United States Patent
Wheeler et al.

(10) Patent No.: US 7,552,333 B2
(45) Date of Patent: *Jun. 23, 2009

(54) TRUSTED AUTHENTICATION DIGITAL SIGNATURE (TADS) SYSTEM

(75) Inventors: Lynn Henry Wheeler, Greenwood Village, CO (US); Anne M. Wheeler, Greenwood Village, CO (US)

(73) Assignee: First Data Corporation, Greenwood Village, CO (US)

( * ) Notice: Subject to any disclaimer, the term of this patent is extended or adjusted under 35 U.S.C. 154(b) by 897 days.

This patent is subject to a terminal disclaimer.

(21) Appl. No.: 10/169,954

(22) PCT Filed: Aug. 6, 2001

(86) PCT No.: PCT/US01/24563

§ 371 (c)(1),
(2), (4) Date: Jul. 3, 2002

(87) PCT Pub. No.: WO02/13444

PCT Pub. Date: Feb. 14, 2002

(65) Prior Publication Data

US 2003/0014372 A1    Jan. 16, 2003

Related U.S. Application Data

(60) Provisional application No. 60/223,076, filed on Aug. 4, 2000.

(51) Int. Cl.
*H04L 9/00* (2006.01)
(52) U.S. Cl. .................................. 713/176; 380/282
(58) Field of Classification Search ............ 713/170, 713/176
See application file for complete search history.

(56) References Cited

U.S. PATENT DOCUMENTS 3,962,539 A    6/1976    Ehrsam et al.

(Continued)

FOREIGN PATENT DOCUMENTS

CA    2271178    7/1999

(Continued)

OTHER PUBLICATIONS

Schneier, Bruce. Applied Cryptography, Second Edition. John Wiley & Sons, 1996. pp. 39-41.*

(Continued)

*Primary Examiner*—Kambiz Zand
*Assistant Examiner*—Jason K Gee
(74) *Attorney, Agent, or Firm*—Sutherland Asbill & Brennan LLP

(57) ABSTRACT

Trusted entity authentication includes creating a public-private pair in a secure environment; storing the private key within a device during its manufacture in the secure environment; linking the public key with other information in the secure environment, receiving input within the device comprising verification data of an entity, identifying within the device a verification status based on the verification data and data prestored within the device; independent of the verification status identified, generating a digital signature for a message including an indication of the identified verification status using the private key; outputting the digital signature for transmission with an EC; identifying upon receipt of the EC the information linked with the public key by authenticating the message with the public key, and considering the identified information and the indicated verification status. The linked information includes device security aspects and the verification status regards entity authentication performed by the device.

13 Claims, 55 Drawing Sheets

U.S. PATENT DOCUMENTS

| | | | |
|---|---|---|---|
| 4,200,770 A | 4/1980 | Hellman et al. | |
| 4,218,582 A | 8/1980 | Hellman et al. | |
| 4,405,829 A | 9/1983 | Rivest et al. | |
| 4,408,203 A | 10/1983 | Campbell | |
| 4,424,414 A | 1/1984 | Hellman et al. | |
| 4,652,698 A | 3/1987 | Hale et al. | |
| 4,734,564 A | 3/1988 | Boston et al. | |
| 4,748,668 A | 5/1988 | Shamir et al. | |
| 4,797,920 A | 1/1989 | Stein | |
| 4,798,668 A | 1/1989 | Ho | |
| 4,823,388 A | 4/1989 | Mizutani et al. | |
| 4,825,050 A | 4/1989 | Griffith et al. | |
| 4,850,017 A | 7/1989 | Mutyas, Jr. et al. | |
| 4,856,077 A | 8/1989 | Rothfjell | |
| 4,868,877 A | 9/1989 | Fischer | |
| 4,879,747 A * | 11/1989 | Leighton et al. | 713/186 |
| 4,885,788 A | 12/1989 | Takaragi et al. | |
| 4,928,298 A | 5/1990 | Tanaka | |
| 4,944,021 A | 7/1990 | Hoshino et al. | |
| 4,995,086 A | 2/1991 | Lilley et al. | |
| 5,001,752 A | 3/1991 | Fischer | |
| 5,018,196 A | 5/1991 | Takaragi et al. | |
| 5,025,373 A | 6/1991 | Keyser, Jr. et al. | |
| 5,029,208 A | 7/1991 | Tanaka | |
| 5,097,504 A | 3/1992 | Camion et al. | |
| 5,140,634 A | 8/1992 | Guillou et al. | |
| 5,214,703 A | 5/1993 | Massey | |
| 5,225,978 A | 7/1993 | Petersen et al. | |
| 5,231,668 A | 7/1993 | Kravitz | |
| 5,280,527 A | 1/1994 | Gullman et al. | |
| 5,412,703 A | 5/1995 | Goodenough et al. | |
| 5,422,953 A * | 6/1995 | Fischer | 713/172 |
| 5,453,601 A | 9/1995 | Rosen | |
| 5,455,865 A | 10/1995 | Pearlman | |
| 5,473,143 A | 12/1995 | Vak et al. | |
| 5,502,766 A | 3/1996 | Boebert et al. | |
| 5,509,071 A | 4/1996 | Petrie, Jr. et al. | |
| 5,534,855 A | 7/1996 | Shockley et al. | |
| 5,539,828 A | 7/1996 | Davis | |
| 5,557,518 A | 9/1996 | Rosen | |
| 5,563,946 A | 10/1996 | Cooper et al. | |
| 5,568,552 A | 10/1996 | Davis | |
| 5,577,120 A | 11/1996 | Penzias | |
| 5,586,036 A | 12/1996 | Pintsov | |
| 5,590,197 A | 12/1996 | Chen et al. | |
| 5,598,474 A | 1/1997 | Johnson | |
| 5,604,801 A | 2/1997 | Donlan et al. | |
| 5,606,609 A | 2/1997 | Houser et al. | |
| 5,615,266 A | 3/1997 | Altschuler et al. | |
| 5,615,268 A | 3/1997 | Bisbee et al. | |
| 5,619,177 A | 4/1997 | Johnson et al. | |
| 5,619,574 A | 4/1997 | Johnson et al. | |
| 5,623,637 A | 4/1997 | Jones et al. | |
| 5,625,690 A | 4/1997 | Michel et al. | |
| 5,636,280 A | 6/1997 | Kelly | |
| 5,659,616 A | 8/1997 | Sudia | |
| 5,659,626 A | 8/1997 | Ort et al. | |
| 5,666,420 A * | 9/1997 | Micali | 380/30 |
| 5,671,258 A | 9/1997 | Burns et al. | |
| 5,671,279 A | 9/1997 | Elgamal | |
| 5,671,285 A | 9/1997 | Newman | |
| 5,677,953 A | 10/1997 | Dolphin | |
| 5,677,955 A | 10/1997 | Doggett et al. | |
| 5,687,322 A | 11/1997 | Deaton et al. | |
| 5,692,047 A * | 11/1997 | McManis | 713/167 |
| 5,694,471 A | 12/1997 | Chen et al. | |
| 5,705,993 A | 1/1998 | Alesu | |
| 5,708,780 A | 1/1998 | Levergood et al. | |
| 5,715,314 A | 2/1998 | Payne | |
| 5,719,950 A | 2/1998 | Osten et al. | |
| 5,721,779 A | 2/1998 | Funk | |
| 5,724,424 A | 3/1998 | Gifford | |
| 5,745,886 A | 4/1998 | Rosen | |
| 5,751,813 A | 5/1998 | Dorenbos | |
| 5,774,525 A | 6/1998 | Kanevsky et al. | |
| 5,778,072 A | 7/1998 | Samar | |
| 5,781,123 A | 7/1998 | Koenig et al. | |
| 5,781,723 A | 7/1998 | Yee et al. | |
| 5,787,172 A | 7/1998 | Arnold | |
| 5,790,677 A | 8/1998 | Fox et al. | |
| 5,796,840 A | 8/1998 | Davis | |
| 5,796,857 A | 8/1998 | Hara | |
| 5,809,144 A | 9/1998 | Sirbu et al. | |
| 5,812,666 A | 9/1998 | Baker et al. | |
| 5,817,123 A | 10/1998 | Kieturakis et al. | |
| 5,825,884 A | 10/1998 | Zdepski et al. | |
| 5,848,161 A | 12/1998 | Luneau et al. | |
| 5,862,327 A | 1/1999 | Kwang et al. | |
| 5,870,475 A | 2/1999 | Allan et al. | |
| 5,878,142 A | 3/1999 | Capute et al. | |
| 5,878,143 A | 3/1999 | Moore | |
| 5,883,810 A | 3/1999 | Franklin et al. | |
| 5,884,270 A | 3/1999 | Walker et al. | |
| 5,884,272 A | 3/1999 | Walker et al. | |
| 5,887,131 A | 3/1999 | Angelo | |
| 5,903,882 A * | 5/1999 | Asay et al. | 705/44 |
| 5,907,147 A | 5/1999 | La | |
| 5,910,988 A | 6/1999 | Ballard | |
| 5,910,989 A | 6/1999 | Naccache | |
| 5,917,913 A | 6/1999 | Wang | |
| 5,943,423 A | 8/1999 | Muftic | |
| 5,949,881 A | 9/1999 | Davis | |
| 5,956,404 A | 9/1999 | Schneier et al. | |
| 5,963,648 A | 10/1999 | Rosen | |
| 5,970,147 A | 10/1999 | Davis | |
| 5,982,502 A | 11/1999 | Jinnai | |
| 5,991,292 A | 11/1999 | Focsaneanu et al. | |
| 5,999,629 A * | 12/1999 | Heer et al. | 705/51 |
| 6,000,522 A | 12/1999 | Johnson | |
| 6,000,832 A | 12/1999 | Franklin et al. | |
| 6,002,787 A | 12/1999 | Takhar et al. | |
| 6,009,177 A | 12/1999 | Sudia | |
| 6,011,858 A | 1/2000 | Stock et al. | |
| 6,021,202 A | 2/2000 | Anderson et al. | |
| 6,023,509 A | 2/2000 | Herbert | |
| 6,029,150 A | 2/2000 | Kravitz | |
| 6,044,154 A | 3/2000 | Kelly | |
| 6,047,051 A | 4/2000 | Ginzboorg et al. | |
| 6,049,874 A | 4/2000 | McClain et al. | |
| 6,061,794 A | 5/2000 | Angelo et al. | |
| 6,061,799 A * | 5/2000 | Eldridge et al. | 726/20 |
| 6,069,970 A | 5/2000 | Salatino et al. | |
| 6,070,154 A | 5/2000 | Tavor et al. | |
| 6,073,237 A * | 6/2000 | Ellison | 713/171 |
| 6,073,242 A | 6/2000 | Hardy et al. | |
| 6,084,969 A | 7/2000 | Wright et al. | |
| 6,092,202 A | 7/2000 | Veil et al. | |
| 6,102,287 A | 8/2000 | Matyas | |
| 6,104,815 A | 8/2000 | Alcorn et al. | |
| 6,105,012 A | 8/2000 | Chang | |
| 6,108,644 A | 8/2000 | Goldschlag et al. | |
| 6,111,956 A | 8/2000 | Field et al. | |
| 6,125,349 A | 9/2000 | Maher | |
| 6,134,325 A | 10/2000 | Vanstone | |
| 6,140,939 A | 10/2000 | Flick | |
| 6,144,949 A | 11/2000 | Harris | |
| 6,154,543 A | 11/2000 | Baltzley | |
| 6,161,180 A | 12/2000 | Matayas et al. | |
| 6,161,181 A | 12/2000 | Haynes, III et al. | |
| 6,167,518 A | 12/2000 | Padgett et al. | |
| 6,189,096 B1 | 2/2001 | Haverty | |
| 6,192,130 B1 | 2/2001 | Otway | |
| 6,192,405 B1 | 2/2001 | Bunnell | |
| 6,199,052 B1 | 3/2001 | Mitty et al. | |

| | | | |
|---|---|---|---|
| 6,202,151 B1 | 3/2001 | Musgrave et al. | |
| 6,205,437 B1 | 3/2001 | Gifford | |
| 6,213,391 B1 | 4/2001 | Lewis | |
| 6,230,269 B1 | 5/2001 | Spies et al. | |
| 6,233,565 B1 | 5/2001 | Lewis et al. | |
| 6,240,091 B1 | 5/2001 | Ginzboorg et al. | |
| 6,243,812 B1 | 6/2001 | Matayas et al. | |
| 6,253,027 B1 | 6/2001 | Weber et al. | |
| 6,253,322 B1 | 6/2001 | Susaki et al. | |
| 6,256,737 B1 | 7/2001 | Bianco et al. | |
| 6,263,447 B1 | 7/2001 | French | |
| 6,279,112 B1 | 8/2001 | O'toole, Jr., et al. | |
| 6,282,522 B1 | 8/2001 | Davis et al. | |
| 6,285,991 B1 | 9/2001 | Powar | |
| 6,292,897 B1 * | 9/2001 | Gennaro et al. | 713/175 |
| 6,299,062 B1 | 10/2001 | Hwang | |
| 6,314,519 B1 | 11/2001 | Davis et al. | |
| 6,324,525 B1 | 11/2001 | Kramer et al. | |
| 6,373,950 B1 | 4/2002 | Rowney | |
| 6,424,249 B1 | 7/2002 | Houvener | |
| 6,484,260 B1 | 11/2002 | Scott et al. | |
| 6,510,516 B1 | 1/2003 | Benson et al. | |
| 6,523,067 B2 | 2/2003 | Mi et al. | |
| 6,532,451 B1 | 3/2003 | Schell et al. | |
| 6,565,000 B2 | 5/2003 | Sehr | |
| 6,567,913 B1 | 5/2003 | Ryan, Jr., et al. | |
| 6,571,339 B1 | 5/2003 | Danneels et al. | |
| 6,587,837 B1 | 7/2003 | Spagna et al. | |
| 6,594,633 B1 | 7/2003 | Broerman | |
| 6,594,759 B1 | 7/2003 | Wang | |
| 6,601,171 B1 | 7/2003 | Carter et al. | |
| 6,615,191 B1 | 9/2003 | Seeley | |
| 6,636,894 B1 | 10/2003 | Short et al. | |
| 6,671,805 B1 | 12/2003 | Brown et al. | |
| 6,741,729 B2 | 5/2004 | Bjorn et al. | |
| 6,751,729 B1 | 6/2004 | Giniger et al. | |
| 6,775,772 B1 * | 8/2004 | Binding et al. | 713/171 |
| 6,898,299 B1 | 5/2005 | Brooks | |
| 6,957,337 B1 | 10/2005 | Chainer et al. | |
| 6,990,588 B1 | 1/2006 | Yasukura | |
| 7,020,308 B1 | 3/2006 | Shinzaki et al. | |
| 7,027,617 B1 | 4/2006 | Frischholz | |
| 7,130,066 B1 | 10/2006 | Kanematu | |
| 2001/0000535 A1 | 4/2001 | Lapsley et al. | |
| 2001/0036297 A1 | 11/2001 | Ikegami et al. | |
| 2002/0053857 A1 | 5/2002 | Scott et al. | |
| 2002/0120846 A1 | 8/2002 | Stewart | |

FOREIGN PATENT DOCUMENTS

| | | |
|---|---|---|
| EP | 0214609 | 3/1986 |
| EP | 0956818 A | 11/1999 |
| FR | 2592502 | 12/1985 |
| GB | 2237670 A | 5/1991 |
| WO | 96/24997 | 8/1996 |
| WO | 97/29567 A1 | 8/1997 |
| WO | 98/09227 | 3/1998 |
| WO | 98/15924 | 4/1998 |
| WO | 98/50875 | 11/1998 |
| WO | 99/28452 | 10/1999 |
| WO | 99/57835 | 11/1999 |
| WO | 00/28493 | 5/2000 |
| WO | 00/67143 | 11/2000 |

OTHER PUBLICATIONS

FIPS 186 (Announcing the Standard for Digital Signature Standard (DSS), Federal Information Processing Standards Publication 186). May 18, 1994, pp. 1-18.*

Burton S. Kaliski, Jr., Some Examples of the PKCS Standards, An RSA Laboratories Technical Note, Nov. 1, 1993, RSA Laboratories, Redwood City, CA, pp. 1-15.

Burton S. Kaliski, Jr., A Layman's Guide to a Subset of ASN.1, BER, and DER, An RSA Laboratories Technical Note, Nov. 1, 1993, RSA Laboratories, Redwood City, CA, pp. 1-36.

PKCS Editor, PKCS #1 v2.1: RSA Cryptography Standard, RSA Laboratories, Draft 2, Jan. 5, 2001, RSA Laboratories, Bedford, MA, pp. 1-60.

PKCS #3: Diffie-Hellman Key-Agreement Standard, An RSA Laboratories Technical Note, Version 1.4, Nov. 1, 1993, RSA Laboratories, Redwood City, CA, pp. 1-8.

PKCS #6: Extended-Certificate Syntax Standard, An RSA Laboratories Technical Note, Nov. 1, 1993, Version 1.5, RSA Laboratories, Redwood City, CA, pp. 1-11.

PKCS #8: Private-Key Information Syntax Standard, An RSA Laboratories Technical Note, Nov. 1, 1993, Version 1.2, RSA Laboratories, Redwood City, CA, pp. 1-5.

Michael J. Wiener, Performance Comparison of Public-Key Cryptosystems, The Technical Newsletter of RSA Laboratories, a division of RSA Data Security, Inc., Summer 1998, vol. 4, No. 1, RSA Laboratories, San Mateo, CA, pp. 1-23.

George Apostolopoulos, et al., Securing Electronic Commerce: Reducing the SSL Overhead, IEEE Network, Jul./Aug. 2000, vol. 14, Issue 4, pp. 1-16.

Ueli Maurer, Modelling a Public-Key Infrastructure, Sep. 1996, Proc. 1996 European Symposium on Research in Computer Security, Lecture Notes in Computer Science, Berlin: Springer-Verlag, Rome, Italy, Department of Computer Science, Swiss Federal Institute of Technology, Zürich, Switzerland, pp. 1-26.

Security Requirements for Cryptographic Modules, Federal Information Processing Standards Publication 140-1, Jan. 11, 1994, pp. 1-45, CSL Bulletin For FIPS 140-1 pp. 1-6, Validated FIPS 140-1 Cryptographic Modules 2001, 2000, 1999, 1998, 1997-95, pp. 1-14.

Mark Heroux, A Private Key Storage Server for DCE—Functional Specification, Open Software Foundation Request for Comments: 94.1, Nov. 1996, (web site at http://www.opengroup.org/rfc/mirror-rfc/rfc94.1.txt), date of capture June 13, 2001, pp. 1-73.

Peter Cox, Bench-Marking SmartGate, Establishing the Scaleability of V-One's SmartGate Security System, Internet SmartWare Ltd., Jul. 24, 1997, pp. 1-7.

Answers to Frequently Asked Questions about Today's Cryptography, RSA Data Security, Inc., Oct. 5, 1993, Revision 2.0, pp. 1-44.

Announcing the Standard for Digital Signature Standard (DSS), Federal Information Processing Standards Publication 186, May 19, 1994, pp. 1-18.

Sharon Boeyen, Certificate Policies and Certification Practice Statements, Entrust Technologies White Paper, Feb. 1997, Version 1.0, pp. 1-7.

Public-Key Infrastructure (PKI)—The VeriSign Difference, Feb. 3, 2001, Copyright 1999, VeriSign, Inc., pp. 1-21.

Thierry Moreau, Thirteen Reasons to Say 'No' to Public Key Cryptography, Draft paper, Mar. 4, 1998, Connotech Experts-Conseils, Inc., Montréal, Québec, Canada, pp. 1-5.

"X9 Overview," American Bankers Association web page (web site at http://www.x9.org/aboutX9.htm), 1998, date of capture Jan. 11, 1999, 3 pp.

Jul. 1997 Meeting Report, Electronic Payments Forum (web site at http://www.epf.net/PrevMtngs/July97Mtng/July97Report.htm), date of capture Jan. 11, 1999, 2 pp.

Hettinga's Best of the Month, Journal of Internet Banking and Commerce, Jan. 5, 1998, (web site at wysiwyg://10/http://www.arraydev.com/commerce/JIBC/9801-20.htm), date of capture Jan. 11, 1999, 6 pp.

Burton S. Kaliski Jr., An Overview of the PKCS Standards, An RSA Laboratories Technical Note, Nov. 1, 1993, RSA Data Security, Inc. Public-Key Cryptography Standards (PKCS), pp. 1-27.

Public Key Cryptography, NIST Special Publication 800-2, Apr. 1991, reprinted at http://csrc.nist.gov/publications/nistpubs/800-2/800-2.txt, pp. 1-138.

Guideline for Implementing Cryptography in the Federal Government, NIST Special Publication 800-21, Nov. 1999, pp. 1-138.

Guideline for the Use of Advanced Authentication Technology Alternatives, FIPS Publication 190, Sep. 28, 1994, reprinted at http://csrc.nist.gov/publications/fips/fips190/fip190.txt, pp. 1-55.

Building A Foundation of Trust in the PC, The Trusted Computing Platform Alliance, Jan. 2000 (web site at http://www.trustedpc.org), pp. 1-9.
Trusted Platform Module (TPM) Security Policy (A Part of the "TCPA Security Policy"), Version 0.45, Oct. 2, 2000, pp. 1-13.
Trusted Platform Module Protection Profile (TPMPP) (A Part of the "TCPA Security Policy"), Version 0.45, Sep. 14, 2000, pp. 1-151.
TCPA PC Specific Implementation Specification, Version 0.95, Jul. 4, 2001, pp. 1-70.
Common Criteria for Information Technology Security Evaluation, Smart Card Security User Group, Smart Card Protection Profile, draft Version 2.1d, Mar. 21, 2001, pp. 1-194.
X9.84-2000, Biometric Information Management and Security for the Financial Services Industry, draft version, Dec. 2000, pp. 1-141.
Security Requirements for Cryptographic Modules, FIPS Publication 140-2, May 25, 2001, pp. 1-62.
Secure Hash Standard, FIPS Publication 180-1, Apr. 17, 1995, pp. 1-24.
Digital Signature Standard (DSS), FIPS Publication 186-2, Jan. 27, 2000, pp. 1-72.
Entity Authentication Using Public Key Cryptography, FIPS Publication 196, Feb. 18, 1997, pp. 1-52.
Computer Data Authentication, FIPS Publication 113, May 30, 1985, (web site at www.itl.nist.gov/fipspubs/fip113.htm), date of capture Jan. 16, 2001, pp. 1-7.
Hettinga's Best of the Month, Journal of Internet Banking and Commerce, Mar. 31, 1999, (web site at http://www.arraydev.com/commerce/JIBC/9801-20.htm), pp. 1-4.
The Electronic Commerce Challenge, Journal of Internet Banking and Commerce, Mar. 31, 1999, (web site at http://www.arraydev.com/commerce/JIBC/9811-06.htm), pp. 1-2.
Sales Brochure for Approveit, electronic approval management software, by SilanisTechnology, Inc., Jul. 18, 2000, pp. 1-12.
Public Key Infrastructure, An NSS Group White Paper, by Bob Walder, undated, reprinted from website http://www.nss.co.uk/WhitePapers/PublicKeyInfrastructure.htm on Jan. 25, 2001, pp. 1-18.
Smart Card & Security Basics, Cardlogix, Inc. brochure, Ref. date: Q1-Q2 2000, pp. 3-36.
Understanding Public Key Infrastructure (PKI), Technology White Paper, by RSA Security, Inc., 1999, pp. 1-10.
An Overview of Smart Card Security, Chan, Siu-cheung Charles, Aug. 17, 1997, reprinted from website http://home.hkstar.com/~alanchan/papers/smartCardSecurity/ on Jan. 27, 2001, pp. 1-7.
Technical Introduction to CIP 3.0, Taschler, Scott, Sep. 30, 1997, reprinted from website http://www.datakey.com/cardpage/cip.htm on Jan. 25, 2001, pp. 1-6.
Smart Cards: Enabling Smart Commerce in the Digital Age, CREC/KPMG White Paper (Draft), May 1998, pp. 1-22.
Hettinga, Bob, Hettiga's Best of the Month, Journal of Internet Banking and Commerce; Array Development, Mar. 31, 1999, web site at http://www.arraydev.com/commerce/JIBC/9801-20.htm, pp. 1-4.
Denny, Stephanie, The Electric Commerce Challenge, Journal of Internet Banking and Commerce; Array Development, Mar. 31, 1999, web site at http://www.arraydev.com/commerce/JIBC/9811-06.htm, pp. 1-2.
PKCS #9, Selected Object Classes and Attribute Types Version 2.0, RSA Laboratories, Redwood City, CA, pp. 1-42, Nov. 2000.
Digital Signature Guidelines Tutorial ; ABA Network, (web site at http://www.abanet.org/scietech/ec/isc/dsg-tutorial.html), date of capture Feb. 18, 2003, pp. 1-7.
Gerck, Ed, Overview of Certication Ssytems: x.509, PKIX, CA, PGP & SKIP—Do you understand digital certificates? Do you know what they warrant? Jul. 18, 2000; pp. 1-18.
Linn, John, Trust Models and Management in Public-Key Infrastructures; RSA Laboratories, Nov. 6, 2000, pp. 1-13.
PKCS #5, v2.0: Password-Based Cryptography Standard, RSA Laboratories, Redwood City, CA; Mar. 25, 1999; pp. 1-30.
PKCS #9, v2.0: Selected Object Classes and Attribute Types, RSA Laboratories, Redwood City, CA; Feb. 25, 2000; pp. 1-34.
PKCS #10, v1.7: Certificate Request Syntax Standard, RSA Laboratories, Redwood City, CA; May 26, 2000; pp. 1-10.

PCKS #12, v1.0: Personal Information Excahnge Syntax, RSA Laboratories, Redwood City, CA; Jun. 24, 1999; pp. 1-23.
PCKS #15: Conformance Profile Specification; RSA Laboratories, Redwood City, CA; Aug. 1, 2000; pp. 1-8.
Pepe, Michel; Smart Cards Gaining Traction; CRN.com—Point of Sale: Trends, Markets and Technologies; Dec. 31, 2002, (web site at http://crn.channelsupersearch.com/news/crn/39163.asp) captured on Feb. 18, 2003; pp. 1-2.
Guide to Internet Security; Public Key Cryptography (web site at http://www.e-certify.com/library/pkc_guide.htm) captured on Feb. 18, 2003.
Private Server Product Description; (web site at http://www.bnn.com.tr/assets/cserver_prodesc.html), date of capture Feb. 18, 2003; pp. 1-11.
Cylink atm encryptor (web site at http//securitytools.hypermart.net/security_1/cylink_atm_encryptor.html), date of capture Feb. 18, 2003, p. 1.
BALs PGP Pubic Key Server; The Computer Law Resource 1996; (web site at http://www.complaw.com/pgp/webkeyserver.html) date of capture Feb. 18, 2003; pp. 1-2.
Baltimore; Solutions; A New Era in Secure and Trusted E-Business; (web site at http://www.baltimore.com/solutions/index.asp) date of capture Feb. 18, 2003; p. 1.
(PGP) Pretty Good Privacy; What's? com; Dec. 27, 2000; (web site at http://whatis.techtarget.com/WhatIs_Definition_Page/0,4152,214292,00.html) date of capture Dec. 27, 2000; pp. 1-3.
An Introduction to Cryptography; Network Associates, Inc. PGP, Version 6.5.1; Jun. 1999; pp. 1-88.
Turnbill, Jim; "Cross-Certification and PKI Policy Networking"; Entrust, Inc; Aug. 2000; pp. 1-10.
Some Suggestions for Automatic Encryption and Identity Verification in the IBM Internal Computing Network; Dec. 28, 1985; pp. 1-13.
Arthur, Dwight; AADS Option for Buyer Authentication; Response to NACHA/IC ANT 2 RFI; Sep. 14, 1998; pp. 1-3.
Internet Counsel; Consumer Internet Purchases Using ATM Cards Successfully Processed by NACHA Pilot Participants; Feb. 23, 2003; pp. 1-4.
Internet Counsel; NACHA to Test ATM Card Payments for Consumer Internet PUrchases; Feb. 23, 2003; pp. 1-3.
News Release: Digital Signatures Can Secure ATM Card Payments on the Internet, NACHA Pilot Concludes; Jul. 23, 2001; pp. 1-2.
Kutler, Jeffrey; Privacy Broker: Likely Internet Role for Banks? Digital Frontiers; Oct. 8, 1998; pp. 1-6.
Disclosure Statement Under 37 C.F.R. § 1.56 for U.S. Appl. No. 10/169,954.
Account Authority Digital Signature Model (http://www.garlic.com/~lynn/aadsover.htm) believed at website after Nov. 8, 1997, date of capture Oct. 2, 2001, p. 5.
Federal Information Processing Standards Publication 140-1, Security Requirements for Cryptographic Modules; US DOC/NBS, Jan. 11, 1994.
Federal Information Processing Standards Publication 140-2, Security Requirements for Cryptographic Modules; US DOC/NBS, May 25, 2001.
Federal Information Processing Standards Publication 80-1, Digital Signature Standard, US DOC/NBS, Apr. 17, 1995.
Federal Information Processing Standards Publication 186-2, Digital Signature Standards, US DOC/NBS, Jan. 11, 1994.
Federal Information Processing Standards Publication 196, Entity Authentication Using Public Key Cryptography, US DOC/NBS, Feb. 18, 1997.
FIPS 186 (Announcing the Standard for Digital Signature Standard (DDS), Federal Information Processing Standards Publication 186). May 18, 1994, pp. 1-18.
"Inside PGP Key Reconstruction: Technical Details," Revision by Will Price, dated Jul. 25, 2000, A PGP Security, Inc. White Paper.
List Serve Posting dated Apr. 2, 2000 regarding Biometrics and Electronic Signatures, Apr. 2, 2000. (cited in U.S. Appl. No. 10/343,618).
List Serve Posting dated Aug. 15, 1999 regarding Risk Management in AA/draft X9.59, Aug. 15, 1999. (cited in U.S. Appl. No. 10/343,618).

List Serve Posting dated Dec. 3, 1998 regarding EU Digital Signature Initiative Stalled, Dec. 3, 1998. (cited in U.S. Appl. No. 10/343,618).

List Serve Posting dated Dec. 11, 1998 regarding AADS Strawman, Dec. 11, 1998. (cited in U.S. Appl. No. 10/343,618).

List Serve Posting dated Dec. 12, 1999 regarding QC Bio-Info Leak?, (cited in U.S. Appl. No. 10/343,618).

List Serve Posting dated Dec. 29, 1999 regarding Attacks on PKI, Dec. 29, 1999. (cited in U.S. Appl. No. 10/343,618).

List Serve Posting dated Dec. 30, 1999 regarding Attacks on PKI, Dec. 30, 1999. (cited in U.S. Appl. No. 10/343,618).

List Serve Posting dated Feb. 7, 2000 regarding Questions about PKI, Feb. 7, 2000. (cited in U.S. Appl. No. 10/343,618).

List Serve Posting dated Feb. 14, 2000 regarding Real Names Hacked—Firewall Issues, Feb. 14, 2000. (cited in U.S. Appl. No. 10/343,618).

List Serve Posting dated Jul. 16, 1999 regarding Common Misconceptions, was Re: KISS for PKIX, Jul. 16, 1999. (cited in U.S. Appl. No. 10/343,618).

List Serve Posting dated May 24, 1999 regarding [ECARM] Cardtech/Securetech & CA PKI, May 24, 1999. (cited in U.S. Appl. No. 10/343,618).

List Serve Posting dated May 25, 1999 regarding [ECARM] Cardtech/Securetech & CA PKI May 25, 1999. (cited in U.S. Appl. No. 10/343,618).

List Serve Posting dated May 30, 1999 regarding [ECARM] Cardtech/Securetech & CA PKI May 30, 1999. (cited in U.S. Appl. No. 10/343,618).

Menezes, Alfred J. Handbook of Applied Cryptography. CRC Press, 1997, pp. 25-32, 546-548, 572-577.

O'Mahoney, Donal. Electronic Payment Systems, Artech House, Inc., pp. 51 and 77-80 (1961).

Pepe, Michel. Smart Cards Gaining Traction, CRN.com-Point of Sale: Trends, Markets and Technologies, Dec. 31, 2002, (website at www.cm.channelsupersearch.com/news/cm/39163.asp) captured on Feb. 18, 2003, pp. 1-2.

"Policy Management Agent for SMTP," Network Associates, 3965 Freedom Circle, Santa Clara, CA 95054-1203, dated Dec. 1999.

Schneier, Bruce. "Applied Cryptography," Second Edition, 1996, pp. 37-39.

Scheneier, Bruce. "Applied Cryptography," Second Edition. John Wiley & Sons, 1996. pp. 185-187.

"X9.59 Working Draft," American Bankers Association, American National Standard X9.59-199X, For the Financial Services Industry: Account-Based Secure Payment Objects, Sep. 25, 1998, pp. 1-26.

Disclosure Statement Under 37 C.F.R. § 1.56 for U.S. Appl. No. 10/169,954.

Office Action dated Jun. 13, 2008 for U.S. Appl. No. 10/343,618.

Office Action dated Jul. 17, 2008 for U.S. Appl. No. 09/923,075.

Disclosure Under 36 C.F.R. ≥ 1.56 filed Mar. 3, 2009.

Non-Final Office Action of U.S. Appl. No. 09/923,075 mailed Dec. 15, 2008.

Advisory Action of U.S. Appl. No. 10/343,619 mailed Feb. 9, 2009.

Final Office Action of U.S. Appl. No. 10/343,619 mailed Dec. 17, 2008.

Non-Final Office Action of U.S. Appl. No. 10/343,618 mailed Jan. 13, 2009.

* cited by examiner

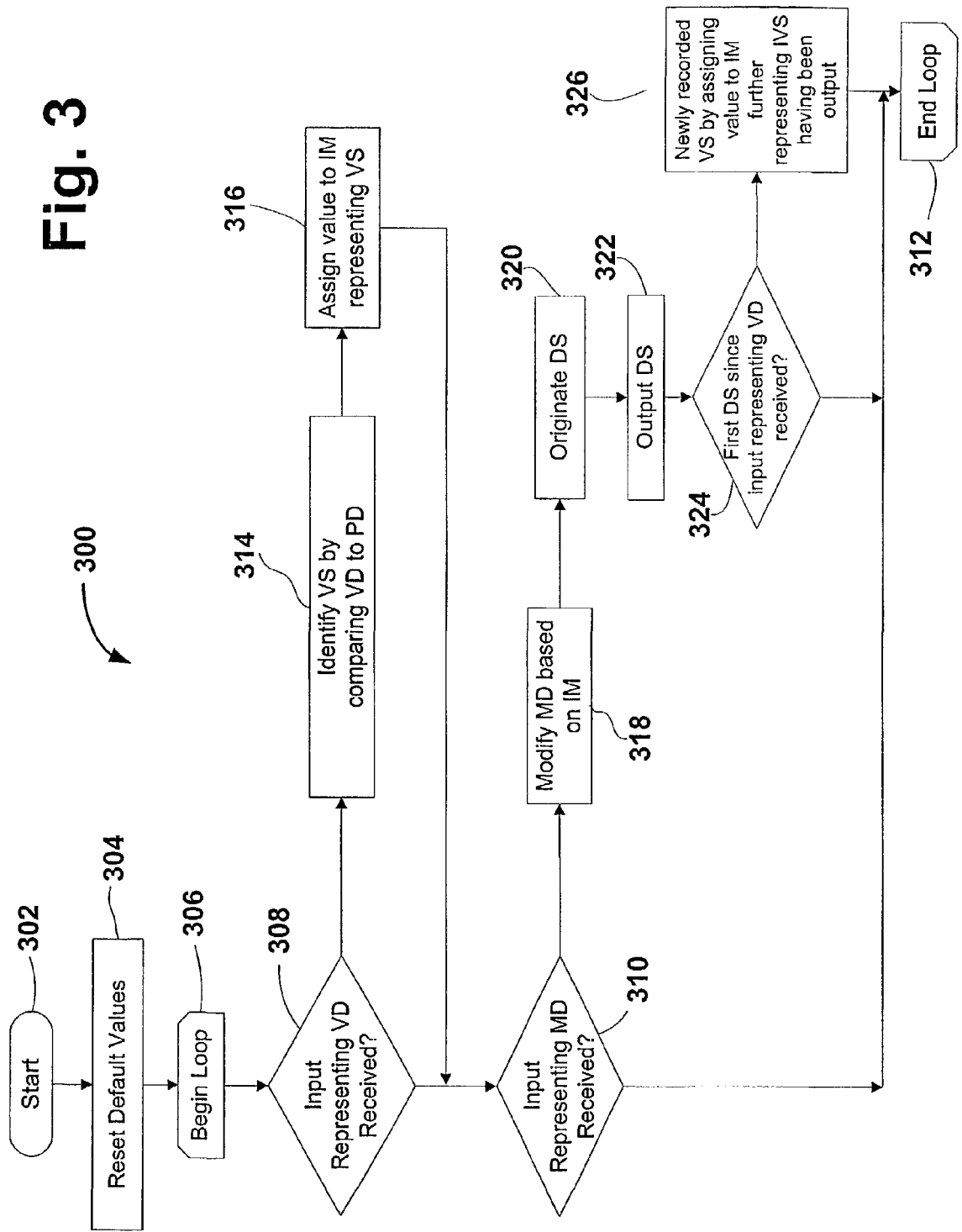

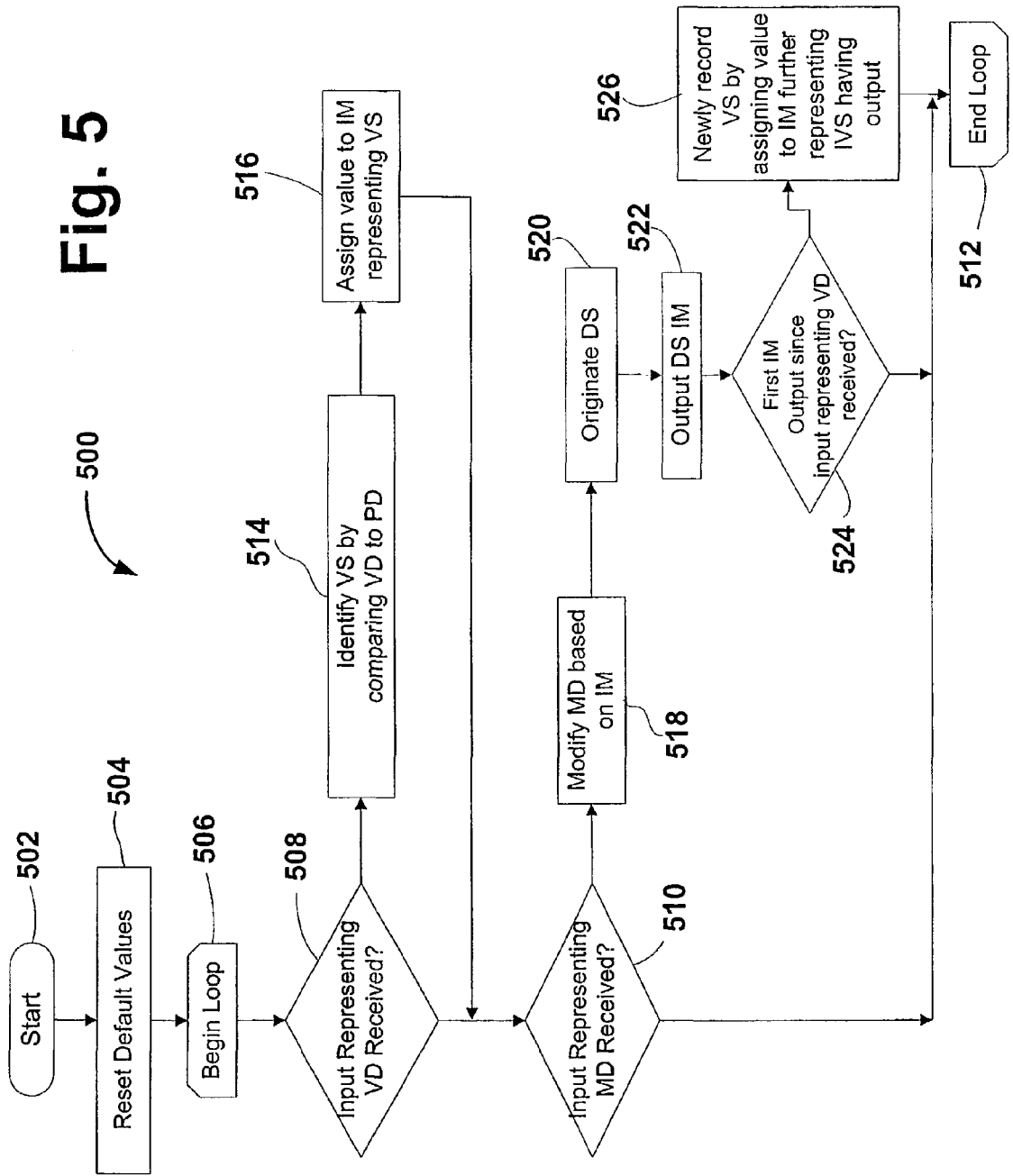

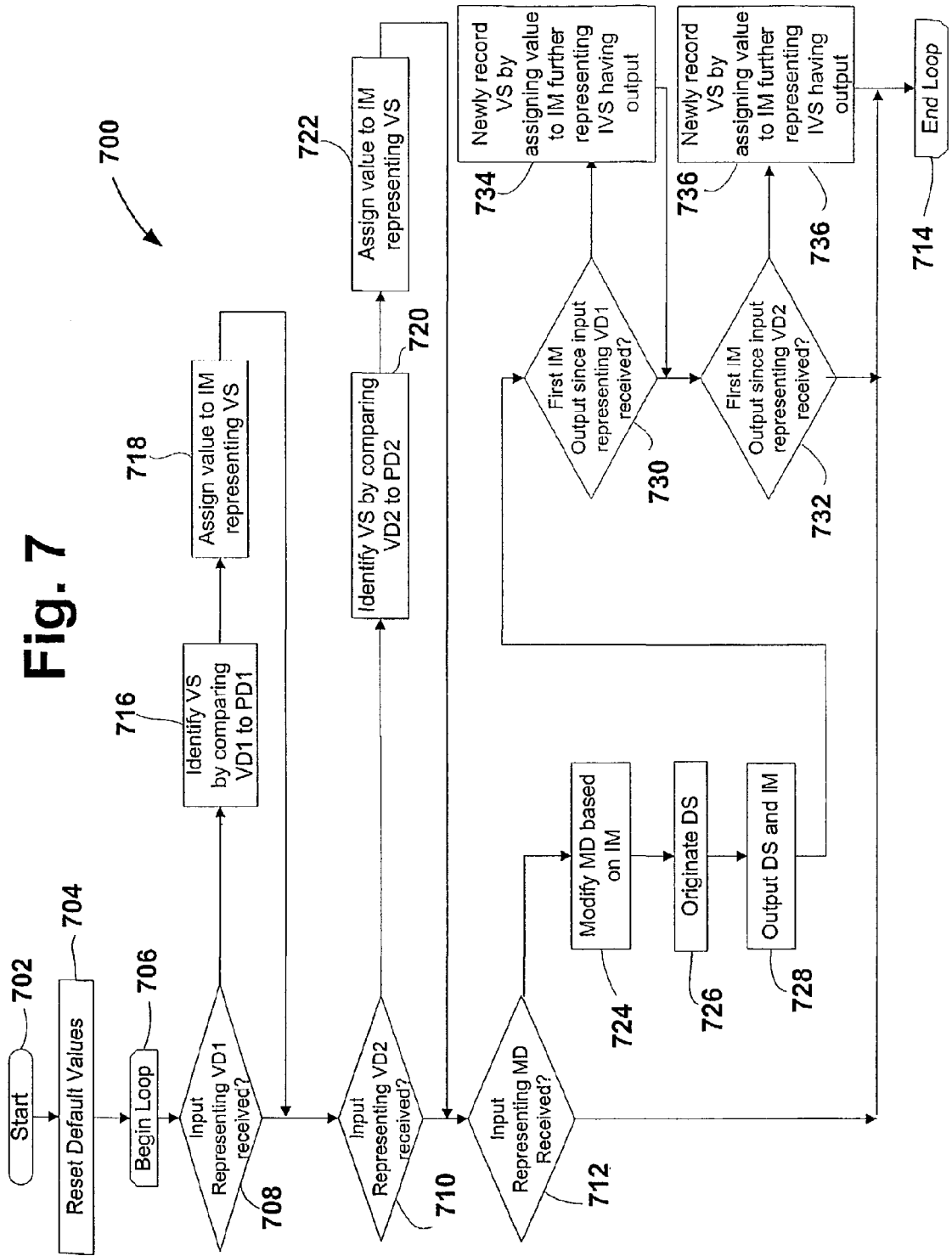

Fig. 10a

| Type (2002) of Verification Data | Value (Authorized User) (1006) |
|---|---|
| PIN | PD=SPD = abcdef |

| Type (1002) of Verification Data | Value (Authorized User) (1006) |
|---|---|
| Bio: ******** | PD=BPD = ########## |

| Type (1002) of Verification Data | Identifier (1004) | Value (Authorized User) (1006) PD= |
|---|---|---|
| PIN | 001 | abcdef |
| Bio: fingerprint (R-thumb) | 002 | ################ |
| Bio: fingerprint (R-index) | 003 | ################ |
| Bio: fingerprint (R-middle) | 004 | ################ |
| Bio: fingerprint (R-ring) | 005 | ################ |
| Bio: fingerprint (R-pinky) | 006 | ################ |
| Bio: fingerprint (L-thumb) | 007 | ################ |
| Bio: fingerprint (L-index) | 008 | ################ |
| Bio: fingerprint (L-middle) | 009 | 0 |
| Bio: fingerprint (L-ring) | 010 | ################ |
| Bio: fingerprint (L-pinky) | 011 | ################ |
| Bio: handprint (R) | 012 | #################### |
| Bio: handprint (L) | 013 | #################### |
| Bio: hand geometry scan (R) | 014 | #################### |
| Bio: hand geometry scan (L) | 015 | 0 |
| Bio: retina scan (R) | 016 | #################### |
| Bio: retina scan (L) | 017 | #################### |
| Bio: iris scan (R) | 018 | #################### |
| Bio: iris scan (L) | 019 | 0 |
| Bio: voice recognition | 020 | ################ |
| Bio: facial recognition | 021 | 0 |
| Bio: written signature | 022 | ############ |
| Bio: writing sample | 023 | ################ |
| Bio: DNA sample | 024 | ######################## |

1000c    1008    1010    1012

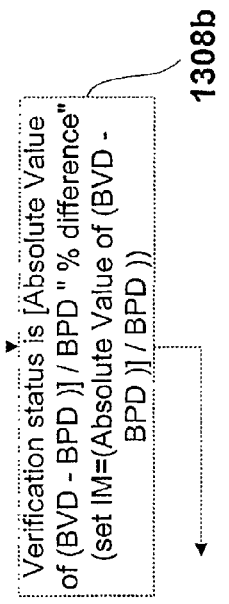
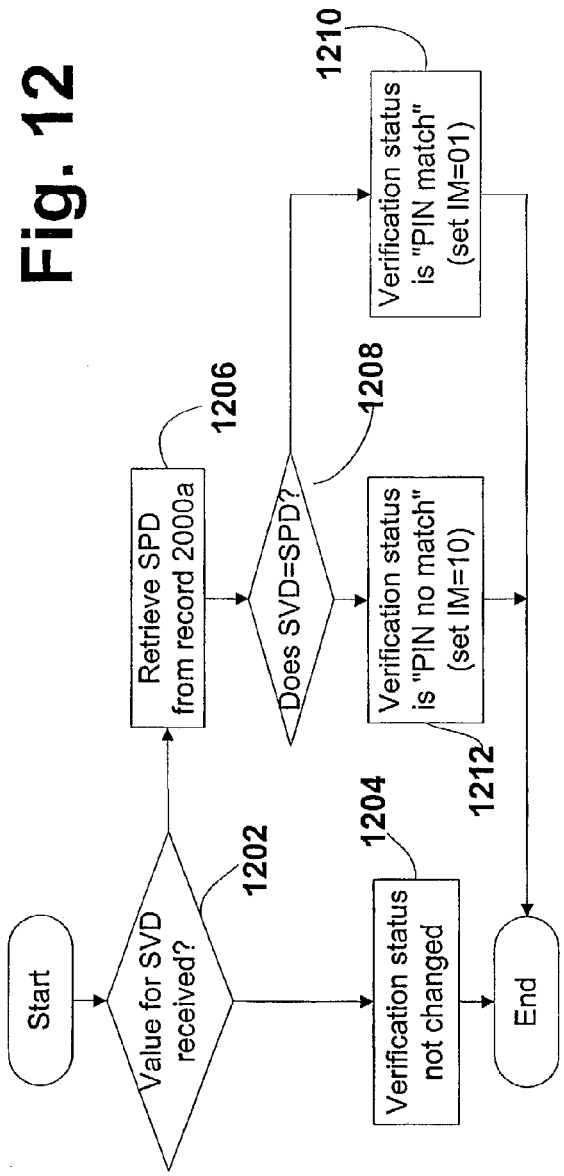
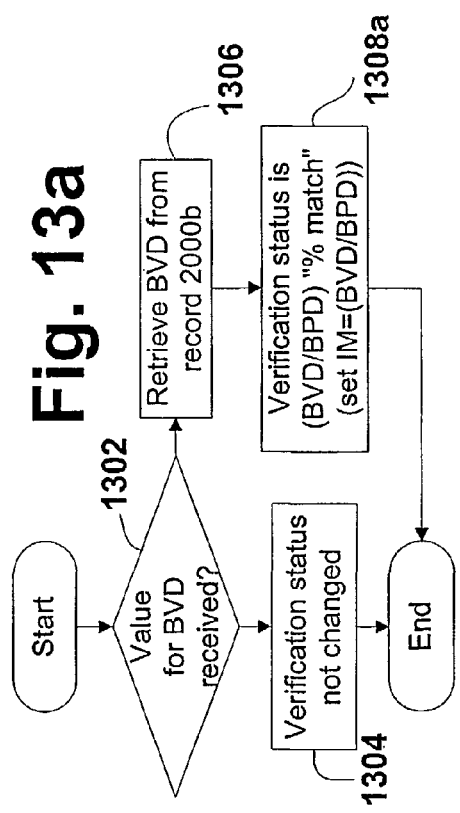

Fig. 15a

| Verification Status (PIN) | Rs₁ (1502) | Rs₂ (1504) | Rs₃ (1506) |
|---|---|---|---|
| No PIN Input | 0 | 00 | "No input" |
| PIN correct | 1 | 01 | "Match" |
| PIN not correct | 2 | 10 | "No match" |

Fig. 15b

| Verification Status (PIN) | Rs₁ (1508) | Rs₂ (1510) | Rs₃ (1512) |
|---|---|---|---|
| No PIN Input | 0 | 00 | "No input" |
| PIN correct, 1st Output | 1 | 01 | "Match, first output since input representing verification data received" |
| PIN not correct | 2 | 10 | "No match" |
| PIN correct, previous Output | 3 | 11 | "Match, but not first output since input representing verification data received" |

Fig. 16

| Verification Status (BIO) | Rb₁ (1602) | Rb₂ (1604) | Rb₃ (1606) |
|---|---|---|---|
| No BIO Input | 00 | 0.00 | "No biometric data entered" |
| (BVD/BPD) "% match" | ## | 0.## | <##> "% degree of match" |
| \|(BVD-BPD)\| / BVD "% difference" | ## | 0.## | <##> "% degree of difference" |

Fig. 17

| Actions in Sequence | IM |||||
|---|---|---|---|---|---|
| | Rs | Rb002 | DSFlag (002) | Rb016 | DSFlag (016) |
| 1. Start Up/Reset | 00 | 00 | 0 | 00 | 0 |
| 2. Incorrect PIN | 10 | 00 | 0 | 00 | 0 |
| 3. Correct PIN | 01 | 00 | 0 | 00 | 0 |
| 4. 1st DS & Output of IVS | 11 | 00 | 1 | 00 | 1 |
| 5. 2nd DS & Output of IVS | 11 | 00 | 1 | 00 | 1 |
| 6. Correct PIN | 01 | 00 | 1 | 00 | 1 |
| 7. R. Thumb Provided (85%) | 01 | 85 | 0 | 00 | 1 |
| 8. R. Retina Provided (90%) | 01 | 85 | 0 | 90 | 0 |
| 9. 3rd DS & Output of IVS | 11 | 85 | 1 | 90 | 1 |
| 10. 2nd R. Thumb Provided (88%) | 11 | 88 | 0 | 90 | 1 |
| 11. Incorrect PIN | 10 | 88 | 0 | 90 | 1 |
| 12. 4th DS & Output of IVS | 10 | 88 | 1 | 90 | 1 |
| 13. 2nd R. Retina Provided (89%) | 10 | 88 | 1 | 89 | 0 |

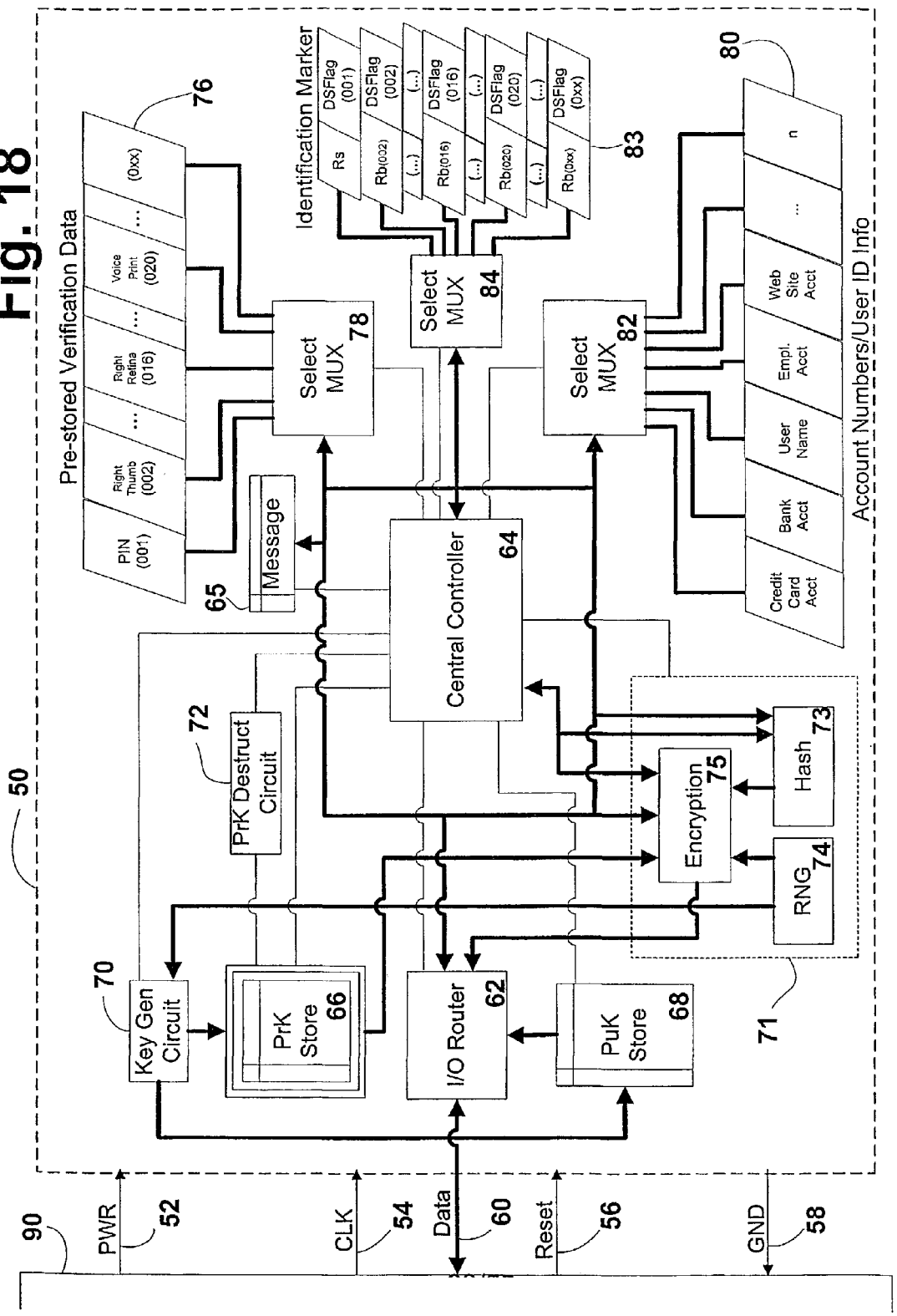

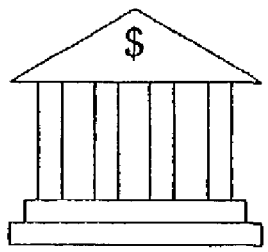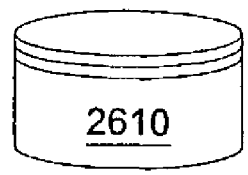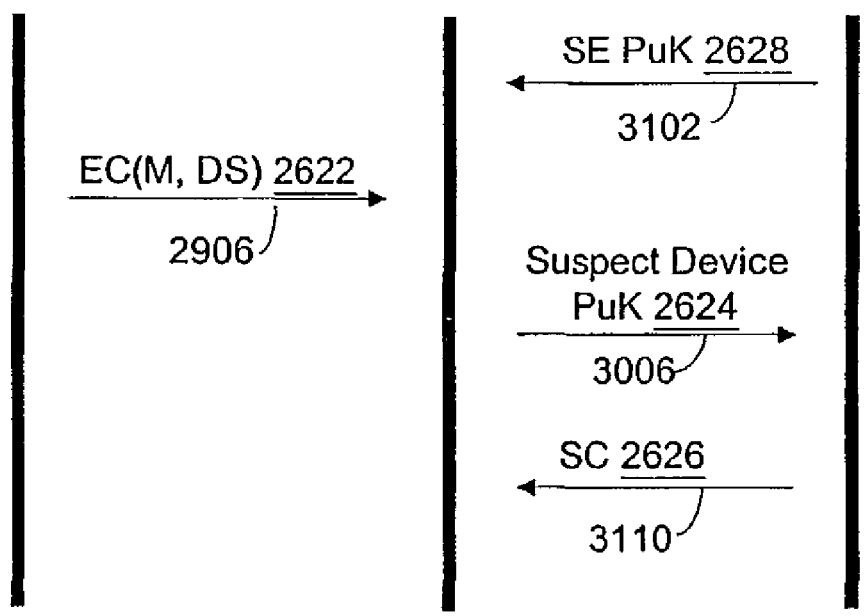
FIG. 28

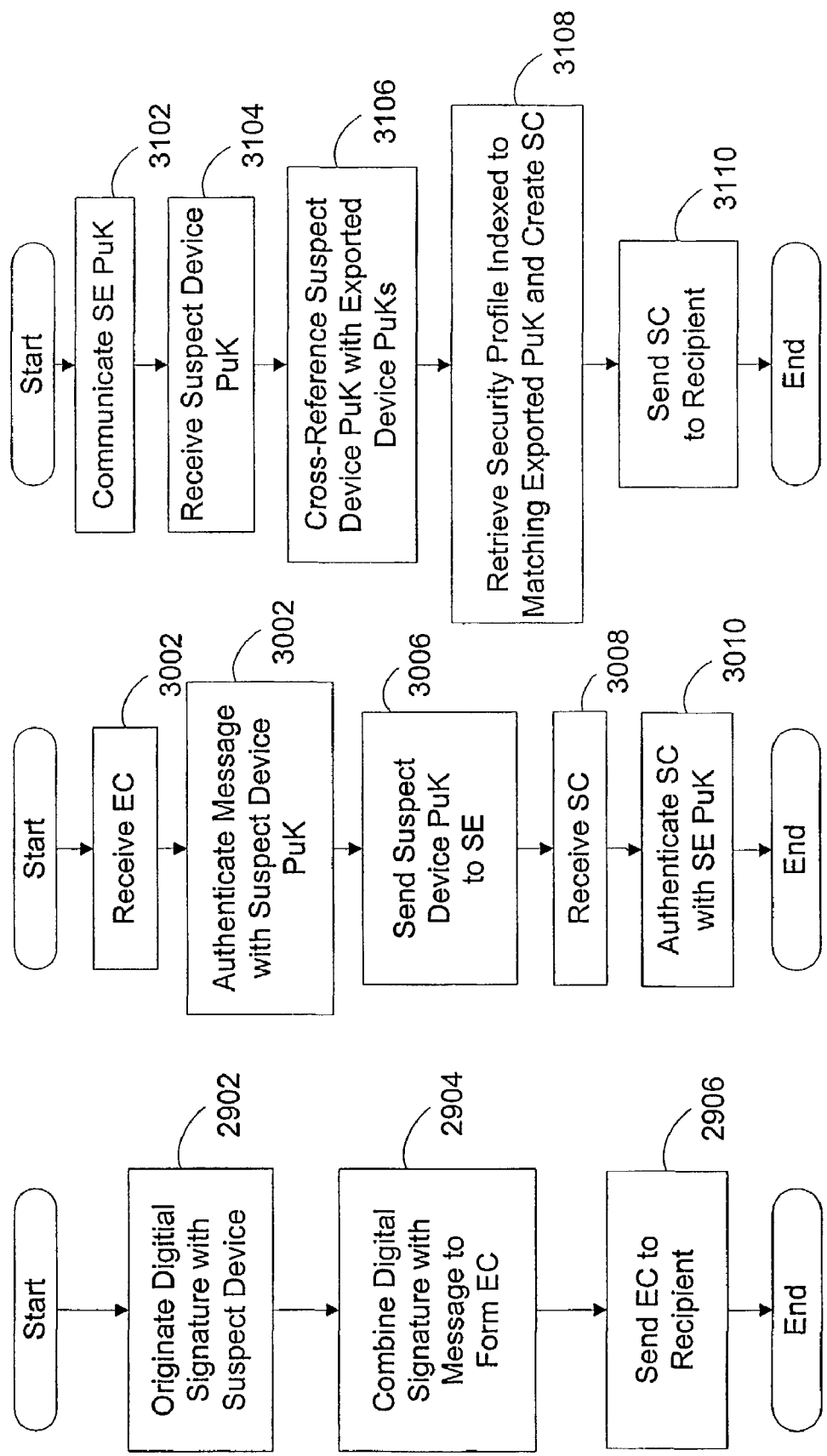

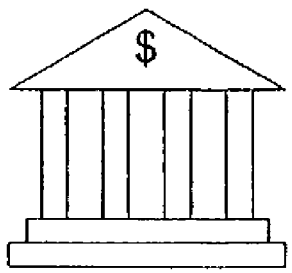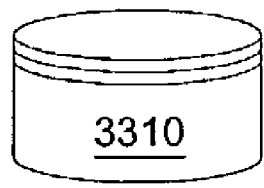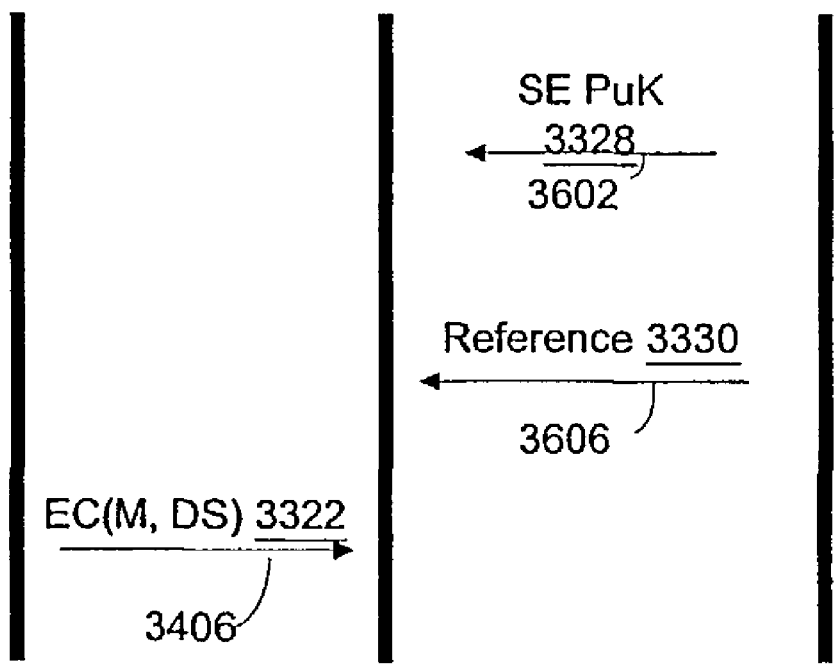
FIG. 33

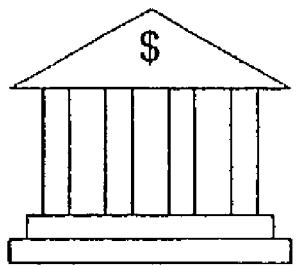
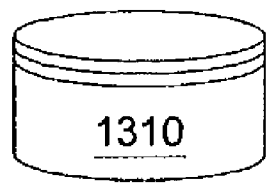
World 1306　　　Recipient 1308　　　Secure Entity 1312
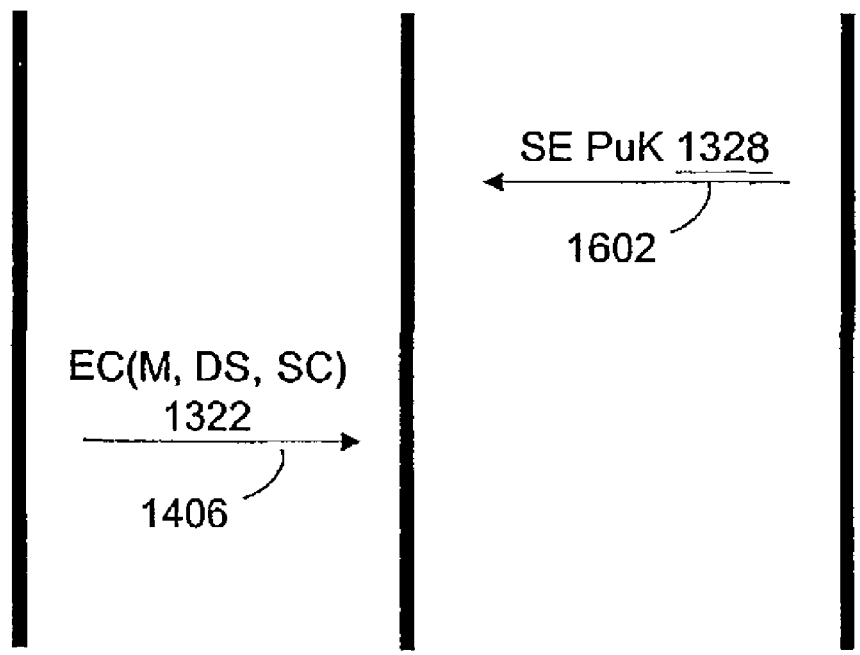
FIG. 38

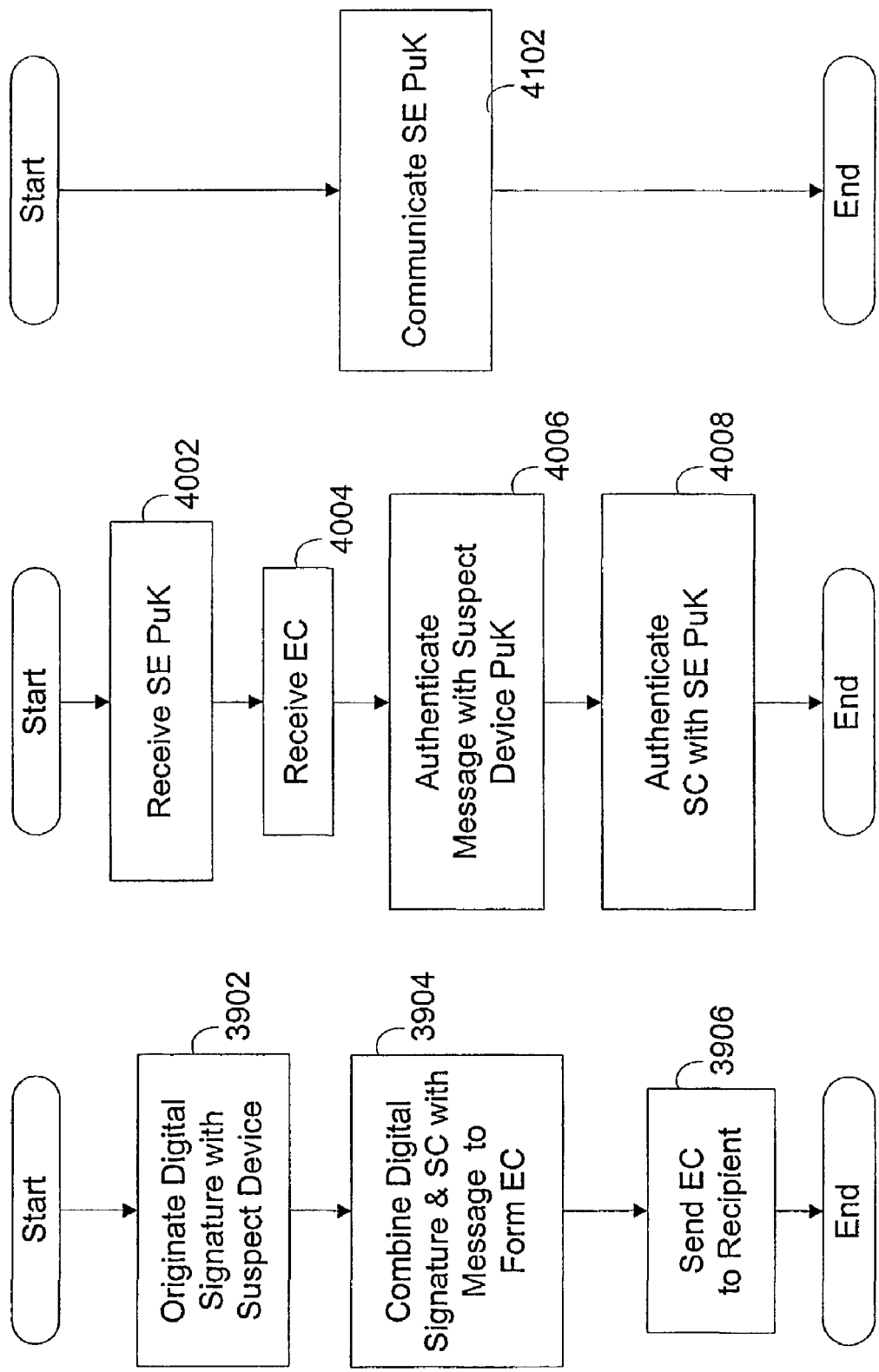

| Database Index | Security Profile |
|---|---|
| $PuK_1$ | - Security Features, including Security Characteristics and Authentication Capabilities<br>- Manufacturing History |
| $PuK_2$ | - Security Features, including Security Characteristics and Authentication Capabilities<br>- Manufacturing History |
| $PuK_3$ | - Security Features, including Security Characteristics and Authentication Capabilities<br>- Manufacturing History |
| ... | ... |
| $PuK_n$ | - Security Features, including Security Characteristics and Authentication Capabilities<br>- Manufacturing History |

| Account Identifier | Security Profile | Account Information | Customer-Specific Information |
|---|---|---|---|
| $PuK_1$ | Security Features Manufacturing History | User ID Internet Hours Used, Hours Remaining, etc... | Name, Credit Card Information, Billing Address, etc... |
| $PuK_2$ | Security Features Manufacturing History | User ID Internet Hours Used, Hours Remaining, etc... | Name, Credit Card Information, Billing Address, etc... |
| $PuK_3$ | Security Features Manufacturing History | User ID Internet Hours Used, Hours Remaining, etc... | Name, Credit Card Information, Billing Address, etc... |
| ... | ... | ... | ... |
| $PuK_n$ | Security Features Manufacturing History | User ID Internet Hours Used, Hours Remaining, etc... | Name, Credit Card Information, Billing Address, etc... |

| Account Identifier | Security Profile | Account Information | Customer-Specific Information |
|---|---|---|---|
| Account$_1$ | Security Features Manufacturing History | PuK$_1$ Available Balance, Register Balance, Related Accounts, IC Card Status | Name, Social Security Number, Mailing Address, etc... |
| Account$_2$ | Security Features Manufacturing History | PuK$_2$ Available Balance, Register Balance, Related Accounts, IC Card Status | Name, Social Security Number, Mailing Address, etc... |
| Account$_3$ | Security Features Manufacturing History | PuK$_3$ Available Balance, Register Balance, Related Accounts, IC Card Status | Name, Social Security Number, Mailing Address, etc... |
| ... | ... | ... | ... |
| Account$_n$ | Security Features Manufacturing History | PuK$_n$ Available Balance, Register Balance, Related Accounts, IC Card Status | Name, Social Security Number, Mailing Address, etc... |

| Account Identifier | Risk Management Information | Account Information | Customer-Specific Information |
|---|---|---|---|
| Account$_1$ | Security Features Manufacturing History Transactional History PuK$_1$-to-Account Authentication | PuK$_1$ Available Balance, Register Balance, Related Accounts, IC Card Status | Name, Social Security, Number Mailing Address, etc... |
| Account$_2$ | Security Features Manufacturing History Transactional History PuK$_2$-to-Account Authentication | PuK$_2$ Available Balance, Register Balance, Related Accounts, IC Card Status | Name, Social Security Number, Mailing Address, etc... |
| Account$_3$ | Security Features Manufacturing History Transactional History PuK$_3$-to-Account Authentication | PuK$_3$ Available Balance, Register Balance, Related Accounts, IC Card Status | Name, Social Security Number, Mailing Address, etc... |
| ... | ... | ... | ... |
| Account$_n$ | Security Features Manufacturing History Transactional History PuK$_n$-to-Account Authentication | PuK$_n$ Available Balance, Register Balance, Related Accounts, IC Card Status | Name, Social Security Number, Mailing Address, etc... |

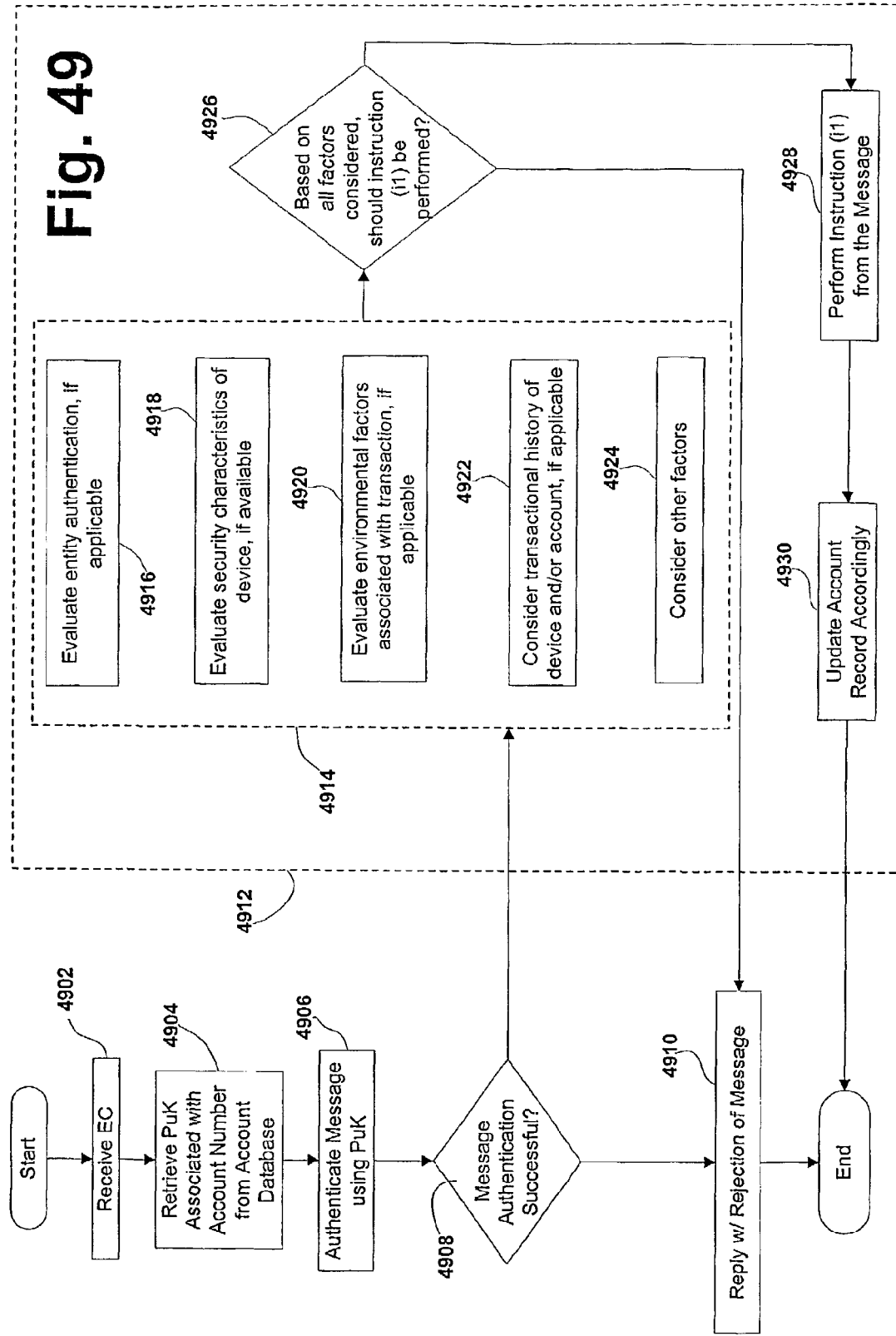

| CKA Account Identifier | PuK-Linked Information | Account Authority Information | User-Specific Information |
|---|---|---|---|
| CKA Account$_1$ | PuK$_1$ Security Features Manufacturing History | Account Authority A Account# Account Authority B Account# | Name, Mailing Address Authentication techniques used to verify user-specific information |
| CKA Account$_2$ | PuK$_2$ Security Features Manufacturing History | Account Authority C Account# Account Authority D Account# | User ID, email address Authentication techniques used to verify user-specific information |
| CKA Account$_3$ | PuK$_3$ Security Features Manufacturing History | Account Authority A Account# Account Authority D Account# | Name, Mailing Address, User ID, email address Authentication techniques used to verify user-specific information |
| ... | ... | ... | ... |
| CKA Account$_n$ | PuK$_n$ Security Features Manufacturing History | Account Authority E Account# Account Authority F Account# | Name, Age, Social Security Number, Driver's License Number and State Authentication techniques used to verify user-specific information |

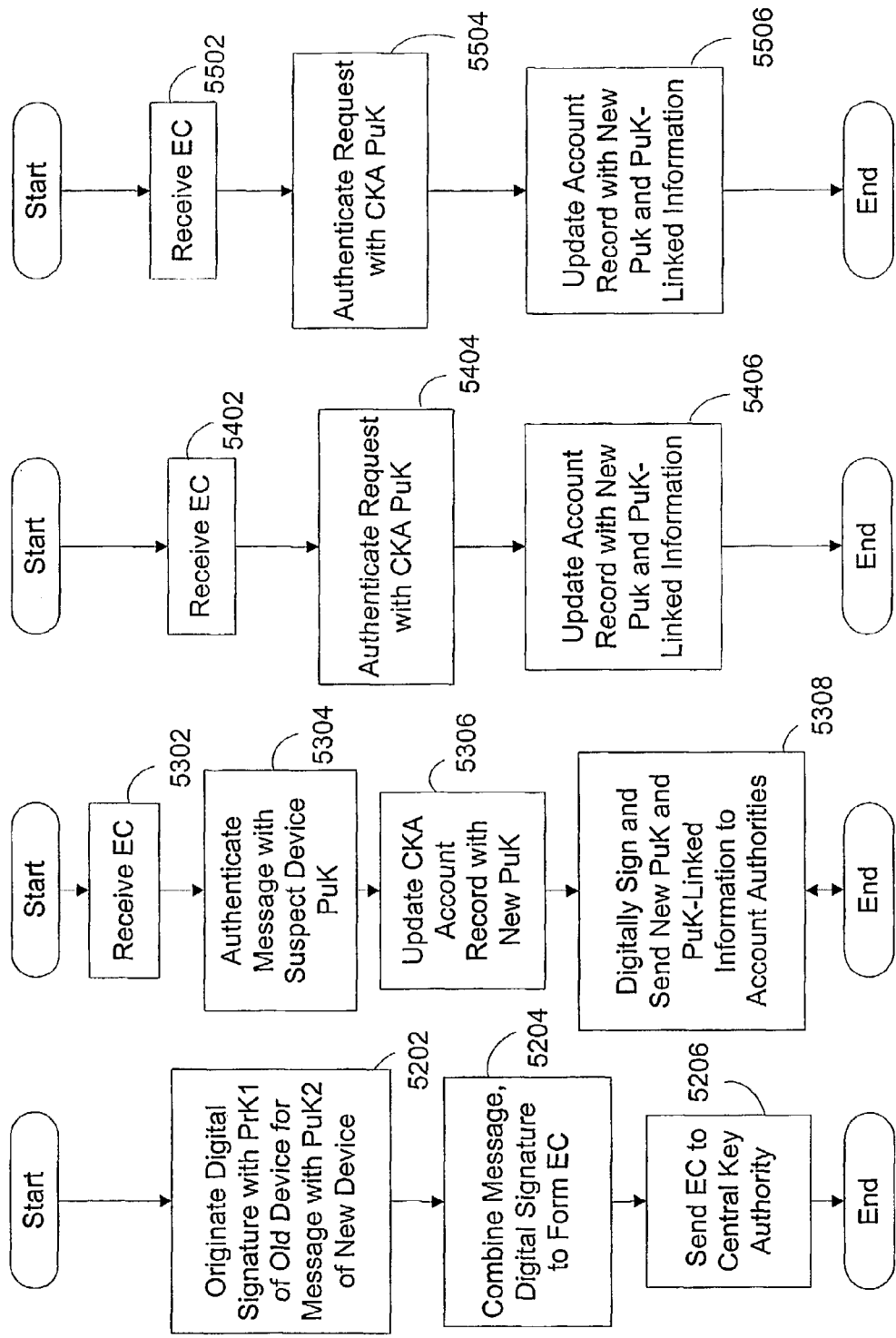

TRUSTED AUTHENTICATION DIGITAL SIGNATURE (TADS) SYSTEM

I. CROSS-REFERENCE TO RELATED APPLICATIONS

This patent application claims priority in the United States under 35 U.S.C. 119, and under the Paris Convention worldwide, to the benefit of the filing date of Wheeler et al. U.S. provisional patent application Ser. No. 60/223,076, which was filed on Aug. 4, 2000, and which is incorporated herein by reference. This application also incorporates herein by reference each of three international patent applications and three U.S. patent applications to Anne and Lynn Wheeler filed concurrently herewith in the U.S. Patent & Trademark Office and bearing Ser. No. PCT/US01/41587 (entitled "Person-Centric Account-Based Digital Signature System") and Ser. No. 09/923,179 (entitled "Account-Based Digital Signature (ABDS) System"); serial number PCT/US01/42562 (entitled "Entity Authentication in Electronic Communications by Providing Verification Status of Device") and Ser. No. 09/923,075 (entitled "Modifying Message Data and Generating Random Number Digital Signature Within Computer Chip"); and Ser. No. PCT/US01/24572 (entitled "Linking Public Key of Device to Information During Manufacture") and Ser. No. 09/923,213 (entitled "Manufacturing Unique Devices That Generate Digital Signatures").

II. FIELD OF THE PRESENT INVENTION

The present invention generally relates to entity authentication and, in particular, to entity authentication in the field of electronic communications.

III. BACKGROUND OF THE PRESENT INVENTION

As used herein, an electronic communication ("EC") is considered to be any communication in electronic form. ECs have become an integral part of transacting business today, especially with the growth of the Internet and e-commerce. An EC can represent, for example, a request for access to information or a physical area, a financial transaction, such as an instruction to a bank to transfer funds, or a legal action, such as the delivery of an executed contract.

In order for ECs to be effective, a recipient of the EC must be able to associate reliably the EC with the entity sending the EC or on whose behalf the EC is sent (collectively referred to herein as "sender"). A recipient receiving an EC requesting access to information or a physical area, prior to granting such information, needs to know who is requesting the access to verify that access may be given. Similarly, a recipient such as a financial institution receiving an EC instructing it to transfer funds from an account of one of its customers needs to know who is requesting the transaction to verify that the sender is authorized to make the transaction on the account.

In order to identify reliably the sender of an EC, an entity first must identify itself in some manner to the recipient some time before sending the EC, in response to which the recipient must assign an entity identifier to the entity. Thereafter, the entity identifier is included in an EC. Upon receipt of the EC, the recipient then cross-references the entity identifier included therein with the assigned entity identifier to identify thereby the sender of the EC. As used herein, "Entity Authentication" refers to the act of checking an entity identifier provided by a suspect entity against a previously assigned entity identifier in order to identify reliably the suspect entity.

Three common types of Entity Authentication are utilized today. A first type is based on what an entity "has," in that possession of an object serves as the entity identifier (herein referred to as "Factor A Entity Authentication"). An example of the use of Factor A Entity Authentication includes the presentation of a credit card at a "pay-at-the-pump" gas station, wherein sliding of the card within a magnetic card reader provides a credit account number, which is magnetically stored on the credit card, to the card reader. The account number then is transmitted in an EC to a third-party authorization service for comparison with credit account numbers. In a simple case, if the account number transmitted by the card reader matches a valid account number in the database of the authorization service, if the account has not exceeded its credit limit, and if the card has not been reported lost or stolen, then the authorization for the charge may be granted. In this example, the entity of the EC (i.e., the consumer at the gas pump) is identified by the account number previously assigned by a financial institution to the consumer.

A second type of Entity Authentication is based on what an entity "knows," in that disclosure of particular information associated with the entity serves as the entity identifier (herein referred to as "Factor B Entity Authentication"). An example of the use of Factor B Entity Authentication includes a request by an entity for information regarding a credit card account, such as balance information over the telephone. In this example, before the financial institution at which the credit card account is maintained provides the account balance to the caller, the caller's identity is verified by requiring the caller to provide the account number and some other cardholder specific information, such as the zip code for the cardholder or the last four digits of the cardholder's social security number—information which does not appear on the face of the card itself. If the information transmitted in the EC over the telephone matches the information associated with the credit card account, as maintained by the financial institution, then the caller is authenticated and the account balance is provided. In this case, the entity of the EC (i.e., the caller) is identified by the account number previously assigned and the cardholder-specific information previously obtained by the financial institution.

A third type of Entity Authentication is based on what an entity "is," in that a biometric characteristic—such as a fingerprint—of an entity serves as the entity identifier (herein referred to as "Factor C Entity Authentication"). While not including an EC, an example of the use of Factor C Entity Authentication includes a customer physically presenting a credit card for payment to a merchant and providing a handwritten signature on the charge slip. In this scenario, the merchant obtains and compares the signature on the charge slip signed by the customer against the signature of the cardholder appearing on the back of the credit card. This comparison is made particularly in cases where the credit account number is not verified through an authorization service as described above, or where the purchase is for a large amount. Upon a successful comparison as determined by the merchant, the customer is authenticated as the cardholder and the merchant accepts the charge slip as payment. Factor C Entity Authentication has yet to be widely utilized with respect to ECs and is most often found in high security scenarios in which a biometric characteristic, such as a fingerprint or retina scan of an individual, is required for authentication of the individual. When used with ECs, a value for the biometric characteristics is obtained with a sensor or other electronic apparatus and the biometric value is compared (using fuzzy logic) with a prestored biometric value for the same biometric characteristic in determining whether there is a match.

For additional security, multiple provision of the same type of Entity Authentication is sometimes required. For example, requiring two forms of personal identification involves two different pieces of Factor A Entity Authentication information. Knowing and providing two different "shared-secrets," such as a zip code and mother's maiden name, involves two different pieces of Factor B Entity Authentication information. Providing two different biometric samples, such as a handwritten signature and a thumbprint, involves two different pieces of Factor C Entity Authentication information. Additional security can also be achieved by requiring the combination of two of more different types of Entity Authentication. For example, Factors A and B Entity Authentication are required in ATM transactions, in which possession of an ATM card and knowledge of the corresponding PIN are required for use.

It will be appreciated and well known by those having ordinary skill in the art that the trust associated with conventional authentication systems is relatively weak, in that the entity identifier utilized for verifying entities today is easily susceptible to misappropriation or forgery. For example, credit cards can readily be counterfeited. Further, an account number, account-specific information, and customer-specific information—including biometric values—all are susceptible to discovery (such as during transmission for authentication) and then fraudulent use in later authentications for transactions upon the relevant account. Once such information is misappropriated, it is difficult for a recipient of an EC to determine that the EC, including an entity identifier, has been sent fraudulently. Moreover, because of the weakness of Entity Authentication in ECs, business methods and systems including ECs are subject to higher risks and less trust than would otherwise be the case if the Entity Authentication were stronger.

In an attempt to increase the trust in business methods and systems utilizing Entity Authentication in ECs, encryption technology has been used to attempt to "hide" or otherwise prevent entity identifier information from being intercepted during communications and transmissions. Digital signatures have also been incorporated into the existing business infrastructure as an attempted means of providing strong authentication, in that an EC sents with an attached digital signature is presumed to come from the entity that claims to have digitally signed the message contained in the EC. In particular, a digital certificate now is used to establish the identity of an entity for which an EC is sent that includes a digital signature originated specifically for a particular message of the EC.

In this regard, the origination of a digital signature generally comprises: (1) the calculation of a message digest-such as a hash value; and (2) the subsequent encryption of the message digest. The message digest is encrypted by an electronic device generally using a private key of a key pair used in public-private key cryptography (also known as asymmetric cryptography). The resulting ciphertext itself usually constitutes the digital signature, which typically is appended to the message to form the EC. The second part of originating the digital signature—using encryption with a private key—is referred to herein as "generating" the digital signature, and the combined two steps is referred to herein as "originating" the digital signature. Furthermore, while the generation of the digital signature is conventionally understood as the encryption of the message digest, it is contemplated herein that generating the digital signature also may include simply encrypting the message rather than the message digest. Digital signatures are important because any change whatsoever to the message in an EC is detectable from an analysis of the message and the digital signature. In this context, the digital signature is used to "authenticate" a message contained within the EC (hereinafter referred to as "Message Authentication"). Message authentication verifies the integrity of the message and should not be confused with Entity Authentication, which verifies an identity of an entity as represented by an entity identifier.

In an example of Message Authentication, a message digest is calculated by applying a hashing algorithm—such as the SHA-1 algorithm—to data representing the message. The hashing algorithm may be applied either within the device or external to the device with the resulting hash value then being transmitted to the device for generation of the digital signature. In order to perform Message Authentication in this example, the recipient of the EC must know or be able to obtain both the identity of the hashing algorithm applied to the message as well as the public key ("PuK") corresponding to the private key used to encrypt the message digest. With this knowledge, the recipient applies the appropriate hashing algorithm to the message to calculate a hash value, and the recipient decrypts the digital signature using the public key. If the hash value calculated by the recipient equals the hash value of the decrypted digital signature, then the recipient determines that the content of the message contained in the EC was not altered in transmission, which necessarily would have changed the hash value.

Although message authentication should not be confused with Entity Authentication, the process of performing Message Authentication simultaneously enables the recipient of an EC to authenticate the sender of the EC, in so much as the recipient thereby confirms that the sender of the EC possessed the private key corresponding to the public key used successfully to authenticate the message. This inherently represents Factor A Entity Authentication regarding the EC. Factor A Entity Authentication is useful when the recipient of the EC has trusted information regarding the identity of the owner of the private key.

This trusted information conventionally is provided based on a digital certificate issued by a trusted third party that accompanies the digital signature and that binds the identity of the private key owner with the public key. A digital certificate (also known as a "digital ID") comprises a voucher by a third-party (commonly referred to as a "Certification Authority") certifying the identity (or other attributes) of an owner of a public key. Essentially, a digital certificate is the electronic counterpart to a driver license, passport, membership card, and other paper-based forms of identification. The digital certificate itself comprises an electronic message including a public key and the identity of the owner of the public key. A digital certificate also typically contains an expiration date for the public key, the name of the Certification Authority, a serial number of the digital certificate, and a digital signature of the Certification Authority for insuring the integrity of the digital certificate. One of the reasons for an expiration date is to limit the liability of a Certification Authority due to the likelihood that attributes other than the identity of the public key owner change over time. The most widely accepted format for digital certificates is defined by the CCITT X.509 international standard; thus, certificates can be read or written by any application complying with X.509. Based on a digital certificate included in an EC, a recipient is able to authenticate the digital certificate using a public key of the Certification Authority and thereby, presumably, confirm the identity of the owner set forth therein. The overall system wherein a digital certificate is included in an EC comprises a "public key infrastructure" (PKI), and is referred to herein as the "Certification Authority Digital Signature" or "CADS" system, which is incorporated herein by reference.

A conventional implementation 100 of the CADS system in the context of an electronic transaction between a purchaser 102 and an online merchant 110 is illustrated in FIG. 1. Under this system, a purchaser 102 using, for example, a computer 104 creates a purchase order in the form of an electronic message. The purchaser 102 includes in the message relevant account information of a financial institution 112 from which payment is to be made to the merchant 110. The account information includes, for example, a credit card number and expiration date as well as the name on the card. Software on the purchaser's computer 104 then originates a digital signature for the message using a private key of the purchaser 102 safeguarded in the computer 104. The software also maintains a digital certificate on the computer 104 issued by a Certification Authority 106a. The message, digital signature, and digital certificate then are combined into an EC, and the EC is communicated over the Internet 108 to the merchant 110.

Upon receipt, the merchant 110 authenticates the message using the public key in the digital certificate. If successful, the merchant 110 then authenticates the digital certificate using a public key of the Certification Authority 106a. Successful authentication of the digital certificate may satisfy the merchant 110 that the purchaser—the sender of the EC—is the owner identified in the digital certificate. If the merchant 110 is so satisfied, then the merchant 110 submits the account information to the relevant financial institution 112 for an approval for payment to the merchant 110 from the account. Upon receipt from the financial institution 112 of approval for payment, the merchant 110 fills the purchase order of the purchaser 102. Furthermore, confirmation of approval (or rejection) of the purchase order preferably is sent from the merchant 110 to the purchaser 102.

While the CADS system enables two parties who otherwise may not have a preexisting relationship with one another to communicate with each other with the confidence of knowing the other's identity, the CADS system has significant drawbacks. For example, a digital certificate typically is issued with an expiration date, and an expired digital certificate generally is not recognized in the industry. Furthermore, if a private key is lost or stolen, then the owner of the private key must notify the Certification Authority to revoke the owner's digital certificate; however, a recipient of an EC with a digital certificate will only know of the revocation of the digital certificate if the recipient cross-references the serial number of the digital certificate against a certificate revocation list (CRL) published by the Certification Authority. Another drawback to the CADS system is that the digital certificate itself is only as good as the particular authority that issues it, and it often is necessary to obtain multiple digital certificates (i.e., from Certificate Authorities 106a, 106b to 106n) in order to create a sufficient "chain" or "network" of trust between the purchaser 104 and merchant 110 for a transaction or communication to be accepted and acted upon.

In addition to these drawbacks, a fundamental flaw to the CADS system actually providing a trusted authentication system based upon digital signatures is that a digital certificate only certifies the identity (or other attributes) of the owner of a private key, and falls significantly short of certifying that the private key actually has been used by the legal owner thereof in generating a particular digital signature. Indeed, trust in the CADS system—and generally in any digital signature system—depends upon the legitimate possession and use of the private key, i.e., upon the sender of each particular EC actually being the private key owner. A fraudulent use of a private key to generate a digital signature of an EC currently cannot be detected through the above-described Message Authentication and Factor A Entity Authentication procedures. The digital signature system therefore is susceptible to fraud if a private key of a device is stolen, either by discovery of the private key therein and subsequent copying and use in another device capable of generating digital signatures, or by physical theft of the device containing the private key.

To guard against fraudulent use of a device to generate a digital signature through theft of the device itself, a personal identification number (PIN), password, or passphrase (collectively referred to herein as "Secret") is typically prestored within the device and must be input into the device before it will operate to generate digital signatures. Alternatively, the Secret is shared with the recipient beforehand and, when the EC later is sent to the recipient, the Secret also is sent to the recipient in association with the message. In the first case, verification of the Secret authenticates the user of the device (herein "User Authentication"), and in the second case, verification of the Secret authenticates the sender of the EC (herein "Sender Authentication"). In either case, confirmation of the Secret represents entity authentication based on Factor B Entity Authentication. Another security aspect that guards against fraudulent use of the device through physical theft include the verification of a biometric characteristic—like a fingerprint—of the user of the device or sender of the EC. This type of authentication is based on Factor C Entity Authentication. As with the Secret, a biometric value is either maintained within the device for User Authentication, or is shared with the recipient beforehand for Sender Authentication by the recipient.

To guard against discovery of a private key and subsequent copying and use in another device, devices are manufactured with electronic shielding, zeroization, auditing, tamper evidence and tamper response, and other security aspects that serve to safeguard the private key (and other protected data) contained therein. Such security aspects of devices include hardware, software, and firmware, and are well known in the art of manufacturing secure computer chips and other devices having cryptographic modules. The requirements of such security aspects are specified, for example, in *Federal Information Processing Standards Publication* 140-1, *Security Requirements for Cryptographic Modules*, U.S. DOC/NBS, Jan. 11, 1994 (herein "FIPS PUB 140-1"), which is incorporated herein by reference and which is available for download at http://csrc.nist.gov/publications/fips; and *Federal Information Processing Standards Publication* 140-2, *Security Requirements for Cryptographic Modules*, U.S. DOC/NBS, May 25, 2001 (herein "FIPS PUB 140-2"), which is incorporated herein by reference and which is available for download at http://csrc.nist.gov/publications/fips. FIPS PUB 140-1 and 140-2 also define security levels that may be met by a device based on the device's security aspects, with each of these defined security levels generally representing a various level of difficulty—in terms of time and money—that would be encountered in attempting to discern a private key of a device. Currently, four security levels are defined with security level 4 being the highest level of security available. Specifications for such security aspects also are set forth in *Trusted Computing Platform Alliance Trusted Platform Module Protection Profile Version* 0.45, Trusted Computing Platform Alliance, September 2000; *Trusted Platform Module (TPM) Security Policy Version* 0.45, Trusted Computing Platform Alliance, October 2000; and *TCPA PC Implementations Specification Version* 0.95, Trusted Computing Platform Alliance, Jul. 4, 2001, which are incorporated herein by reference (collectively "TCPA Documents"), and which are available for download at http://www.trustedpc.com; and *Common Criteria for Information Technology Security Evaluation, Smart Card Protection Profile, Draft Version 2.1d*, Smart Card Security User Group, Mar. 21, 2001, which is incorporated herein by reference (hereinafter "Smart Card Protection Profile"), and which is available for download at http://csrc.nist.gov.

As described in more detail herein, the particular aspects of a device that safeguard against discovery of a private key and other protected data are referred to herein as "security characteristics" of the device. The particular aspects of a device that safeguard against unauthorized use of the device by authenticating the user are referred to herein as "authentication capabilities" of the device. The "security aspects" of a device (including a cryptographic module or TPM) comprise the security characteristics and authentication capabilities as well as other security aspects of the device, the requirements of which are specified in the above cited references.

Unfortunately, while the aforementioned security aspects generally reduce overall the risk of fraud within the digital signature system, a recipient of any one particular EC including a digital signature may be unfamiliar with the device used to generate the digital signature and, therefore, be unable to gauge the risk of whether the digital signature was generated fraudulently, either through theft of the device or discovery of the private key.

Of course, if the recipient possesses a shared secret or a biometric value of the sender for performing Sender Authentication, then the recipient may determine that the digital signature was not fraudulently generated assuming that the shared secret or biometric value was not stolen. However, this type of protection by the recipient has significant drawbacks and is not always used by the recipient. For example, if the Secret or biometric value is communicated to the recipient in association with a message for Sender Authentication by the recipient, then the Secret or biometric value first must have been shared with the recipient beforehand and safeguarded by the recipient as part of an established, preexisting relationship; consequently, a recipient having no prior existing relationship with the sender is unable to perform Sender Authentication.

Another drawback is that the sharing of the Secret or biometric value with the recipient exposes the recipient to liability and exposes the Secret or biometric value itself to a greater risk of theft and dissemination. The transmission of the Secret or biometric value for verification carries with it the risk of interception and discovery during transit. Upon receipt, the Secret or biometric value must be safeguarded by the recipient, which inherently gives rise to a risk of theft from the recipient. This is especially significant in the corporate context where a rogue employee may steal the safeguarded Secret or biometric value (insider fraud historically has been the greatest threat). The potential damages also are extensive when the Secret or biometric value is stolen. Since it is difficult for an individual to remember multiple Secrets for multiple recipients, it is common for the same Secret to be used with different recipients. The theft of the Secret from one recipient thereby compromises the Sender Authentication performed by all of the recipients, at least until the Secret is changed for each recipient. In the case of the theft of a biometric value, the damages are even more severe, as a sender's biometric characteristic cannot be changed and, once lost, potentially compromises any future Sender Authentication therewith.

Alternatively, when the Secret or biometric value is prestored and maintained within the device for User Authentication, the risks associated with safeguarding of the Secret or biometric value by the recipient and associated with transmission of the Secret or biometric value to the recipient are avoided. In this conventional paradigm, the recipient does not actually perform the verification—it is done at the device level. A drawback to this alternative paradigm, however, is that because the device remains inoperable until the correct Secret or biometric value of the user is entered, the recipient is unable to monitor repeated attempts to guess the Secret or biometric value. Furthermore, when the device is enabled by the entry of the correct Secret or a biometric value resulting in a match, the device typically remains enabled for a predefined period of time thereafter, such as until it is powered off or resets. Under this alternative paradigm, a recipient is unable to determine whether a particular EC sent during such a time period includes a fraudulently generated digital signature, as the device may have been stolen after being enabled but before its deactivation. Accordingly, while there is User Authentication under this alternative paradigm, there is no provision per se for Sender Authentication.

Yet another drawback is that this alternative paradigm does not particularly accommodate the use of the device to send ECs to different recipients when a biometric value is prestored and maintained within—and Factor C Entity Authentication is performed by—the device. In this regard, different recipients may have different requirements as to what constitutes a biometric "match" so as to be a successful verification; a biometric match is a determination of whether a biometric value input is sufficiently close to a stored biometric value so as to meet at least a minimum security threshold. A security threshold is subjectively set by each recipient and includes factors such as the nature of the communication and the extent of liability to the recipient for actions and responses based on a fraudulently sent EC. Different recipients cannot make their own match/no-match determinations based on their own requirements, standards, and criteria if each recipient does not receive beforehand the biometric value of the sender, make its own comparison thereof with each additional biometric value that is received in association with a message, and apply its own business judgment as to whether the comparison is sufficiently close so as to be a match.

Accordingly, a need exists for a new authentication paradigm for ECs in which Factor B Entity Authentication and/or Factor C Entity Authentication is used, but in which the aforementioned drawbacks of the conventional paradigms that use such authentication techniques are overcome. In particular, a need exists for such a paradigm that provides for both User Authentication as well as for Sender Authentication using either or both of Factor B Entity Authentication and Factor C Entity Authentication, and all without requiring a recipient to safeguard either a Secret or a biometric value. In this regard, a need exists for such a paradigm in which Factor B Entity Authentication and Factor C Entity Authentication can be reliably inferred by the recipient without the recipient being privy to the authenticating information, thereby addressing privacy concerns. Furthermore, a need exists in such a paradigm for the recipient to be able to determine, in its own subjective business judgment, what constitutes a successful biometric match when Factor C Entity Authentication is used. A need also exists for such a paradigm in which the recipient is able to monitor repeated attacks on a device to guess a Secret or a biometric value, and for such an authentication paradigm that further accommodates the use of a single device for the sending of ECs to various, unrelated recipients.

Additionally, a recipient generally is unable to gauge the risk of whether a digital signature was generated fraudulently when no secret or biometric value is shared between the sender and the recipient. Instead, a recipient must rely upon blind trust in accepting that the device used to generate the digital signature has not been stolen and in accepting that the device used to generate the digital signature has sufficient safeguards to protect its private key from discovery, copying, and use in a counterfeit device. A need therefore exists for a method by which a recipient may reliably identify a risk of whether a digital signature has been generated fraudulently using a stolen private key (whether stolen by physical theft of the device or discovery of the private key itself), whereby the recipient may protect itself against fraud. In this regard, a need also exists for a method by which a recipient of an EC including a digital signature may reliably determine at any given time the current level of security of the device to which belongs the private key used to generate the digital signature. A need also exists for a method by which a recipient of an EC may reliably determine an assurance level of the device as well as the specific safeguards of such device that protect against fraudulent use thereof.

Finally, a need also exists for an alternative paradigm in which Factor B and/or Factor C Entity Authentication can be reliably inferred from information provided to a recipient by a device, the reliability of such device also being ascertainable by the recipient.

IV. SUMMARY OF THE PRESENT INVENTION

The present invention herein described lies in the provision of a verification status regarding entity authentication performed by a device (herein "First aspect of the Present Invention") and, in combination therewith, the reliable identification of information regarding the device (herein "Second aspect of the Present Invention"). Moreover, each of these two aspects includes various aspects and, accordingly, various alternative preferred implementations of the present invention comprise combinations of preferred aspects of each aspect. The present invention will first be described in detail with reference to each aspect of the present invention and the various preferred aspects and alternatives thereof. The synergies and benefits of the combination of these two aspects then will be described with regard to specific implementations of the present invention.

A. First Aspect of the Present Invention

The First aspect of the present invention relates to the provision of a verification status regarding entity authentication performed by a device and includes the steps of identifying within the device a current verification status out of a plurality of predefined verification statuses of the device as a function of verification data of an entity input into the device and data prestored within the device; and, independent of the verification status identified, outputting from the device an indication of the identified verification status. The prestored data represents either a Secret or biometric characteristic—or both—of the entity that is authenticated by the device. The biometric data may represent, for example, a digitized fingerprint, a digitized handprint or hand geometry, a digitized retina, a digitized iris, a digitized voice print, a digitized facial scan, a digitized written signature, or a digitized DNA sample. The device also may prestore data for a plurality of different types of verification data, whether for one person or for several persons.

In a preferred aspect of the First aspect, one of the predefined verification statuses is representative of the verification data being the same as the prestored data, and at least one other verification status is representative of the verification data being different from the prestored data. Also, neither the verification data nor the prestored data preferably is revealed by the indication of the identified verification status. In other preferred aspects, one of the predefined verification statuses represents an unsuccessful verification; one of the predefined verification statuses represents a successful verification; one of the predefined verification statuses additionally represents whether a digital signature has been generated by the device since verification data was last input into the device; one of the predefined verification statuses additionally represents whether a digital signature has been generated subsequent to a comparison of verification data input into the device with data prestored within the device; one of the predefined verification statuses additionally represents whether any verification data has been input into the device within a predetermined time period comprising, for example, the time since a last successful verification or the time since a resetting of the device.

Additionally in preferred aspects, one of the predefined verification status represents a difference between verification data input into the device and data prestored within the device; one of the predefined verification statuses represents a degree of match between biometric verification data input into the device and biometric data prestored within the device; one of the predefined verification statuses additionally represents a percentage of match between biometric verification data input into the device and biometric data prestored within the device; one of the predefined verification statuses additionally represents whether a digital signature has been generated by the device since verification data was last input into the device; one of the predefined verification statuses additionally represents whether a digital signature has been generated subsequent to a comparison of verification data input into the device with data prestored within the device; one of the predefined verification statuses additionally represents whether any verification data has been input into the device within a predetermined time period.

In accordance with the First aspect of the present invention, a digital signature for a message is generated within the device as a function of the identified verification status, which includes modifying within the device data representing the message as a function of the identified verification status of the device such that the generated digital signature comprises the indication of the identified verification status. The generation of the digital signature includes encrypting within the device using a private key of a public private key pair a message digest for the modified data. The digital signature is generated in response to an external inquiry received by the device, in response to receipt of data representing the message, or in response to receipt of input comprising the verification data. The message digest preferably is calculated within the device. The digital signature for the modified data thereafter is output from the device. The message itself may be for the performance of a financial transaction, for the performance of a legal action, or for access—or a request for authentication for access—to a database, physical space, web site, or computer program. The message also may be predetermined and static, and may be stored within the device itself.

The digitally signed message preferably is composed within the device and is displayed on a display screen of the device for review and approval. The message also may be composed within an I/O support element external to the device which, in turn, transmits the input representing the message into the device through an interface of the device. Alternatively, a portion of the message may be composed within an I/O support element external to the device that, in turn, transmits input representing the portion of the message into the device through an interface of the device, with a remaining portion of the message then being composed within the device. The I/O support element may comprise, for example, a point of sale terminal, a biometric scanner, a card reader, or a computer.

Verification data may be required to be input into the device for a certain type of message such as, for example, each message representing a financial transaction. Verification also may not be required to be input into the device for other types of messages, or for a predefined period of time such as the time between approval of a request embodied in a message and a powering off of the device. Verification data also may be required to be input into the device following a predefined period of time after a last successful verification.

In a preferred aspect, the device identifies a current verification status by assigning an identification marker within the device equal to a value out of a set of predefined values corresponding to the predefined verification statuses. The value may be equated with a successful verification, and may further represent whether a digital signature was generated and/or output since verification data was last input into the device. The modification of the message data preferably includes: embedding the assigned value of the identification marker within the message data; appending the assigned value of the identification marker to the message data; appending the assigned value of the identification marker to the beginning of the message data; or appending the assigned value of the identification marker to the end of the message data.

The device may be capable of receiving two (or more) instances of verification data input into the device, with each instance representing the same type or a different type of verification data. In such case the function with which the message data is modified preferably comprises the steps of: comparing the first instance of verification data with the appropriate data prestored within the device and assigning, based on the comparison, a first comparison marker within the device equal to a value out of a set of predefined values; and, comparing the second instance of verification data with the appropriate data prestored within the device and assigning, based on the comparison, a second comparison marker within the device equal to a value out of a set of predefined values. The message data then may be modified as a function of only one of—or both of—the assigned values for the first and second comparison markers, as desired.

The First aspect of the present invention also relates to the provision of a verification status regarding an entity authentication wherein no verification data is yet received by the device. In particular, prestored data of an entity is maintained within the device for identifying a verification status of the device as a function of the prestored data and verification data later input into the device. Thereafter, a current verification status is identified within the device that represents the lack of input of any verification data during a predefined period of time. An indication of the identified verification status is then output from the device. At some point thereafter, input comprising verification data is received within the device, a current verification status is identified within the device out of a plurality of predefined verification statuses of the device by comparing the received verification data with the prestored data; and an indication of the identified verification status is again output from the device, wherein the second indication is for the identified verification status based on the comparison.

Other aspects of the First aspect include the verification data being input directly into the device by a user; and, alternatively, input representing the verification data being received within an I/O support element external to the device and then transmitted into the device. The I/O support element may include, for example, a point of sale terminal, a biometric scanner, a card reader, an ATM machine, or a computer.

In addition to the foregoing, the First aspect of the present invention also includes receiving a digital signature; decrypting the digital signature using a public key of a public-private key pair; for each one of a plurality of predefined verification statuses of the device, modifying data representing a message as a function of the predefined verification status; and identifying the current verification status of the device as being the predefined verification status for which the modified data matches the decrypted digital signature. In a variation of this aspect, a message digest is calculated as a function of the modified data following the modification. The calculation of the message digest as a function of the modified data may include the calculation of a hash value for the modified data.

B. Second Aspect of the Present Invention

The Second aspect of the present invention relates to the reliable identification of information regarding the device providing the indication of the verification status. Preferably, the information permits for a determination of both a security level and an assurance level of such device. Indeed, as the device is performing Factors B and/or C Entity Authentication and then only providing an indication of the verification status identified based thereon, a recipient receiving the verification status will desire to know sufficient information about the device in order to establish some level of trust in the device and the overall system of authentication of the present invention, which is based thereon.

The present invention generally comprises the linking in a reliable manner of a public key of a device that generates digital signatures using asymmetric cryptography to other information associated with the device within an environment in which the device is manufactured and, thereafter, later identifying of the other information regarding the device after the release of the device from the manufacturing environment based upon its public key. By considering such information later identified, a recipient is able to gauge a risk or likelihood of whether a digital signature using the private key belonging to the device was generated fraudulently.

As used herein, the "other information" comprises at least one of security aspects and manufacturing history of the device, and preferably includes both security aspects and manufacturing history of the device (herein collectively referred to as "Security Profile"). As described above, the security aspects include those aspects that safeguard the private key (and other protected data) within the device from discovery (herein referred to as "security characteristics"), those aspects that perform either or both of Factors B and C Entity Authentication with regard to authentication of the user of the device (herein referred to as "authentication capabilities"), and aspects that otherwise serve to provide security to the device. It is important to know the security aspects of a device—rather than simply a stated security level of the device—as technologies are developed over time that reduce the effectiveness of such security aspects and, consequently, result in the decrease of the actual security level of the device. Unless upgrades are made, the security aspects of a device are permanent while the security level of the device eventually will decrease over time. By knowing the security aspects, the appropriate security level of a device may be determined at any given time. Furthermore, by knowing the security characteristics of the device, a recipient is able to gauge a likelihood of whether the private key of the device has been compromised, and by knowing the authentication capabilities of the device (or lack thereof), a recipient is able to gauge a likelihood of whether someone other than the authorized user utilized the device to generate a digital signature.

The "manufacturing history" of the device includes attributes of the manufacture of the device, preferably including: the manufacturer of the device; all specifications applicable to the device; manufacture date of the device; location of manufacture; batch identifier of the device; serial number or part number of the device; security of the manufacturing facility; physical instantiation of the device regarding layout and process geometry; software identification and release date; operating parameters of the device, including voltage and frequency ranges; identification of all enabled hardware and software security aspects of the device; cryptography characteristics of the device; random number generator characteristics of the device; and key generation characteristics of the device. The manufacturing history enables one to gauge an assurance level of the device. By knowing the manufacturing history of a device, the security aspects of the device may be revised as errors, omissions, flaws, security breaches, or possible improprieties and the like are discovered as having occurred during the manufacturing of the device.

The environment of manufacture preferably comprises a "secure environment," i.e., an environment having a sufficient security rating at least as comparable to the security level of each device manufactured therein. By manufacturing each device in a secure environment, the security level of each device manufactured in such environment is not compromised.

The "linking" of the public key to the other information of a device comprises the recording of the information of the device in one or more databases maintained within the secure environment (herein collectively "secure database") in association with the public key of the device, whereby the other information is retrievable from the secure database based on the public key. Preferably, the other information is indexed or mapped in the secure database to the public key of the device to which the information relates. Moreover, since each public key is unique—at least to a high degree of probability—the mapping in the secure database is one-to-one. Alternatively, the public key and Security Profile may be indexed to a unique identifier—such as a serial number of the device—within the secure database. The linking of the public key to the other information of a device also may comprise the combining of the public key with the other information into a record and then the digital signing of the record in the secure environment by a trusted entity using a private key of the trusted entity. The record and digital signature together form a "Security Certificate," which then is imported into the device during its manufacture. The digital signing of the record by the trusted entity in the secure environment reliably links the public key of the manufactured device to the other information.

In accordance with preferred aspects of the Second aspect of the present invention, the device is manufactured in a secure environment (i.e., an environment having a sufficient security rating so as not to compromise the security level of any device manufactured in such environment). Furthermore, the information linked with the public key of the device comprises the Security Profile of the device. Accordingly, the recipient is able to determine a current security level of the device based on the identified security aspects of the device. The recipient also is able to gauge a risk of whether the private key of the device was compromised based on the identified security characteristics of the device, and the recipient is able to gauge a risk of whether the device containing the private key was fraudulently used based on the identified authentication capabilities of the device. Finally, the recipient is able to evaluate the stated security aspects of the device based upon the identified manufacturing history of the device.

Preferably, before a manufactured device is removed from the secure environment, a public-private key pair is created within the device and the public key is exported and linked to the Security Profile of the device within the secure database. In particular, one of the keys—the public key—is recorded in the secure database by the device manufacturer or other trustworthy entity ("Secure Entity"), and the other key—the private key—is preferably retained within the manufactured device and safeguarded against discovery. The public key also is retained within the device and is exportable upon demand. The Security Profile of the manufactured device is recorded in the secure database, and the record therefor is indexed or mapped to the corresponding public key, thereby reliably linking together both the public key and Security Profile of the device. In this case, the unique identifier is stored within the device and is exportable upon demand. Moreover, since each public key is unique—at least to a high degree of probability—the mapping in the secure database is one-to-one. Alternatively, the public key and Security Profile are indexed to a unique identifier of the device within the secure database, thereby reliably linking together the public key and Security Profile of the device, whereby an assurance level of the device may be determined.

Subsequently, when an EC is received by a recipient that includes a digital signature generated by a suspect device and the message is authenticated utilizing a suspect public key, the recipient identifies the Security Profile linked to the suspect public key as pertaining to the actual manufactured device to which belongs the private key used to generate the digital signature of the EC (herein "genuine device"). Then, whether the digital signature was generated fraudulently can be gauged by the recipient based upon the known Security Profile for the genuine device. Specifically, the risk of whether the private key retained within the manufactured device has been compromised—and thus whether the suspect device is the genuine device—can be gauged based on the identified security characteristics of the genuine device, and the risk of whether the genuine device has been fraudulently used can be gauged based on the identified authentication capabilities of the genuine device. These evaluations also can be qualified based on the identified manufacturing history of the device, as appropriate, by determining an assurance level of the device.

In alternative preferred aspects of the Second aspect, a public—private key pair is created and the public key of the device is linked to the Security Profile of the device by combining the public key with the Security Profile into a record that then is digitally signed by the Secure Entity to form a Security Certificate of the respective device, which also is imported into the device. The digital signing of the record by the Secure Entity in the secure environment reliably links the Security Profile of the manufactured device and its public key. Subsequently, when a digital signature is generated by the device for inclusion in an EC, the Security Certificate also is included in the EC. Upon receipt and successful authentication of the message using the suspect public key set forth in the Security Certificate, the recipient authenticates the Security Certificate in the EC utilizing a public key of the Secure Entity. Upon successful authentication thereof, the recipient reliably identifies the Security Profile of the genuine device to which belongs the private key used in generating the digital signature of the EC. Then, whether the digital signature was generated fraudulently can be gauged by the recipient based upon the known Security Profile for the genuine device. Specifically, the risk of whether the private key retained within the manufactured device has been compromised—and thus whether the suspect device is the genuine device—can be gauged based on the identified security characteristics of the genuine device, and the risk of whether the genuine device has been fraudulently used can be gauged based on the identified authentication capabilities of the genuine device. These evaluations also can be qualified based on the identified manufacturing history of the device, as appropriate.

Additional aspects of both the First and Second aspects of the present invention include: a device with a computer-readable medium having computer-executable instructions that perform one or more steps of a method of the present invention; a device with an integrated circuitry that performs one or more steps of a method of the present invention; and a device with a computer chip that performs one or more steps of a method of the present invention.

V. BRIEF DESCRIPTION OF THE DRAWINGS

Benefits and further aspects of the present invention will be apparent from a detailed description of preferred implementations thereof taken in conjunction with the following drawings, wherein like reference numbers refer to like elements, and wherein:

FIG. 2b illustrates a variation of the implementation of FIG. 2a;

FIG. 2c illustrates a variation of the implementation of FIG. 2a;

FIG. 3 illustrates a preferred mode of operation of the device of FIGS. 2a, 2b, and 2c;

FIG. 4b illustrates a variation of the implementation of FIG. 4a;

FIG. 4c illustrates a variation of the implementation of FIG. 4a;

FIG. 5 illustrates a preferred mode of operation of the device of FIGS. 4a, 4b, and 4c;

FIG. 6b illustrates a variation of the implementation of FIG. 6a;

FIG. 6c illustrates a variation of the implementation of FIG. 6a;

FIG. 7 illustrates a preferred mode of operation of the device of FIGS. 6a, 6b, and 6c;

FIG. 8b illustrates a variation of the implementation of FIG. 8a;

FIG. 8c illustrates a variation of the implementation of FIG. 8a;

Figure 11A:
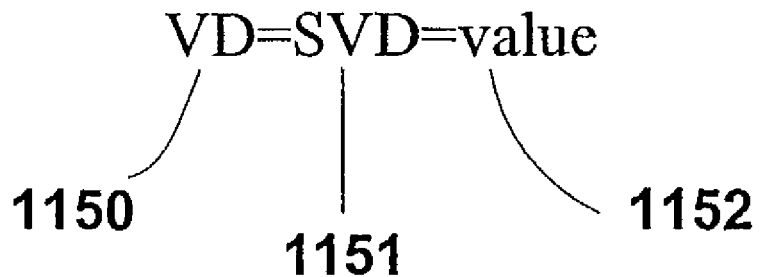
Figure 11B:
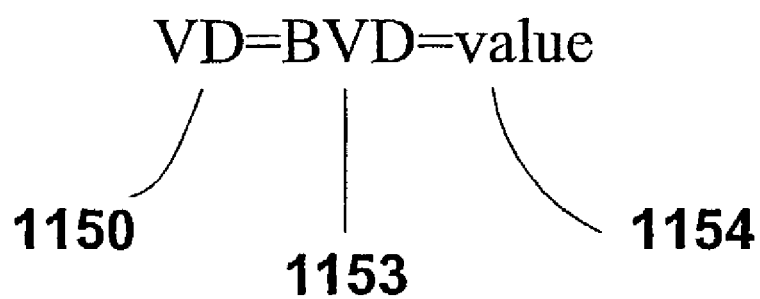
Figure 11C:
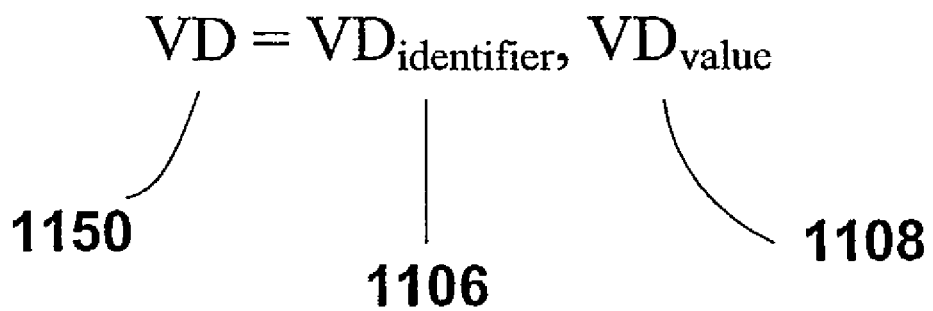
Figure 14:
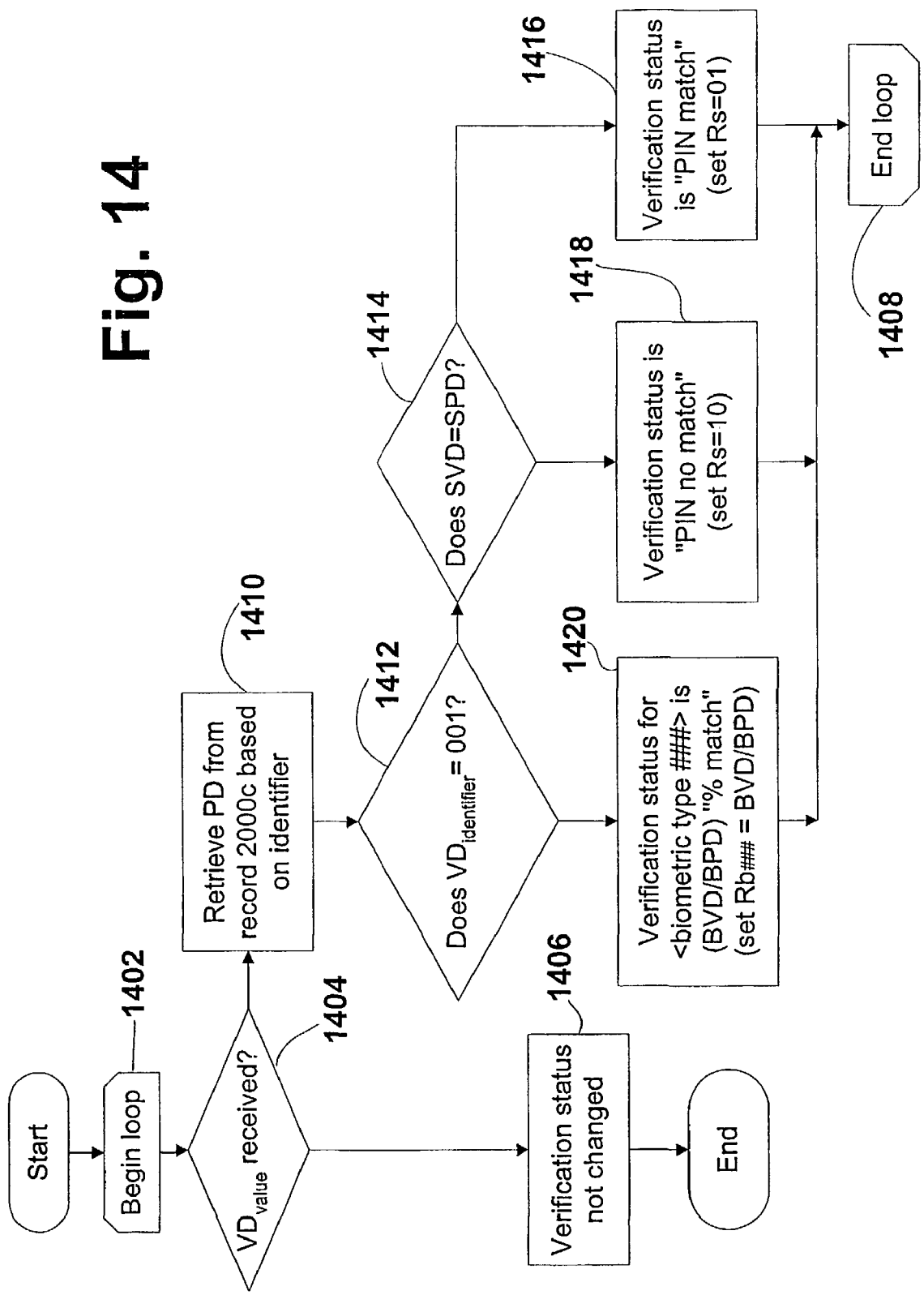
Figure 19:
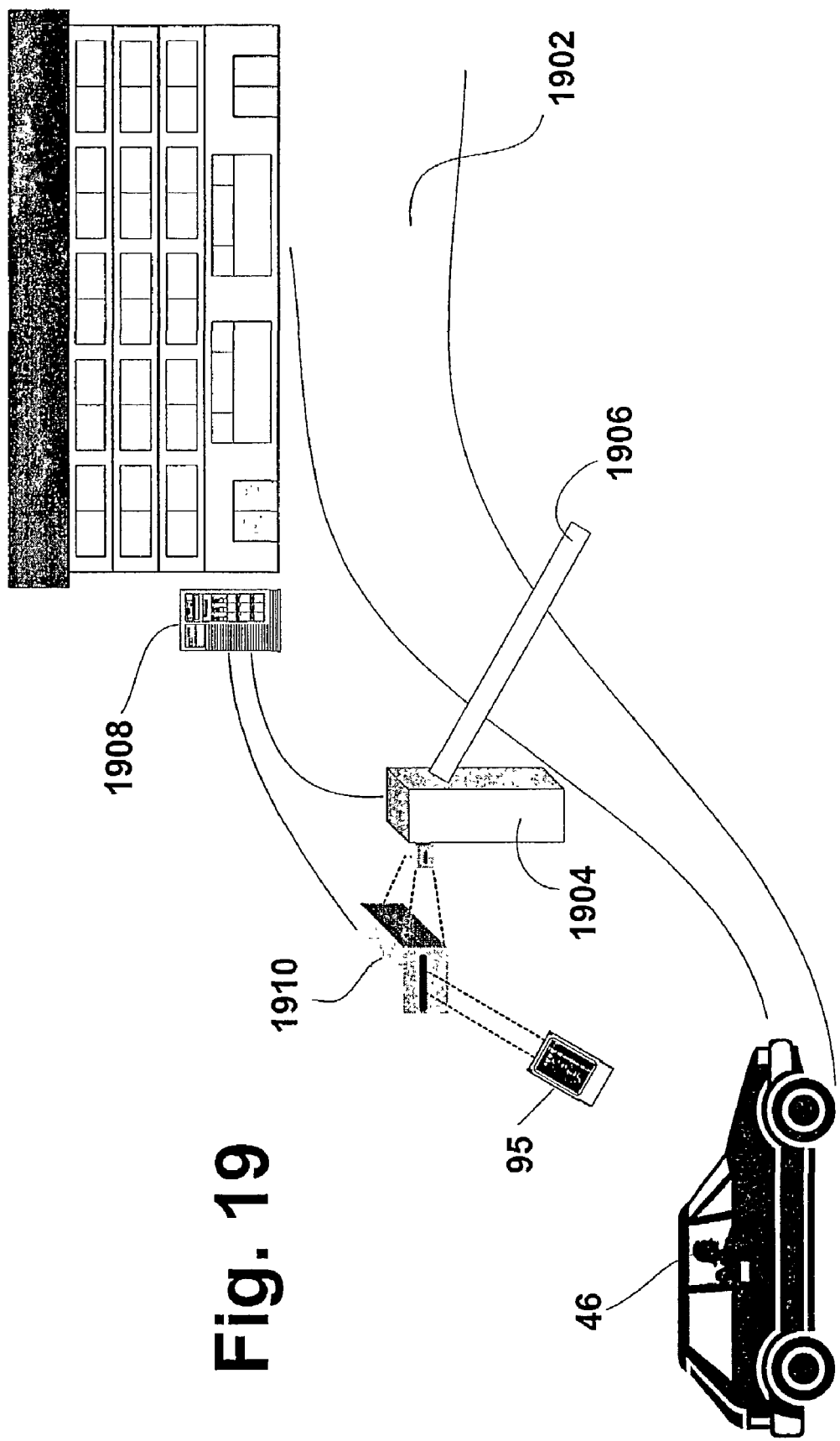
Figure 20:
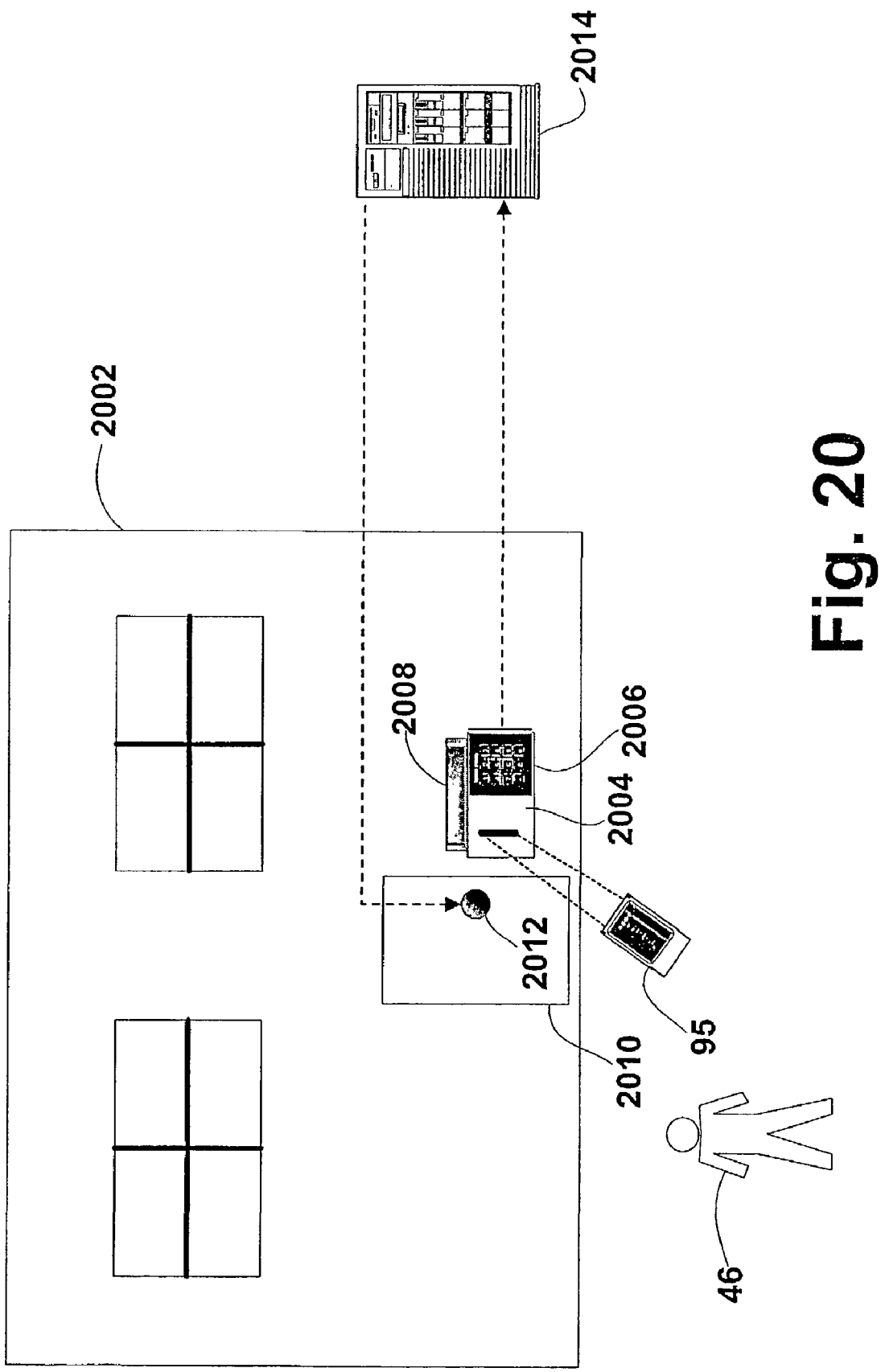
Figure 21:
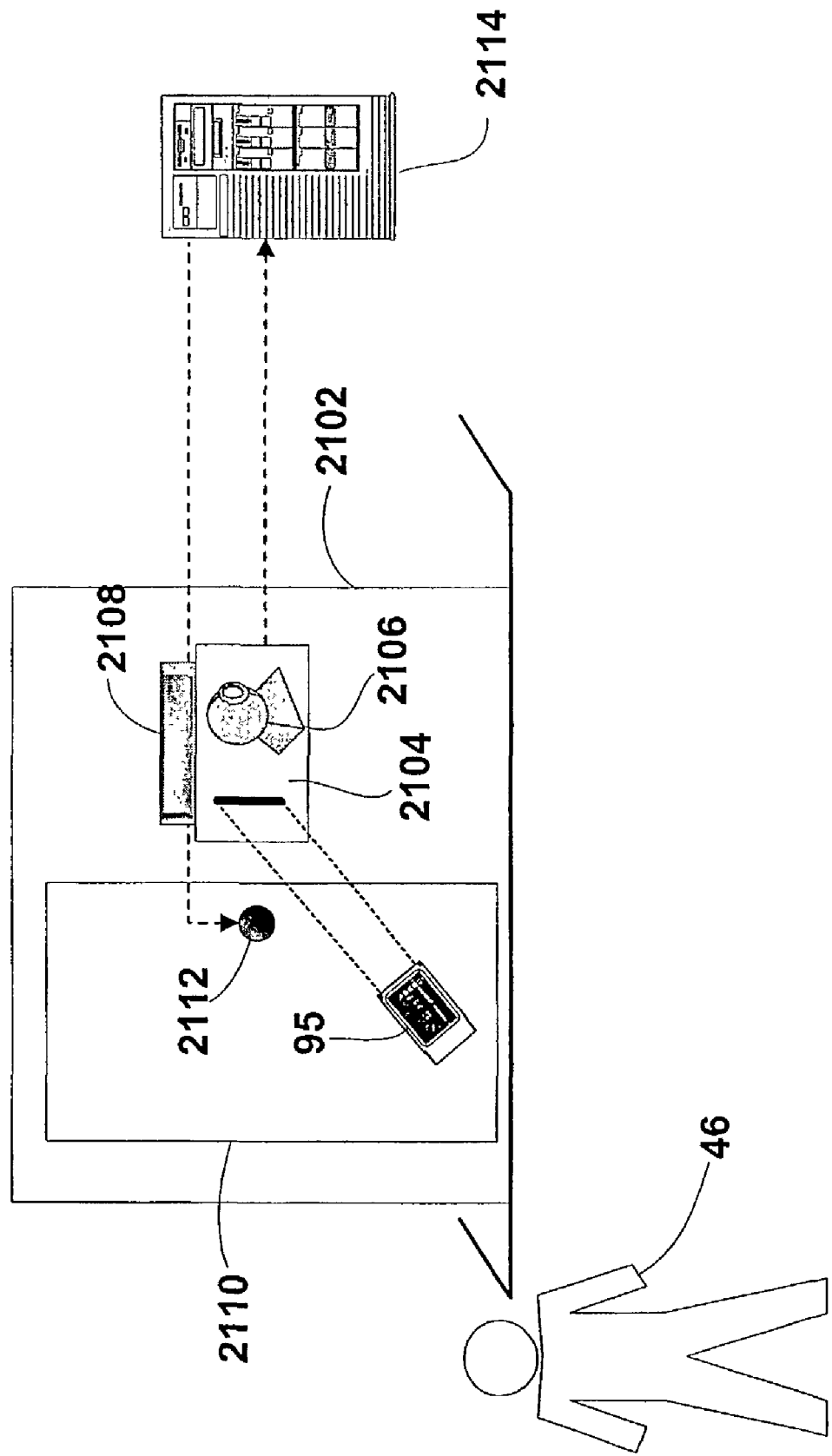
Figure 22A:
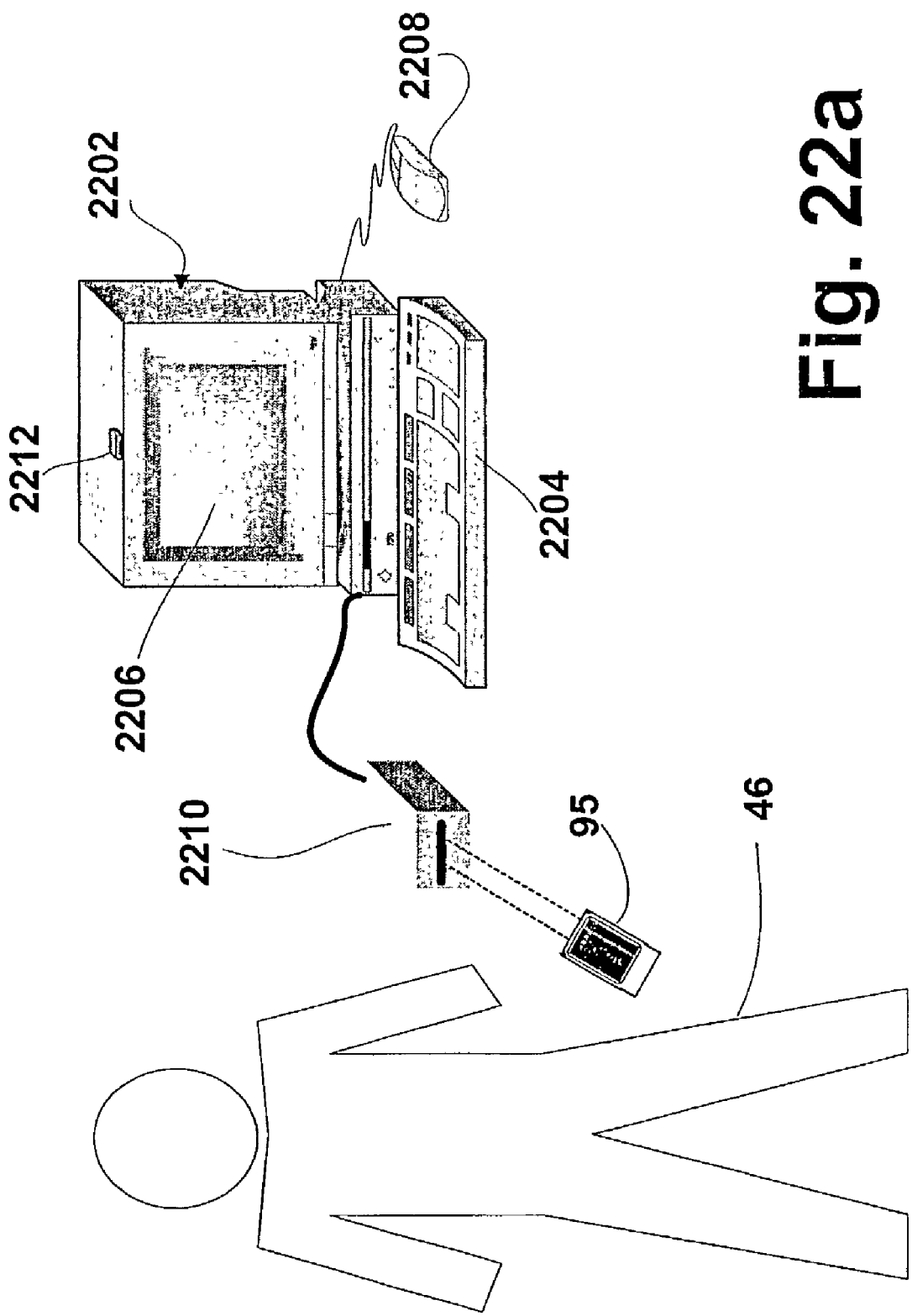
Figure 22B:
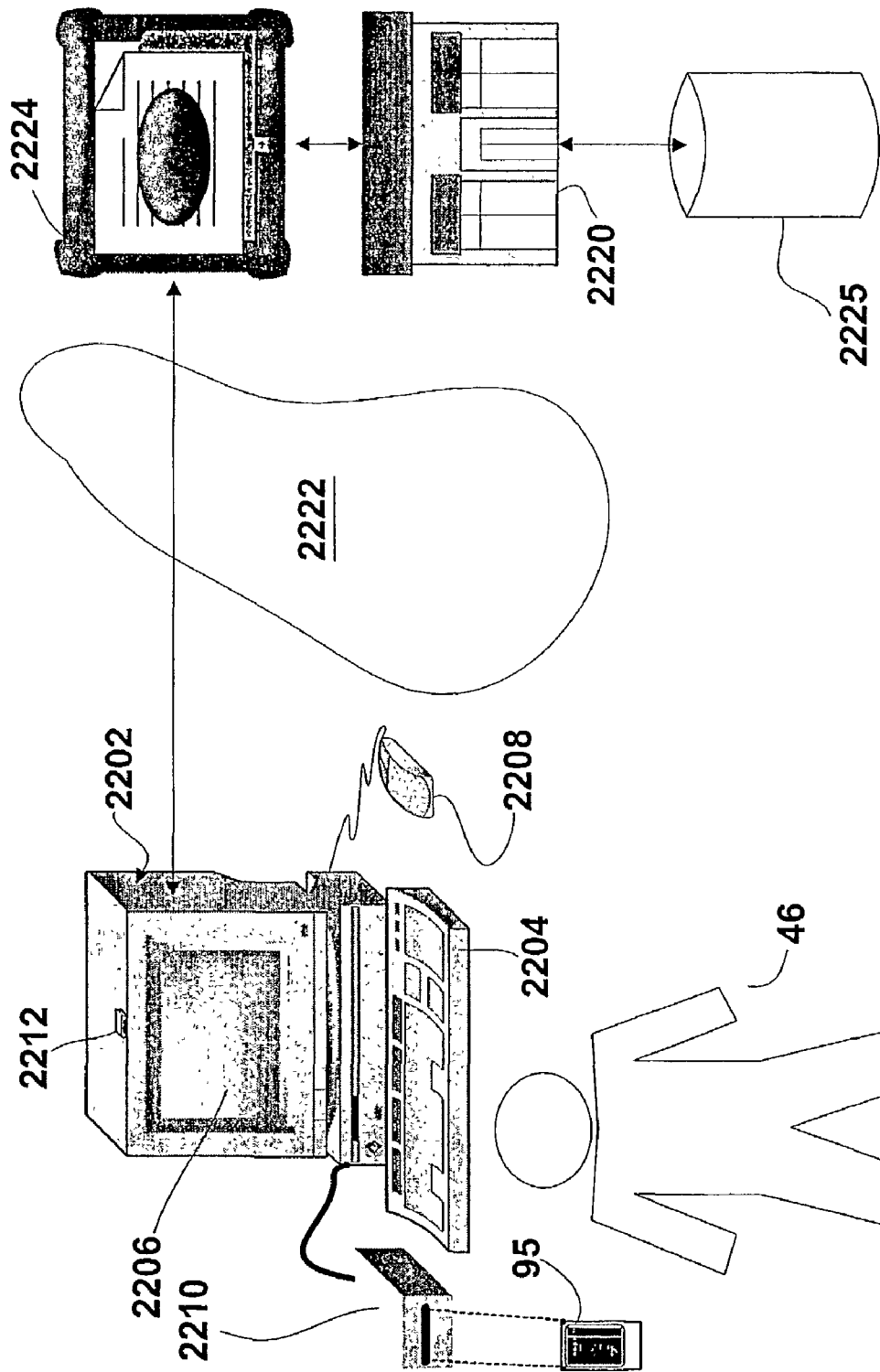
Figure 23:
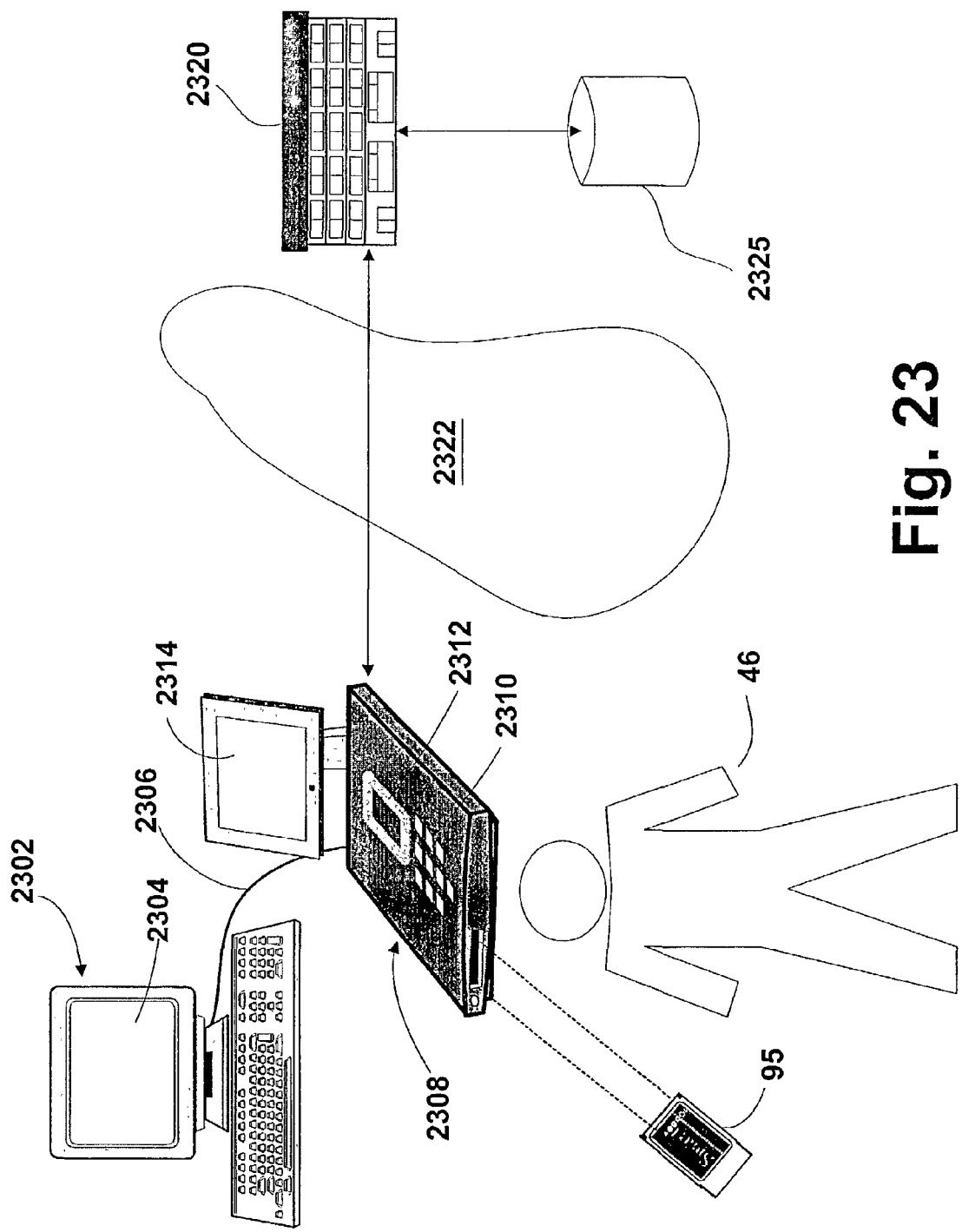
Figure 24:
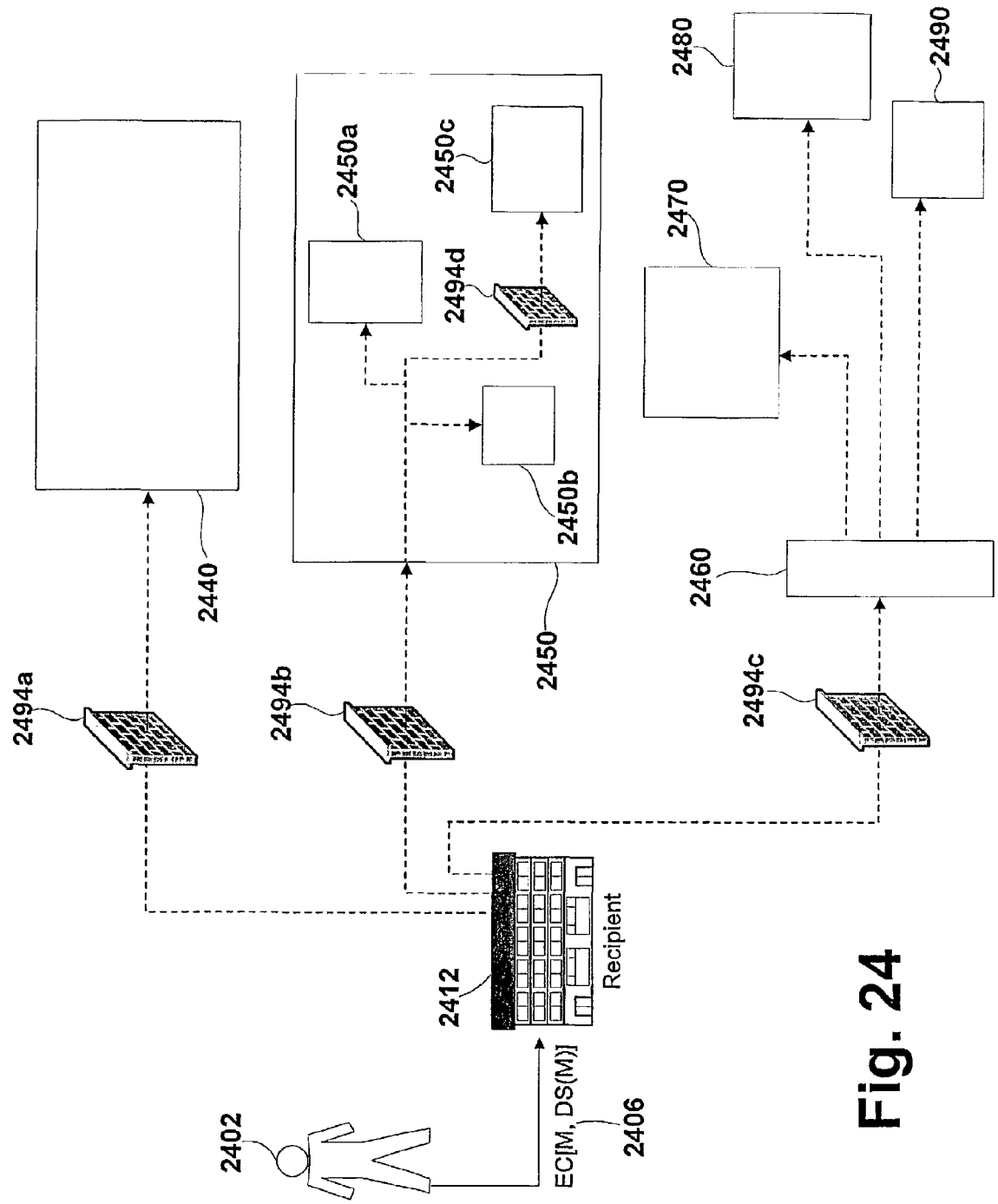
Figure 25:
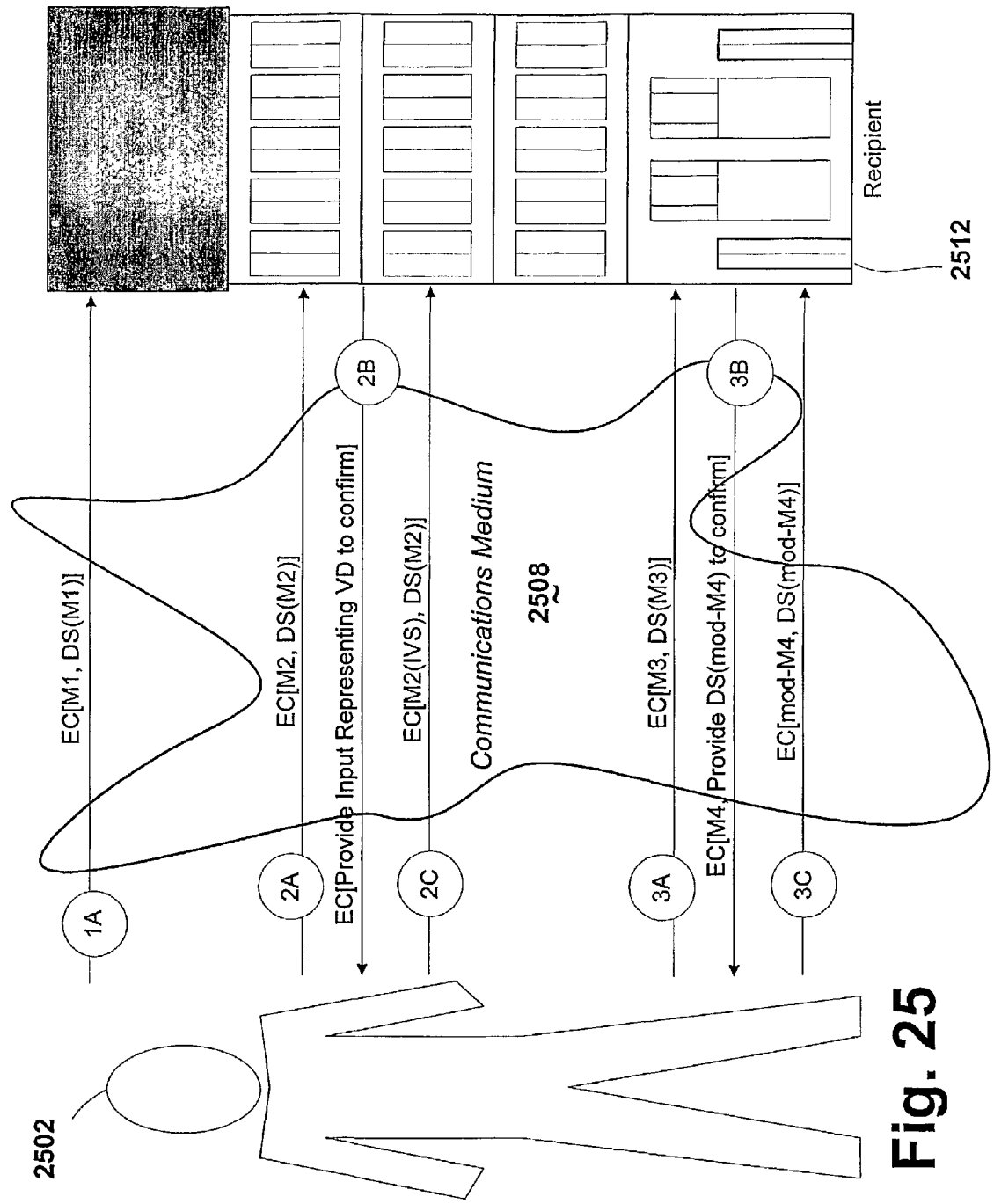
Figure 26:
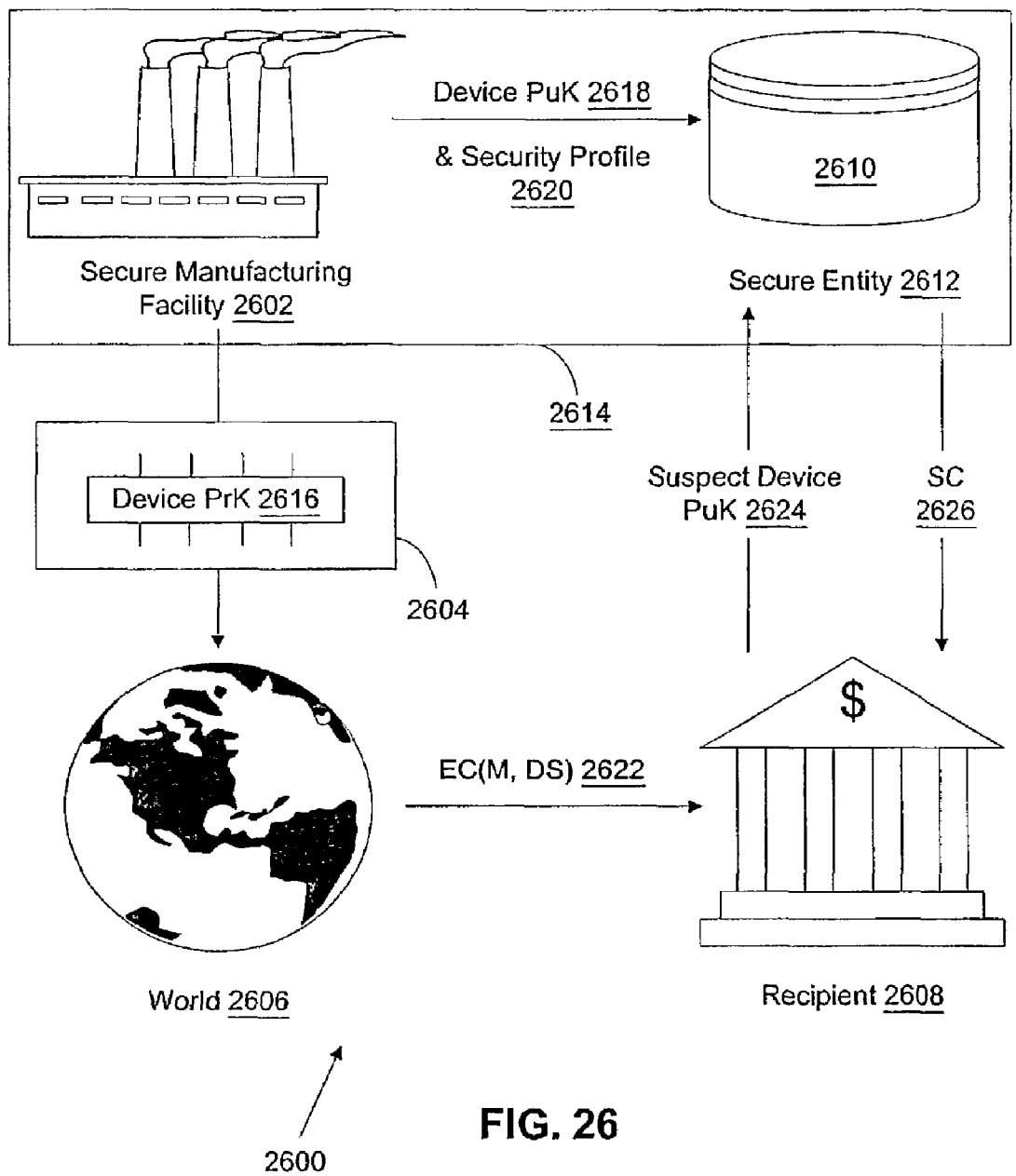
Figure 27:
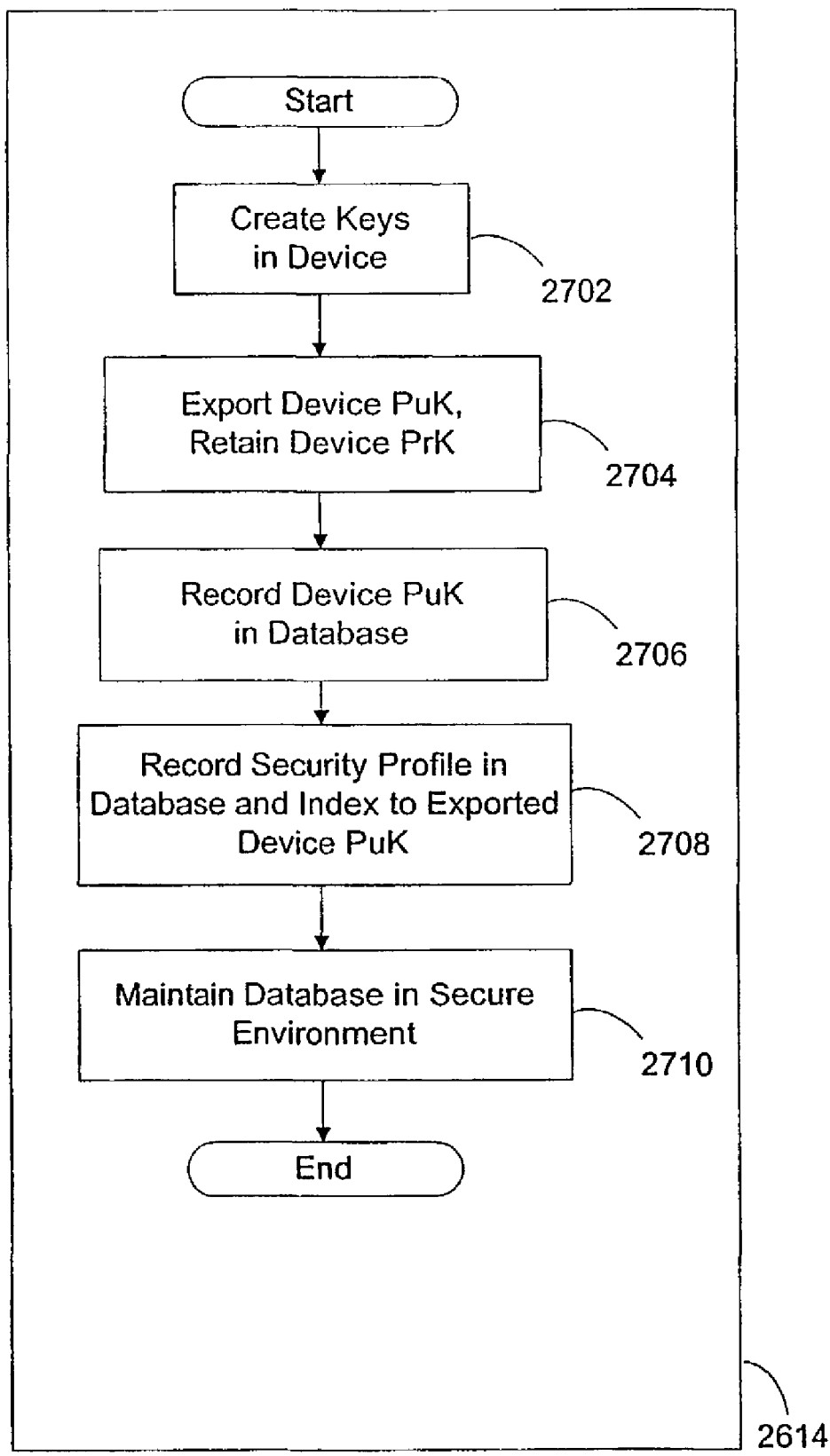
Figure 32:
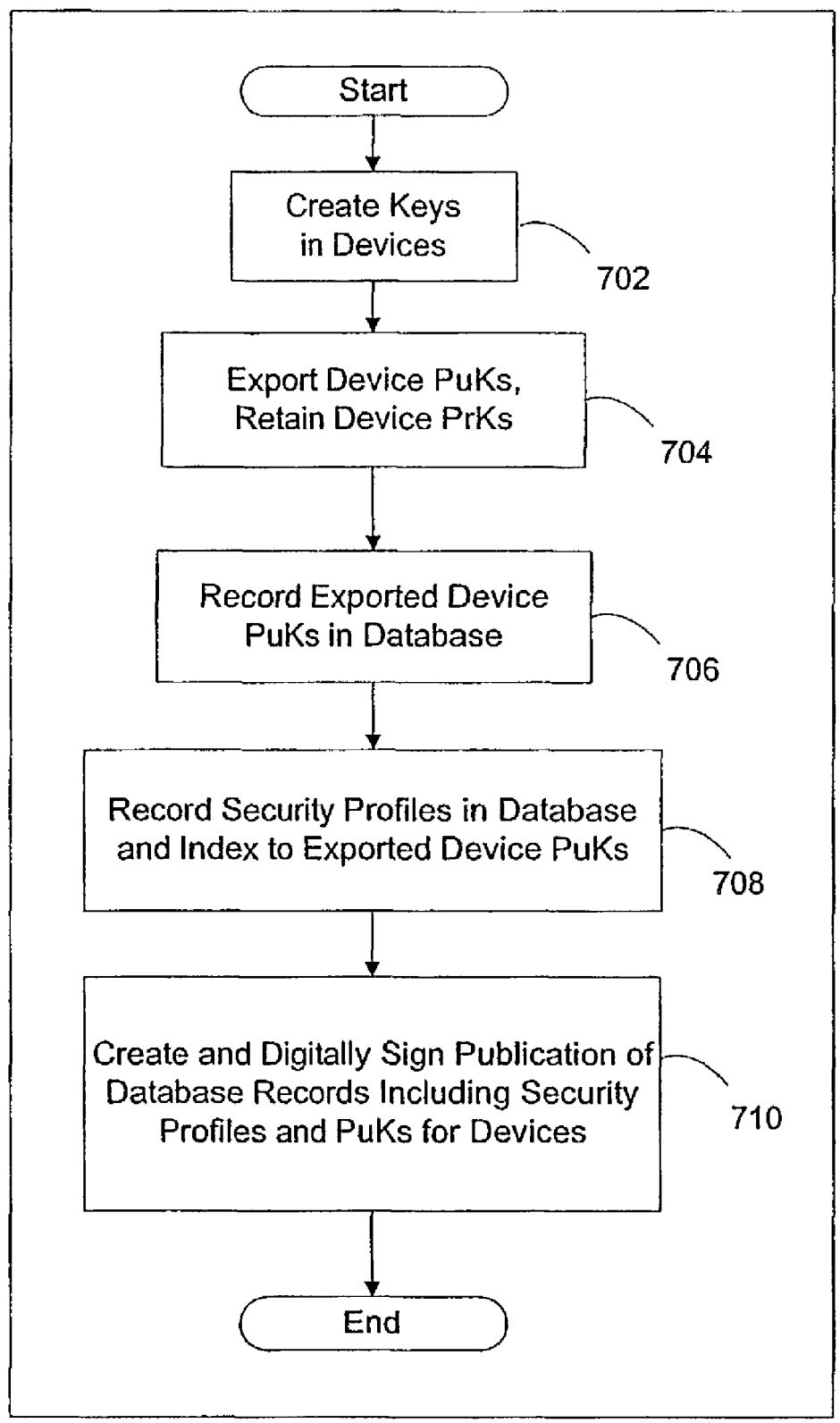
Figures 34, 35, 36:
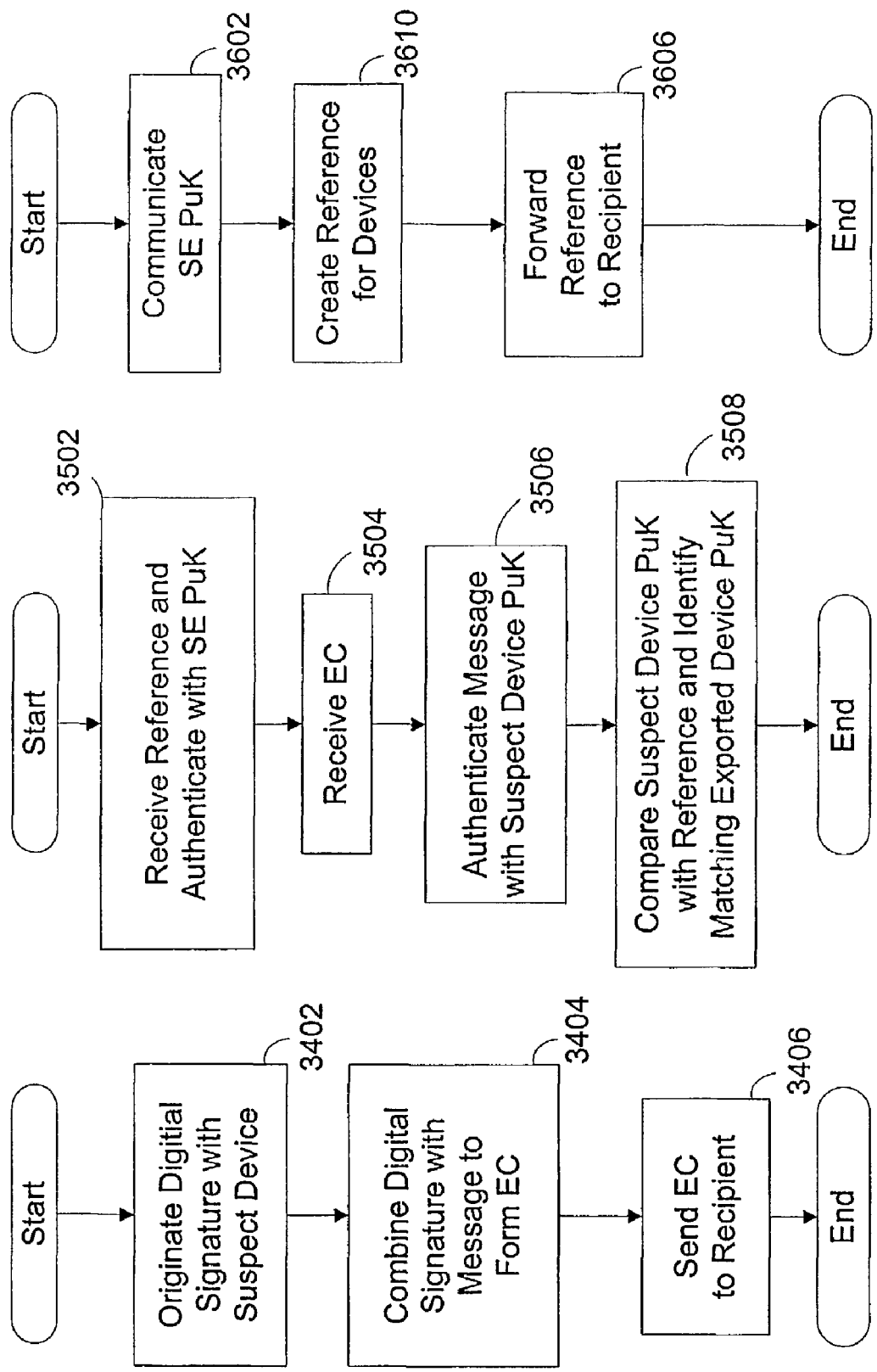
Figure 37:
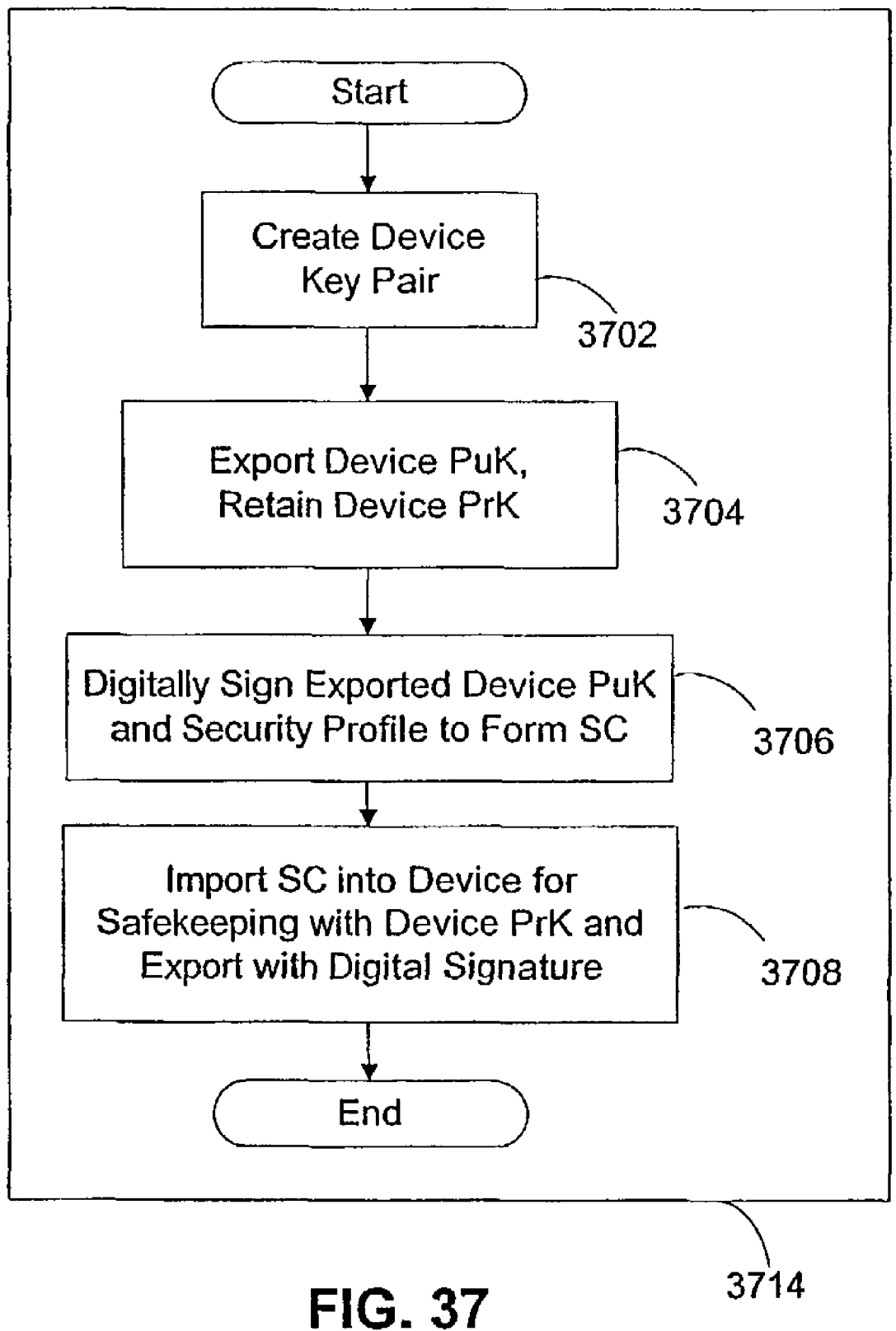
Figure 42:
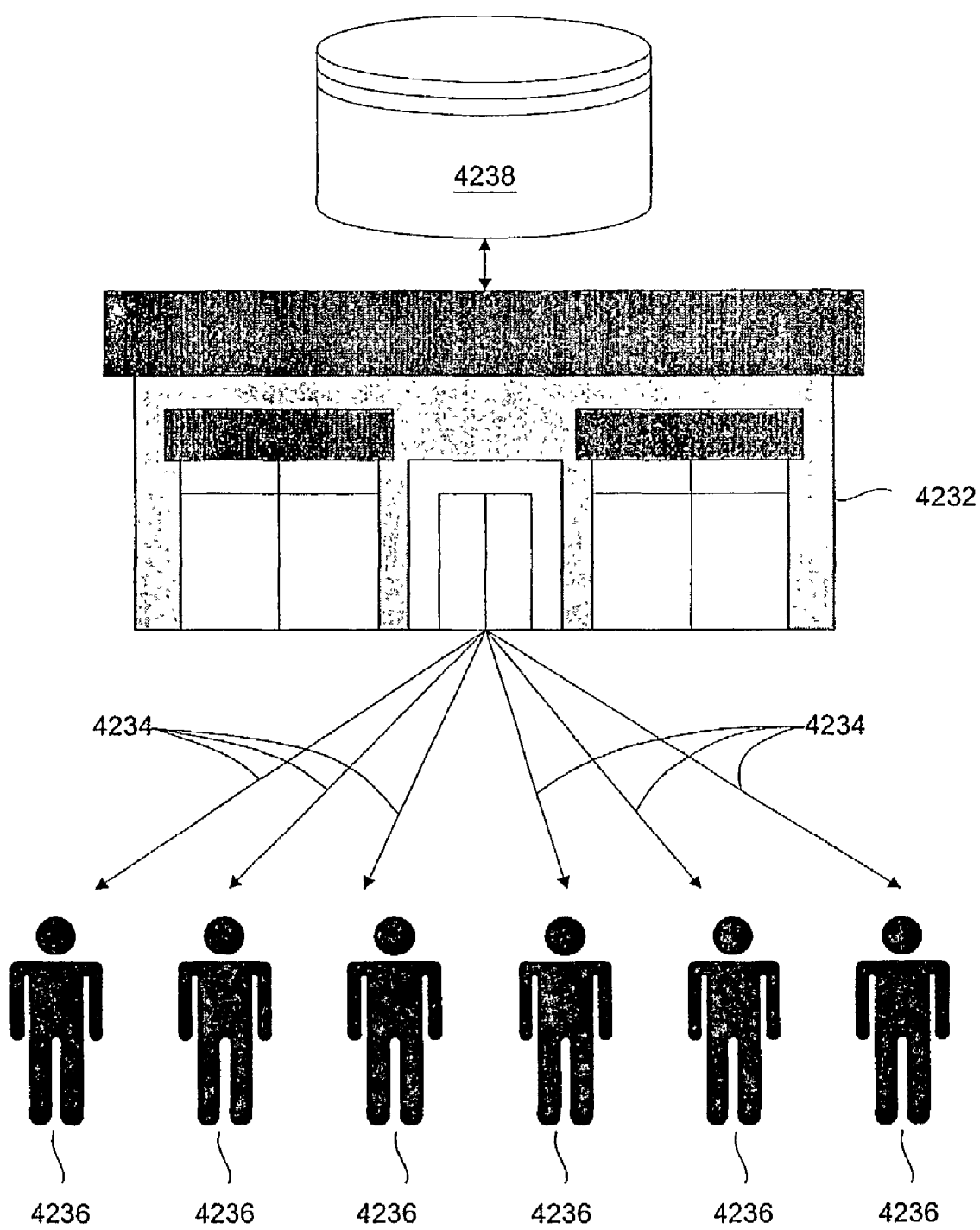
Figure 43:
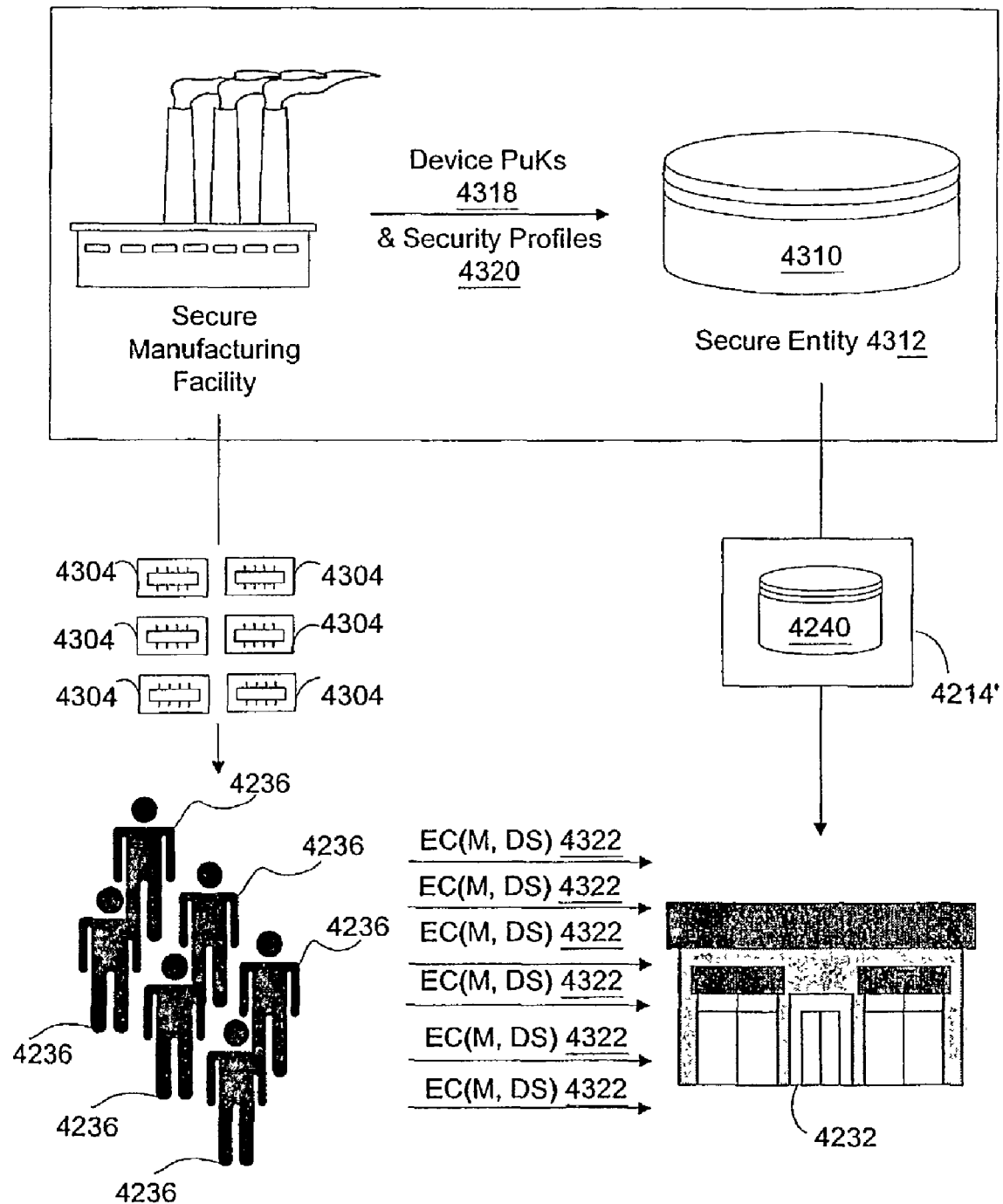
Figure 47:
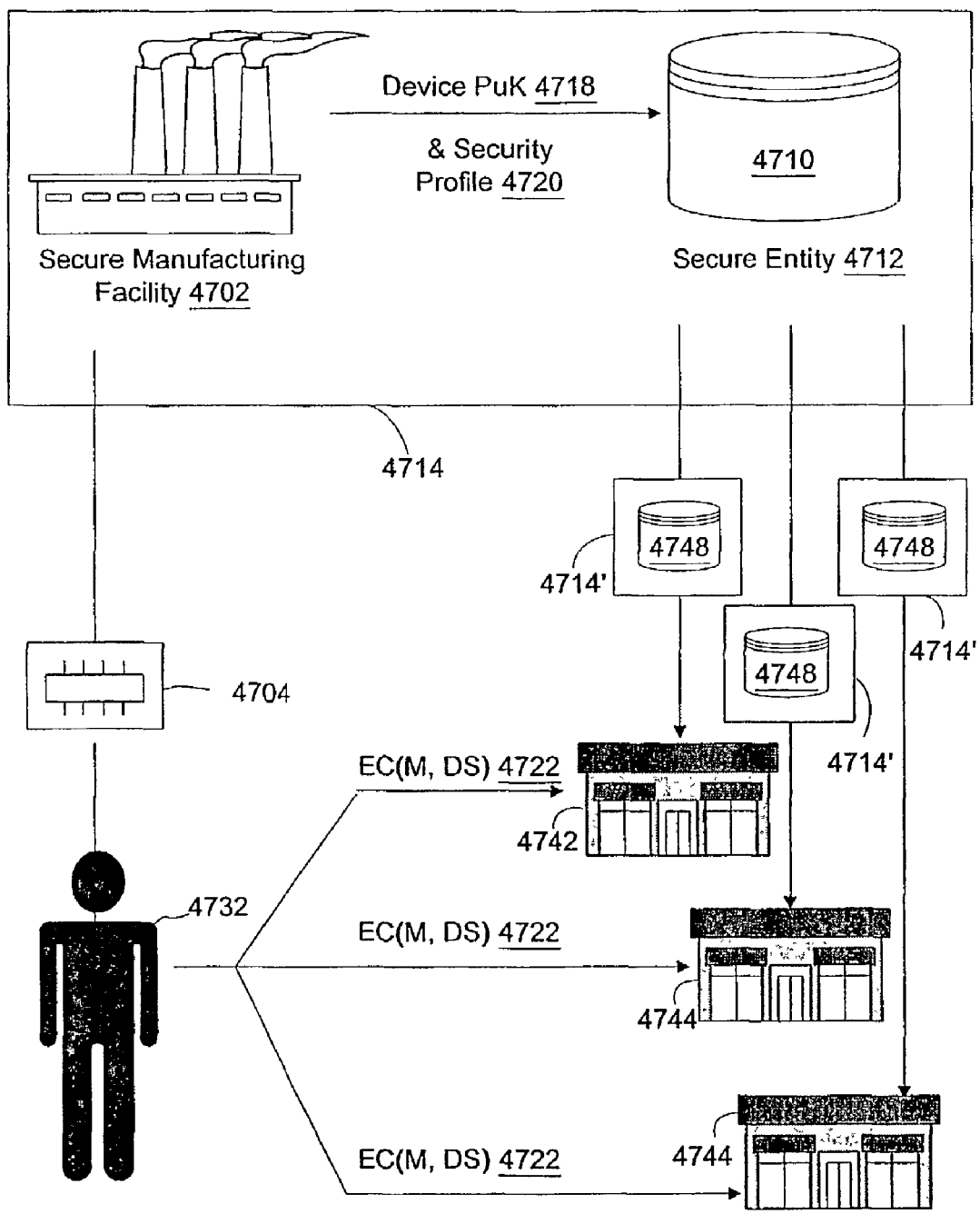
Figure 51:
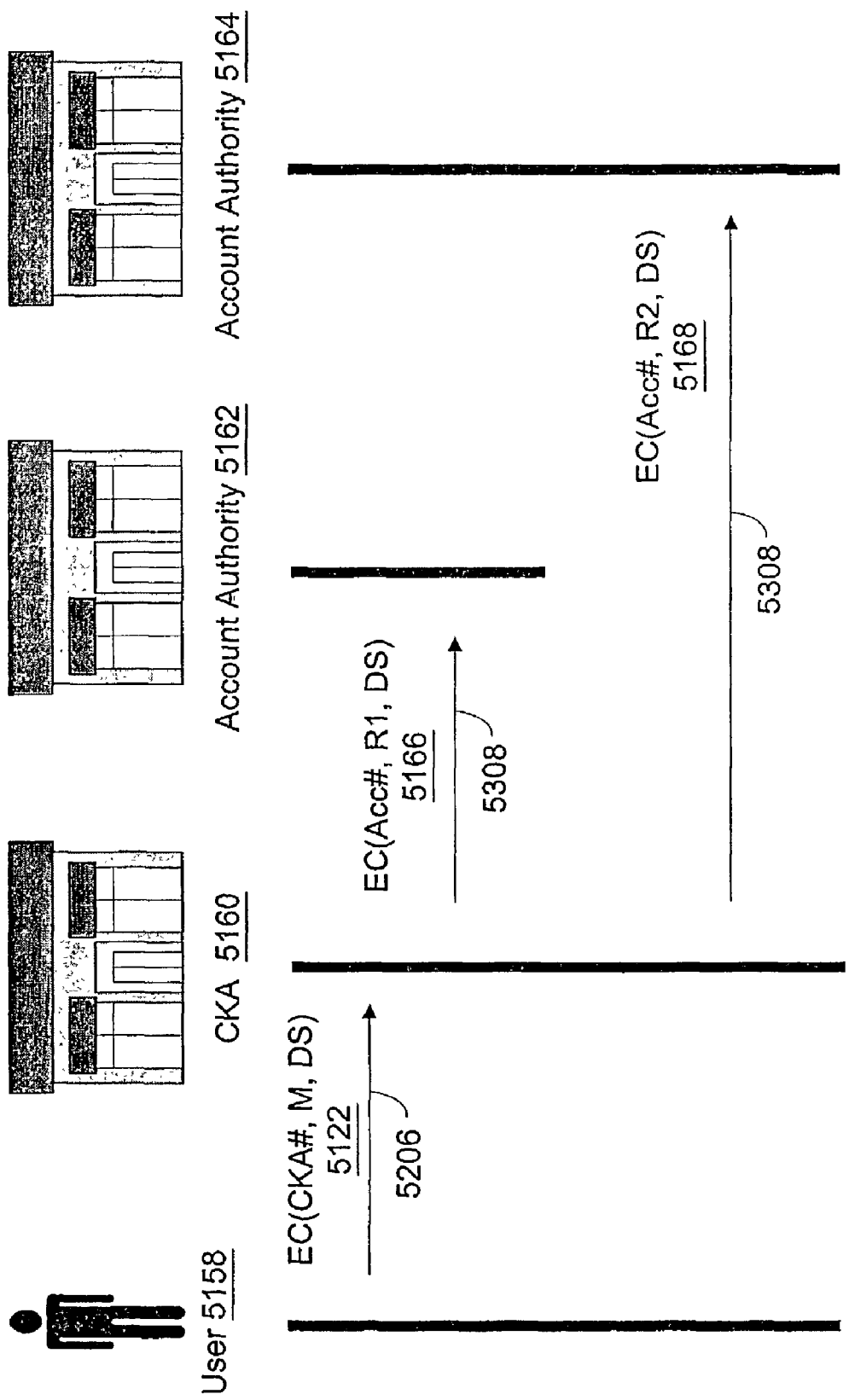
Figure 56:
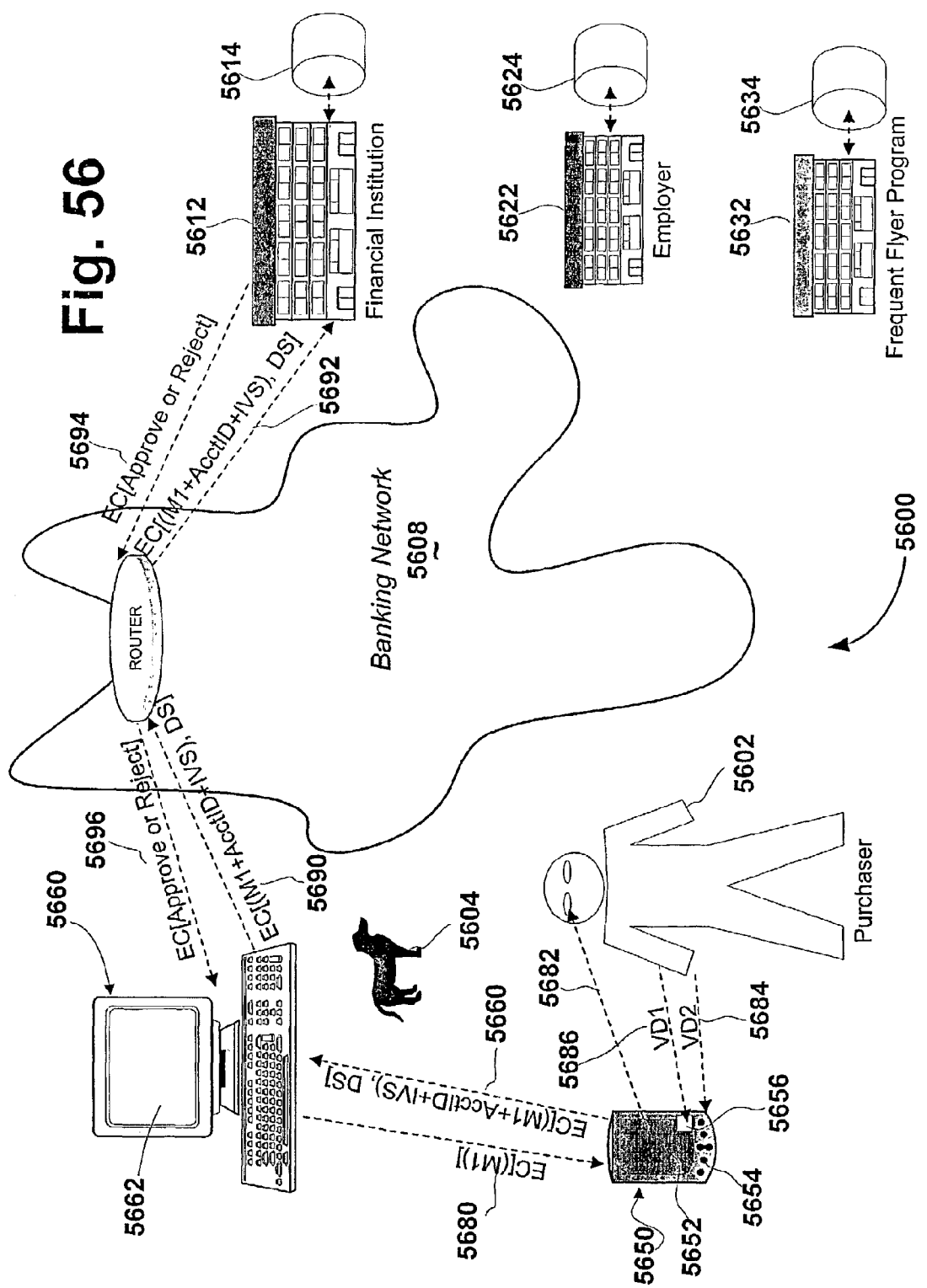
Figure 57:
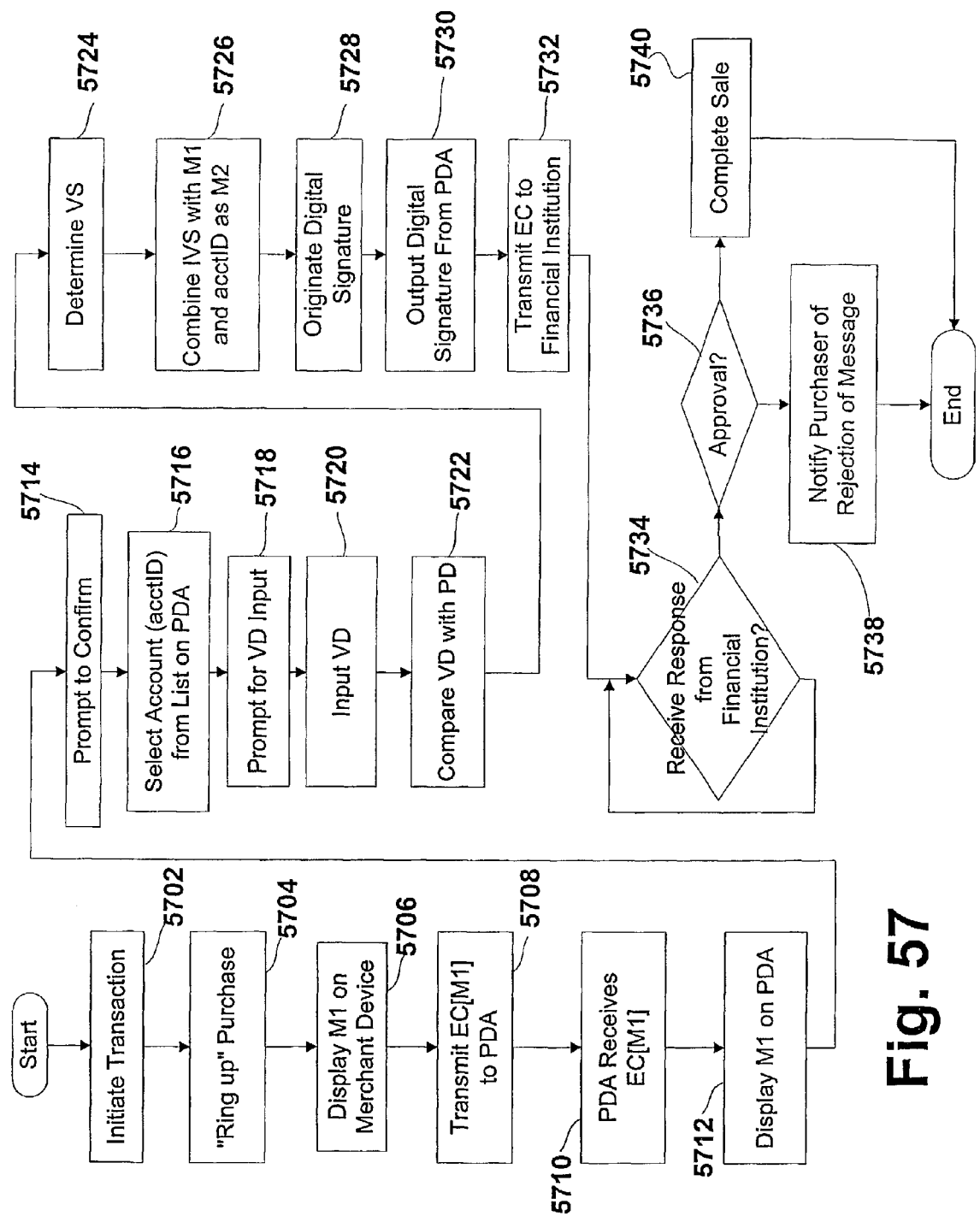
Figure 58:
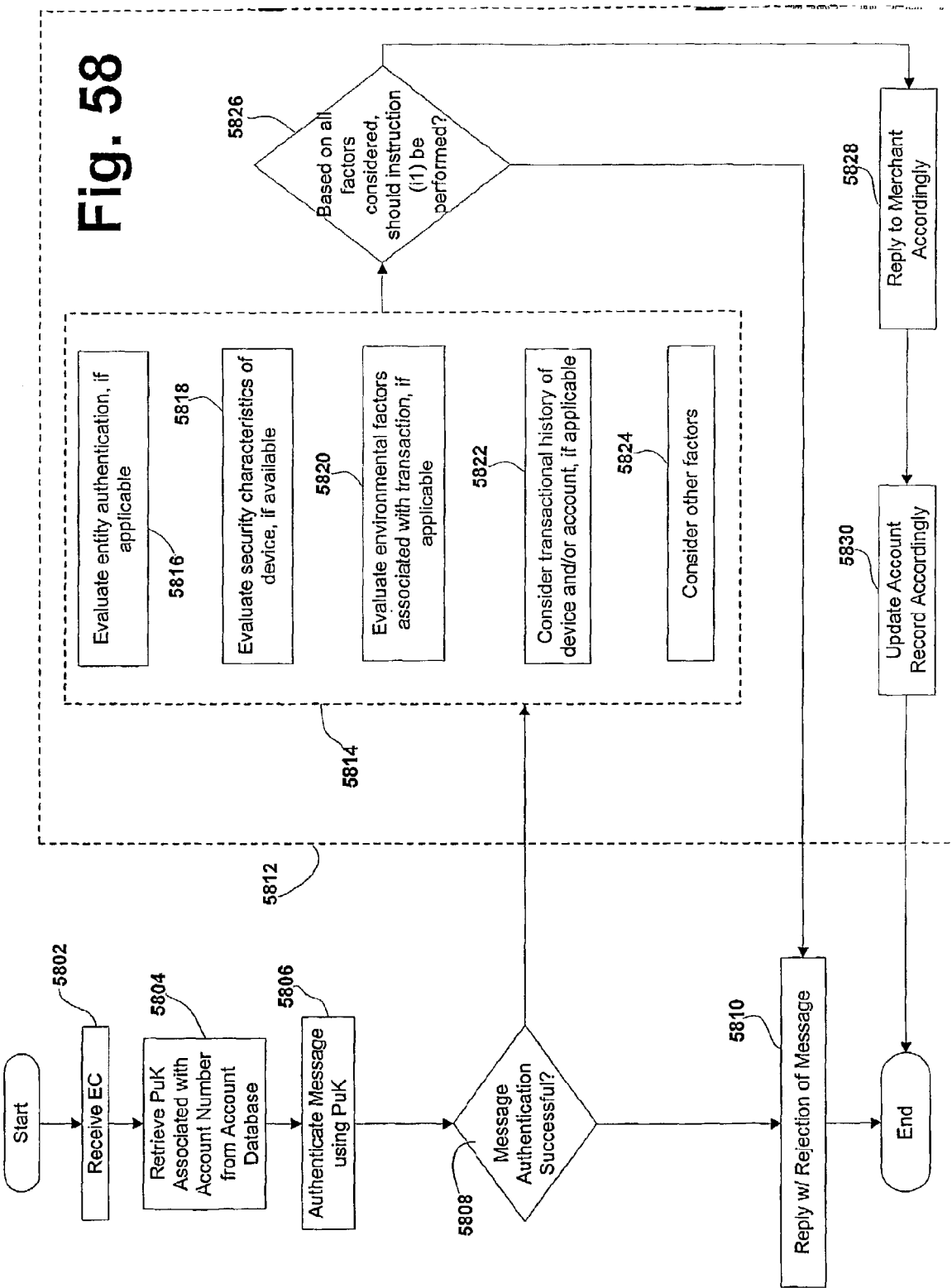

FIGS. 10a, 10b, and 10c illustrate preferred formats of prestored data of the first aspect of the present invention;

FIGS. 11a, 11b, and 11c illustrate preferred formats of verification data of the first aspect of the present invention;

FIG. 12 illustrates a preferred comparison and verification status identification process;

FIGS. 13a and 13b illustrate preferred comparison and verification status identification processes of the first aspect of the present invention;

FIG. 14 illustrates a preferred comparison and verification status identification process of the first aspect of the present invention;

FIGS. 15a and 15b illustrate preferred formats of identification markers of the first aspect of the present invention;

FIG. 16 illustrates preferred formats of identification markers of the first aspect of the present invention;

FIG. 17 illustrates a table of identification markers resulting from a hypothetical sequence of verification data inputs in accordance with the first aspect of the present invention;

FIG. 18 illustrates a preferred data flowchart within an implementation of the first aspect of the present invention using a computer chip;

FIG. 19 illustrates a first specific implementation of the first aspect of the present invention using an IC card;

FIG. 20 illustrates a second specific implementation of the first aspect of the present invention using an IC card;

FIG. 21 illustrates a third specific implementation of the first aspect of the present invention using an IC card;

FIGS. 22a and 22b illustrate fourth and fifth specific implementations of the first aspect of the present invention using an IC card;

FIG. 23 illustrates a sixth specific implementation of the first aspect of the present invention using an IC card;

FIG. 24 illustrates use of an EC for session authentication and transaction authentication purposes in accordance with the first aspect of the present invention;

FIG. 25 illustrates use of an EC for transaction confirmation purposes in accordance with the first aspect of the present invention; and FIG. 26 illustrates a preferred system in which a first preferred implementation of the second aspect of the present invention is practiced;

FIG. 27 illustrates a flowchart of steps performed within a secure environment in accordance with the first preferred implementation of the second aspect of the present invention;

FIG. 28 illustrates a communication sequence in identifying a Security Profile of a device in accordance with the first preferred implementation of the second aspect of the present invention;

FIG. 29 illustrates a flowchart of steps performed by a suspect device originating a digital signature in an EC in accordance with the first preferred implementation of the second aspect of the present invention;

FIG. 30 illustrates a flowchart of steps performed by a recipient in accordance with the first preferred implementation of the second aspect of the present invention;

FIG. 31 illustrates a flowchart of steps performed by a Secure Entity in accordance with the first preferred implementation of the second aspect of the present invention;

FIG. 32 illustrates a flowchart of steps performed within the secure environment in accordance with a second preferred implementation of the second aspect of the present invention;

FIG. 33 illustrates a communication sequence in identifying a Security Profile of a device in accordance with the second preferred implementation of the second aspect of the present invention;

FIG. 34 illustrates a flowchart of steps performed by a suspect device originating a digital signature in an EC in accordance with the second preferred implementation of the second aspect of the present invention;

FIG. 35 illustrates a flowchart of steps performed by a recipient in accordance with the second preferred implementation of the second aspect of the present invention;

FIG. 36 illustrates a flowchart of steps performed by a Secure Entity in accordance with the second preferred implementation of the second aspect of the present invention;

FIG. 37 illustrates a flowchart of steps performed within the secure environment in accordance with a third preferred implementation of the second aspect of the present invention;

FIG. 38 illustrates a communication sequence in identifying a Security Profile of a device in accordance with the third preferred implementation of the second aspect of the present invention;

FIG. 39 illustrates a flowchart of steps performed by a suspect device originating a digital signature in an EC in accordance with the third preferred implementation of the second aspect of the present invention;

FIG. 40 illustrates a flowchart of steps performed by a recipient in accordance with the third preferred implementation of the second aspect of the present invention;

FIG. 41 illustrates a flowchart of steps performed by a Secure Entity in accordance with the third preferred implementation of the second aspect of the present invention;

FIG. 42 illustrates a system related to the second aspect of the present invention in which a third-party provides goods and/or services to customers and maintains a customer account database in conjunction therewith;

FIG. 43 illustrates a preferred system in which a preferred implementation of the second aspect of the present invention is practiced;

FIG. 44 illustrates database records of an initial PuK-linked account database in accordance with the preferred implementation of the second aspect of the present invention;

FIG. 45 illustrates a PuK-linked account database of customers comprising the database records of FIG. 44 after having been updated and/or merged by the third-party representing an Internet service provider;

FIG. 46 illustrates a PuK-linked account database of customers comprising the database records of FIG. 44 after having been updated and/or merged by the third-party representing a financial institution;

FIG. 47 illustrates a preferred system in which a preferred implementation of the third aspect of the present invention is practiced;

FIG. 48 illustrates an established PuK-linked account database of customers of a third-party representing a financial institution in accordance with a preferred implementation of a fifth aspect of the present invention;

FIG. 49 illustrates a flow chart for considering whether to perform a transaction on an account in accordance with a preferred implementation of the fifth aspect of the present invention;

FIG. 50 illustrates an account database of a Central Key Authority in accordance with a sixth aspect of the present invention;

FIG. 51 illustrates a communication sequence in accordance with a preferred implementation of the sixth aspect of the present invention;

FIG. 52 illustrates a flowchart of steps performed by a user in accordance with the preferred implementation of the sixth aspect of the present invention of FIG. 51;

FIG. 53 illustrates a flowchart of steps performed by a Central Key Authority in accordance with the preferred implementation of the sixth aspect of the present invention of FIG. 51;

FIG. 54 illustrates a flowchart of steps performed by a first Account Authority in accordance with the preferred implementation of the sixth aspect of the present invention of FIG. 51;

FIG. 55 illustrates a flowchart of steps performed by a second Account Authority in accordance with the preferred implementation of the sixth aspect of the present invention of FIG. 51;

FIG. 56 illustrates a business application in accordance with a preferred embodiment of the present invention;

FIG. 57 illustrates a flowchart of steps performed by both an account holder and merchant (intermediate party) in the business application of FIG. 56; and FIG. 58 illustrates a flowchart of steps performed by an account authority in the business application of FIG. 56.

VI. DETAILED DESCRIPTION OF PREFERRED EMBODIMENTS

As a preliminary matter, it readily will be understood by those persons skilled in the art that, in view of the following detailed description of the devices, systems, and methods of the present invention, the present invention is susceptible of broad utility and application. Many implementations and adaptations of the present invention other than those herein described, as well as many variations, modifications, and equivalent arrangements, will be apparent from or reasonably suggested by the present invention and the following detailed description thereof, without departing from the substance or scope of the present invention. Furthermore, those of ordinary skill in the art will understand and appreciate that although steps of various processes may be shown and described in some instances as being carried out in a preferred sequence or temporal order, the steps of such processes are not necessarily to be limited to being carried out in such particular sequence or order. Rather, in many instances the steps of processes described herein may be carried out in various different sequences and orders, while still falling within the scope of the present invention. Accordingly, while the present invention is described herein in detail in relation to preferred implementations, it is to be understood that this detailed description only is illustrative and exemplary of the present invention and is made merely for purposes of providing a full and enabling disclosure of the present invention. The detailed description set forth herein is not intended nor is to be construed to limit the present invention or otherwise to exclude any such other implementations, adaptations, variations, modifications and equivalent arrangements of the present invention, the present invention being limited solely by the claims appended hereto and the equivalents thereof.

A. First Aspect of the Present Invention: Providing Verification Status Regarding Entity Authentication by Device In accordance with all of the aspects of the present invention, the device useful in the present invention includes a digital signature component that generates digital signatures for electronic messages using public-private key cryptography. The key pair is generated within the device during its manufacture and, preferably, the device is incapable of divulging the private key while the public key is exportable upon demand. Furthermore, during manufacture of the device the public key is exported from the device and "linked" with other information regarding the device in a secure manner. The linking of the public key of the device to the other information regarding the device occurs prior to the release of the device from an environment in which it is manufactured.

The manufactured device itself comprises hardware, software and/or firmware and, specifically, comprises a computer chip, an integrated circuit, a computer-readable medium having suitable software therein, or a combination thereof. The device further may comprise a physical object such as a hardware token or an embedded token, the token containing such a computer chip, integrated circuitry, software, or combination thereof. If the device is a hardware token, it preferably takes the form of a ring or other jewelry; a dongle; an electronic key; a card, such as an IC card, smart card, debit card, credit card, ID badge, security badge, parking card, or transit card; or the like. If the device is an embedded token, it preferably takes the form of a cell phone; a telephone; a television; a personal digital assistant (PDA); a watch; a computer; computer hardware; or the like.

The device preferably includes a device interface comprising a port—including a wireless communications port, a serial port, a USB port, a parallel port, or an infrared port—or some other physical interface for communicating with at least an external electronic apparatus, whether contact or contactless. The device also may include a trusted platform module (TPM) comprising hardware and software components providing increased trust in a platform, as set forth and described in the TCPA Documents cited above.

Some devices of the present invention require use of an I/O support elements to enable the devices to receive message data or verification data. Some of the devices require I/O support elements to receive specific types of verification data but not others. Some of the devices require use of I/O support elements to transmit information regarding verification statuses, digital signatures, and messages to recipients of the ECs. Some of the devices are self-contained, i.e., they can generate and transmit messages, digital signatures, and indicators of verification status without requiring I/O support elements; some devices, although self-contained, are capable of interacting with I/O support elements, as desired. Moreover, an I/O support element may take the form of any number of different apparatuses, depending upon the particular application in which it is used and depending upon the type of device with which it interacts. Indeed, one example of an I/O support element includes a card reader comprising hardware and software components designed in accordance with the technical specifications published by CEN/ISSS as a result of the well-known Financial Transactional IC Card Reader Project (known commonly as "FINREAD").

For higher security applications, the device—or the device in combination with an I/O support element—preferably includes the following: a keypad (alphanumeric), interactive display, or other type of user data entry mechanism (collectively referred to herein as "User Interface") that allows the sender of an EC to compose or modify a message; a User Interface for inputting Secret verification data (it should be noted that the User Interface for generating or modifying a message may, but does not have to, be the same as the User Interface for the entry of the Secret verification data); a display for showing the message and/or Secret to the sender of the EC using the device; a scanner or reader for receiving at least one type of biometric verification data; memory for securely storing data representing a Secret and/or a biometric characteristic; memory for securely storing a private key (PrK); a processor or circuitry for performing various comparisons between data input into the device and for identifying a verification status of the device based on the comparisons; a processor or circuitry for generating or originating digital signatures; and a means for outputting information from the device for transmission to the electronic apparatus. Preferably, the device also includes memory for storing and exporting the public key (PuK) associated with the particular private key (PrK), and for storing additional user information such as account information, user ID's, and the like. For lower security applications, not all of the above are necessary.

Also in accordance with all aspects of the present invention, each device includes a verification component thereof that performs Factor B and/or Factor C Entity Authentication. In particular, the verification component: receives input representing verification data of an entity; identifies a current verification status of the device; and communicates the identified verification status (VS) to a recipient in association with an EC. The verification data input into the device represents a Secret or a biometric characteristic of the entity. The verification status of the device preferably is identified within the device by maintaining prestored data of the entity and by comparing the prestored data with the verification data input into the device. Accordingly, the prestored data represents a Secret or a biometric characteristic, too.

The device includes a plurality of predefined verification statuses, each representing a relational correspondence between the verification data and the prestored data. None of the verification statuses, however, actually reveals the verification data or the prestored data; thus, there need be no "shared secret" between the entity using the device and the recipient. The device identifies one of the predefined verification statuses as being the current verification status based on the comparison of the verification data with the prestored data, and the device communicates the identified verification status to the recipient by outputting from the device an indicator of the identified verification status that then is transmitted to the recipient. The indicator may or may not actually comprise the verification status; however, the indicator does indicate to the recipient (or enables the recipient to determine) the verification status identified within the device.

Additionally, the device preferably includes a predefined verification status representing that no input was received within a predefined period of time. The device identifies this verification status as being the current verification status if no input is received within such predefined period of time and, when appropriate, communicates such verification status to the recipient in association with an EC. The predefined period of time may comprise, for example, the time since a resetting of the device or simply a predetermined amount of time. Further, for devices that "power on" only when voltage or an appropriate signal is provided to the device (e.g., voltage from an internal power supply, voltage from an external power supply, receipt of an RF signal, and the like), the predefined amount of time may comprise the time since the device was, in fact, "powered on."

Examples of possible verification statuses include "match" and "no match" between the verification data and the prestored data, and degrees of match or difference between the verification data and prestored data (e.g., when the verification data and prestored data comprises biometric values). The verification statuses also may further represent whether a verification status has been provided to the recipient within a predefined period of time. The predefined period of time may comprise, for example, the time since the last comparison of verification data with prestored data that resulted in a successful verification, the time since the last receipt of input representing verification data, or simply a predetermined amount of time, as discussed above.

In preferred aspects, the device also includes a plurality of predefined verification statuses, each representing a relational correspondence between the verification data and the prestored data. None of the verification statuses, however, actually reveals the verification data or the prestored data; thus, there need be no "shared secret" between the sender and the recipient. The device identifies one of the predefined verification statuses as being the current verification status based on the comparison of the verification data with the prestored data, and the device communicates the identified verification status to the recipient by outputting from the device an indicator of the identified verification status that then is transmitted to the recipient. The indicator may or may not actually comprise the verification status; however, the indicator does indicate to the recipient (or enables the recipient to determine) the verification status identified within the device. The "indicator" represents the indication of the identified verification status of the device.

Additionally, the device preferably includes a predefined verification status representing that no input was received within a predefined period of time. The device identifies this verification status as being the current verification status if no input is received within such predefined period of time and, when appropriate, communicates such verification status to the recipient in association with an EC. The predefined period of time may comprise, for example, the time since a resetting of the device or simply a predetermined amount of time. Further, for devices that "power on" only when voltage or an appropriate signal is provided to the device (e.g., voltage from an internal power supply, voltage from an external power supply, receipt of an RF signal, and the like), the predefined amount of time may comprise the time since the device was, in fact, "powered on."

Examples of possible verification statuses include "match" and "no match" between the verification data and the prestored data, and degrees of match or difference between the verification data and prestored data (e.g., when the verification data and prestored data comprises biometric values). The verification statuses also may further represent whether a verification status has been provided to the recipient within a predefined period of time. The predefined period of time may comprise, for example, the time since the last comparison of verification data with prestored data that resulted in a successful verification, the time since the last receipt of input representing verification data, or simply a predetermined amount of time, as discussed above.

It should be understood that, depending upon the context in which the sender and recipient are interacting, the message may be explicit or implicit. If implicit, the content of the message may be predefined. For example, the actual act of receiving an indicator of the verification status of the device by the recipient may, in itself, represent a message agreed upon between the sender and the recipient. In such a case, no EC containing a message need be sent. Furthermore, when an EC actually is sent from the sender to the recipient, part or all of the EC may be composed and sent from the device, rather than separate from the device.

The recipient preferably has the ability of determining a level of risk associated with the EC based on the verification status. The determination of risk regards whether the digital signature received in the EC was generated using the device by someone other than the owner (or authorized entity) of the private key. Because of this determined level of risk associated with the EC, the recipient is better able to evaluate the message of the EC. The recipient preferably is represented by an electronic apparatus that includes an interface for receiving the indicator transmitted from device and logic circuitry or software incorporating business logic for evaluating the EC from the sender based on the received indicator. The electronic apparatus may be located remote to the device but disposed in electronic communication therewith, such as over an electronic communications network (e.g. Internet, intranet, wireless network, and the like).

1. First Preferred implementation of Device Providing Verification Status (Digital Signature as the Indicator)

Figure 1:
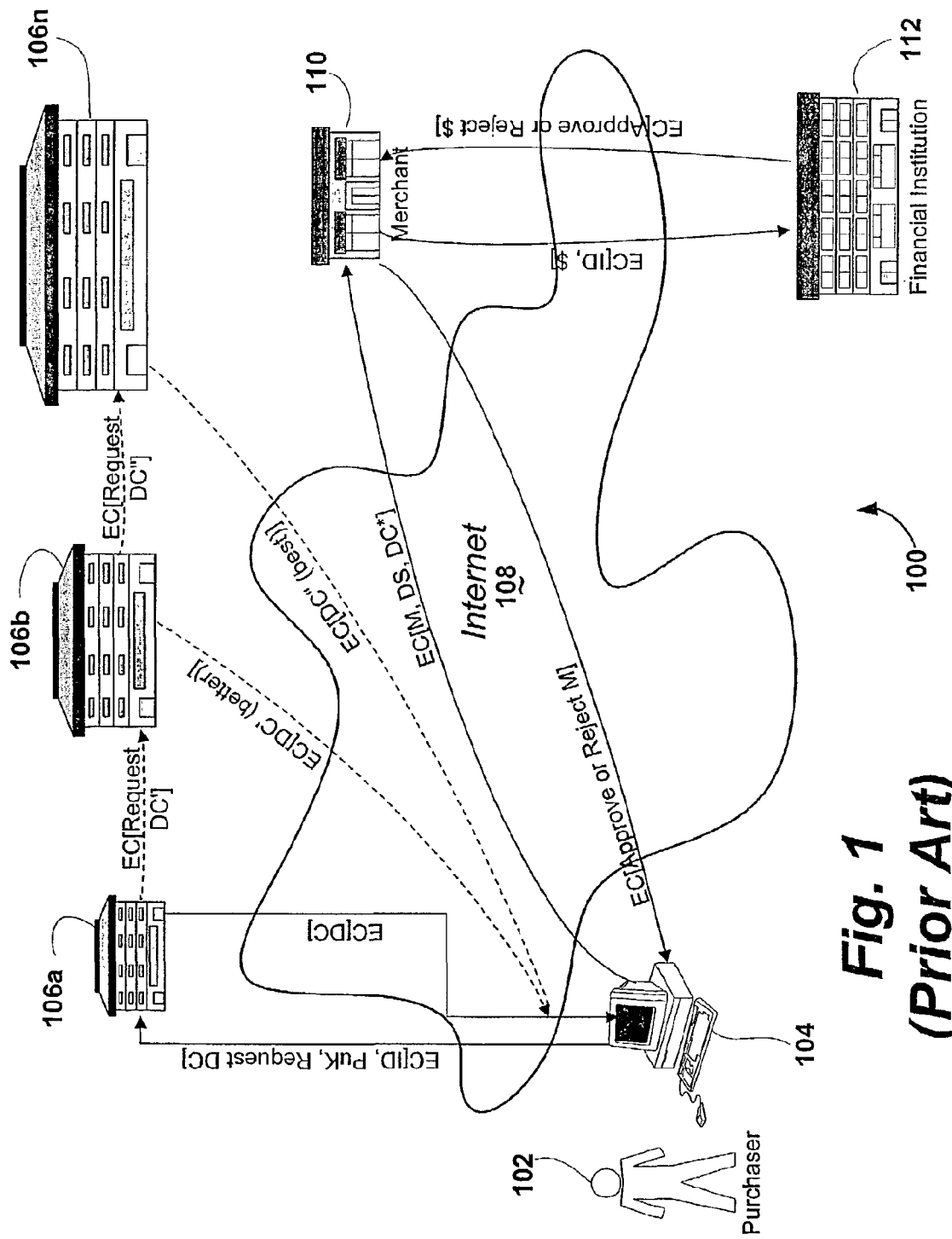
FIG. 1 illustrates a prior art Certification Authority Digital Certificate (CADS) system.
Figure 2A:
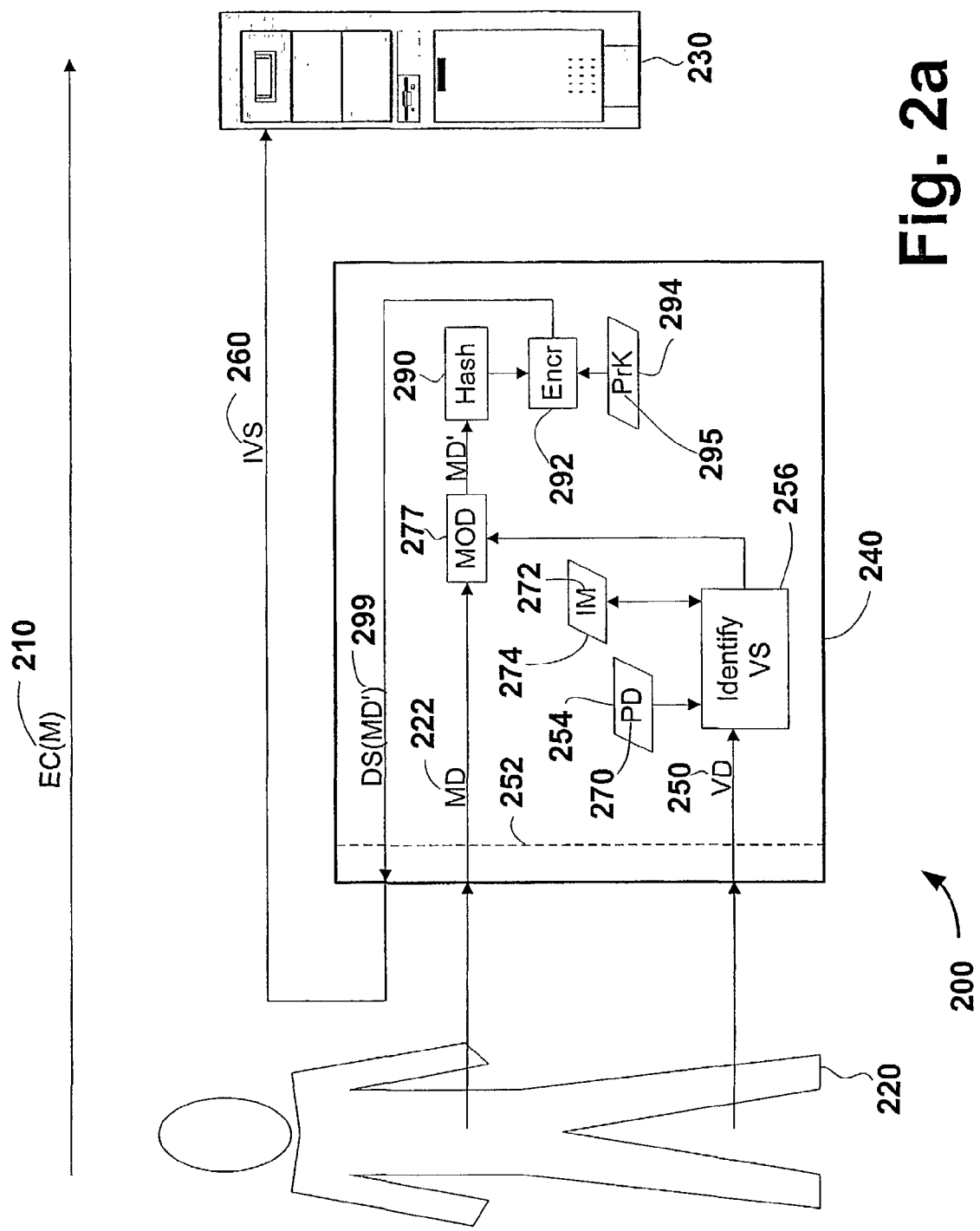
FIG. 2a illustrates a first preferred implementation of the first aspect of the present invention.

A first preferred implementation 200 of a device of the present invention is illustrated in FIG. 2a, wherein an EC 210 including a message from a sender 220 is received by a recipient represented by an electronic apparatus 230, and wherein a device 240 receives input representing verification data (VD) 250 at a device interface 252. The device interface 252 includes, as appropriate, one or more of the following: a user interface such as an alphanumeric keypad, a touch screen display, or a biometric scanner for receiving input directly from the sender 220; an electrical contact; a standard electronic interface with a computer bus; an antenna; or a communications port, such as a serial port, USB port, parallel port, infrared port or other wireless communications port.

The device 240 includes a verification component therein that maintains data (PD) 270 of the sender 220 prestored in memory 254. The verification data 250 and prestored data 270 represent Secret or biometric values. The verification component identifies at 256 a current verification status of the device 240 based on a comparison of the verification data 250 with the prestored data 270 and records the last identified (i.e., "current") verification status of the device 240 by assigning a value to an identification marker (IM) 272 that is stored in memory 274.

The device 240 also receives at the device interface 252 data (MD) 222 representing the message of the EC 210. The message data may comprise the message itself, a message digest thereof, or the result of some other processing of the message (M). The device 240 includes a digital signature component that, upon receipt of the message data 222, obtains the value for the identification marker 272 and modifies the message data at 277 as a function of this value (as used herein, "function" may include the possible function $f(x)=x$ for a particular value of x).

The digital signature component then originates a digital signature 299 for the modified message data (MD') by calculating a hash value therefor at 290 and then encrypting the hash value at 292 using a private key 295 of a public-private key pair. For increased reliability and trust, the private key 295 is retained securely within memory 294 so that it is never exported from the device 240 and is not discoverable from outside of the device 240. The digital signature is originated in accordance with the ECDSA as specified in FIPS PUB 186-2. Accordingly, the digital signature 299 is generated using a random number generator, and the hash function at 290 is performed using SHA-1, which generates a 20-byte output regardless of the size of the input received. The digital signature 299 then is output from the device 240 for transmitting to the recipient as the indicator 260 of the verification status of the device 240. The digital signature 299 output from the device 240 actually comprises the indicator of the verification status (IVS) 260 as a result of the modification process. The indicator 260 then is transmitted to the recipient in association with the EC 210, whereby the recipient is able to identify the indicator 260 as pertaining to the EC 210.

The device 240 includes a set of predefined verification statuses each representing a relational correspondence between the verification data 250 and the prestored data 270. Verification statuses of the set further represent whether an indicator 260 has been output from the device 240 since the last successful verification or since the last receipt of input representing verification data. The set also contains an additional predefined verification status representing the lack of input representing verification data 250 since a resetting after a timeout or a powering on of the device 240. The indicator 260 output from the device 240 is based on the last comparison of the verification data 250 with the prestored data 270, but only if input representing verification data 250 has been received since the resetting of the device 240. Otherwise, the indicator 260 indicates the lack of input representing verification data 250 since the resetting of the device 240.

The electronic apparatus 230 includes an interface (not shown) capable of receiving the indicator 260. The electronic apparatus 230 also includes logic circuitry or software incorporating business logic therein for determining the verification status of the device based on the indicator 260 and for evaluating the EC 210 received from the sender 220 based on the determined verification status. In this regard, the electronic apparatus 230 decrypts the digital signature with the public key, which corresponds to the private key 295 and which may be received in association with the digital signature or known or obtained beforehand by the recipient. The recipient also modifies—and then calculates a hash value for—the message for each one of the predefined verification statuses of the device until the calculated hash value equals the hash value of the decrypted digital signature. In calculating a hash value for comparison, the electronic apparatus 230 also performs any necessary processing to the message in order to produce the message data that was modified within the device 240. When the hash value calculated by the recipient equals the hash value of the decrypted digital signature, the recipient thereby determines the current verification status of the device 240. This determination also confirms the authenticity of the message of the EC 210. Furthermore, in order to minimize consumption of resources, the set of verification statuses of the device is predefined to contain only a limited number of verification statuses when this particular device 240 of the preferred implementation 200 is used.

When the verification data 250 and the prestored data 270 comprise a Secret, the predefined set of verification statuses includes four verification statuses, comprising: a first verification status representing the lack of verification data 250 since a resetting of the device; a second verification status representing a match between the verification data 250 and the prestored data 270, and further representing no other indicator 260 being output from the device 240 since the match; a third verification status representing a failed match between the verification data 250 and the prestored data 270; and a fourth verification status representing a match between the verification data 250 and the prestored data 270, and further representing the output of an indicator 260 since the match. The identification marker 272 stored in memory 274 preferably comprises one of four binary numbers that represents the current verification status identified by the device 240. Of course, the correspondence between the values of the identification marker 272 and the predefined verification statuses of the device should be previously known by the recipient.

The four binary numbers respectively correspond to the four verification statuses and include: "00" identifying the first verification status; "01" identifying the second verification status; "10" identifying the third verification status; and "11" identifying the fourth verification status. Furthermore, the modification of the message data 222 at 277 preferably includes the embedding of the value of the identification marker 272 within the message data, including insertion of the value at a predefined location within, or at the beginning or end of, the message data. As also will be appreciated, the "modification" of the message data for one of the verification statuses may include not modifying the message data, such as when the identification marker 272 equals "00." Even in this case, however, the digital signature 299 identifies the verification status of the device as representing the lack of verification data 250 being received since a resetting of the device. Furthermore, it will be appreciated that the digital signature 299 for the modified message neither reveals the verification data 250 nor the prestored data 270; thus, no "shared secret" is required between the sender and the recipient in the preferred implementation 200. However, the recipient can infer correct knowledge of the Secret from the verification status.

Alternatively, when the verification data 250 and the prestored data 270 comprise biometric values, the set of predefined verification statuses comprises the possible percentages of match—or degrees of difference—between the verification data 250 and prestored data 270, together with a verification status representing the lack of input representing verification data 250 since a resetting of the device 240. For example, the predefined verification statuses comprising the percentage match of the verification data 250 with the prestored data 270 may comprise the set of percentages ranging from 0% to 100% in increments of, in this implementation, 20%. Preferably each one of the verification statuses representing a percentage match also further represents whether an indicator 260 has been output from the device 240 since the last receipt of input representing verification data 250. The identification marker 272 stored in memory 274 preferably comprises the percentage match plus a flag regarding the output of the indicator 260 as identified by the device 240. Of course, the correspondence between the values of the identification marker 272 and the predefined verification statuses of the device 240 should be previously known by the recipient. Also, in this case, the modification of the message data 222 at 277 preferably includes the embedding of the value of the identification marker 272 within the message data, including insertion of the value at a predefined location within, or at the beginning or end of, the message data. As also will be appreciated, the "modification" of the message data for one of the verification statuses may include not modifying the message data, such as when no verification data 250 has been received since a resetting of the device 240. Even in this case, however, the digital signature 299 identifies the verification status of the device 240 as representing the lack of verification data 250 being received since a resetting of the device 240. Furthermore, it will be appreciated that the digital signature 299 for the modified message neither reveals the verification data 250 nor the prestored data 270; thus, no biometric value representing the sender's irreplaceable biometric characteristic is communicated to the recipient. However, the recipient can infer from the verification status the presence of the sender 220 from the reading of the biometric characteristic.

Figure 2B:
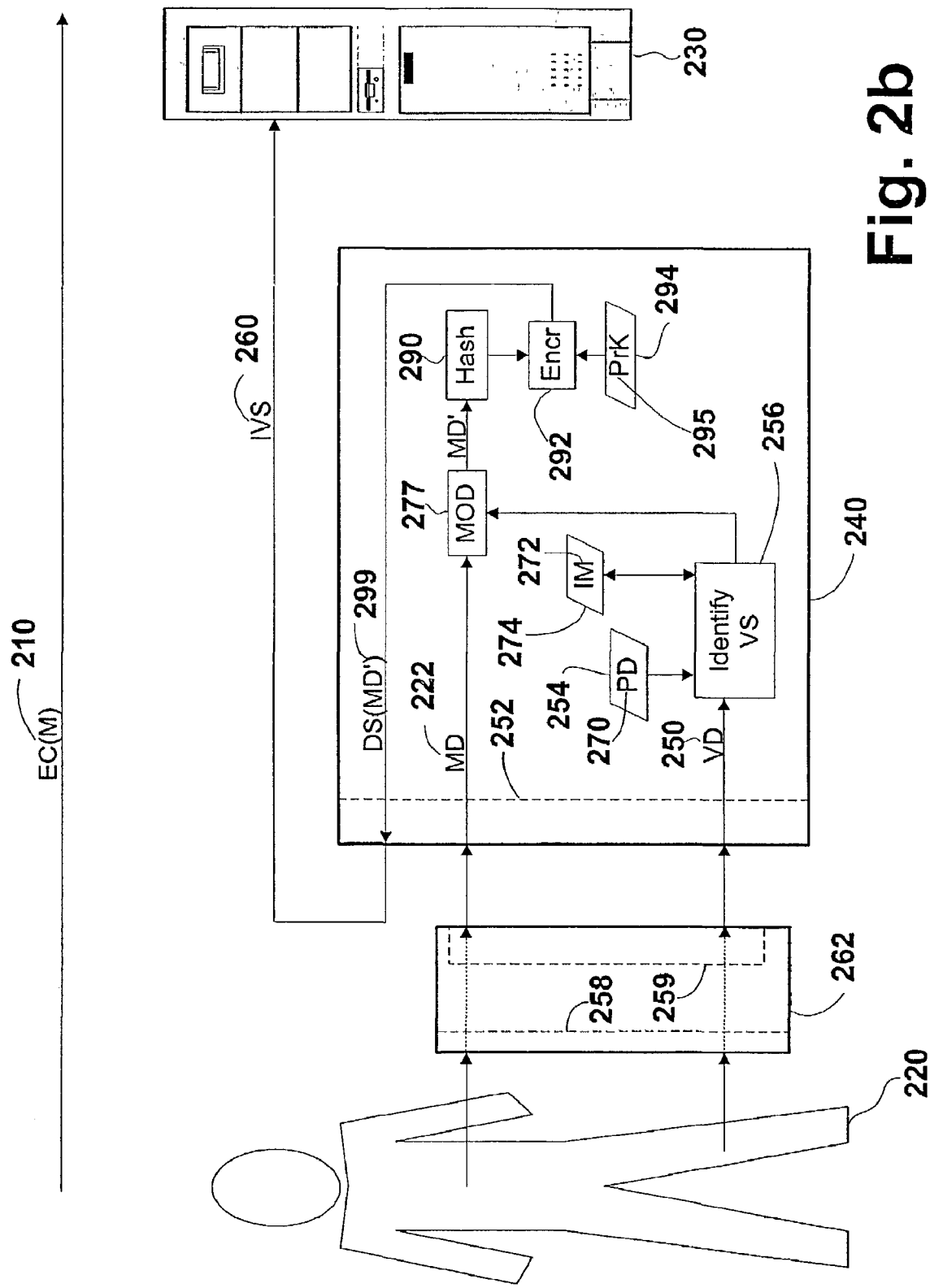
Figure 2C:
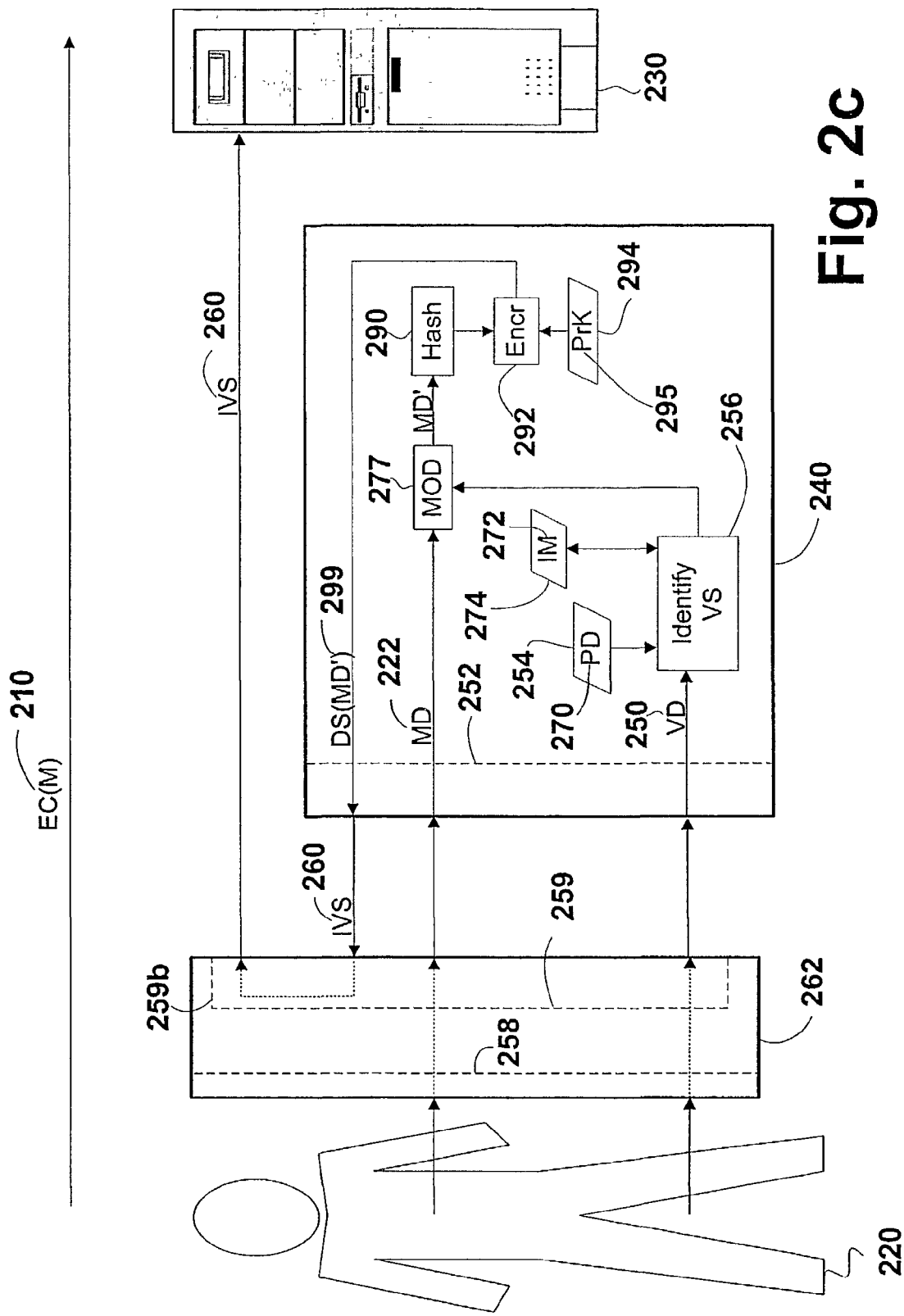

A variation based on the sixth preferred implementation 200 of FIG. 2a is shown in FIG. 2b, and includes an I/O support element 262 from which input representing the verification data 250 and input representing the message data 222 is received by the device 240. The I/O support element 262 includes a user interface 258 from which input from the sender 220 is received and an I/O interface 259 that communicates the input representing the verification data 250 and input representing the message data 222 to the device 240. Although the message data 222 is shown coming from the I/O support element 262, it is possible for some or all of the message data 222 to originate with the device 240 or another apparatus (not shown). Yet an additional variation thereof is shown in FIG. 2c, wherein the I/O support element 262 receives the indicator 260 being output from the device 240. The I/O support element 262, in turn, transmits the indicator 260 to the electronic apparatus 230. As shown, the indicator 260 transmitted from the I/O support element 262 is the same as the indicator 260 output from the device 240. However, the indicator 260 transmitted from the I/O support element 262 may be packaged or embedded within another communication—including additional information that is digitally signed by the I/O support element 262. Furthermore, in FIGS. 2a, 2b, and 2c, the EC 210 is shown as being transmitted separate from the indicator 260. However, in the preferred implementation of FIG. 2a and any variations thereof, the indicator 260 equally may be associated with the EC 210 by being transmitted as part of the EC 210. Furthermore, the EC 210 may be output from the device 240, an associated I/O support element 262 (not shown in FIG. 2a), or other apparatus.

A preferred mode 300 of operation of the device of FIGS. 2a, 2b, and 2c is illustrated in FIG. 3 and begins with a resetting Step 304 of the device following a timeout or powering on of the device at 302. During the reset, the identification marker is assigned a value corresponding to a verification status representing the receipt of no input of verification data and further representing the fact that that no indicator has yet been output. The device then enters a repeating loop that begins at 306 and ends at 312 and continues within this loop until the device is reset, is powered off, or deactivates after a predetermined amount of time.

Still referring to FIG. 3, the first step in the loop preferably includes the determination Step 308 whether any input representing verification data is received by the device. If the determination in Step 308 is positive, the current verification status (VS) of the device is identified Step 314 by comparing the verification data (VD) with the data (PD) prestored in the memory of the device. The verification status identified then is recorded by assigning Step 316 the identification marker stored within the memory of the device equal to the predefined value corresponding to the identified verification status.

If no input representing verification data is received in Step 308 or after the value of the identification marker is recorded in Step 316, the next step in the loop preferably includes the determination Step 310 whether any input representing message data (MD) is received by the device. If the determination in Step 310 is negative, the loop restarts Step 306. If the determination in Step 310 is positive, the device then modifies Step 318 the message data based on the identification marker. Next, the device originates Step 320 a digital signature for the modified message data. The digital signature for the modified message data is then output Step 322 from the device. Following the output of the digital signature for the modified message, the determination is made Step 324 whether the digital signature output is the first digital signature output since receipt of input for verification data in Step 308. The loop restarts Step 306 if the determination in Step 324 is negative. If the determination in Step 324 is positive, then the verification status is newly recorded Step 326 by assigning a value to the identification marker that represents the verification status indicated by the digital signature output in Step 322, and that further represents the fact that the digital signature has been output. The loop then restarts Step 306.

2. Second Preferred implementation of Device Providing Verification Status (Message and Indicator Digitally Signed)

Figure 4A:
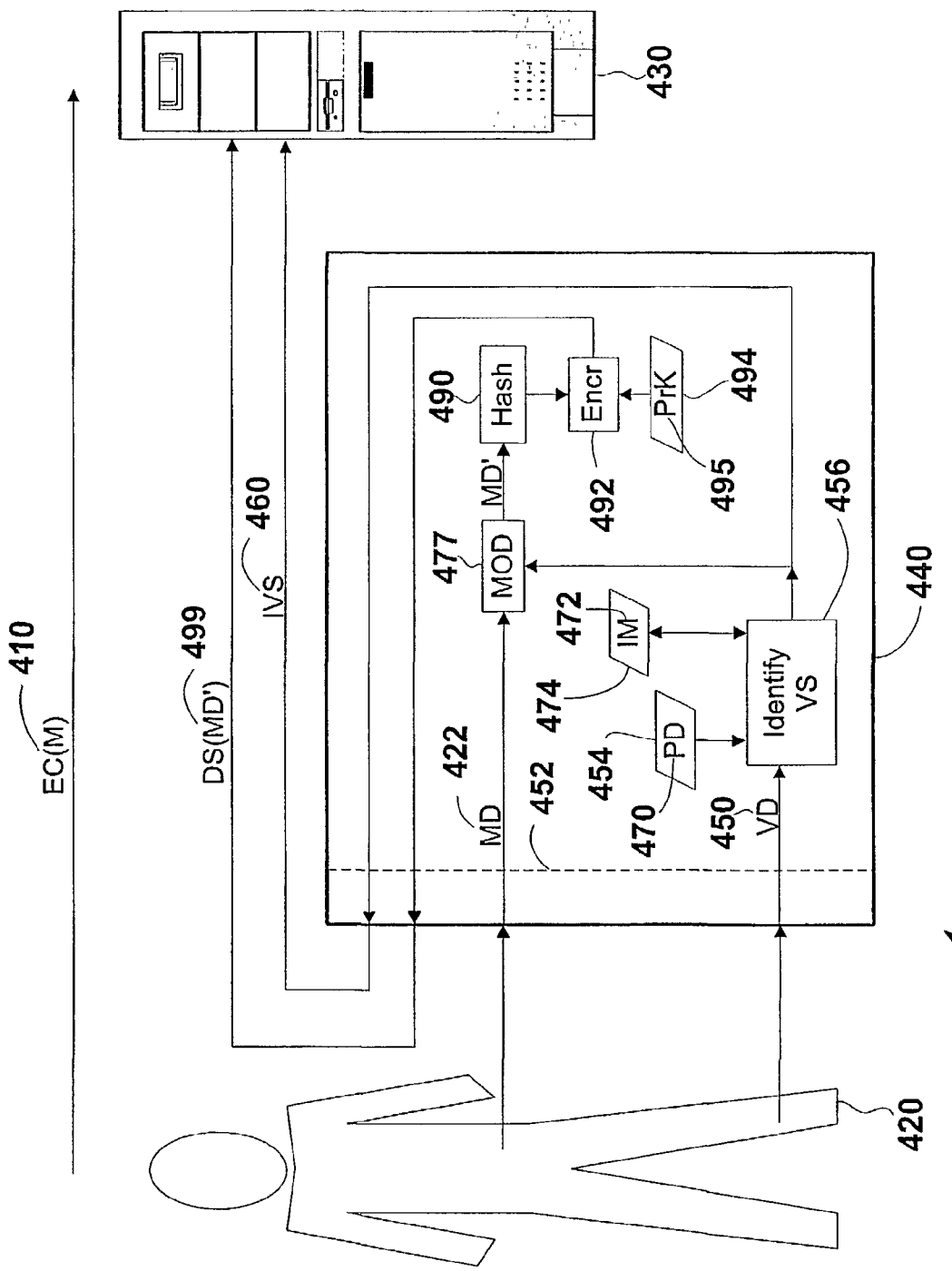
FIG. 4a illustrates a second preferred implementation of the first aspect of the present invention.

A second preferred implementation 400 of a device of the present invention is illustrated in FIG. 4a, wherein an EC 410 including a message from a sender 420 is received by a recipient represented by an electronic apparatus 430, and wherein a device 440 receives input representing verification data (VD) 450 at a device interface 452. The device interface 452 includes, as appropriate, one or more of the following: a user interface such as an alphanumeric keypad, a touch screen display, or a biometric scanner for receiving input directly from the sender 420; an electrical contact; a standard electronic interface with a computer bus; an antenna; or a communications port, such as a serial port, USB port, parallel port, infrared port or other wireless communications port.

The device 440 includes a verification component therein that maintains data (PD) 470 of the sender 420 prestored in memory 454. The verification data 450 and prestored data 470 represent Secret or biometric values. The verification component identifies at 456 a current verification status of the device 440 based on a comparison of the verification data 450 with the prestored data 470 and records the last identified (i.e., "current") verification status of the device 440 by assigning a value to an identification marker (IM) 472 that is stored in memory 474.

The device 440 also receives at the device interface 452 message data (MD) 422 representing the message (M) of the EC 410. The message data 422 may comprise the message itself, a message digest thereof, or the result of some other processing of the message. The device 440 includes a digital signature component that, upon receipt of the message data 422, obtains the value for the identification marker 472 and modifies the message data at 477 as a function of this value (as used herein, "function" may include the possible function f(x)=x for a particular value of x). The digital signature component then originates a digital signature 499 for the modified message data (MD') by calculating a hash value therefor at 490 and then encrypting the hash value at 492 using a private key 495 of a public-private key pair. For increased reliability and trust, the private key 495 is retained securely within memory 494 so that it is never exported from the device 440 and is not discoverable from outside of the device 440. The digital signature is originated in accordance with the ECDSA as specified in FIPS PUB 186-2. Accordingly, the digital signature 499 is generated using a random number generator, and the hash function at 490 is performed using SHA-1, which generates a 20-byte output regardless of the size of the input received. The digital signature 499 then is output from the device 440 together with the value of the identification marker 472 as the indicator 460 of the verification status (IVS) of the device 440 for transmitting to the recipient. The digital signature 499 and the indicator 460 then are transmitted to the recipient in association with the EC 410, whereby the recipient is able to identify the indicator 460 as pertaining to the EC 410.

The device 440 includes a set of predefined verification statuses each representing a relational correspondence between the verification data 450 and the prestored data 470. Verification statuses of the set further represent whether an indicator 460 has been output from the device 440 since the last successful verification or since the last receipt of input representing verification data. The set also contains an additional predefined verification status representing the lack of input representing verification data 450 since a resetting after a timeout or a powering on of the device 440. The indicator 460 output from the device 440 is based on the last comparison of the verification data 450 with the prestored data 470, but only if input representing verification data 450 has been received since the resetting of the device 440. Otherwise, the indicator 460 indicates the lack of input representing verification data 450 since the resetting of the device 440.

The electronic apparatus 430 includes an interface (not shown) capable of receiving the indicator 460. The electronic apparatus 430 also includes logic circuitry or software incorporating business logic therein for determining the verification status of the device based on the indicator 460 and for evaluating the EC 410 received from the sender 420 based on the determined verification status. In this regard, the electronic apparatus 430 decrypts the digital signature with the public key, which corresponds to the private key 495 and which may be received in association with the digital signature 499 or known or obtained beforehand by the recipient. The recipient also modifies—and then calculates a hash value for—the message based on the verification status identified by the indicator 460. In calculating a hash value for comparison, the electronic apparatus 430 also performs any necessary processing to the message in order to produce the message data that was modified within the device 440. When the hash value calculated by the recipient equals the hash value of the decrypted digital signature, the recipient confirms the authenticity of the current verification status of the device 440 as indicated by the indicator 460 as well as confirms the authenticity of the message of the EC 410.

When the verification data 450 and the prestored data 470 comprise a Secret, the predefined set of verification statuses includes four verification statuses, comprising: a first verification status representing the lack of verification data 450 since a resetting of the device; a second verification status representing a match between the verification data 450 and the prestored data 470, and further representing no other indicator 460 being output from the device 440 since the match; a third verification status representing a failed match between the verification data 450 and the prestored data 470; and a fourth verification status representing a match between the verification data 450 and the prestored data 470, and further representing the output of an indicator 460 since the match. The identification marker 472 stored in memory 474 preferably comprises one of four binary numbers that represents the current verification status identified by the device 440. Of course, the correspondence between the values of the identification marker 472 and the predefined verification statuses of the device should be previously known by the recipient.

The four binary numbers respectively correspond to the four verification statuses and include: "00" identifying the first verification status; "01" identifying the second verification status; "10" identifying the third verification status; and "11" identifying the fourth verification status. Furthermore, the modification of the message data 422 at 477 preferably includes the embedding of the value of the identification marker 472 within the message data, including insertion of the value at a predefined location within, or at the beginning or end of, the message data. As also will be appreciated, the "modification" of the message data for one of the verification statuses may include not modifying the message data, such as when the identification marker 472 equals "00." Even in this case, however, the digital signature 499 identifies the verification status of the device as representing the lack of verification data 450 being received since a resetting of the device. Furthermore, it will be appreciated that neither the digital signature 499 for the modified message nor the indicator 460 reveals the verification data 450 or the prestored data 470; thus, no "shared secret" is required between the sender 420 and the recipient in the preferred implementation 400. However, the recipient can infer correct knowledge of the Secret from the verification status.

Alternatively, when the verification data 450 and the prestored data 470 comprise biometric values, the set of predefined verification statuses comprises the possible percentages of match—or degrees of difference—between the verification data 450 and prestored data 470, together with a verification status representing the lack of input representing verification data 450 since a resetting of the device 440. For example, the predefined verification statuses comprising the percentage match of the verification data 450 with the prestored data 470 may comprise the set of percentages ranging from 0% to 100% in increments of 1%. Preferably each one of the verification statuses representing a percentage match also further represents whether an indicator 460 has been output from the device 440 since the last receipt of input representing verification data 450. The identification marker 472 stored in memory 474 preferably comprises the percentage match plus a flag regarding the output of the indicator 460 as identified by the device 440. Of course, the correspondence between the values of the identification marker 472 and the predefined verification statuses of the device 440 should be previously known by the recipient.

Also, in this case, the modification of the message data 422 at 477 preferably includes the embedding of the value of the identification marker 472 within the message data, including insertion of the value at a predefined location within, or at the beginning or end of, the message data. As also will be appreciated, the "modification" of the message data for one of the verification statuses may include not modifying the message data, such as when no verification data 450 has been received since a resetting of the device 440. Even in this case, however, the digital signature 499 identifies the verification status of the device 440 as representing the lack of verification data 450 being received since a resetting of the device 440. Furthermore, it will be appreciated that neither the digital signature 499 for the modified message nor the indicator 460 reveals the verification data 450 or the prestored data 470; thus, no biometric value representing the sender's irreplaceable biometric characteristic is communicated to the recipient. However, the recipient can infer from the verification status the presence of the sender 420 from the reading of the biometric characteristic.

Figure 4B:
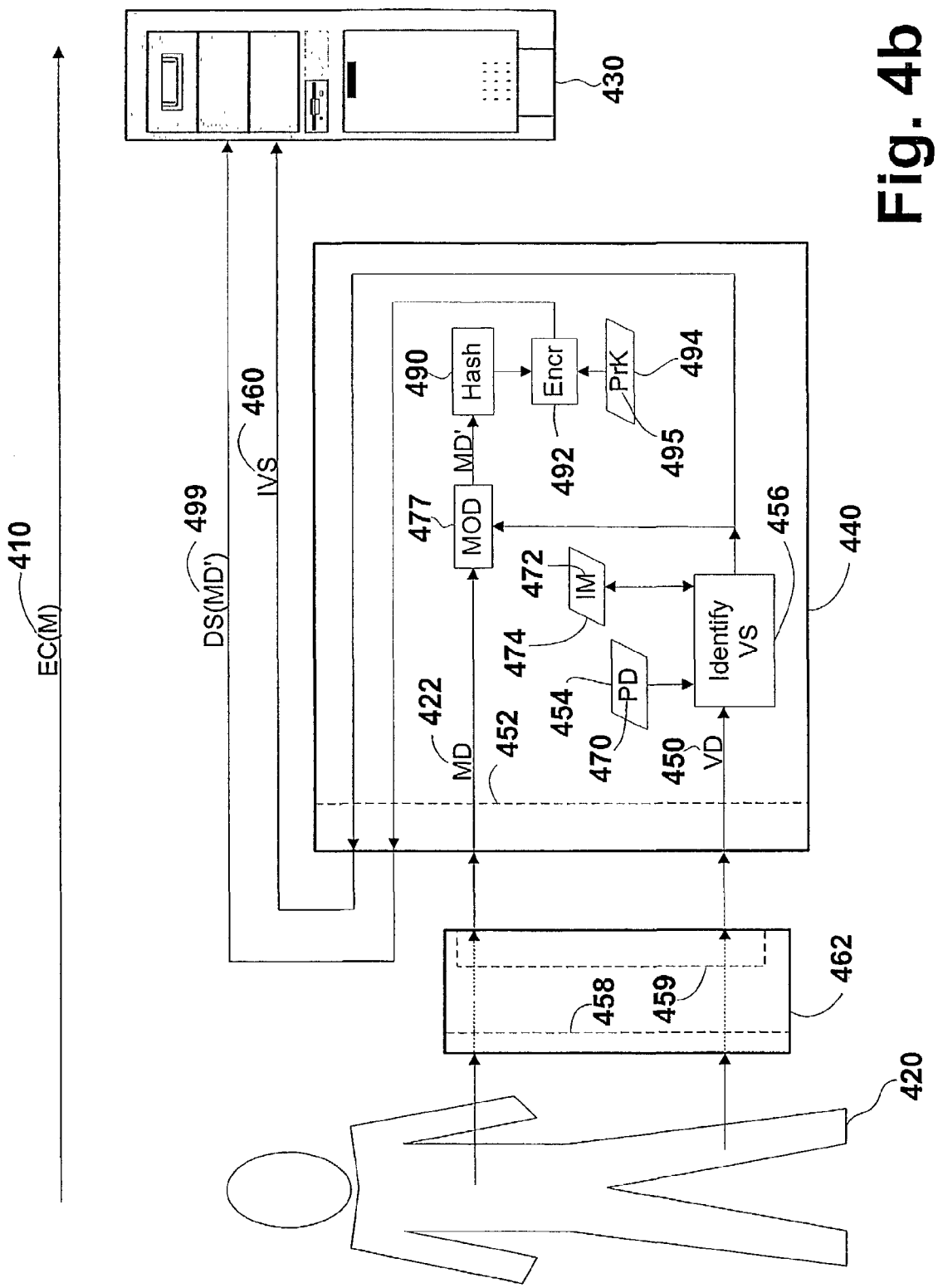
Figure 4C:
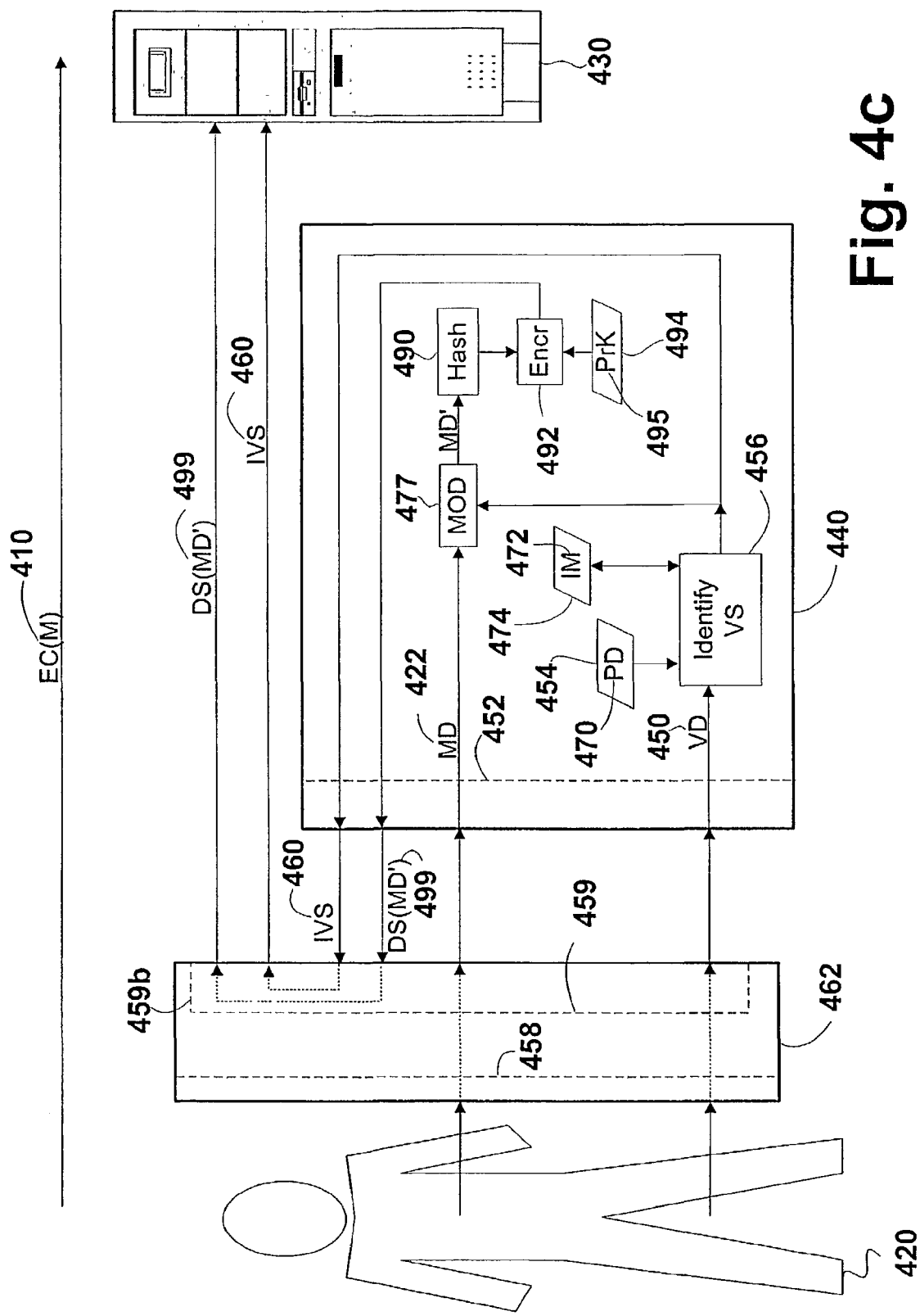

A variation based on the seventh preferred implementation 400 of FIG. 4a is shown in FIG. 4b, and includes an I/O support element 462 from which input representing the verification data 450 and input representing the message data 422 is received by the device 440. The I/O support element 462 includes a user interface 458 from which input from the sender 420 is received and an I/O interface 459 that communicates the input representing the verification data 450 and input representing the message data 422 to the device 440. Although the message data 422 is shown coming from the I/O support element 462, it is possible for some or all of the message data 422 to originate with the device 440 or another apparatus (not shown). Yet an additional variation thereof is shown in FIG. 4c, wherein the I/O support element 462 receives the indicator 460 and digital signature 499 output from the device 440. The I/O support element 462, in turn, transmits the indicator 460 and the digital signature 499 to the electronic apparatus 430.

As shown, the indicator 460 and digital signature 499 transmitted from the P/O support element 462 are the same as the indicator 460 and digital signature 486 output from the device 440. However, the indicator transmitted from the I/O support element 462 may be different from the indicator output from the device 440, so long as the recipient is able to determine both the verification status as indicated by the indicator 460 output from the device 440, as well as the bit pattern of the identification marker 472 based on which the message was modified. For instance, the indicator transmitted from the I/O support element 462 may indicate not only the verification status of the device 440, but also a verification status of the I/O support element 462 when the I/O support element 462 itself identifies a verification status. Furthermore, the indicator 460 and digital signature 499 transmitted from the I/O support element 462 may be packaged or embedded within another communication—including additional information that is digitally signed by the I/O support element 462.

Furthermore, in FIGS. 4a, 4b, and 4e, the EC 410 is shown as being transmitted separate from the indicator 460 and digital signature 499. However, in the preferred implementation of FIG. 4a and any variations thereof, the indicator 460 and digital signature 499 equally may be associated with the EC 410 by being transmitted as part of the EC 410. Furthermore, the EC 410 may be output from the device 440, an associated I/O support element 462 (not shown in FIG. 4*a*), or other apparatus.

A preferred mode 500 of operation of the device of FIGS. 4*a*, 4*b*, and 4*c* is illustrated in FIG. 5 and begins with a resetting Step 504 of the device following a timeout or powering on of the device at 502. During the reset, the identification marker is assigned a value corresponding to a verification status representing the receipt of no input of verification data and further representing the fact that that no indicator has yet been output. The device then enters a repeating loop that begins at 506 and ends at 512 and continues within this loop until the device is reset, is powered off, or deactivates after a predetermined amount of time.

Still referring to FIG. 5, the first step in the loop preferably includes the determination Step 508 whether any input representing verification data is received by the device. If the determination in Step 508 is positive, the current verification status (VS) of the device is identified Step 514 by comparing the verification data (VD) with the data (PD) prestored in the memory of the device. The verification status identified then is recorded by assigning Step 516 the identification marker stored within the memory of the device equal to the predefined value corresponding to the identified verification status.

If no input representing verification data is received in Step 508 or after the value of the identification marker is recorded in Step 516, the next step in the loop preferably includes the determination Step 510 whether any input representing message data (MD) is received by the device. If the determination in Step 510 is negative, the loop restarts Step 506.

If the determination in Step 510 is positive, the device then modifies Step 518 the message data based on the identification marker. Next, the device originates Step 520 a digital signature for the modified message data. The digital signature for the modified message data and the value of the identification marker are then output Step 522 from the device. Following the output of the digital signature for the modified message and value of the identification marker, the determination is made Step 524 whether the value of the identification marker output is the first value thereof output since receipt of input representing verification data in Step 508. The loop restarts Step 506 if the determination in Step 524 is negative. If the determination in Step 524 is positive, then the verification status is newly recorded Step 526 by assigning a value to the identification marker that represents the verification status identified by the value of the identification marker output in Step 522, and that further represents the fact that the value of the identification marker has been output. The loop then restarts Step 506.

3. Third Preferred implementation of Device Providing Verification Status (Multiple Verification Data With Indicator And Message Digitally Sited)

Figure 6A:
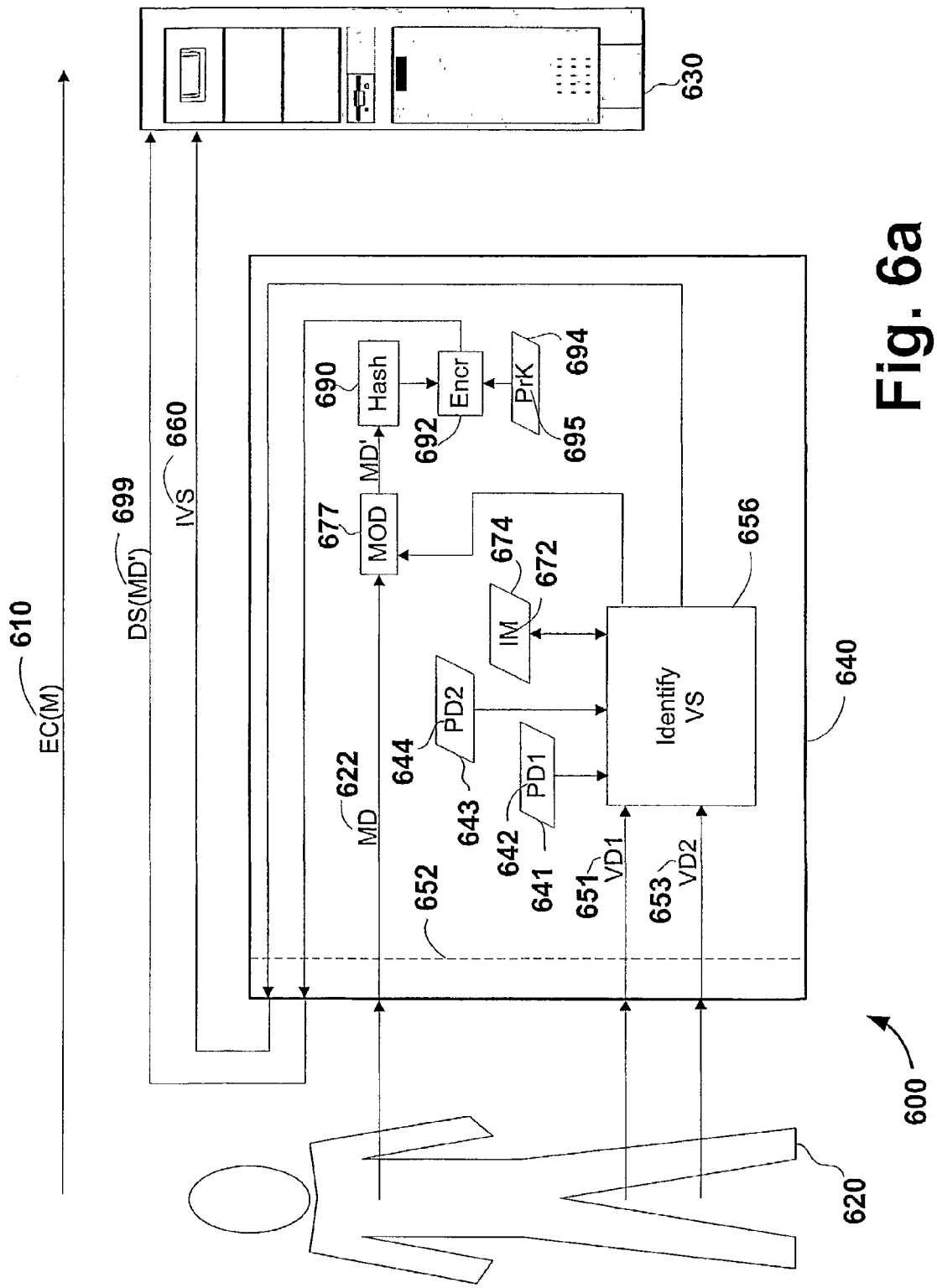
FIG. 6a illustrates a third preferred implementation of the first aspect of the present invention.

A third preferred implementation 600 of a device of the present invention is illustrated in FIG. 6*a*, wherein an EC 610 including a message from a sender 620 is received by a recipient represented by an electronic apparatus 630, and wherein a device 640 receives input representing first verification data (VD1) 651 and input representing second verification data (VD2) 653 at a device interface 652. The device interface 652 includes, as appropriate, one or more of the following: a user interface such as an alphanumeric keypad, a touch screen display, or a biometric scanner for receiving input directly from the sender 620; an electrical contact; a standard electronic interface with a computer bus; an antenna; or a communications port, such as a serial port, USB port, parallel port, infrared port or other wireless communications port.

The device 640 includes a verification component therein that maintains data prestored in memory of the device 640. The first prestored data (PD1) 642 is located in memory 641, and the second prestored data (PD2) 644 is located in memory 643. The verification component identifies at 656 a current verification status of the device 640 based on a comparison of the first verification data 651 with the first prestored data 642 and the second verification data 653 with the second prestored data 644, and records the latest (i.e., "current") verification status of the device 640 by assigning a value to an identification marker (IM) 672 stored in memory 674.

The device 640 also receives at the device interface 652 message data (MD) 622 representing the message (M) of the EC 610. The message data 622 may comprise the message itself, a message digest thereof, or the result of some other processing of the message. The device 640 includes a digital signature component that, upon receipt of the message data 622, obtains the value for the identification marker 672 and modifies the message data at 677 as a function of this value (as used herein, "function" may include the possible function f(x)=x for a particular value of x). The modification of the message preferably includes the embedding of the value of the identification marker 672 within the message data, including insertion of the value at a predefined location within, or at the beginning or end of, the message data. As also will be appreciated, the "modification" of the message data for one of the verification statuses may include not modifying the message data.

The digital signature component then originates a digital signature 699 for the modified message data (MD') by calculating a hash value therefor at 690 and then encrypting the hash value at 692 using a private key 695 of a public-private key pair. For increased reliability and trust, the private key 695 is retained securely within memory 694 so that it is never exported from the device 640 and is not discoverable from outside of the device 640. The digital signature is originated in accordance with the ECDSA as specified in FIPS PUB 186-2. Accordingly, the digital signature 699 is generated using a random number generator, and the hash function at 690 is performed using SHA-1, which generates a 20-byte output regardless of the size of the input received. The digital signature 699 then is output from the device 640 together with the value of the identification marker 672 as the indicator 660 of the verification status (IVS) of the device 640 for transmitting to the recipient. The digital signature 699 and the indicator 660 then are transmitted to the recipient in association with the EC 610, whereby the recipient is able to identify the indicator 660 as pertaining to the EC 610.

The device 640 includes a set of predefined verification statuses each representing a relational correspondence between the verification data 651,653 and the prestored data 642,644. Verification statuses of the set further represent whether an indicator 660 has been output from the device 640 since the last successful verification based on either or both of the first and second verification data 651,653, or since the last receipt of input representing either or both of the first and second verification data 651,653. The set also contains a predefined verification status representing the lack of input of both first and second verification data 651,653 since a resetting after a timeout or a powering on of the device 640. The indicator 660 output from the device 640 is based on the last respective comparison of verification data with the prestored data, but only if input representing the respective verification data has been received since the resetting of the device 640.

Otherwise, the indicator 660 indicates the lack of input for both the first and second verification data 651,653 since the resetting of the device 640.

The electronic apparatus 630 includes an interface (not shown) capable of receiving the indicator 660. The electronic apparatus 630 also includes logic circuitry or software incorporating business logic therein for determining the verification status of the device based on the indicator 660 and for evaluating the EC 610 received from the sender 620 based on the determined verification status. In this regard, the electronic apparatus 630 decrypts the digital signature with the public key, which corresponds to the private key 695 and which may be received in association with the digital signature 699 or known or obtained beforehand by the recipient. The recipient also modifies—and then calculates a hash value for—the message based on the verification status identified by the indicator 660. In calculating a hash value for comparison, the electronic apparatus 630 also performs any necessary processing to the message in order to produce the message data that was modified within the device 640. When the hash value calculated by the recipient equals the hash value of the decrypted digital signature, the recipient confirms the authenticity of the current verification status of the device 640 as indicated by the indicator 660 as well as confirms the authenticity of the message of the EC 610.

When either of the first or second verification data 651, 653—and the prestored data therefor—comprise a Secret, the predefined set of results for the comparison for such includes four possible outcomes, comprising: a first outcome representing the lack of verification data since a resetting of the device 640; a second outcome representing a match between the verification data and the prestored data, and further representing no other indicator 660 being output from the device 640 since the match; a third outcome representing a failed match between the verification data and the prestored data; and a fourth outcome representing a match between the verification data and the prestored data, and further representing the output of an indicator 660 since the match.

When either of the first or second verification data 651, 653—and the prestored data therefor—represent a biometric characteristic, the predefined set of results for the comparison for such produces a result preferably out of a predefined number of possible outcomes. Each outcome represents a possible percentage of match—or degree of difference—between the verification data and prestored data that is allowed, together with a verification status representing the lack of input for verification data since a resetting of the device 640. For example, the predefined outcomes comprising the percentage match of the verification data with the prestored data may comprise the set of percentages ranging from 0% to 100% in increments of 1%. Preferably each one of the outcomes representing a percentage match also further represents whether an indicator 660 has been output from the device 640 since the last receipt of input representing verification data.

The identification marker 672 is stored in memory 674 and comprises a value representing one of the set of predefined verification statuses of the device 640. The set of predefined verification statuses preferably comprises all of the possible combinations of outcomes from the respective comparisons for the first and second verification data 651,653. Of course, the correspondence of the possible values for the identification marker 672 with the predefined verification statuses of the device 640 should be previously known by the recipient. Moreover, none of the verification statuses actually reveal any of the verification data 651,653 or the prestored data 642,644; thus, no "shared secret" is required between the sender 620 and the recipient, and no biometric value representing the sender's irreplaceable biometric characteristic is communicated to the recipient. However, the recipient can infer from the verification status both the correct knowledge of the Secret and the presence of the sender from the reading of the biometric characteristic.

Figure 6B:
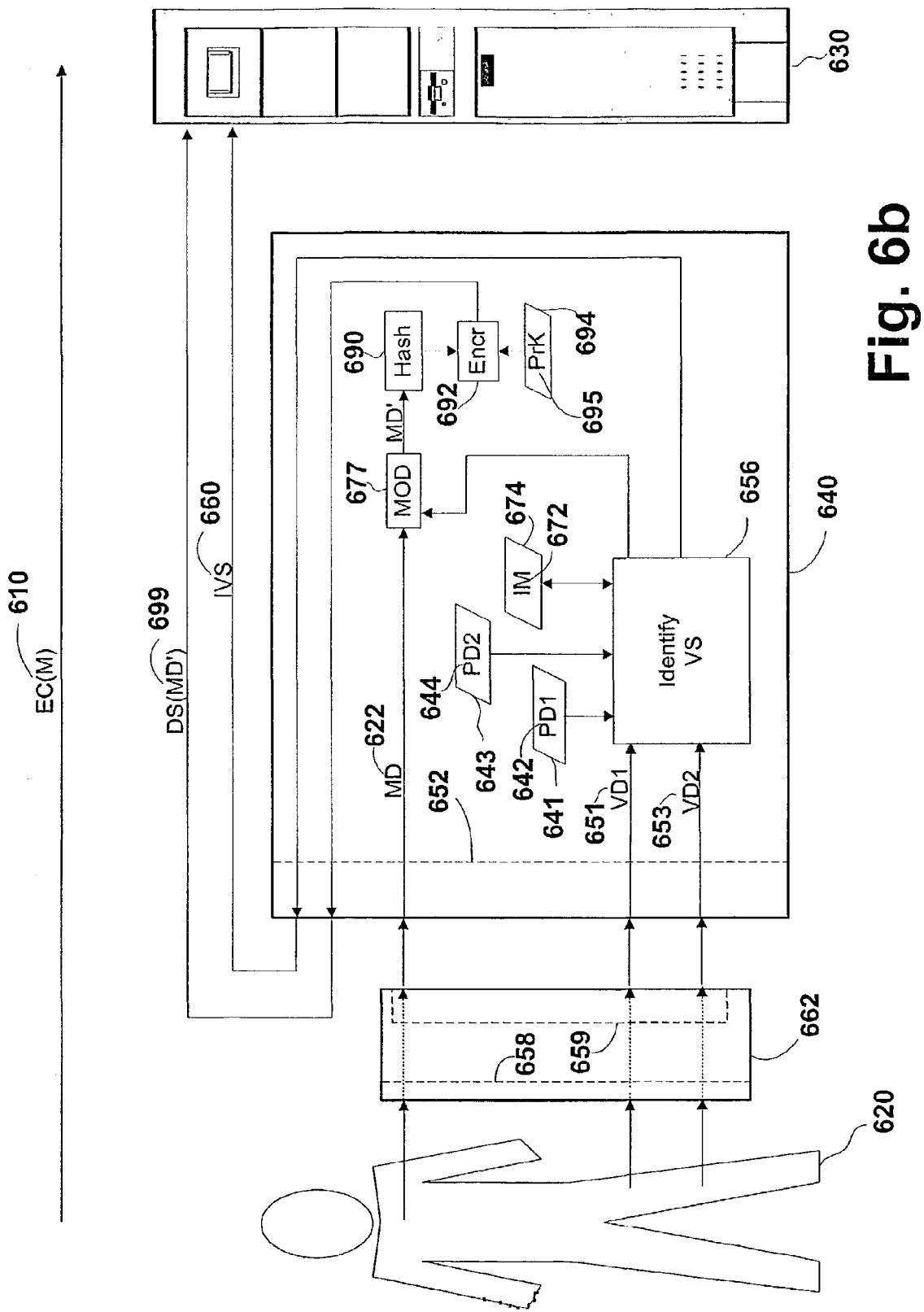

A variation based on the eighth preferred implementation 600 of FIG. 6a is shown in FIG. 6b, and includes an I/O support element 662 from which input representing the first and second verification data 651,653 and input representing the message data 622 is received by the device 640. The I/O support element 662 includes a user interface 658 from which input from the sender 620 is received and an I/O interface 659 that communicates the input representing the first and second verification data 651,653 and input representing the message data 622 to the device 640.

Figure 6C:
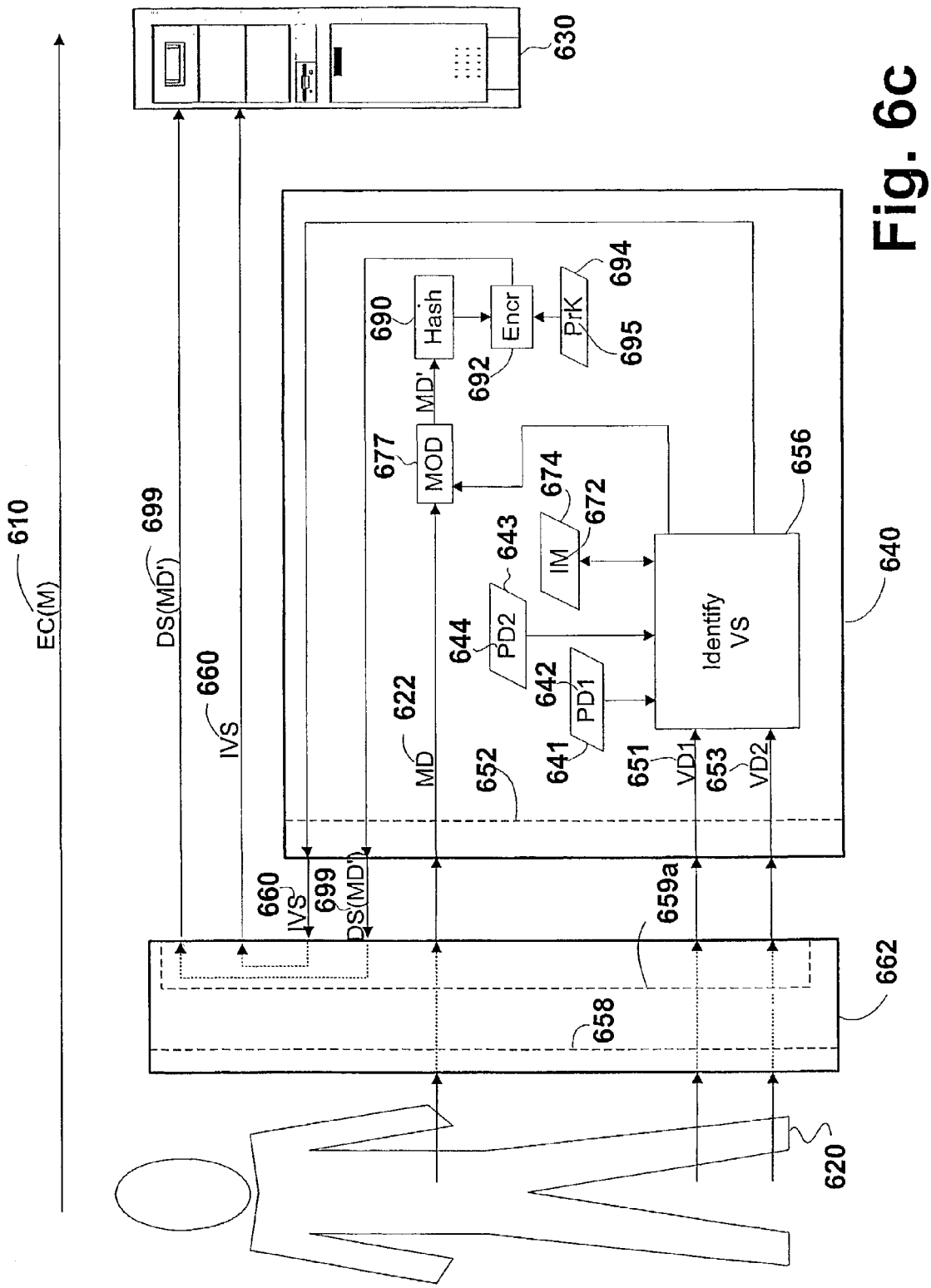

Although the message data 622 is shown coming from the I/O support element 662, it is possible for some or all of the message data 622 to originate with the device 640 or another apparatus (not shown). Yet an additional variation thereof is shown in FIG. 6c, wherein the I/O support element 662 receives the indicator 660 and digital signature 699 output from the device 640. The I/O support element 662, in turn, transmits the indicator 660 and the digital signature 699 to the electronic apparatus 630.

As shown, the indicator 660 and digital signature 699 transmitted from the I/O support element 662 are the same as the indicator 660 and digital signature 686 output from the device 640. However, the indicator transmitted from the I/O support element 662 may be different from the indicator output from the device 640, so long as the recipient is able to determine both the verification status as indicated by the indicator 660 output by the device 640, as well as the bit pattern of the identification marker 672 based on which the message was modified. For instance, the indicator transmitted from the I/O support element 662 may indicate not only the verification status of the device 640, but also a verification status of the I/O support element 662 when the I/O support element 662 itself identifies a verification status. Furthermore, the indicator 660 and digital signature 699 transmitted from the I/O support element 662 may be packaged or embedded within another communication—including additional information that is digitally signed by the I/O support element 662.

Furthermore, in FIGS. 6a, 6b, and 6c, the EC 610 is shown as being transmitted separate from the indicator 660 and digital signature 699. However, in the preferred implementation of FIG. 6a and any variations thereof, the indicator 660 and digital signature 699 equally may be associated with the EC 610 by being transmitted as part of the EC 610. Furthermore, the EC 610 may be output from the device 640, an associated I/O support element 662 (not shown in FIG. 6a), or other apparatus.

A preferred mode 700 of operation of the device of FIGS. 6a, 6b, and 6c is illustrated in FIG. 7 and begins with a resetting Step 704 of the device following a timeout or powering on of the device at 702. During the reset, the identification marker is assigned a value corresponding to a verification status representing the receipt of no input of any verification data and further representing the fact that that no indicator has yet been output. The device then enters a repeating loop that begins at 706 and ends at 714 and continues within this loop until the device is reset, is powered off, or deactivates after a predetermined amount of time.

Still referring to FIG. 7, the first step in the loop preferably includes the determination Step 708 whether any input representing the first verification data (VD1) is received by the device. If the determination in Step 708 is positive, the current verification status (VS) of the device is identified Step 716 by comparing the first verification data (VD1) with the first data (PD1) prestored in the memory of the device. The verification status identified then is recorded by assigning Step 718 the identification marker stored within the memory of the device equal to the predefined value corresponding to the identified verification status. If no input representing the first verification data is received in Step 708 or after the value of the identification marker is recorded in Step 718, the next step in the loop preferably includes the determination Step 710 whether any input representing the second verification data (VD2) is received by the device. If the determination in Step 710 is positive, the current verification status (VS) of the device is identified Step 720 by comparing the second verification data (VD2) with the second data (PD2) prestored in the memory of the device. The verification status identified then is recorded by assigning Step 722 the identification marker stored within the memory of the device equal to the predefined value corresponding to the identified verification status.

If no input representing the second verification data is received in Step 710 or after the value of the identification marker is recorded in Step 722, the next step in the loop preferably includes the determination Step 712 whether any input representing message data (MD) is received by the device. If the determination in Step 712 is negative, the loop restarts Step 706.

If the determination in Step 712 is positive, the device then modifies Step 724 the message data based on the identification marker. Next, the device originates Step 726 a digital signature for the modified message data. The digital signature for the modified message data and the value of the identification marker are then output Step 728 from the device. Following the output of the digital signature for the modified message and value of the identification marker, the determination is made Step 730 whether the value of the identification marker output is the first value thereof output since receipt of input representing the first verification data in Step 708.

If the determination in Step 730 is positive, then the verification status is newly recorded Step 734 by assigning a value to the identification marker that represents the verification status identified by the value of the identification marker output in Step 728, and that further represents the fact that the value of the identification marker has been output. If the determination in Step 730 is negative or after the value of the identification marker is newly recorded in Step 734, the next step in the loop preferably includes the determination Step 732 whether the value of the identification marker output is the first value thereof output since receipt of input representing the second verification data in Step 710.

If the determination in Step 732 is positive, then the verification status is newly recorded Step 736 by assigning a value to the identification marker that represents the verification status identified by the value of the identification marker output in Step 728, and that further represents the fact that the value of the identification marker has been output. If the determination in Step 732 is negative or after the value of the identification marker is newly recorded in Step 736, the loop then restarts Step 706.

4. Fourth Preferred implementation (Multiple Verification Data With Digital Signature as Indicator)

Figure 8A:
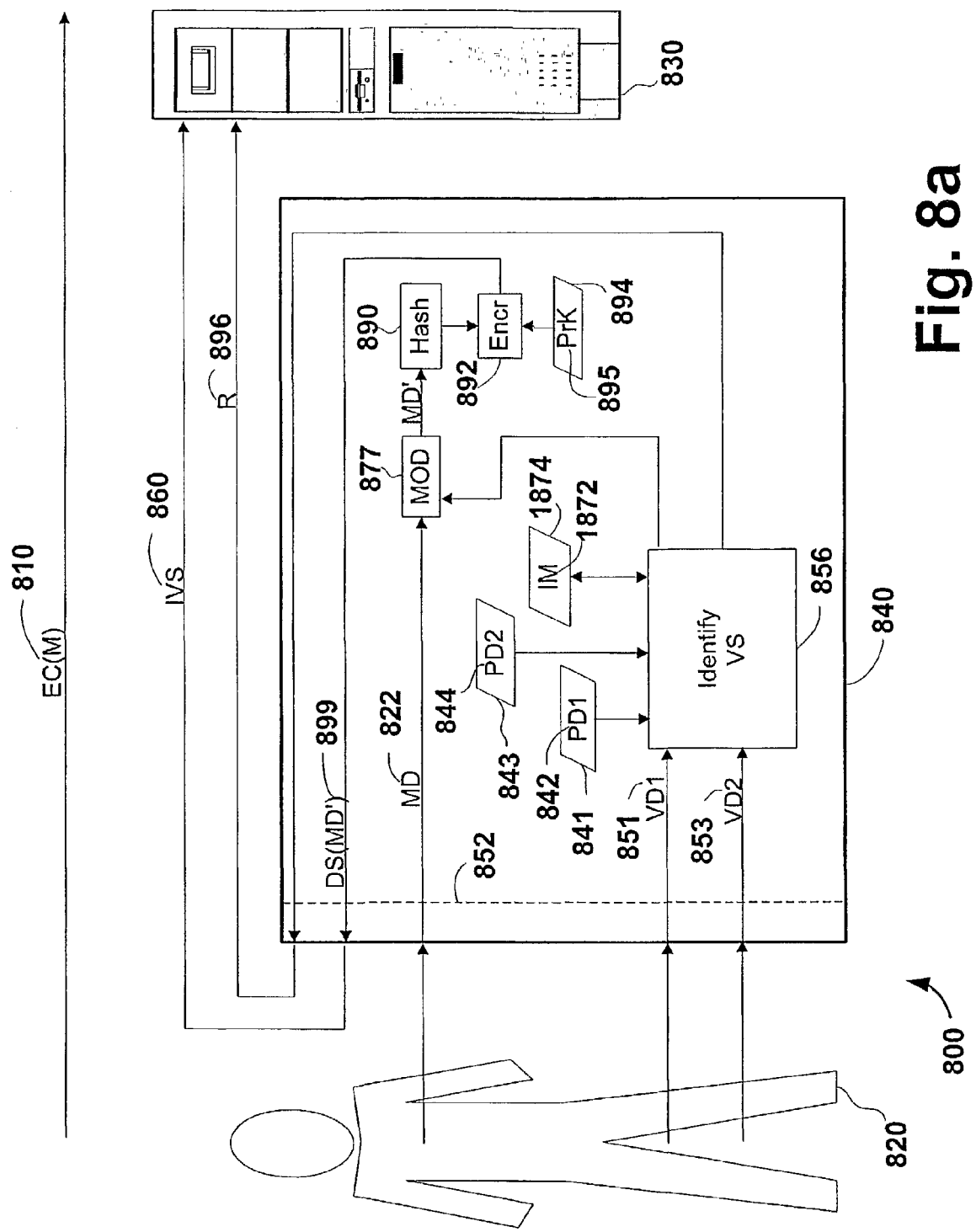
FIG. 8a illustrates a fourth preferred implementation of the first aspect of the present invention.

A fourth preferred implementation 800 of a device of the present invention is illustrated in FIG. 8a, wherein an EC 810 including a message from a sender 820 is received by a recipient represented by an electronic apparatus 830, and wherein a device 840 receives input representing first verification data (VD1) 851 and input representing second verification data (VD2) 853 at a device interface 852. The device interface 852 includes, as appropriate, one or more of the following: a user interface such as an alphanumeric keypad, a touch screen display, or a biometric scanner for receiving input directly from the sender 820; an electrical contact; a standard electronic interface with a computer bus; an antenna; or a communications port, such as a serial port, USB port, parallel port, infrared port or other wireless communications port.

The device 840 includes a verification component therein that maintains data prestored in memory of the device 840. The first prestored data (PD1) 842 is located in memory 841, and the second prestored data (PD2) 844 is located in memory 843. The verification component identifies at 856 a current verification status of the device 840 based on a comparison of the first verification data 851 with the first prestored data 842 and the second verification data 853 with the second prestored data 844, and records the latest (i.e., "current") verification status of the device 840 by assigning a value to an identification marker (IM) 872 stored in memory 874.

The device 840 also receives at the device interface 852 message data (MD) 822 representing the message (M) of the EC 810. The message data 822 may comprise the message itself, a message digest thereof, or the product of some other processing of the message. The device 840 includes a digital signature component that, upon receipt of the message data 822, obtains the value for the identification marker 872 and modifies the message data at 877 as a function of this value (as used herein, "function" may include the possible function $f(x)=x$ for a particular value of x). The modification of the message preferably includes the embedding of the value of the identification marker 872 within the message data, including insertion of the value at a predefined location within, or at the beginning or end of, the message data. As also will be appreciated, the "modification" of the message data for one of the verification statuses may include not modifying the message data.

The digital signature component then originates a digital signature 899 for the modified message data (MD') by calculating a hash value therefor at 890 and then encrypting the hash value at 892 using a private key 895 of a public-private key pair. For increased reliability and trust, the private key 895 is retained securely within memory 894 so that it is never exported from the device 840 and is not discoverable from outside of the device 840. The digital signature is originated in accordance with the ECDSA as specified in FIPS PUB 86-2. Accordingly, the digital signature 899 is generated using a random number generator, and the hash function at 890 is performed using SHA-1, which generates a 20-byte output regardless of the size of the input received. The digital signature 899 then is output from the device 840 as the indicator 860 of the verification status (IVS) of the device 840 for transmitting to the recipient. The digital signature 899 output from the device 840 actually comprises the indicator of the verification status (IVS) 860 as a consequence of the modification process. The current outcome of the first comparison (results of VD1 and PD1 comparison) is also output as a result (R) 896. The indicator 860 and result 896 then are transmitted to the recipient in association with the EC 810, whereby the recipient is able to identify the indicator 860 and result 896 as pertaining to the EC 810.

The device 840 includes a set of predefined verification statuses each representing a relational correspondence between the verification data 851,853 and the prestored data 842,844. Verification statuses of the set further represent whether an indicator 860 has been output from the device 840 since the last successful verification based on either or both of the first and second verification data 851,853, or since the last receipt of input representing either or both of the first and second verification data 851,853. The set also contains a predefined verification status representing the lack of input of both first and second verification data 851,853 since a resetting after a timeout or a powering on of the device 840. The indicator 860 output from the device 840 is based on the last respective comparisons of verification data with the prestored data, but only if input representing verification data has been received since the resetting of the device 840. Otherwise, the indicator 860 indicates the lack of input for both the first and second verification data 851,853 since the resetting of the device 840.

The electronic apparatus 830 includes an interface (not shown) capable of receiving the indicator 860. The electronic apparatus 830 also includes logic circuitry or software incorporating business logic therein for determining the verification status of the device based on the indicator 860 and for evaluating the EC 810 received from the sender 820 based on the determined verification status. In this regard, the electronic apparatus 830 decrypts the digital signature with the public key, which corresponds to the private key 895 and which may be received in association with the digital signature 899 or known or obtained beforehand by the recipient. The recipient also modifies—and then calculates a hash value for—the message based on the result 896 and for each possible outcome of the second comparison until the calculated hash value equals the hash value of the decrypted digital signature. In calculating a hash value for comparison, the electronic apparatus 830 also performs any necessary processing to the message in order to produce the message data that was modified within the device 840. When the hash value calculated by the recipient equals the hash value of the decrypted digital signature, the recipient thereby determines the current verification status of the device 840. This determination also confirms the authenticity of the message of the EC 810. Furthermore, in order to minimize consumption of resources, the second set of outcomes for the second comparison (VD2 with PD2) is predefined to contain only a limited number of outcomes. For instance, the first verification data and prestored data therefor preferably represent a biometric characteristic, and the second verification data and prestored data therefor preferably represent a Secret.

When either of the first or second verification data 851, 853—and the prestored data therefor—comprise a Secret, the predefined set of outcomes for the comparison for such includes four possible outcomes, comprising: a first outcome representing the lack of verification data since a resetting of the device 840; a second outcome representing a match between the verification data and the prestored data, and further representing no other indicator 860 being output from the device 840 since the match; a third outcome representing a failed match between the verification data and the prestored data; and a fourth outcome representing a match between the verification data and the prestored data, and further representing the output of an indicator 860 since the match.

When either of the first or second verification data 851, 853—and the prestored data therefor—represent a biometric characteristic, the predefined set of outcomes for the comparison for such produces a result preferably out of a predefined number of possible outcomes. Each outcome represents a possible percentage of match—or degree of difference—between the verification data and prestored data that is allowed, together with a verification status representing the lack of input for verification data since a resetting of the device 840. For example, the predefined outcomes comprising the percentage match of the verification data with the prestored data may comprise the set of percentages ranging from 0% to 100% in increments of 1%. Preferably each one of the outcomes represents a percentage match also further represents whether an indicator 860 has been output from the device 840 since the last receipt of input representing verification data.

The identification marker 872 is stored in memory 874 and comprises a value representing one of the set of predefined verification statuses of the device 840. The set of predefined verification statuses preferably comprises all of the possible combinations of outcomes from the respective comparisons for the first and second verification data 851,853. Of course, the correspondence of the possible values for the identification marker 872 with the predefined verification statuses of the device 840 should be previously known by the recipient. Moreover, none of the verification statuses actually reveal any of the verification data 851,853 or the prestored data 842,844; thus, no "shared secret" is required between the sender 820 and the recipient, and no biometric value representing the sender's irreplaceable biometric characteristic is communicated to the recipient. However, the recipient can infer from the verification status both the correct knowledge of the Secret and the presence of the sender.

Figure 8B:
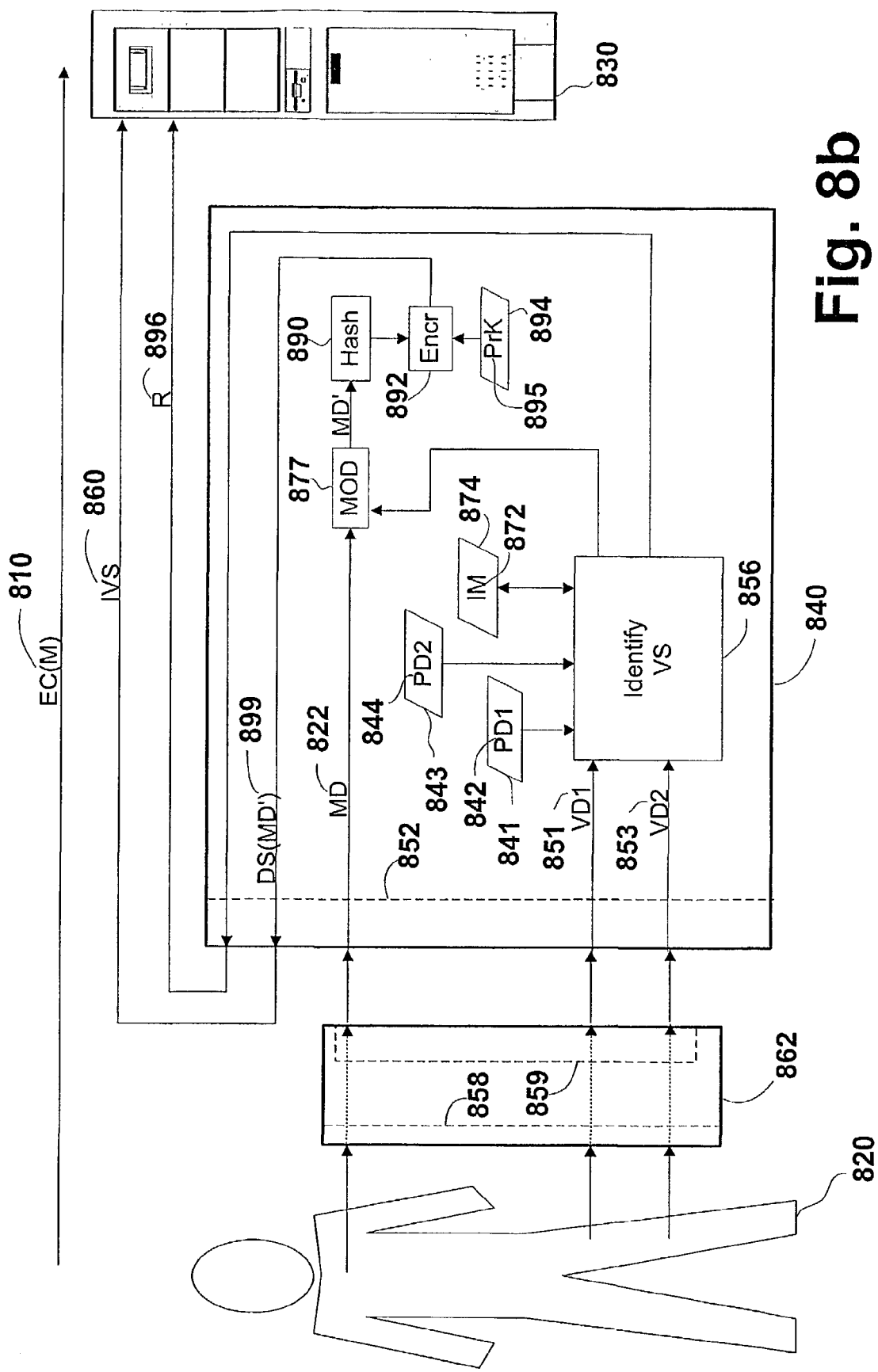

A variation based on the ninth preferred implementation 800 of FIG. 8a is shown in FIG. 8b, and includes an I/O support element 862 from which input representing the first and second verification data 851,853 and input representing the message data 822 is received by the device 840. The I/O support element 862 includes a user interface 858 from which input from the sender 820 is received and an I/O interface 859 that communicates the input representing the first and second verification data 851,853 and input representing the message data 822 to the device 840.

Figure 8C:
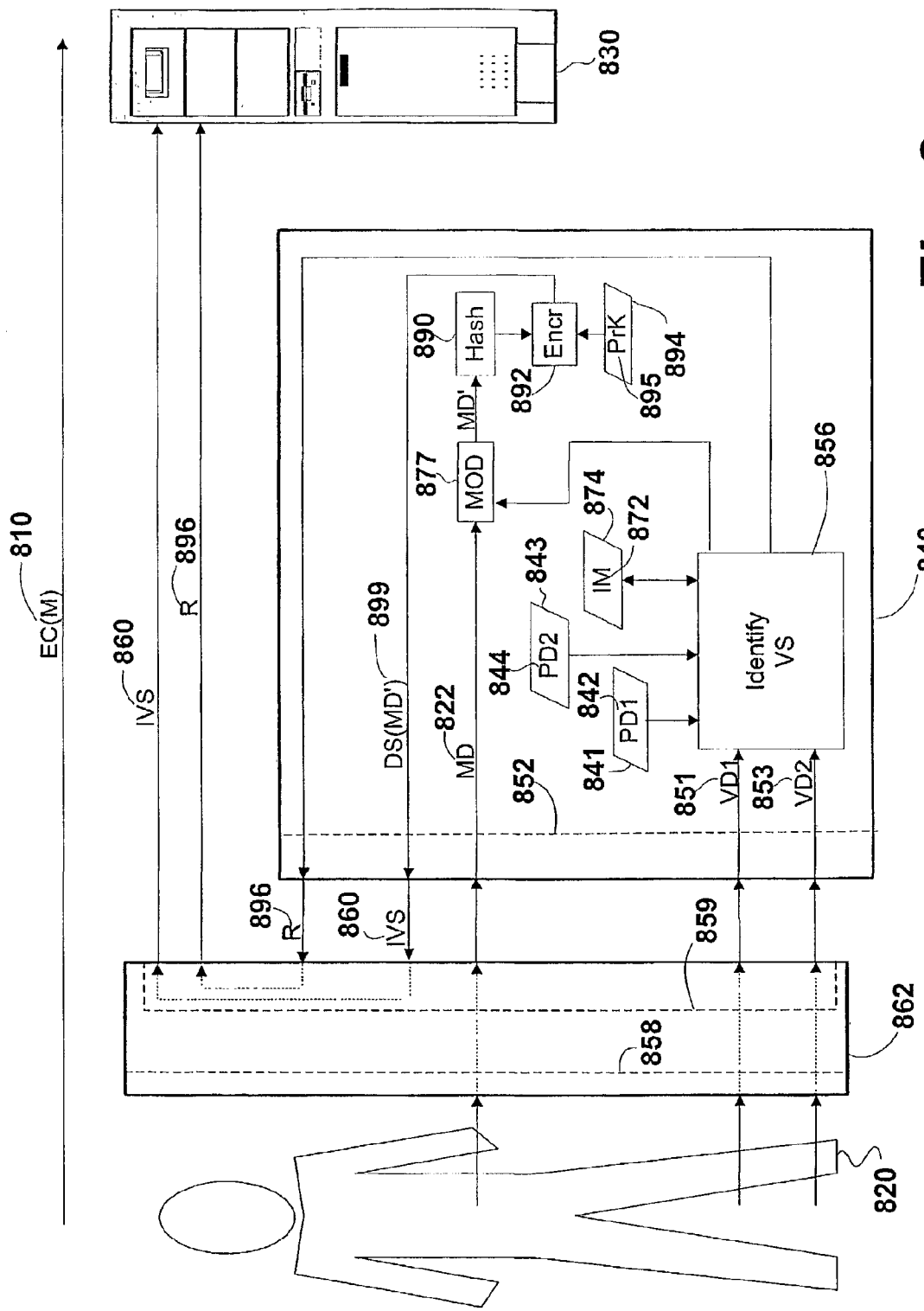

Although the message data 822 is shown coming from the I/O support element 862, it is possible for some or all of the message data 822 to originate with the device 840 or another apparatus (not shown). Yet an additional variation thereof is shown in FIG. 8c, wherein the I/O support element 862 receives the indicator 860 and the result 896 output from the device 840. The I/O support element 862, in turn, transmits the indicator 860 and the result 896 to the electronic apparatus 830.

As shown, the indicator 860 and result 896 transmitted from the I/O support element 862 are the same as the indicator 860 and result 896 output from the device 840. However, the result transmitted from the I/O support element 862 may be different from the result output from the device 840, so long as the recipient is able to determine the bit pattern of the result 872 based in part on which the message was modified. For instance, the result transmitted from the I/O support element 862 may indicate not only the result of the comparison of the first verification data input into the device 840, but also a verification status of the PO support element 862 when the I/O support element 862 itself identifies a verification status. Furthermore, the indicator 860 and result 896 transmitted from the I/O support element 862 may be packaged or embedded within another communication-including additional information that is digitally signed by the I/O support element 862.

Furthermore, in FIGS. 8a, 8b, and 8c, the EC 810 is shown as being transmitted separate from the indicator 860 and result 896. However, in the preferred implementation of FIG. 8a and any variations thereof, the indicator 860 and result 896 equally may be associated with the EC 810 by being transmitted as part of the EC 810. Furthermore, the EC 810 may be output from the device 840, an associated I/O support element 862 (not shown in FIG. 8a), or other apparatus.

Figure 9:
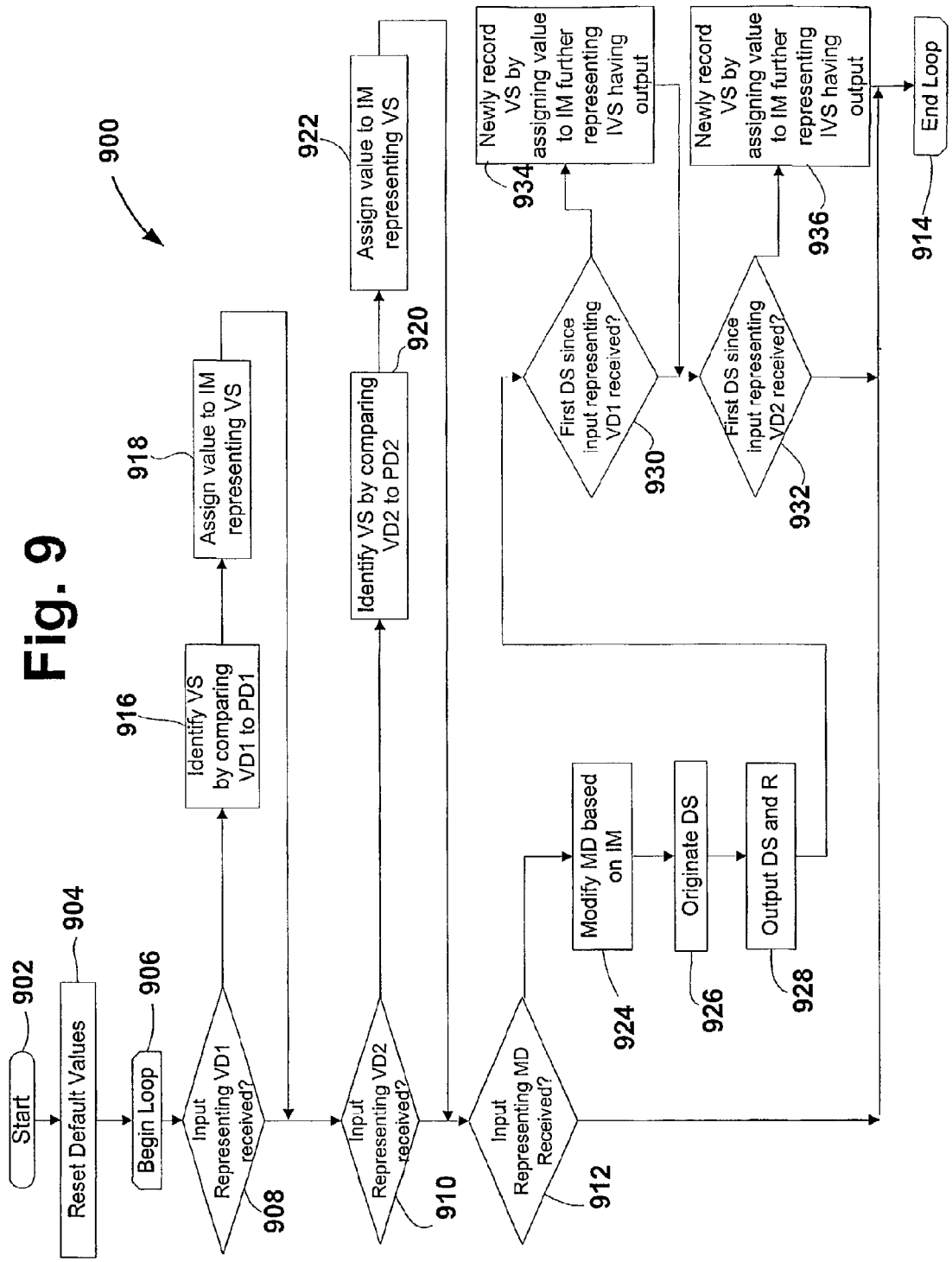
FIG. 9 illustrates a preferred mode of operation of the device of FIGS. 8a, 8b, and 8c.

A preferred mode 900 of operation of the device of FIGS. 8a, 8b, and 8c is illustrated in FIG. 9 and begins with a resetting Step 904 of the device following a timeout or powering on of the device at 902. During the reset, the identification marker is assigned a value corresponding to a verification status representing the receipt of no input of any verification data and further representing the fact that that no indicator has yet been output. The device then enters a repeating loop that begins at 906 and ends at 914 and continues within this loop until the device is reset, is powered off, or deactivates after a predetermined amount of time.

Still referring to FIG. 9, the first step in the loop preferably includes the determination Step 908 whether any input representing the first verification data (VD1) is received by the device. If the determination in Step 908 is positive, the current verification status (VS) of the device is identified Step 916 by comparing the first verification data (VD1) with the first data (PD1) prestored in the memory of the device. The verification status identified then is recorded by assigning Step 918 the identification marker stored within the memory of the device equal to the predefined value corresponding to the identified verification status. If no input representing the first verification data is received in Step 908 or after the value of the identification marker is recorded in Step 918, the next step in the loop preferably includes the determination Step 910 whether any input representing the first verification data (VD1) is received by the device. If the determination in Step 910 is positive, the current verification status (VS) of the device is identified Step 920 by comparing the second verification data (VD2) with the second data (PD2) prestored in the memory of the device. The verification status identified then is recorded by assigning Step 922 the identification marker stored within the memory of the device equal to the predefined value corresponding to the identified verification status.

If no input representing the second verification data is received in Step 910 or after the value of the identification marker is recorded in Step 922, the next step in the loop preferably includes the determination Step 912 whether any input representing message data (MD) is received by the device. If the determination in Step 912 is negative, the loop restarts Step 906.

If the determination in Step 912 is positive, the device then modifies Step 924 the message data based on the identification marker. Next, the device originates Step 926 a digital signature for the modified message data. The digital signature for the modified message data and the value of the result for the first comparison are then output Step 928 from the device. Following the output of the digital signature for the modified message and value of the result of the first comparison, the determination is made Step 930 whether the digital signature is the first output since receipt of input representing the first verification data in Step 908. If the determination in Step 930 is positive, then the verification status is newly recorded Step 934 by assigning a value to the identification marker that represents the verification status identified by the digital signature marker output in Step 928, and that further represents the fact that the digital signature has been output.

If the determination in Step 930 is negative or after the value of the identification marker is newly recorded in Step 934, the next step in the loop preferably includes the determination Step 932 whether the digital signature is the first output since receipt of input representing the second verification data in Step 910. If the determination in Step 932 is positive, then the verification status is newly recorded Step 936 by assigning a value to the identification marker that represents the verification status identified by the digital signature output in Step 928, and that further represents the fact that the digital signature has been output. If the determination in Step 932 is negative or after the value of the identification marker is newly recorded in Step 936, the loop then restarts Step 906.

5. Data Formats

In accordance with all of the aspects of the present invention, the device comprises hardware, software and/or firmware and, specifically, comprises a computer chip, an integrated circuit, a computer-readable medium having suitable software therein, or a combination thereof. The device further may comprise a physical object such as a hardware token or an embedded token, the token containing such a computer chip, integrated circuitry, software, or combination thereof. If the device is a hardware token, it preferably takes the form of a ring or other jewelry; a dongle; an electronic key; a card, such as an IC card, smart card, debit card, credit card, ID badge, security badge, parking card, or transit card; or the like. If the device is an embedded token, it preferably takes the form of a cell phone; a telephone; a television; a personal digital assistant (PDA); a watch; a computer; computer hardware; or the like. The device preferably includes a device interface comprising a port—including a wireless communications port, a serial port, a USB port, a parallel port, or an infrared port—or some other physical interface for communicating with at least an external electronic apparatus, whether contact or contactless. The device also may include a trusted platform module (TPM) comprising hardware and software components providing increased trust in a platform, as set forth and described in the TCPA Documents cited above. Some of the above devices require use of an I/O support element to enable the device to receive message data or verification data. Some of the devices require an I/O support element to receive specific types of verification data but not others. Some of the devices require use of an I/O support element to transmit information regarding verification statuses, digital signatures, and messages to recipients of the ECs. Some of the devices are self-contained, which means that they can generate and transmit messages, digital signatures, and indicators of verification status without the use of external apparatuses; some devices, although self-contained, are capable of interacting with such external apparatuses, such as an I/O support element, if desired. An I/O support element may take the form of any number of different apparatuses, depending upon the particular application in which it is used and depending upon the type of device with which it interacts.

For higher security applications, the device—or the device in combination with an I/O support element—preferably includes the following components: a keypad (alphanumeric), interactive display, or other type of user data entry mechanism (collectively referred to herein as "User Interface") that allows the sender of an EC to compose or modify a message; a User Interface for inputting Secret verification data (it should be noted that the User Interface for generating or modifying a message may, but does not have to, be the same as the User Interface for the entry of the Secret verification data); a display for showing the message and/or Secret to the sender of the EC using the device; a scanner or reader for receiving at least one type of biometric verification data; memory for securely storing the Secret(s), prestored biometric data, and the private key (PrK); a processor or circuitry for performing the various comparisons and for identifying a verification status of the device; a processor or circuitry for generating or originating digital signatures; and a means for outputting information from the device and transmitting it to the electronic apparatus. Preferably, the device also includes memory for storing and exporting the public key (PuK) associated with the particular private key (PrK), and for storing additional user information such as account information, user ID's, and the like. For lower security applications, not all of the above elements are necessary.

To this point, the discussion of the devices of the present invention that provide indications of verification status has focused on the flow of data into and out of the devices and the manipulation of such data performed by components within the devices or in communication with the devices. This section provides further detail regarding, for example, preferred database formats and exemplary data values and structures for verification data, prestored data, verification statuses, and identification markers and indicators of verification status. This section also illustrates preferred implementationologies for identifying verification statuses when verification data represents a Secret, biometric characteristic, or a combination of both. Additionally, this section illustrates the functional aspects of a preferred computer chip that may be used as the device or as part of a device of the present invention.

a. Record Formats for Prestored Data

As shown in FIGS. 10a, 10b, and 10c, the prestored data of an authorized user of a device (generally referred to as PD) may be maintained in suitable records 1100a, 1000b, and 1000c, respectively, within a database of the device. As shown in FIG. 10a, for simple applications in which the device is adapted to receive and process only a Secret, such as a PIN 1003, record 1000a would simply contain the "value" 1005 for the Secret Prestored Data (SPD) 1042 (or referred to generically as PD 1070). As shown in FIG. 10b, for slightly more complex applications in which the device is adapted to receive and process only one specified type 1002 of biometric data 1007, record 1000b would simply contain the "value" 1009 for the applicable Biometric Prestored Data (BPD) 1044 (also referred to generically as PD 1070).

As shown in FIG. 10c, for other applications in which the device is adapted to receive and process more than one specified type of verification data, the record 1000c includes a list of the possible verification data types 1002 representing both a Secret and a biometric characteristic. Each type 1002 of verification data (whether Secret or biometric) has associated therewith a corresponding pre-set identifier 1004 and a corresponding unique value 1006 comprising the prestored data 1070 therefor. The specific identifiers 1004 associated with particular data types 1002, as shown in FIG. 10c, are arbitrary and may be formatted or established to conform with any industry standard or convention now or hereinafter developed (such as, for example, the standards set forth in *Biometric Information Management and Security for the Financial Services Industry*, Document Number X9.84-1000 WD, American National Standards Institute, 1000, which is incorporated herein by reference). Further, the list of types 1002 of data shown in FIG. 10c, is only intended to be exemplary and, in practice, record 1000c may include more, less, or different specific types 1002 of data.

In addition, although the types 1002 of data are shown in records 1000a, 1000b, and 1000c for ease of reference and explanation, it is not necessary that the information that appears in the column showing the types 1002 actually be maintained in these records if the relationship between each data type 1002 and its corresponding identifier 1004 is otherwise known. Except for the prestored data (values 1005, 1008) for the PINs, which is conventionally includes a 4-10 digit alphanumeric string, the values 1009,1010 associated with each type 1002 of biometric data will generally be a numeric value corresponding to a digital representation of an authorized user's biometric characteristic. For example, the current F.B.I. standard for electronic fingerprint scans is "40 point minutiae." Such a value may be obtained by an appropriate and conventional biometric scanner capable of scanning and converting such scan into a digital representation of the particular biometric data type 1002. Generally, for any particular biometric data type 1002, it is preferably that the same standard, scale, or convention be used at both the personalization stage of the device, when such data is input into the device for the purpose of creating the prestored data, as well as each time verification data is later input into the device for the purpose of identifying a verification status. If no data has been prestored for comparison with a particular type 1002 of data, then the corresponding value 1012 for that data type 1002 is set to zero, null, or comparable equivalent value.

b. Verification Data Formats Input into the Device

As shown in FIG. 11a, for simple applications in which the device is adapted to receive and process only a Secret (again, such as a PIN), it is preferable that the verification data 1150 comprise Secret Verification Data (SVD) 1151 having a value 1102 input by the sender of an EC when using the device. As shown in FIG. 11b, for slightly more complex applications in which the device is adapted to receive and process only one specified type of biometric verification data, it is preferable that the verification data 1150 comprise Biometric Verification Data (BVD) 1153 having a value 1104 input in response to a scan of a biometric characteristic provided by the sender when using the device. Finally, as shown in FIG. 11c, for other applications in which the device is adapted to receive and process more than one specified type of verification data, whether Secret or biometric, it is preferable that the verification data 1150 comprise both an identifier 1106 and a corresponding value 1108. The identifier 1106 indicates the type of verification data being input into the device, and, hence, indicates the prestored data the device will need to reference for comparison purposes. Although not shown, it should be understood that instead of using identifiers, it is possible to use software or device commands or instructions in combination with the input of verification data 1150 to notify the device of the particular type of the verification data 1150 being input.

c. Comparison Process and Identification of Verification Status

Referring now to FIGS. 12, 13a, 13b, and 14, several exemplary processes by which a device compares the verification data with prestored data and thereby identifies the verification status are set forth in greater detail. Again, as shown in FIG. 12, and referring initially to simple applications in which the device is adapted to receive and process only verification data for a Secret, the device first determines if input representing verification data (e.g. as shown in Step 308 in FIG. 3) has in fact been received and, if so, determines (Step 1202) whether such verification data is for a Secret. If verification data for the Secret is not received, then the device maintains Step 1204 the current verification status (the start-up default value of which is "No PIN entered").

If verification data for a Secret is received, then the device retrieves Step 1206 the corresponding prestored data (SPD), e.g., value 1005 from record 1000a in FIG. 10a. Next, the device compares Step 1208 the input value with the prestored data value. If the result (Rs) of the comparison is that the values are equal, then the device identifies Step 1210 the verification status as "PIN match." If the result (Rs) of the comparison is that the values are not equal, then the device identifies Step 1212 the verification status as "PIN no match." Furthermore, although FIG. 12 shows the verification statuses in a descriptive format (e.g., "No PIN entered;" "PIN match;" and "PIN no match"), it should be understood that the device, preferably, sets an identification marker (IM) to an arbitrary value that directly maps to a respective verification status which, in this simple example, is also equal to the result of the comparison (Rs). A few possible examples of equivalent identification marker values are illustrated in FIG. 15a. Nevertheless, it should be obvious to one skilled in the art that innumerable different types, conventions, or formats for suitable equivalent verification statuses corresponding to those listed in FIG. 15a may be chosen within the scope of the present invention. As shown in FIG. 15a, a first identification marker comprising a Secret verification result ($Rs_1$)) 1502 is in cardinal number format. A second identification marker comprising a Secret verification result ($Rs_2$) 1504 is in binary format. Additionally, a third identification marker comprising a Secret verification result ($Rs_3$) 1506 that is shown is merely a different character string representation of the verification statuses listed in the first column of FIG. 15a. Referring back to FIG. 12, the resulting identification marker values shown in Steps 1210 and 1212 use the second convention described above.

Referring now to FIGS. 13a and 13b, for slightly more complex applications in which the device is adapted to receive and process only one specified type of biometric verification data, the device first determines Step 1302 that biometric verification data has, in fact, been received. If no biometric verification data has been received, then the device maintains Step 1304 the current verification status (the start-up default value of which is "No BIO input"). If the device has received biometric verification data, then the device retrieves Step 1306 the corresponding prestored data (BVD) (e.g. value 1009 in record 1000b in FIG. 10b). In biometric data comparisons, unlike in Secret data comparisons, it is preferred that the result (Rb) of the comparison comprise the degree or percentage of match (or difference) between the verification data and the prestored data. Thus, in preferred implementations, the device identifies Step 1308a a verification status by dividing the biometric verification data by the prestored data to obtain a percentage match between the two values and assigning the result (Rb) to the identification marker.

As shown in FIG. 13b, the device may alternatively obtain a percentage difference between the two values by calculating Step 1308b the absolute value of the difference between the two values and dividing that number by the prestored data, and then assigning the result (Rb) to the identification marker. Several examples of equivalent biometric identification marker values are illustrated in FIG. 16; however, it should be obvious to one skilled in the art that many different types, conventions, or formats for identification marker values showing degree or percentage of match or difference between the biometric verification data and the prestored data (e.g., such as those set forth in FIG. 16) may be chosen within the scope of the present invention. For example, a first identification marker comprising a biometric verification result ($Rb_1$) 1602 is a percentage value (to 2 digits) corresponding to the degree of match or difference between the two values (with the calculated number substituted for the "##"). A second identification marker comprising a biometric verification result ($Rb_2$) 1604 is a decimal value (to 2 digits) corresponding to the degree of match or difference between the two values. A third identification marker comprising biometric verification result ($Rb_3$) 1606 is a character string associated with the corresponding verification status in the first column of the figure.

As has been described previously, in the preferred implementation, the device outputs an indicator of the verification status based on biometric verification data in the form of a degree (or percentage) of match or degree (or percentage) of difference between the biometric verification data and the prestored data. By providing the verification status in this manner, the electronic apparatus (or recipient) is allowed to determine, based on its own logic or business rules, whether the degree of match obtained and provided by the device meets a required security threshold for a particular business purpose or application. This enables the device to be used easily with different recipients, each with its own threshold requirements for biometric verification data. Alternatively, it should be understood that the device itself could be pre-programmed or pre-hardwired to determine within the device whether the biometric verification data qualifies as a "match" or "no match" with the prestored data relative to an arbitrarily determined threshold—in which case, its identification marker would be similar merely to that for a comparison of verification data for a Secret.

Referring now to FIG. 14, for other applications in which the device is adapted to receive and process Secret and biometric verification data, the device first initiates Step 1402 a loop for the purpose of processing each input for those applications in which more than one type of verification data is received. In the first step within the loop, the device determines Step 1404 whether verification data has been received. If verification data has not been received, then the device maintains Step 1406 the current verification status (which at start-up is "No PIN entered; No BIO entered"). If verification data has been received, then the device retrieves Step 1410 the prestored data (1006 from FIG. 1000c) corresponding with the identifier (1106 from FIG. 11c) for such verification data. As an aside and as stated previously, another implementation allows a device or computer command sent with the verification data to indicate the type of verification data being input without the use of an identifier 1106 (as shown in FIG. 11c). Next, the device determines Step 1412, based on the identifier (or command input), whether the verification data represents a Secret or a biometric characteristic.

If the verification data represents a Secret, then the device compares Step 1414 the verification data with the corresponding prestored data for such Secret. If the values are equal, then the device identifies Step 1416 the result of the comparison as a "match" and, in this example, sets Rs equal to a value of "01" (using the binary convention from FIG. 15a). The loop then restarts Step 1408. If the values are not equal, then the device identifies Step 1416 the results of the comparison as a "no match" and, in this example, sets Rs equal to a value of "10" (again using the binary convention from FIG. 15a). The loop then restarts at Step 1408. On the other hand, if the device determines that the verification data represents a biometric characteristic, then the device identifies Step 1420 the verification status by comparing the verification data with the corresponding prestored data and calculating a percentage match therebetween. In this regard, the device sets Rb for the particular type of biometric verification data (designated by ###) equal to the value of the percentage match. The loop then restarts at Step 1408. In this example, the value of the identification marker (IM) corresponding with the verification status includes the value for Rs as well as the values for each Rb for each biometric verification type.

Several examples using specific numbers will help explain this process. In the first example, suppose a PIN and one type of biometric verification data, such as a right handprint, is entered into the device by a sender of an EC who is using the device. In this example (using the conventions discussed above with regard to FIGS. 10c and 11c and with regard to column 1504 of FIG. 15a and column 1702 of FIG. 16) a suitable verification status is represented by an identification marker including the following value:

001,10,012,90 (with or without the commas)

This identification marker indicates a verification status in which an incorrect PIN was received and a right handprint having a 90% degree of match was received.

In a second example, suppose three types of biometric verification data (a right thumb, a left thumb, and a right iris scan) are entered. In this second example (again using the same conventions), a suitable verification status is represented by an identification marker including the following value:

002,95,007,93,018,87 (with or without the commas)

This identification marker indicates a verification status in which a right thumbprint had a 95% match, a left thumbprint had a 93% match, and a right iris scan produced an 87% match.

In an alternate implementation, after performing the above steps, the device identifies the verification status as an identification marker containing every possible identifier 1004 (or some subset thereof from FIG. 10c) followed by its corresponding Rs or Rb value. Thus, even though an input is not provided for every single type of verification data, the identification marker nevertheless includes all identifiers 1004 and their corresponding Rs and Rb values. For those types for which no input is received, the corresponding value for Rs or Rb is its default value preferably comprising zero or null, or a suitable equivalent. In this third example, a suitable verification status is represented as an identification marker of:

001,01,002,00,003,00,004,0.25,005,00,006,0.96, . . . 024,0.95

Assuming that the ". . ." merely includes each identifier between 007 and 023 followed by a "00" (i.e., no verification data inputs corresponding with identifiers 007 through 023), the identification marker in this example indicates a verification status in which a correct PIN was input, a right middle fingerprint had a 25% match, a right pinky fingerprint had a 96% match, and a DNA scan had a 95% match. Just for comparison purposes, unlike the previous examples, this example uses the conventions for Rb discussed above with regard to column 1604 of FIG. 16.

In another alternative implementation, it is possible to eliminate all of the identifiers 1004 from the identification marker if the recipient knows what convention is used by the device, including the sequence of presenting each verification data type within the identification marker value or data stream. For example, using both conventions as described above for all twenty three identifiers (column 1504 of FIG. 15a for the Rs value and column 1602 of FIG. 16 for the Rb values in the first identification marker below, and column 1504 of FIG. 15a for the Rs value and column 1604 of FIG. 16 for the Rs values in the second identification marker below) and assuming that the order of verification data types is the same as the twenty-three identifiers 1004 in FIG. 10c, the identification marker for the above-described verification status could be presented, alternatively, as follows:

0100000.25000.96000000000000000000000000000000000.95 or

01000025009600000000000000000000000000000000000095

Each identification marker above identifies a verification status in which a correct PIN was input, a right middle fingerprint had a 25% match, a right pinky fingerprint had a 96% match, and a DNA scan had a 95% match.

7. Associating Specific Sender Approval for EC

ECs, and the ability to authenticate the sender of an EC, are useful for at least three different business purposes within the present invention. These three different purposes are described generally hereinafter as "session authentication," "transaction authentication," and "transaction confirmation." Session authentication and transaction authentication are similar to each other since both typically involve situations in which the sender of the EC must "prove" (at least to the extent possible based on the strength of the entity authentication) to the recipient of the EC that he is the legitimate device user or account holder (e.g., if the recipient of the EC is an account authority). In contrast, transaction confirmation typically involves situations in which the sender of the EC has already proven to the recipient of the EC that he is the legitimate device user or account holder; however, the recipient of the EC requires confirmation of a specific digitally-signed message from the sender before the recipient will act thereupon or in reliance thereupon (e.g., perform a requested action).

Session authentication and transaction authentication are generally used, for example, by the recipient of an EC to determine whether or not to grant the sender of the EC with "access" to a requested resource. A resource is, for example, a physical space, database, computer file, data record, checking account, computer system, computer program, web site, or the like. Such authentication is also typically necessary before the recipient of an EC will perform a requested action on an account or other resource. A main distinction between session authentication and transaction authentication is what the recipient of the EC does as a result of such authentication. For example, once the sender of an EC is authenticated for session authentication purposes, the recipient provides the sender with access (by means of a session key, entity identifier, and the like) to the requested account or resource for the duration of the "session." The meaning of a session varies depending upon the type of account or resource being accessed and depending upon the business rules of the particular recipient, which is protecting the account or resource; however, a session typically means some period of time during which the sender of the EC is allowed to perform actions on or within the account or resource without providing additional authentication to the recipient. In addition, the amount of access to the account or resource a sender of an EC is granted is also governed by the business rules of the particular recipient and may vary from recipient to recipient and from resource to resource.

In contrast, transaction authentication is typically only useful for the particular transaction with which it is associated. Transaction authentication associated with a particular transaction is not "carried over" for use with another transaction. Such a transaction may be a request for the recipient to perform a specific action on the account or resource (e.g., a request for the recipient to "provide checking account balance" or "open the door"). In contrast with transaction confirmation (described in the next paragraph), however, transaction authentication is useful when the recipient does not specifically need to know the "intent" of the sender of the EC before performing the requested action.

Transaction confirmation, on the other hand, is useful when the value or risk associated with a particular transaction rises to the level that the recipient will not act unless it receives sufficient assurance that the sender of the EC intended to send and digitally sign the message and, correspondingly, intended for the recipient to act in reliance thereupon. Since a digital signature is capable of being generated by a device, potentially without the desire or even knowledge of the sender of the EC or user of the device, intent cannot be presumed from the mere receipt of a digital signature from a device. For this reason, some means of confirming the sender's intent with respect to a specific transaction is needed. Such transaction confirmation is preferably obtained by a physical, overt act performed by the sender that is determinable within the message received by the recipient. For example, in some instances, the contemporaneous provision of Factor B or C entity authentication information by the sender of the EC in conjunction with the message that is digitally signed can imply confirmation or intention. Another method of obtaining such transaction confirmation is through the deliberate and recognizable modification by the sender of an EC of a "proposed" message generated by the recipient specifically for confirmation purposes and which is then digitally signed by the sender.

In light of the above, it should be understood that in many circumstances, even if the sender of an EC has already provided verification data for the purpose of session authentication, it may be necessary for the sender to provide additional verification data for the purpose of creating stronger entity authentication (still for session authentication purposes) before the recipient will provide the sender of the EC, for example, with access to a more restricted portion of the particular account or resource or to another more restricted account or resource. Further, it should also be understood that even during a particular session, it may be necessary for the sender of the EC to provide additional verification data either for transaction authentication purposes (when the transaction requires a stronger level of entity authentication than the particular session required) or for transaction confirmation purposes (when the recipient desires specific assurance of the sender's intent before performing a requested action). In addition, it should also be understood that a single EC communicated from a sender to a recipient may be used simultaneously for both transaction authentication and for transaction confirmation purposes in many circumstances.

Turning now to FIG. 24, an example of an EC 2406 used for session authentication purposes is illustrated. As shown, a recipient 2412 of an EC acts as a type of "gate-keeper" for three resources 2440,2450,2460, one of which the sender 2402 desires to access as requested in the EC 2406. Although only one recipient 2412 is illustrated in this example for ease of reference, it should be understood that each resource 2440, 2450,2460 could, in fact, have its own separate EC recipients/gatekeepers (not shown) associated therewith.

Continuing with FIG. 24, the recipient 2412 restricts access to the resources 2440,2450,2460, directly or indirectly, by preventing the sender 2402 from proceeding through gates 2494a, 2494b, or 2494c until the sender 2402 has provided the recipient 2412 with a "sufficient" level of entity authentication—at least to the extent required by the particular gate 2494a,2494b,2494c. For reasons that should be readily apparent, the level of entity authentication required by each gate varies depending upon what the specific resource is that is being protected. For example, if the resource is a parking deck, only a minimal level of entity authentication is necessary; if the resource is a corporate checking account, stronger entity authentication is likely required; if the resource is the control system for launching nuclear warheads, even stronger entity authentication is required.

In some circumstances, providing a sufficient level of entity authentication is all that is needed to obtain access to the resource. For example, gate 2494a provides the only session authentication hurdle to sender 2402 for accessing resource 2440 (although, of course, the amount of access provided to the sender 2402 and the process by which the sender 2440 is able to access the resource may be further restricted by permissions and access rights, which are not discussed in detail herein). Alternatively, as illustrated by resource 2450, providing a sufficient level of entity authentication to pass through gate 2494b enables the sender 2402 to access resource 2450 generally and to access sub-resources 2450a,2450b (nested within the confines of resource 2450) specifically. Notably, stronger entity authentication is necessary before sender 2402 is given access to sub-resource 2450c, as indicated by gate 2494d. In another alternative arrangement, providing a sufficient level of entity authentication to pass through gate 2494c enables the sender 2402 to access not only resource 2460 but also independent resources 2470,2480,2490, which are not within the protective confines of resource 2460 but which allow the sender 2402 with access therein when the sender 2402 of the EC has provided sufficient entity authentication to pass through gate 2494c.

As stated previously, in some circumstances, the particular resource 2440,2450,2460 is not only protected but also maintained by the recipient 2412 (for example, if the recipient 2412 of the EC is a financial institution and the resource is a bank account of the sender 2402). In other circumstances, the particular resource 2440,2450,2460 is merely protected by the recipient/gatekeeper 2412, which is in communication and coordination with another entity, such as a resource manager, access controller, or authorization controller (not shown), that actually maintains the resource (for example, if the recipient 2412 is merely an entity authentication system and the resource is a secure network server, to which access and permissions are controlled by a separate access control server).

The illustration of FIG. 24 is equally applicable to an EC used for transaction authentication purposes. For example, if EC 2406 contains a specific request for information from one of the resources 2440,2450,2460 or a request for the sender 2412 of an EC to perform a specific action on or in one of the resources 2440,2450,2460, then the EC 2406 is used for entity authentication solely for that particular request; however, no on-going or session access to the particular resource 2440,2450,2460 is granted as a result.

Turning now to FIG. 25, three different examples of ECs between a sender 2502 and a recipient 2512 over communications medium 2508 are illustrated. In all three examples, the last EC from the sender 2502 to the recipient 2512 is used for a transaction confirmation purpose.

In the first interchange, designated by EC 1A in FIG. 25, the sender 2502 transmits an EC, which contains a message (M1) and a digital signature for the message (DS(M1)). In this interchange, the sender 2502 provides sufficient proof of intent and Factor B or C Entity Authentication such that the recipient 2512 requires no follow-up EC that requests confirmation.

In the second interchange, designated by ECs 2A, 2B, and 2C and still with reference to FIG. 25, the sender 2502 transmits an EC, which contains a message (M2) and a digital signature for the message (DS(M2)). In this interchange, the recipient 2512 is not satisfied that it has received sufficient proof of the sender's intent as applied to the message (M2). For this reason, the recipient 2512 sends EC 2B back to the sender 2502; EC 2B requests that the sender 2502 send a new EC with the same message (M2) and digital signature therefor (DS(M2)) but only after providing verification data to a device of the present invention, from which the recipient can ascertain the verification status of the device, and thereby, the level of Factor B or C Entity Authentication provided by the sender, an indicator of verification status (IVS) of which is included therewith as "proof" that the sender 2502 did intend to send EC 2A. As shown, the message of EC 2C is essentially the same as the message of original EC 2A with the addition of the indicator of verification status (IVS). Such indicator (IVS), preferably, is included within the message (M2) that is digitally signed.

In the third interchange, designated by ECs 3A, 3B, and 3C and still with reference to FIG. 25, the sender 2502 transmits an EC, which contains a message (M3) and a digital signature therefor (DS(M3)). In this interchange, the recipient 2512 is not satisfied that it has received sufficient proof of the sender's intent as applied to the message (M3). For this reason, in this example, the recipient 2512 sends EC 3B back to the sender 2502; EC 3B contains a proposed new message (M4) for review and digital signing by the sender 2502. Message (M4) is composed by the recipient 2512 and preferably contains most, if not all, of the information that was contained in message (M3). Message (M4) may also contain additional information not contained in message (M3). Further, EC 3B requests that, if the sender 2502 agrees with and accepts the contents of message (M4), that the sender 2502 modify the message (M4) in a specified manner (indicated in EC 3B or based on a known protocol) to create a modified message (mod-M4) and then digitally sign the same (DS(mod-M4)). It is possible to perform Factor B or C Entity Authentication within the device and, then, to include an indicator of verification status (IVS) thereof within EC 3C; however, it is not required since account authority 2512 did not request it in EC 3B.

It is also possible and advantageous for the device of the present invention to provide additional information to the recipient of an EC as to whether the verification status of the device is in a "persistent" state or whether the verification status applies specifically to the EC with which the indicator of verification status is associated. Such information can be used by the recipient to determine whether the sender of the EC input the correct Secret for a previous message or whether the correct Secret was input as specific approval or authorization of a specific session or transaction. The same advantages apply in the case of a biometric characteristic.

For example, as stated above, for devices configured only to receive verification data for a Secret, such as a PIN, there are three verification statuses, or "states", that can be identified by the identification marker using the format of FIG. 15*a*: no PIN entered (Rs=00); correct PIN (Rs=01); and incorrect PIN (Rs=10). In accordance with this additional aspect of the present invention, an additional "state" is added to these three as shown more fully in FIG. 15*b*. This additional state represents that a correct PIN was entered, but that since then, an indicator of the verification status was output or a digital signature was generated in association with an EC. This fourth state may be shown using any of the formats previously discussed, including a cardinal number format shown in column 1508 of FIG. 15*b*; a binary format shown in column 1510 of FIG. 15*b*; and a character string format shown in column 1512 of FIG. 15*b*. Using the binary format, the fourth state is identified whenever an indicator is output or a digital signature is generated with the identification marker equaling "01" by setting, thereafter, the identification marker equal to "11".

Alternatively, the device maintains a counter or "digital signature flag" (referred to hereinafter generically as "DSFlag"). In this regard, the DSFlag is initially set to zero and counts to one or more each time an indicator of verification status is output from or a digital signature is generated by the device. Thereafter, the DSFlag remains at one (or continues counting by one) for each indicator output or digital signature generated until verification data again is received by the device, after which the DSFlag is reset to zero. In this case, the value of the DSFlag is incorporated into the value of the identification marker as an additional bit of information. For example, possible values of an identification marker thus include the following, wherein "/" separates the binary value of Rs and the corresponding DSFlag value for purposes of illustration: 00/0 (no PIN input; no IVS or DS output); 00/1 (no PIN input; IVS or DS output); 01/0 (PIN match; no IVS or DS output since PIN match); 01/1 (PIN match; IVS or DS output since PIN match); 10/0 (PIN no match; no IVS or DS output); and 10/1 (PIN no match; IVS or DS output).

For a device configured to receive one type of biometric verification data only, the device preferably includes a DSFlag as part of the identification marker in similar manner to the methodology just described. For example, for a device that originates digital signatures and is only capable of receiving and processing one particular type of biometric verification data, the identification marker includes the degree of match as well as the value of the DSFlag. Thus, if the sender of an EC had submitted a thumbprint, which was determined to have a 90% match, and if no digital signature had been generated, a suitable value of the identification marker is "90/0" (with the "/" merely to indicate the separation of the two values), with the value of "90" for Rb indicating the degree of match and the value of "0" for the DSFlag indicating that no digital signature had been generated since last receipt of verification data. Conversely, in the above example, if one or more digital signatures have been generated by the device since the thumbprint scan was submitted to the device, the identification marker would be "90/1" (or in the case of a counter, "90/x" where "x" is any number greater than 0).

For devices capable of receiving multiple types of verification data input (Secret and/or biometric), it is preferable for each comparison result (R) for each type of verification data to have its own DSFlag. In this situation, every time a digital signature is originated, all of the DSFlags are set to one (or otherwise incremented as described above); however, each time additional verification data is received by the device, the DSFlag for that particular type of verification data is set to zero. For transmission of information to the electronic apparatus in this scenario, it is preferred to include the particular identifier, as discussed previously. Using the example from the previous section, a suitable identification marker appears as:

001,01,1,002,00,1,003,00,1,004,0.25,0,005,00,1,006, 0.96,1, . . . 024,0.95,1

This identification marker indicates a verification status in which a correct Secret was input, a right middle fingerprint had a 25% match, a right pinky fingerprint had a 96% match, a DNA scan had a 95% match, and the right middle fingerprint was entered since the last digital signature was generated by the device.

Turning now to FIG. 17, a table illustrates a hypothetical series of actions (primarily inputs of different types of verification data) into a device of the present invention and the resulting change (if any) to the value of the identification marker. In this example, the device maintains a PIN, a digitized value for the right thumbprint (identifier=002) of an authorized user of the device, and a digitized version of the right retina (identifier=016) of an authorized user of the device. In addition, in this example, the identification marker (IM) of the device comprises the Rs value, the Rb(002) value, DSFlag(002) value, Rb(016) value, and DSFlag(016) value. The identification marker uses the two digit binary convention for the value of Rs (i.e., from column 1510 from FIG. 15*b*), a two-digit percentage match convention for the values of Rb(002) and Rb(016) (from column 1602 from FIG. 16), and binary values for the DSFlag associated with each biometric verification data type. Thus, the DSFlag values are either "0"—indicating no generation of a digital signature or output of an indicator of the verification status since the particular type of biometric verification data was received, or "1"—indicating generation of a digital signature or output of an indicator since the particular type of biometric verification data was received.

A series of thirteen actions is illustrated in sequence in the first column of the table of FIG. 17. The impact of each of these actions upon the device and, more specifically, upon the identification marker of the device, which identifies the current verification status of the device, is shown horizontally across the remaining columns of the table. In the first action, the device is activated, turned on, or otherwise reset. This action causes each of the values that make up the identification marker to reset to their default values of zero, as shown. In the second action, an incorrect PIN is entered, which causes the value of Rs to change to "10." A subsequent correct PIN entry into the device, switches the Rs value to "01." The generation of a digital signature, output of the value of the identification marker, or other output of the verification status of the device causes the value of Rs to switch to "11" and both of the DSFlags to toggle to "1." It should be noted that the value of Rs that was included within the output of the fourth action step was the "01" (from the previous row of the table, which was the "current" value of Rs at the time of the output). As illustrated by the fifth action, a second generation of a digital signature, output of the value of the identification marker, or other output of the verification status of the device has no effect upon the value of identification marker; however, it should be noted that the value of Rs and of the DSFlags will be different from the values that were output during the fourth action.

A correct PIN input as the sixth action sets the value of Rs to "01," but noticeably has no impact on the DSFlags for the right thumbprint and right retina. In the seventh action, a right thumbprint is provided to the device and results in an 85% match with the prestored right thumbprint value. This causes the value of Rb(002) to be set to "85" and the value of DSFlag(002) to be set to "0." In the eighth action, a right retina scan result is provided to the device and results in a 90% match with the prestored value. This causes the value of Rb(016) to be set to "90" and also the value of DSFlag(016) to be set to "0."

Still referring to FIG. 17, the ninth action is a third generation of a digital signature, output of the identification marker, or other output of the verification status of the device including the identification marker that was in effect after the eighth action, which causes Rs to switch to "11" and both of the DSFlags to toggle back to "1." In the tenth action, a second right thumbprint is provided to the device, which results in an 88% match, which changes the value of Rb(002) to "88" and the value of DSFlag(002) to "0." An incorrect PIN entry at this point, in the eleventh action, merely changes the value of Rs to "10." In the twelfth action, the fourth generation of a digital signature, output of the identification marker, or other output of the verification status of the device causes DSFlag(002) to toggle back to "1" but has not effect upon the Rs value or upon the DSFlag(016) value, which is already set to "1." In the thirteenth action, a second right retina provided to the device, which results in an 89% match, changes the value of Rb(016) to "89" and switches the value of DSFlag(016) back to "0." In the fourteenth action (not specifically shown), a reset signal to the device resets all of the values back to those shown after the first action.

8. Computer Chip Design

Turning now to FIG. 18, a preferred computer chip 50 of the present invention that may be used in conjunction with an IC card, PDA, cell phone, personal computer, or other device in accordance with the present invention is illustrated. As shown, the computer chip 50 receives power 52, a clock input 54, and a reset or master clear input 56 from an external source 90. The computer chip 50 is also connected to ground 58 and exchanges input and output data 60 through external source 90. The external source 90 may be part of the IC card, PDA, cell phone, personal computer or other device in which the computer chip 50 is installed or it may be part of an I/O support element (not shown) with which the IC card, PDA, cell phone, personal computer, or other device is in communication, as the case may be.

Internally, the computer chip 50 includes an I/O router 62, a central controller 64, a memory location 66 for securely storing a private key of a public-private key pair, a memory location 68 for storing the corresponding public key of the public/private key pair, a dedicated public/private key generator circuit 70, a private key destruction circuit 72, a memory location 65 for storing a default prestored message, a digital signature circuit 71 (which includes a hash function circuit 73, a random number generator 74, and an encryption circuit 75), a memory location 76 for prestoring data (Secret and/or biometric data), a selection multiplexer 78 for retrieving selected prestored data from memory location 76, a memory location 80 for storing various account and other user information, a selection multiplexer 82 for retrieving selected information from memory location 80, a memory location 83 for storing the current verification status (preferably in the form of an identification marker (IM)) of the computer chip 50, which includes the value of Rs (for the Secret) and the values for each Rb (for each biometric verification data type stored within the device 50) and the values for the DSFlags corresponding with the Rs and Rb values), and a selection multiplexer 84 for reading and writing to the memory location 83.

Preferably, the computer chip 50 is designed with the following capabilities: the ability to store data securely and permanently (especially the private key); the ability to create a public-private key pair on the chip on a one-time only basis using a random number produced within the chip from the random number generator 74; and the ability to originate digital signatures, when requested, using a random number produced within the chip from the random number generator 74 in accordance with FIPS PUB 186-2. The computer chip 50 further preferably is resistant to tampering and is immune to Differential Power Attacks and other physical analysis. The prestored data for the Secret preferably also is protected from exhaustive search attacks. One method of "protecting" the private key is by designing the computer chip 50 with the destruct circuit 72, which destroys the private key when triggered by any tampering or attempted theft of the private key by electronic, physical, and other known means. Under such circumstances, the destruct circuit 72 renders the computer chip 50 useless by preventing the computer chip 50 from being able to generate further digital signatures and by destroying the information retained in memory location 66.

Still referring to FIG. 18, the computer chip 50 also includes non-modifiable operating software either loaded into the chip during manufacture or permanently etched into read-only memory (ROM) on the chip 50. Such software enables the computer chip 50 to respond to and act upon a specific set of commands. Such commands enable, for example, the computer chip 50 to be personalized. Personalization includes the input and prestoring of data for a Secret, a biometric characteristic, user name, and account number(s). Preferably, the prestored data for the Secret is capable of being changed, upon successful input of the current Secret verification data. The biometric prestored data, however, preferably is permanent once loaded into memory.

The software further includes a command that causes the key generation circuit 70 to create a unique public-private key pair directly within the computer chip 50 on a one-time only basis. As stated previously, the private key is stored securely in memory location 66. The public key is stored in memory location 68. The software includes a command that enables the public key to be exported from the computer chip 50. The command to export the public key may be executable multiple times or one time only, depending upon whether strict control over access to the public key is desired. The software also includes a command that notifies the computer chip 50 that verification data is being input. Optionally, separate commands (or separate information included with the command) are used to indicate whether the verification data being input is for a Secret or a biometric characteristic and, if for a biometric characteristic, the biometric type. Preferably, the computer chip 50 also automatically identifies a verification status whenever it receives verification data.

The software further includes a command that notifies the computer chip 50 that message data is being input. In many situations, it is necessary or desirable for the message data input or provided to the computer chip 50 to incorporate specific account information or other user data maintained in memory location 80 on the computer chip 50. There are generally two techniques for extracting such information from memory location 80 and including it within the message data sent to the computer chip 50.

In the first technique, all of the account and other user information is extracted from the computer chip 50 and the user is prompted through a display to select the appropriate account or user information to be included as part of the message to be digitally signed using the computer chip 50. A message data command then is sent to the computer chip 50 for the origination of a digital signature, with the selected account or user information included in the message data. For example, when the computer chip 50 is used in an IC card in conjunction with a reader or other I/O support element, the I/O support element sends a command to the computer chip 50 for the extraction of all account and user information. The user then selects the appropriate account or user information from a display provided by the I/O support element to be included as part of the message to be digitally signed using the computer chip 50. Thereafter a message data command is sent to the computer chip 50 for the origination of a digital signature, with the selected account or user information included in the message data.

In the second technique, the message data command provided to the computer chip 50 includes one or more "null fields" or other appropriate "tags" which identify a particular account field or user information field, but in which no value is supplied. In response to the tag, the computer chip 50 searches content addressable memory to identify a corresponding field maintained in memory. Upon location of the corresponding field, the computer chip 50 supplies the value of such field in the message data in substitution for the null value of the tag. With this methodology, each data cell containing account or user information in memory location 80 has its own tag or content address. Preferably, such tags or content addresses are standardized so that account or user information can be correctly stored in memory location 80 and easily retrieved using a tag when later needed. Such tags may include XML tags.

For example, a message data command could be sent to the computer chip 50 in which the message data contains a null field or tag requesting that <user name> be inserted into a particular location within the text of the message data. Whenever such message data is provided to the computer chip 50, the computer chip 50 automatically completes the message data by inserting, in this case, the "user name" stored in the third cell of memory location 80 of the chip 50. Preferably, a tag could be used to extract and insert any of the various field values (e.g., credit card account number; banking account number; user name; employer account number; web site account number, etc.) maintained in memory location 80 of the computer chip 50.

Once the message data is "completed" with all requested account and user information using one of the above techniques, such message data is then ready for: modification by the current verification status of the computer chip (using the value of IM); calculation of the hash value for the modified message data; encryption of the hash value to generate a digital signature; and output of the digital signature.

Alternatively, the computer chip 50 generates a digital signature in the same manner using a prestored message in memory location 65—rather than imported message data—in response to a suitable command to generate a digital signature.

As will be appreciated, a computer chip including components and functionality described above, and which is used in providing a verification status in accordance with the present invention, is itself novel and nonobvious and, accordingly, such a computer chip indeed comprises an aspect of the present invention.

FIGS. 19-23 (with frequent reference back to FIG. 18) illustrate how a single IC card 95, configured to function in accordance with the First aspect of the present invention and containing a suitable computer chip 50 (such as described above with reference to FIG. 18), may be used in many different applications and settings by a suspect user 46 of the IC card 95. The structure of the IC card 95 is conventional in that it has the computer chip 50 embedded therein and surface contacts for enabling communication between an IC card reader and the computer chip 50 in the IC card 95. The surface contacts are ISO/IEC 7816 compliant. It is also possible to have an ISO/IEC 14443 compliant proximity card or a combination card capable of both 7816 and 14443 operations.

For purposes of these examples, it is assumed that the computer chip 50 (as shown in FIG. 18) already contains a unique public/private key pair created in the manner previously described. It is further assumed that a PIN (the Secret in these examples) and digitized versions of the authorized user's right thumbprint, right retina, and voice print have been input and prestored in memory location 76 (cells 001, 002, 016, and 020 respectively) of the chip 50 (again, as shown in FIG. 18). It is also assumed that the authorized user's name, credit card account number, checking account number, relevant employee ID number for building and computer access, and website broker account number have been suitably prestored in memory location 80 for access as needed using an appropriate tag contained within message data provided to the IC card 95 from an external source, as discussed above. Additionally, it is assumed that the public key stored on the computer chip 50 has been provided to the authorized user's employer, credit card account company, bank, and broker, each of which has, in turn, associated in its own database the public key with the authorized user's account. For purposes of the present examples, we will also assume that the computer chip 50 outputs the value for the identification marker (IM), which is a data string containing the value of Rs using the convention as set forth in column 1504 of FIG. 15a (i.e., no PIN (Rs=00), correct PIN and not used for IVS or DS (Rs=01), and incorrect PIN (Rs=10). The value for the identification marker further includes the type identifier (0xx) and the value of Rb (in the format of a two-digit percentage match (xx) as set forth in column 1602 of FIG. 16) for every biometric verification data type. Furthermore, the identification marker includes a respective DSFlag associated with the Rs value and with each Rb value.

Now, referring specifically to FIG. 19, a first example illustrates the IC card 95 being used by the suspect user 46. In this first example, the suspect user 46 presents the IC card 95 to gain access to a parking area 1902. The parking area 1902 is secured by a parking gate 1904, which has an arm 1906 and which is controlled by a parking gate controller 1908. In turn, the parking gate controller 1908 is in communication with an IC card reader 1910. Although shown as separate from the parking gate 1904, the controller 1908 and the IC card reader 1910 could, in fact, be physically installed within the housing of the parking gate 1904.

To get the arm 1906 to lift, the suspect user 46 inserts the IC card 95 into the reader 1910 (or positions the card near the reader in case of 14443 operations). As this is a relatively low security parking area 1902, the IC card reader 1910 does not have an associated keypad or biometric scanner; thus, there is no means by which the suspect user 46 can input any verification data. Correspondingly, access to the parking area is not dependent upon any particular verification status of the IC card 95. The parking gate controller 1908 opens the parking gate 1906 merely upon proper presentation of the IC card 95, which is pre-registered with the parking gate controller 1908. Preferably, pre-registration involves the authorized user of the card providing his name ("user name") as retained in the memory 80 (as shown in FIG. 18) of the computer chip 50 to the parking gate controller 1908 or, conversely, having the operator of the parking gate 1904 (e.g., the authorized user's employer or agent) "approve" the IC card 95 for use with the parking gate system by inputting an employee account number into memory location 80 (as shown in FIG. 18) of the computer chip 50. For improved security, the authorized user of the card 95 also provides his public key (retained on the chip 50) to the parking gate controller 1908, which associates the user's name or employee account number (hereinafter generally referred to as "user information") therewith.

When the IC card 95 is inserted into the card reader 1910 (or brought into proximity to the card reader 1910), the card reader 1910 is initialized. Initialization of the card reader 1910 is conventional and is accomplished either by the card reader 1910 physically detecting an IC card 95, or by the IC card 95 outputting a "reset" message to the card reader 1910 as part of its start-up protocol when it first receives power from the card reader 1910. Once the IC card 95 receives power, the identification marker and all DSFlags for the PIN and each applicable biometric type are reset. Alternatively, all such values may be reset when power is removed from the card 95.

Following initialization, the card reader 1910 sends a message input command to the IC card 95. At a minimum, the message input command includes a tag requesting user information, such as "user name" or "employee account number" from the appropriate data field in memory location 80 (as shown in FIG. 18). In this example, there is no additional message data other than the tag.

Once the message input command is received by the IC card 95, the computer chip 50 (as shown in FIG. 18) on the IC card 95 retrieves the requested user information from memory location 80 (as shown in FIG. 18), with such user information becoming part of the message data; retrieves the current value of the identification marker; modifies the message data with the value of the identification marker by prepending the value to the message data; calculates a hash value of the modified message data; encrypts the hash value to generate a digital signature; and exports the digital signature, requested user information, and value of the identification marker to the card reader 1910, which forwards such data on to the controller 1908 for processing.

Thereafter, the controller 1908 first compares the requested user information (name or employee account number) received from the IC card 95 with a list of authorized names or authorized employee account numbers maintained in its database. For low security having no regard for authentication, the controller 1908 opens the parking gate 1906 if the user information received from the IC card 95 matches one of the authorized names or authorized employee account numbers in its database. For higher security to guard against a counterfeit IC card, the controller 1908 decrypts the digital signature received from the IC card 95 using the public key associated with the matching user information. If the decrypted hash value from the digital signature matches a hash value calculated based on the user information (i.e., message data) provided by the IC card 95, as modified by the value of the identification marker received from the IC card 95, then the controller 1908 determines that the IC card 95 from which the digital signature is received contains the unique private key associated with the user who pre-registered with the operator of the parking gate 1904, and lifts the parking gate arm 1906—the decision in this case to raise the gate being based on Factor A Entity Authentication.

Turning now to FIGS. 20 and 21, the same IC card 95 may be used by the suspect user 46 first to gain access into secure building 2002 and then into secure room 2102, which is located within the secure building 2002. As shown in FIG. 20, one IC card reader 2004 is mounted next to the secure entrance 2010 into the building 2002. This IC card reader 2004 includes an alphanumeric keypad 2006 and a display screen 2008. The IC card reader 2004 is in electronic communication with a building security controller 2014, which controls the locking mechanism 2012 of the entrance 2010. Inside the building, as shown in FIG. 21, another IC card reader 2104 is mounted on the wall next to secure door 2110. This IC card reader 2104 includes a retina scanner 2106 and a display 2108. Likewise, this IC card reader 2104 is in electronic communication with the building security controller 2114, which controls the locking mechanism 2112 of the door 2110. If the parking area 1902 (from FIG. 19) is part of the same facility as secure building 2002, it is possible that parking gate controller 1908 and building security controllers 2014, 2114 are the same apparatus, part of the same computer system, or share the same database of information regarding the authorized user and public key for IC card 95.

First, with regard to FIG. 20, for access into the secure building 2002, the IC card 95 is inserted into the IC card reader 2004 (or brought into proximity to the card reader 2004). The reader 2004 is initialized in much the same way as the card reader 1910 in FIG. 19. The identification marker and all DSFlags are reset when power is first supplied to the IC card 95.

Once initialized, the card reader 2004, using the display 2008, prompts the suspect user 46 to input a PIN. Once the PIN is entered using the keypad 2006, the card reader 2004 transmits the same, not to the building security controller 2014, but directly to the IC card 95.

Once the IC card 95 receives the PIN verification data, the controller 64 on the computer chip 50 (as shown in FIG. 18) retrieves the prestored PIN data from memory location 76 (cell 001) and compares the two values (Factor B Entity Authentication). A match/no-match determination is made by the controller 64, which identifies the verification status as either Rs=01 (match) or Rs=10 (no match).

After a suitable but brief delay, which is programmed into the controls of the card reader 2004, the card reader 2004 sends a message input command to the IC card 95. As was described previously in relation to FIG. 19, the message input command includes a "tag" requesting user information (e.g. "user name" or "employee account number") from the appropriate data field in memory location 80 (as shown in FIG. 18). Again, it is assumed that the message data comprises the tag only and no additional information.

Once the message input command is received by the IC card 95, the computer chip 50 on the IC card 95 retrieves the requested user information from memory location 80 (as shown in FIG. 18); retrieves the current value of the identification marker; modifies the user information (i.e., message data) with the value of the identification marker by pre-pending the value to the user information; calculates a hash value of the modified user information to generate a digital signature; encrypts the hash value; and exports the digital signature, requested user information, and value of the identification marker to the card reader 2004. The computer chip 50 (as shown in FIG. 18) then increments the value of all of the DSFlags to "1". Equivalently, the computer chip 50 only increments the value of the DSFlags to "1" for the specific verification data types for which any verification data input has been received since powering on of the card 95.

The digital signature, value of the identification marker, and user information received by the card reader 2004 are communicated to the building security controller 2014. The building security controller 2014 first confirms that the user information matches either an authorized name or an authorized employee account number for access to the building 2002. If so, the building security controller 2014 then decrypts the digital signature using the public key associated with the matching authorized user information. If the decrypted hash value from the digital signature matches a hash value calculated based on the user information received from the IC card 95, as modified by the value of the identification marker received from the IC card 95, then the building security controller 2014 determines that the IC card 95 from which the digital signature is received contains the unique private key. Finally, the building security controller 2014 checks the verification status indicated by the value of the identification marker to determine whether the suspect user 46 of the IC card 95 is in fact the authorized user of the IC card 95. If the indicated verification status represents a match (i.e., value of Rs=01), the building security controller 2014 infers that the suspect user 46 is the authorized user, and then sends a signal to the locking mechanism 2012 to unlock the entrance and/or open the door 2010.

For access into the secure room 2102 of FIG. 21, the IC card 95 is inserted into the IC card reader 2104 (or brought into proximity to the card reader 2104). The reader 2104 is initialized in much the same way as the card reader 2004, with the identification marker and all DSFlags being reset when power is first supplied to the IC card 95. Once initialized, the card reader 2104, using the display 2108, prompts the suspect user 46 to place his right eye before the scanner 2106. The retina scanner 2106 scans the right eye of the suspect user 46 and obtains a digitized version thereof. The card reader 2104 then transmits the biometric verification data (which includes an identifier and a value of the digitized scan of the right retina), not to the building security controller 2114, but to the IC card 95 for comparison.

Once the biometric verification data is received by the IC card 95, the controller 64 (as shown in FIG. 18) determines the type of biometric verification data received (based on the identifier), retrieves the corresponding prestored biometric data for the authorized user's right retina from memory location 76 (cell 016), and compares the two values (Factor C Entity Authentication). A degree of match determination/calculation is made by the controller 64, which sets Rb(016) to a two-digit number corresponding with the percentage match (again, as shown in FIG. 18).

After a suitable but brief delay, the card reader 2104 sends a message input command to the IC card 95. As was described previously, the message input command includes a tag requesting user information from the appropriate data field in memory location 80. Again, it is assumed that the message data comprises the tag only and no additional information.

Once the message input command is received by the IC card 95, the computer chip 50 on the IC card 95 retrieves the requested user information from memory location 80; retrieves the current value of the identification marker (including therein the value of Rb(016) and the value of the DSFlag(016), which was reset to zero when the card was inserted into the card reader 2104); modifies the user information with the value of the identification marker by pre-pending the value to the user information, calculates a hash value of the modified user information; encrypts the hash value to generate a digital signature; and exports the digital signature, requested user information, and value of the identification marker to the card reader 2104. The computer chip 50 then increments the value of all of the DSFlags to "1."

The digital signature, user information, and value of the identification marker received from the IC card 95 are then communicated by the card reader 2104 to the building security controller 2114. The building security controller 2114 first confirms that the user information received from the IC card 95 matches an authorized user name or employee account number for access to the room 2102. If so, the building security controller 2114 then decrypts the digital signature using the public key associated with the matching user information. If the decrypted hash value from the digital signature matches a hash value calculated based on the user information received from the IC card 95, as modified by the value of the identification marker received from the IC card 95, then the building security controller 2114 determines that the IC card 95 from which the digital signature is received contains the unique private key. Finally, the building security controller 2114 checks the verification status indicated by the value of the identification marker to determine whether the suspect user 46 is in fact the authorized user of the IC card 95. In this regard, if the degree of match between the value for the scanned retina and the prestored value for the retina of the authorized user meets a threshold requirement (e.g. 90% match or better) set by the building security controller 2114, then the building security controller 2114 infers that the suspect user 46 is the authorized user and sends a signal to the locking mechanism 2112 to unlock and/or open the door 2110.

If the degree of match received from the card 95 does not exceed the required threshold set by the building security controller 2114 for this room 2102, an additional retina scan may be requested and the above procedure repeated. If the IC card 95 was not removed from the card reader 2104, and if the IC card 95 generates a digital signature before a new retina scan is taken or successfully transmitted into the IC card 95, the verification status output by the card 95 will include the DSFlag for the right retina set to a value of "1," which signals the building security controller 2114 that a new retina scan was not input or correctly received by the IC card 95. When a new retina scan is taken and transmitted to the IC card 95, the DSFlag for the right retina (DSFlag(016)) is reset to zero. Since retina scans of the same eye will generally vary slightly with each scan (as do most scans of other types of biometric information), the building security controller 2114 will be alert to the potential of a fraudulent biometric verification data received by the IC card 95 when a new degree of match determination is exactly identical to a previous determination from the same IC card 95.

Even if the initial degree of match received from the card 95 exceeds the required threshold set by the building security controller 2114 for this room 2102, the building security controller 2114 may nevertheless request a follow-up retina scan from the suspect user 46 simply for the purpose of determining if the initial degree of match determination was fraudulent (i.e., is the follow-up degree of match identical to the initial degree of match?). The building security controller 2114 may also include business logic that denies access to the room 2102 if there is a "perfect" or 100% match between the scanned retina and the prestored retina, since such a comparison also likely indicates a fraudulently input verification data.

Referring to FIG. 22*a*, the suspect user 46 now sits at his desk to access his personal computer 2202. The computer 2202 is conventional in that it includes a keyboard 2204, a monitor 2206, and a mouse 2208. The computer 2202 also includes a card reader 2210, which exchanges data with the computer 2202 through a suitable port (e.g., serial, parallel, USB, etc.) of the computer 2202. The card reader 2210 is similar to those discussed above and is capable of exchanging information with an IC card 95 when inserted therein (or brought within proximity thereof). In the present example, the computer 2202 also includes a microphone 2212 for receipt of audio input, such as the voice of the suspect user 46. Although it is possible to prevent the computer 2202 from powering on without a proper IC card 95 inserted into the card reader 2210, the present example assumes that the computer 2202 will power on and "boot up" to a security screen (using suitable software installed on the computer 2202), but that no substantive access, such as to programs or databases maintained on, or to the operating system of, the computer 2202 is enabled until the suspect user 46 is authenticated.

After powering on, the computer 2202 prompts, on a security screen displayed on the monitor 2206, the suspect user 46 to insert the IC card 95 into card reader 2210, to enter a PIN into a suitable data entry window also displayed on the screen, and to state (audibly) his name—first name, middle initial, and last name—for the purpose of obtaining a voiceprint.

When the IC card 95 is inserted into the reader 2210, the reader 2210 is initialized (as described previously) and the power supplied to the card 95 causes the identification marker and all of the DSFlags on the computer chip 50 to be reset. Once the PIN has been entered using the keyboard 2204 and once the suspect user 46 states his name into the microphone 2212, the computer 2202 transmits both the PIN and a digitized version of the voiceprint, via the card reader 2210, to the IC card 95. The card reader 2210 transmits the value of the PIN and digitized voiceprint along with an identifier (e.g., 001 for the PIN and 020 for the voiceprint) for each to identify to the card 95 the type and order of the verification data input.

Upon receipt of the PIN and biometric verification data by the IC card 95, the controller 64 on the computer chip 50 (referring back to FIG. 18) first determines the type of verification data received based on the identifiers and then retrieves the appropriate prestored data from memory location 76. In this example, the controller 64 first retrieves the prestored data for the PIN from memory location data cell 001 in memory location 76, and then compares the value with the value of the PIN verification data received from the card reader 2210 (Factor B Entity Authentication). A match/no-match determination is made by the controller 64, which sets the value of the Rs as either "01" (match) or "10" (no match). Next, the controller 64 retrieves the prestored data for the authorized user's voiceprint from data cell 020 in memory location 76, and then compares this value with the digitized voiceprint received from the card reader 2210 (Factor C Entity Authentication). A degree of match determination/calculation is made by the controller 64, which sets the value of Rb(020) to a two-digit number corresponding to the percentage match.

After a suitable but brief delay, the computer 2202 then sends a message input command to the IC card 95 via the card reader 2210. In this case, the message input command includes a tag requesting user information from the appropriate data field in memory location 80 (again, as shown in FIG. 18). Again, it is assumed that the message data comprises the tag only and no additional information.

Once the message input command is received by the IC card 95, the computer chip 50 on the IC card 95 retrieves the requested authorized user information (as the message data) from memory location 80; retrieves the current value of the identification marker (which includes the value of Rs and the value of DSFlag(001), which was reset to zero when the card was inserted into the card reader 2210, and which also includes the value of Rb(020) and the value of the DSFlag (020), which was also reset to zero), modifies the message data with the identification marker by pre-pending the value to the message data, calculates a hash value of the modified message data, encrypts the hash value to generate a digital signature, and exports the digital signature, requested user information, and value of the identification marker to the card reader 2210. The computer chip 50 then increments the value of all of the DSFlags on the computer chip 50 to "1" (at a minimum, the DSFlags for the PIN and for the voiceprint, namely DSFlag(001) and DSFlag(020), are incremented to "1").

The digital signature, user information, and value of the identification marker received by the card reader 2210 are then communicated to the computer 2202 for processing. If the computer 2202 is a stand-alone computer, processing is performed within the computer 2202 itself. More likely, however, computer 2202 will be networked and in communication with a server (not shown), which will actually determine whether the suspect user 46 will gain access to the computer 2202.

Assuming a server is involved, the server first confirms that the user information received from the IC card 95 matches an authorized user name or employee account number for access to and use of the specific computer 2202. The server then decrypts the digital signature using the public key associated with the matching user information. If the decrypted hash value from the digital signature matches a hash value calculated based on the user information received from the IC card 95, as modified by the value of the identification marker received from the IC card 95, then the server determines that the IC card 95 from which the digital signature is received contains the unique private key. Finally, the server checks the verification status indicated by the value of the identification marker to determine whether the suspect user 46 is in fact the authorized user of the IC card 95. This is a two-step process since two different types of verification data have been received by the IC card 95 and used to identify the verification status of the card 95. In the first step, if the value of Rs is "01" (match), then the server infers that the suspect user 46 is the authorized user. In the second step, the server uses business logic or a rule base to determine if the voiceprint provided by the suspect user 46 is sufficiently similar to the voiceprint of the authorized user stored on the IC card 95 so as to infer again that the suspect user 46 is the authorized user.

The business logic and rule base of the server may be programmed to accept varying combinations of Rs and Rb values (PIN and voiceprint) to infer that the suspect user 46 is the authorized user. For example, a correct PIN by itself, a correct PIN plus at least a 70% match of voiceprint, an incorrect PIN if the voiceprint exceeds 95%, and an incorrect PIN but two voiceprints exceeding 90% are all different types of verification statuses that may be sufficient for the server to infer that the suspect user 46 is the authorized user and grant access to the computer 2202. Obviously, the business logic or rule base can vary widely, depending upon the necessary security desired.

Turning now to FIG. 22b, the IC card 95 may also be used by the suspect user 46 in accessing a secure website over an insecure network, such as the Internet 2222. In this further example, we will assume that the suspect user 46 is accessing the secure website 2224 of his broker 2220, with whom he already has an established account. The brokerage company 2220 that operates the website 2224 already has the authorized user's public key from the IC card 95 stored in its account database 2215 and associated with the authorized user's account. We will also assume that the suspect user 46 is accessing the website 2224 using computer 2202 front FIG. 22a and that the card 95 has not been removed from the card reader 2210 since it was used to gain access to the computer 2202; thus, the DSFlags remain set to "1".

When accessing the website 2224, the suspect user 46 enters a user ID in a login screen for the website. The user ID enables the brokerage company 2220 readily to locate the appropriate account of the user, as is conventional. However, rather than encrypting the user ID together with a password and then sending the encrypted information over the Internet, the computer 2202 sends the user ID to the IC card 95 via the card reader 2210. The process by which the website 2224 instructs the computer 2202 to send the user ID to the IC card 95 rather than directly over the Internet to the website 2224 is beyond the scope of this invention; however, it may be readily accomplished in several different manners. In one example, the website 2224 has a dedicated login page for use only by users having a suitable IC card 95 (or other device of the present invention), in which case, entry of the user ID into such login page automatically instructs the computer 2202 to send the user ID to the IC card 95 for processing. Alternatively, the login page for the website 2224 could enable the user to select a conventional login using an ID and password or to login using his IC card 95. In either of the above examples, the user ID could actually be prestored in a "cookie" in memory on the computer 2202, as is conventional, which would enable the user merely, to click one button on the login page of the website 2224, which causes the computer 2202 to send the user ID to the IC card 95.

Once a message input command comprising the user ID is received by the IC card 95, the computer chip 50 on the IC card 95 retrieves the current value of the identification marker, modifies the user ID received from the card reader 2210 with the value of the identification marker by pre-pending the value to the user ID, calculates a hash value of the modified user ID, encrypts the hash value to generate a digital signature, and returns the digital signature and the value of the identification marker to the computer 2202 via the card reader 2210. In this case, the values of the DSFlags are not incremented since they are already set to a value of "1."

The user ID, the digital signature, and value of the identification marker then are communicated in an EC by the computer 2202 over the Internet 2222 to the website 2224 for processing. Computer programming associated with the website 2224 first confirms that the suspect user 46 maintains an account with the brokerage company by matching the user ID with an account. If an account with a matching user ID is found, then the computer programming next decrypts the digital signature using the public key associated with the identified account. If the decrypted hash value from the digital signature matches a hash value calculated based on the user ID received from the IC card 95, as modified by the value of the identification marker received from the IC card 95, then it is determined that the IC card 95 from which the digital signature is received contains the unique private key corresponding with the account of the user. Finally, the computer programming associated with the website 2224 checks the verification status indicated by the value of the identification marker to determine whether the suspect user 46 is in fact the authorized user of the IC card 95.

Preferably, the computer programming extracts only the value of the Rs from the value of the identification marker for initial evaluation. If the value of Rs is "00" (no PIN input), then the website 2224 sends a request data back to the computer 2202 requesting input of the user's PIN. If the value of Rs is "10" (incorrect PIN), then the website 2224 sends a request for the suspect user 46 to reenter the PIN. In either case, a suitable screen is displayed on the monitor 2206 of the computer 2202 to enable the suspect user 46 to enter the PIN. It should again be emphasized that such PIN will be transmitted by a keyboard of the computer 2202 to the card 95 but not transmitted over the Internet 2222. If the value of Rs is "01" (correct PIN), then the website 2224 infers that the suspect user 46 is in fact the authorized user and grants access to the website 2224. Thus, for mere access to the website 2224, it is not necessary that the PIN be entered just prior to the generation of the digital signature for the user ID—previous entry of a correct PIN is satisfactory for access to the website 2224.

On the other hand, if after perusing the website 2224, the "now-authorized" user requests a transaction, such as purchase of stock, then the website 2224 transmits a detailed confirmation of the requested transaction and specifically requests entry of a PIN to confirm specific approval for the purchase order. Once the PIN has been input by the suspect user 46, the computer 2202 provides the same to the IC card 95.

Upon receipt of the PIN, the controller 64 first retrieves the prestored data for the PIN from memory location data cell 001 in memory location 76 and compares it with the PIN received from the computer 2202. A match/no-match determination then is made by the controller 64, and the value of Rs is set to either "01" representing a match or to "10" representing a failed match, and the DSFlag(001) also is set to "0".

After a suitable but brief delay, the computer 2202 then sends a message input command (which contains the purchase order) to the IC card 95. The computer chip 50 on the IC card 95 retrieves the current value of the identification marker (including therein the value of Rs and DSFlag(001)); modifies the message data received from the computer 2202 with the value of the identification marker by pre-pending the value to the message data; calculates a hash value of the modified message data; encrypts the hash value to generate a digital signature; and exports the digital signature and value of the identification marker to the computer 2202, which then forwards the same on to the website 2224. The computer chip 50 then increments the value of all of the DSFlags to "1." In this example, the website 2224 will only approve the requested transaction when the value of the identification marker includes therein a value of Rs of "01" and a value of DSFlag(001) as "0".

If desired, the communication between the computer 2202 and the website 2224 may be performed using a Secure Socket Layering (SSL) protocol, as is conventional. Such a protocol is set forth, for example, in U.S. Pat. No. 5,848,161, which is incorporated herein by reference. In such protocol, it is customary for the computer 2202 to generate a random number for use in creating a session key for the SSL communication. In accordance with a further aspect of the present invention, the IC card 95 is used for the provision of the random number for creation of the session key. In particular, a digital signature is originated by the IC card 95 and used as the random number itself for the purpose of creating the session key. An indirect result of the DSA and ECDSA specified in FIPS PUB 186-2 is that the resulting digital signature itself is a random number. A session key for communication using pretty good privacy (PGP) encryption also may be created based on the digital signature of the IC card 95.

Turning now to FIG. 23, use of the IC card 95 at a point of sale location is illustrated. A point of sale card reader 2308 includes an alphanumeric keypad 2310, a display 2314, and, in this case, a thumbprint reader 2312. The point of sale card reader 2308 is in communication via data connector 2306 with a merchant cash register/terminal 2302, which has its own display 2304. The point of sale card reader 2308 is also in communication over an insecure network, such as the Internet 2322, with a banking authority 2320. The banking authority 2320 is either a financial institution that maintains a banking or credit card account on behalf of the authorized user of the IC card 95 or is an authorized approval agent or clearance authority for such a financial institution. In either case, the banking authority 2320 maintains a database 2315, which associates the public key of the card 95 with the corresponding account of the authorized user of the IC card 95, and has the authority to approve or disapprove online transactions requested against such account.

When an item is purchased by the suspect user 46, the merchant "rings up" the item on the merchant cash register/terminal 2302 and the total balance due is displayed to the suspect user 46 on the display 2304. To pay, the suspect user 46 inserts the IC card 95 into the point of sale card reader 2308 (or brings the IC card 95 into proximity to the card reader 2308). Upon insertion (or approach), the point of sale card reader 2308 is initialized in a manner similar to the card readers previously described. The identification marker and all the DSFlags on the computer chip 50 of the IC card 95 are reset when power is first supplied to the card 95 by the point of sale card reader 2308.

Next, the merchant cash register/terminal 2302 transmits the balance due to the point of sale card reader 2308 via data connector 2306. The point of sale card reader 2308 displays the balance due on display 2314. In one implementation, the display 2314 also prompts the suspect user 46 to select whether he wants to pay using either a debit account or a credit card account. In an alternative implementation, the point of sale card reader 2308 sends a "retrieve account information" command to the IC card 95, which returns a list of all available checking, credit card, or other accounts maintained in memory location 80 on the computer chip 50 from which payment may be made. In this alternative implementation, the display 2314 prompts the suspect user 46 to select one of the retrieved accounts for payment. The display 2314 next prompts the suspect user 46 to enter a PIN using the alphanumeric keypad 2310 and to place his right thumb on the thumbprint scanner 2312. Once the PIN and thumbprint have been input, the point of sale card reader 2308 transmits both the PIN and a digitized version of the thumbprint to the IC card 95. The card reader 2308 transmits the value of the PIN and digitized thumbprint along with an identifier (e.g., 001 for the PIN and 002 for the thumbprint) for each so that the card 95 "knows" the type and order of the verification data input.

Upon receipt of the PIN and digitized version of the thumbprint by the IC card 95, the computer chip 50 on the card 95 identifies the verification status of the IC card 95 in the manner previously described. After a suitable but brief delay, the point of sale card reader 2308 then sends a message input command to the IC card 95. In this case, the message input command includes message data comprising a receipt for the item purchased, the total balance due, and the payment account specified by the suspect user 46. In the first implementation, the account would be retrieved from memory location 80 (on the computer chip 50) and inserted into the message data using a suitable "tag," indicating whether the primary debit account or primary credit card account number should be used. In the alternative implementation, the account number for the account specifically selected by the suspect user 46 from the list of available accounts displayed on display 2314 is included in the message data received from the card reader 2308.

Once the message input command is received by the IC card 95, the computer chip 50 on the IC card 95 retrieves the current value of the identification marker (including therein the value of Rs and DSFlag(001), and including therein the values of Rb(002) and DSFlag(002)), modifies the message data received from the point of sale card reader 2308 with the value of the identification marker by pre-pending the value to the message data, calculates a hash value of the modified message data, encrypts the hash value to generate a digital signature, and exports the digital signature and value of the identification marker to the point of sale card reader 2308. The computer chip 50 then increments the value of all of the DSFlags to "1." The digital signature, value of the identification marker, and message data (including account number and amount of the purchase) are then communicated by the point of sale card reader 2308 to banking authority 2320 for processing.

The banking authority 2320 first confirms that the specified account number is a valid account number. The banking authority 2320 then decrypts the digital signature using the public key associated with the identified account number in the database 2315. If the decrypted hash value from the digital signature matches a hash value of the message data, as modified by the value of the identification marker received from the IC card 95, then it is determined that the IC card 95 from which the digital signature is received contains the unique private key and that the message data containing the receipt and total balance due has not been modified since it was digitally signed.

Next, the banking authority 2320 checks the verification status indicated by the value of the identification marker provided by the IC card 95 to determine whether the suspect user 46 is in fact the authorized user of the IC card 95. This is a two-step process as two different types of verification data are received by the IC card 95 and used to identify the verification status of the IC card 95. In the first step, if the value of Rs is "01" (match), then the banking authority 2320 infers that the suspect user 46 is the authorized user. In the second step, the banking authority 2320 uses business logic or a rule base to determine if the thumbprint provided by the suspect user 46 is sufficiently similar to the thumbprint of the authorized user stored on the card 95 so as to infer again that the suspect user 46 is the authorized user.

The business logic and rule base of the banking authority 2320 is such that it may rely upon varying combinations of values for Rs (PIN) and Rb(002) (thumbprint) in accepting the suspect user 46 as the authorized user. For example, a correct PIN by itself, a correct PIN plus at least a 60% match of thumbprint, an incorrect PIN if the thumbprint exceeds 96%, and an incorrect PIN but two thumbprints exceeding 90% (but not identical) are all different types of verification statuses that may be sufficient for the banking authority 2320 to accept Factors B and C Entity Authentication of the suspect user 46 by the card 95.

Finally, if the specified account has a sufficient balance or credit to cover the requested purchase amount and there are no other factors (e.g. card reported stolen, duplicate request, etc.) that would warrant refusal of the transaction, the banking authority 2320 grants approval of the transaction and transmit confirmation of the same back to the point of sale card reader 2308. Obviously, the business logic, rule base, and other factors that are taken into consideration by the banking authority 2320 can vary widely, depending upon the necessary level of security desired by the banking authority 2320.

B. Second Aspect of the Present Invention: Reliably Identifying Information Regarding Device Generating Digital Signature A Second aspect of the present invention includes the linking of a public key of a device with other information within the environment of manufacture of the device and later identifying of the other information regarding the device after its release from the manufacturing environment based upon its public key. By considering such information later identified, a recipient is able to gauge a risk or likelihood of whether a digital signature using the private key belonging to the device was generated fraudulently. Specifically, the information linked with the public key of the device comprises the Security Profile of the device. Accordingly, the recipient is able to determine a current security level of the device based on the identified security aspects of the device. The recipient also is able to gauge a risk of whether the private key of the device was compromised based on the identified security characteristics of the device, and the recipient is able to gauge a risk of whether the device containing the private key was fraudulently used based on the identified authentication capabilities of the device. Finally, the recipient is able to evaluate the stated security aspects of the device based upon the identified manufacturing history of the device in order to determine an assurance level of the device.

In accordance with a first preferred aspect of the Second aspect of the present invention, and with reference to FIG. 26, devices—as represented by device 2604—are manufactured at a secure manufacturing facility 2602 in a secure environment 2614 (i.e., an environment having a sufficient security rating so as not to compromise the security level of any device manufactured in such environment). Before each device 2604 is removed from the secure environment 2614, a respective public-private key pair is created preferably within each device 2604, and the public key 2618 is exported and linked to a respective Security Profile 2620 of the device 2604 within the secure database.

In particular, one of the keys—the public key 2618—is recorded in the secure database 2610 by a Secure Entity, and the other key—the private key 2616—is retained within the device 2604 and safeguarded against discovery. The public key 2618 also is stored within the device 2604 and is exportable upon demand. A respective Security Profile 2620 for each device 2604 is composed preferably by the manufacturer 2602 and then recorded by the Secure Entity 2612 in the secure database 2610, with the record therefor being indexed or mapped to the corresponding public key 2618, thereby reliably linking together both the public key 2618 and Security Profile 2620 of the device 2604. Moreover, since each public key 2618 is unique—at least to a high degree of probability—the mapping in the secure database 2610 is one-to-one. Alternatively, the public key 2618 and Security Profile 2620 are indexed to a unique identifier of the device 2604 within the secure database 2610, thereby reliably linking together the public key 2618 and Security Profile 2620 of the device 2604, whereby a security level and an assurance level of the device 2604 may be determined.

The preferred manufacturing steps performed within the secure environment 2614 expressly are set forth in FIG. 27. With reference to both FIGS. 26 and 27, the public-private key pair is created (Step 2702) within the device 2604 during its manufacture in the facility 2602 and before the device 2604 is released from the secure environment 2614. Preferably the public-private key pair is created with a random number generator disposed within the device 2604 itself. The private key 2616 (PrK) is retained within the device 2604, while the corresponding public key (PuK) 2618 is exported (Step 2704) from the device 2604 and recorded (Step 2706) in the secure database 2610 before the device 2604 is released from the secure environment 2614. If desired, the public key 2618 also may be retained (not shown) within the device 2604 for later export upon demand after release of the device 2604 from the secure environment 2614. The private key 2616 is utilized, for example, in generating a digital signature (DS) for a message (M) that is communicated to the recipient 2608. In addition to the public key 2618, a Security Profile 2620 of the device 2604 is compiled and recorded (Step 2708) in the secure database 2610 and indexed to the public key 2618, whereby the Security Profile 2620 is retrievable from the secure database 2610 based on knowledge of the public key 2618. The public key 2618 and Security Profile 2620 are thereby securely linked together.

Following population of the secure database 2610 with the public key 2618 and Security Profile 2620 of each device 2604, the device 2604 is released from the secure environment 2614 into the world 2606. The secure database 2610, however, is maintained (Step 2710) in the secure environment 2614 to preserve the integrity of the data recorded therein. Furthermore, following manufacture the security rating of the secured environment 2614 is maintained at a level that is at least as comparable to, and preferably greater than, the security level of each device 2604 manufactured at the facility 2602 for which the public key 2618 and Security Profile 2620 are maintained in the secure database 2610.

The facility 2602 and the secure database 2610 are located within a secure environment 2614, which represents any and all locations having a sufficient security rating so as not to compromise the security level of the device 2604 manufactured in the facility 2602. As will be apparent, the facility 2602 and the secure database 2610 need not be co-located at the same physical location in order to be within the secure environment 2614. Nor must the manufacturer 2602 of the device be the Secure Entity 2612 that maintains the secure database 2610, although such possibility is within the scope of the present invention.

After manufacture, each device 2604 is released into the world 2606. In this respect, each device 2604 may be delivered directly to an individual for use or, alternatively, delivered from the manufacturing facility 2602 to a processing facility (not shown) whereat the device 2604 may be customized for a particular financial institution or other third party, and then delivered to an individual. In either event, and with reference now to FIGS. 28-31, a digital signature (DS) is originated (Step 2902) for a message (M) somewhere in the world 2606 with a suspect device. The suspect device may be the genuine device 2604 manufactured at the facility 2602 of FIG. 26 that is legitimately used, the genuine device 2604 that is fraudulently used, or a counterfeit device having a replica of the private key 2616 of the genuine device 2604. The digital signature then is combined (Step 2904) with the message to form an EC 2622, which is sent (Step 2906) to the recipient 2608 over any conventional secure or insecure electronic communications network, such as the Internet or a private network.

The recipient 2608 receives the EC 2622 (Step 3002) and attempts to authenticate (Step 3004) the message using a suspect device public key 2624. The suspect device public key 2624 is provided to the recipient 2608 and, preferably, is included within the EC 2622 that is received by the recipient 2608, whereby the recipient 2608 may readily attempt authentication of the message. Alternatively, the suspect device public key 2624 is identified to the recipient 2608 before or after receipt of the EC 2622 in such a manner that the recipient 2608 is able to associate the suspect device public key 2624 with the EC 2622.

In any event, if the message successfully authenticates using the suspect device public key 2624, and if the message is the first message authenticated using the suspect device public key 2624, then the recipient 2608 sends (Step 3006) the suspect device public key 2624 to the Secure Entity 2612 that manages the secure database 2610 and requests a Security Profile associated with that public key 2624. Communications between the recipient 2608 and the Secure Entity 2612 are by way of any conventional secure or insecure electronic communications network, such as the Internet or a private network.

When the Secure Entity 2612 receives (Step 3104) the suspect device public key 2624 from the recipient 2608, the Secure Entity 2612 compares (Step 3106) the suspect device public key 2624 against the exported public keys maintained in the secure database 2610 to determine if there is a match. If a match is found, then the Security Profile associated with the matching exported public key is retrieved and, for the purpose of maintaining the integrity of the information during transit, digitally signed (Step 3108) by the Secure Entity 2612. The Security Profile and digital signature therefor create a "Security Certificate" (SC) 2026 that then is forwarded (Step 3110) to the recipient 2608. Preferably, the public key 2618 of the manufactured device 2604 matching the suspect device public key 2624 is included in the Security Certificate 2026 for confirmation by the recipient 2608 of the public key 2618 to which the Security Certificate 2026 pertains.

Upon receipt (Step 3008) of the Security Certificate 2026 from the Secure Entity 2612, the authenticity of the Security Certificate 2026 is checked (Step 3010) using a public key 2618 (SE PuK) of the Secure Entity 2612, which preferably has been communicated (Step 3102) to the recipient 2608 beforehand. Subsequently, upon a successful authentication, the Security Profile contained in the authenticated Security Certificate 2026 is identified as the Security Profile 2620 of the genuine device 2604 to which belongs the private key 2616 used to digitally sign the message of the EC 2622.

Thereafter, the recipient 2608 gauges the risk of whether the use of the private key 2616 of the genuine device 2604 to digitally sign the message of the EC 2622 was fraudulent based on the identified Security Profile. The Security Certificate 2026 also is recorded by the recipient 2608 in an "in-house" database maintained by the recipient 2608, whereby the same suspect device public key 2624 used to authenticate future ECs may be referenced against this in-house database for identifying the appropriate Security Profile, rather than again sending a request for the Security Profile to the Secure Entity 2612. Accordingly, another request need not be made unless and until the Security Profile has been updated by the Secure Entity 2612.

In an alternative aspects of the Second aspect of the Present Invention, a Secure Entity generates a reference containing device public keys and corresponding Security Profiles linked thereto for a plurality of devices manufactured at a secure manufacturing facility and communicates the reference to a recipient. The reference is embodied in print or electronic media and includes a list of Security Profiles of manufactured devices indexed by their respective public keys. Furthermore, the reference preferably is digitally signed by the Secure Entity, whereby the recipient may securely rely upon the information contained in the reference when successfully authenticated with a public key of the Secure Entity. Thereafter, the recipient only need compare each suspect device public key that successfully authenticates a message against the device public keys included in the reference, rather than actually send each suspect device public key to the Secure Entity for a Security Profile. The recipient thereby is readily able to identify the Security Profile of the genuine device to which belongs the private key used to digitally sign the message.

With particular reference to FIG. 32, and in accordance with this second preferred aspect, a public-private key pair is created (Step 3202) within each device during its manufacture and before the devices are removed from a secure environment 3214. The respective private key of each device is retained securely within the device, and the respective public key is exported from each device (Step 3204) and recorded (Step 3206) in a secure database together with the respective Security Profile of each device. The respective public key may also be retained within each device and be exportable upon demand. Each Security Profile is indexed with the exported public key (Step 3208) of the respective device, whereby the Security Profile of the device is retrievable from the secure database based on the public key. Following population of the secure database with the public key and Security Profile of the device, the Secure Entity creates and preferably digitally signs (Step 3210) a reference including the Security Profiles and public keys linked therewith for the respective devices. As will be appreciated by one of ordinary skill in the art, all of the Steps 3202-3210 occur within the secure environment 3214.

Following release of the devices from the secure environment 3214, and with reference now to FIGS. 33-36, a digital signature is originated (Step 3402) for a message (M) somewhere in the world 3306 with a suspect device, and the digital signature is combined (Step 3404) with the message to form an EC 3322, which is then sent (Step 3406) to the recipient 3308. The recipient 3308 receives the EC 3322 (Step 3504) and attempts to authenticate (Step 3506) the message using a suspect device public key sent within the EC 3322 or otherwise provided to the recipient 3308.

Upon successful authentication of the message, the recipient 3308 compares the suspect device public key against the public keys included in the reference 3330 created by the Secure Entity 3312. The reference 3330 is forwarded (Step 3606) to the recipient 3308 and received and authenticated (Step 3502) by the recipient 3308 preferably before the receipt of the EC 3322. Also, in order that the recipient 3308 may authenticate the reference 3330, the public key 3328 (SE PuK) of the Secure Entity 3312 also preferably is communicated (Step 3602) in a secure manner beforehand. Then, if the suspect device public key matches a public key in the reference 3330, the Security Profile of the genuine device to which belongs the private key used to digitally sign the message is identified. Subsequently, the recipient 3308 is able to gauge, based on the identified Security Profile, a risk that the private key of the genuine device was fraudulently used to digitally sign the message of the EC 3322.

In yet a third alternative preferred aspect of the Second aspect, a Security Certificate for a respective device is incorporated into the manufactured device prior to its release from the secure environment of its manufacture. In this regard, and with reference to FIG. 37, a pair of keys are created (Step 3702) within the device during its manufacture and before its release from a secure environment 3714. The private key is securely retained within the device, and the public key is exported (Step 3704) from the device and may also be retained within the device and be exportable upon demand. The exported public key is combined with a Security Profile of the device and digitally signed (Step 3706) by the Secure Entity to form the Security Certificate. The Security Certificate then is imported (Step 3708) into the device itself and is exportable from the device with a digital signature for inclusion in an EC.

Thereafter, with reference to FIGS. 38-16, a suspect device originates (Step 3902) a digital signature for a message (M) somewhere in the world 3806. The digital signature and Security Certificate of the device are then exported from the device and combined (Step 3904) with the message to form an EC 3822, which then is sent (Step 3906) to the recipient 3808. Upon receipt (Step 4004) of the EC 3822 by the recipient 3808, the suspect device public key identified in the Security Certificate is used to authenticate (Step 4006) the message, and the Secure Entity's public key 3828—which preferably is communicated (Step 4102) by the Secure Entity 3812 and received (Step 4002) by the recipient 3808 beforehand—is used to authenticate (Step 4008) the Security Certificate. Upon successful authentication, the Security Profile of a genuine device to which belongs the private key used to generate the digital signature is thereby identified to the recipient 3808. Based on the identified Security Profile, the recipient 3808 is able to gauge the risk that the private key of the genuine device was fraudulently used to digitally sign the message of the EC 3822. Furthermore, because the public key is bound with the Security Profile in the Security Certificate during the manufacture of the device in the secure environment, the recipient 3808 is able to rely upon the Security Certificate corresponding, in fact, to the genuine device.

Benefits of this third alternative aspect include the elimination of the requirement that the recipient 3808 transmit a suspect device public key to the Secure Entity 3812, and the elimination of the requirement that the Secure Entity 3812 transmit the a Security Profile directly to the recipient 3808. Of course, a disadvantage to this preferred aspect is that the entire system is compromised if the Secure Entity's private key used to digitally sign Security Certificates is compromised.

4. Variations of the Preferred Aspects of the Second Aspect

In the first and second preferred aspects of the Second aspect of the present invention set forth above, the Security Profile of each device is indexed in the secure database to the public key of the device and is retrievable from the secure database based on the public key. In a variation of these two preferred aspects (not shown), the Security Profile and public key of each device is recorded in the secure database and are indexed to a unique device identifier, which may comprise, for example, an account number written into the device during its manufacture, a serial number manufactured within the device during its manufacture, or the like. The device identifier is exportable from the device for inclusion with each digital signature generated by the device. Upon receipt of an EC including the digital signature and device identifier, a recipient then obtains the suspect device public key by cross-referencing the device identifier with a known database or reference for public keys and Security Profiles linked therewith. In this regard, the recipient forwards the device identifier to a Secure Entity for identifying the suspect device public key and Security Profile therefor, or the recipient compares the device identifier in a reference published by the Secure Entity that includes public keys and linked Security Profiles indexed by device identifiers. The methodology is similar to that described above for the first and second preferred aspects, the primary difference being that the recipient must contact the Secure Entity or check a reference prior to attempting to authenticate a received message. In the first and second preferred aspects in which the Security Profile of each device is indexed to its public key, the recipient only need contact the Secure Entity or check a reference if the message first authenticates using the suspect device public key included with the message.

In a variation of the first, second, and third preferred aspects of this Second aspect of the present invention, the Secure Entity receives the EC and, itself, identifies the Security Profile of the genuine device to which belongs the private key used to digitally sign the message. Furthermore, the EC in this case either may be sent directly to the Secure Entity or may be forwarded to the Secure Entity by a recipient for gauging of the risk that the private key of the genuine device was fraudulently used to digitally sign the message.

Preferably, the steps set forth above with regard to FIGS. 30-31; FIGS. 35-36; and FIGS. 40-41 are computer automated, and the entire sequence of events of each respective group of figures occurs within a small time interval on the order of magnitude of minutes, if not seconds.

In view of the foregoing detailed description of preferred implementations of the Second aspect of the present invention, it will be apparent to those having ordinary skill in the art that by: creating the respective public-private key pair of each device within the device itself before release from the secure environment of its manufacture; exporting only the public key from the device and retaining the private key within the device against the possibility of export; and securely linking the exported public key of the device with other information within the secure environment of manufacture of the device, each device is thereby rendered unique with respect to all of the other devices. Moreover, because of the secure environment in which the devices are manufactured and the secure linking of the public key with the other information, the uniqueness of the devices may be relied upon by third-parties—such as future Account Authorities—even though such third-parties may not have had any control or involvement in the actual manufacturing of the devices. The secure binding of the public key with each device within the environment of the manufacture of the device provides the required trust for relying upon the uniqueness of the devices, as each device later may be identified based upon the private key retained therein, and only therein.

A benefit this manufacturing process is that it provides the ability to transport devices from their place of manufacture to additional processing facilities where the devices are initialized with regard to particular Account Authorities without high levels of security otherwise conventionally utilized. For example, armored cars and guards are routinely used to protect the delivery of credit card and IC card supplies to a processing facility for initialization for a particular financial institution. Indeed, as a result of the manufacturing process of the present invention, a facility at which additional processing takes place on behalf of a particular Account Authority now may authenticate each device prior to its initialization and independent of the transport of the device from the manufacturing facility. Moreover, because of the ability to authenticate a particular device immediately following its manufacture and thereafter, the system of using of a single device for making transactions on multiple accounts maintained with different Account Authorities is now enabled with higher levels of trust not otherwise found in the conventional art.

Indeed, typically if each device is delivered to a manufacturing facility for further processing, the device is transported under armed guard because of the risk that the device may be stolen and customized for the financial institution in such a manner as to perpetuate fraudulent transactions. As a benefit of the manufacturing process of the present invention, which serves to individualize each device based on the public-private key pair, devices released from the manufacturing facility do not require the same levels of protection as conventionally provided when transported to a processing facility, as each device may be authenticated by the processing facility upon arrival and independent of the path of delivery between the manufacturing facility and the processing facility.

The Second aspect of the present invention also includes establishing an initial PuK-linked account database and is based partially upon the first preferred aspect set forth above. In this regard, the establishment of a database for a plurality of manufactured devices as described above—wherein each device has a unique record including its public key and other information regarding the device—represents a database that may be built upon in creating an initial PuK-linked account database for a plurality of customers and/or consumers (generically referred to herein as "customers") of a third party.

Specifically, with reference to FIG. 42, a third party 4232 provides services and/or goods 4234 to each of a plurality of customers 4236 and, in connection therewith, maintains a database 4238 of account records for the customers 4236. For example, and without limitation, the third party 4232 (herein referred to as an "Account Authority") may be a financial institution including a bank, finance company, or insurance company; merchant; Internet service provider; telecommunication provider; medical provider; government entity; or utility company. The account database 4238 typically is established one account at a time on a per customer basis as each customer 4236 engages the Account Authority 4232, and each database record for the customer 4236 typically is indexed within the database 4238 by a unique account number.

In accordance with this second preferred aspect, and with reference to FIG. 43, a predetermined number of devices 4304 are manufactured in a secure environment 4214 in accordance with the first and second preferred aspects of the First aspect of the present invention. In accordance with the second preferred aspect of the Second aspect present invention, the devices 4304 are earmarked for the Account Authority 4232, and database records 4840 in the secure database 4310 corresponding to the devices 4304 are communicated in a secure manner 4214' to the Account Authority 4232. The earmarked devices 4304 also are distributed to the customers 4236 of the Account Authority 4232.

Upon receipt of the PuK-linked database records 18440 by the Account Authority 4232, the database records 4840 represent an initial PuK-linked account database for the Account Authority 4232. The database records 4840 preferably include the public keys 4318 of the devices 4304 and the Security Profiles 4320 of the devices 4304 as described above with respect to the first and second preferred implementations of the first aspect of the present invention. Moreover, the database records 4840 are preferably digitally signed by the Secure Entity 4312 for security in transit from the Secure Entity 4312 to the Account Authority 4232.

An example of the preferred database records 4840 are shown in FIG. 19. As set forth in the background section above, the Security Profile includes security aspects of the device—specifications for which are set forth for example in FIPS PUBS 140-1 and 140-2—as well as a manufacturing history of the device as specified, for example, in *Smart Card Protection Profile*. Moreover, in accordance with the preferred implementations of the present invention the security aspects of the Security Profile include security characteristics and authentication capabilities of the device.

Once received, the Account Authority 4232 updates the PuK-linked account database records with specific information of the customers 4236 and their accounts. However, before such an association is made between a particular customer's account and a record of the initial PuK-linked account database, the particular customer 4236 preferably is authenticated to the Account Authority 4232 with respect to that customer's account. Accordingly, entity authentication techniques are used for authenticating the customer 4236 with respect to a record in the account database. Such authentication techniques may include questioning the particular customer 4236 about specific-account associated information in the record or requiring the particular customer 4236 to provide a Secret or other entity information, such as the maiden name of the mother of the customer (Factor B Entity Authentication).

Additionally, the Account Authority 4232 preferably verifies that a customer 4236 has received the correct device 4304. The device 4304 received by a customer 4236 is identified by having the customer 4236 digitally sign a message with the private key of the device 4304 and transmit the message and digital signature in a respective EC 4322 that is sent to the Account Authority 4232 for Factor A Entity Authentication. The Account Authority 4232 authenticates the message using a public key of the device 4304 that preferably is included in the EC 4322. Furthermore, upon a successful authentication of the message, the Account Authority 4232 identifies the record in the initial PuK-linked account database corresponding to the public key successfully authenticating the message for association with the account of the customer 4236.

If additional security is required, each device may include an initialization PIN that first must be entered by a customer before functioning. Upon the correct entry of the initialization PIN, each customer preferably then enters a personalization PIN that must be entered, for example, each time the device is used thereafter. The initialization PINs preferably are distributed to the customers separately from the devices. Moreover, the use of an initialization PIN and a personalization Pin in each device preferably is included in each database record as part of the authentication capabilities of the respective device.

A number of alternative techniques for verifying that the customers received the correct cards also could be used. For example, each customer could be required to call a particular number from his or her home and input over the telephone a number printed on each respective device in order to effect association of the device with the customer's account.

Once sufficient authentication is completed, the customer-specific information may be associated with the PuK-linked account database record in various ways. First, the initial PuK-linked account database record may be merged with a preexisting account database of the customer maintained by the Account Authority, which contains the customer-specific information. Second, the initial PuK-linked account database may be maintained separately from but indexed by an identifier with a preexisting account database of the customer containing the customer-specific information. Third, the Account Authority simply may obtain the customer-specific information from the customer following authentication and update the PuK-linked account database record accordingly.

This second aspect of the present invention also is useful in establishing accounts for new customers of the Account Authority. In this regard, devices are distributed in the same manner as set forth in FIG. 43, but to potential customers of the Account Authority rather than to existing customers. However, in this scenario entity authentication with respect to preexisting accounts is not required, as new accounts are established by the potential customers. Nevertheless, Factor A Entity Authentication remains important in associating a customer with one of the particular PuK-linked records.

With respect to the establishment of new accounts, under an "anonymous" framework the manufactured devices are distributed to the customers, and the goods and/or services are provided to the customers without regard to any customer-specific information, i.e., the goods and/or services are provided on a per device basis as identified by the public key of the device, and are not necessarily on a per customer basis. Thus, upon successful authentication with a public key of a message digitally signed by one of the devices, the account identified by the public key is activated and nothing further is required.

On the other hand, under a "personalized" framework each new customer provides customer-specific information to the Account Authority, and the Account Authority updates the initial PuK-linked account database by associating the customer-specific information with the respective PuK-linked database record of that customer's device (as identified by the public key of that device). Again, the Account Authority in this situation does not need to authenticate the new customer with respect to any existing account.

An example of a new business method of establishing a initial PuK-linked account database in accordance with the second aspect of the present invention comprises establishing new customers for an Internet service provider (ISP). First, a number of manufactured devices such as dongles, for instance, are manufactured in accordance with the first aspect of the present invention and mailed to a plurality of prospective customers of the ISP. Each dongle is packaged with a CD-ROM including software for setting up and connecting to the ISP and the Internet from a potential customer's computer. The dongle and CD-ROM also may be distributed as an insert in a magazine, for example. Upon receipt, the prospective customer installs the software in his or her computer and attaches the dongle to an appropriate port of the computer. Then, when the computer connects with the ISP, an EC is communicated to the ISP that includes a digital signature generated utilizing a private key retained within the dongle as well as a public key retained within and exported from the dongle. Upon receipt of the EC, the ISP authenticates the message using the public key included with the message. Upon authentication, then the ISP compares for a match the public key received with the linked public keys in the initial PuK-linked account database and activates the account having the matching public key. The account record may include a credit of 2600 hours of free internet surfing, for example, as a promotional introduction to the ISP. In this example, no customer-specific information is required and the account is setup under an anonymous framework.

Alternatively, the ISP may require customer-specific information in order to activate the new account, including billing and credit card information from the customer. Upon receipt thereof, the identified record in the PuK-linked account database is updated with this customer-specific information and the account is activated. A resulting updated PuK-linked account database 4540 of the ISP after activation of several accounts might resemble, for instance, that of FIG. 20.

Upon activation of the account, the account preferably is assigned a unique account identifier that is included with each message sent to the ISP for identifying the account to which the message relates. A User ID or account number may serve as the account identifier. The public key is recorded in the PuK-linked account database whereby, upon identifying the appropriate account record with the account identifier, the digitally signed message is authenticated with the associated public key. Alternatively, the public key itself may serves as the account identifier. In either case, access is granted to its network and the Internet by the ISP upon a successful authentication of a digitally signed message (Factor A Entity Authentication).

Another example of a new business method utilizing the aforementioned establishment of a initial PuK-linked account database of this second aspect of the present invention comprises setting up existing customers of a financial institution with IC cards to be used as check cards. In this example, a number of IC cards are manufactured in accordance with the first aspect of the present invention and mailed to a plurality of existing customers of the financial institution who have requested the IC cards. Each manufactured IC card includes a respective initialization PIN that must be sent to the financial institution for activation of the IC card for use on the account. The respective initialization PIN is mailed to each customer separately from the corresponding IC card. Furthermore, each IC card includes recorded therein the account number of the customer to which it is mailed.

The database records of the IC cards recorded in the secure database are transmitted to the financial institution in a secure manner. Upon receipt, the database records represent the initial PuK-linked account database which then are updated and/or merged with the records of the customers in a preexisting account database maintained by the financial institution, the resulting database being a PuK-linked account database. A resulting PuK-linked account database 5040 might resemble, for instance, that of FIG. 21.

Upon separate receipt by each customer of the IC card and initialization PIN, the customer first uses the IC card at an ATM machine of the financial institution by entering the initialization PIN and then communicating to the financial institution an EC including the PIN from the customer and account number from the IC Card digitally signed with the IC card. Upon receipt of the EC, the financial institution authenticates the sender of the EC by retrieving the authorized PIN from the identified account number in the EC and comparing the authorized PIN with the PIN transmitted in the EC. The financial institution similarly authenticates the message with the public key associated with the identified account number. Upon successful verification of the PIN and successful message authentication, the financial institution activates the IC card within the record for use as a check card on the account. Furthermore, after activation of the IC card, messages in ECs representing transactions on the account need only be digitally signed with the IC card and include the account number of the customer. Such ECs need not include any personal information of the customer, such as the customer's name, billing address, a PIN, etc.

The third aspect of the present invention includes establishing multiple third party accounts with a PuK-linked database record and is based partially upon the first and second preferred implementations of the first aspect of the present invention. In this regard, and with reference to FIG. 22, a device 4704 that generates digital signatures is manufactured within a secure environment 4714. Before the device 4704 is released from the secure environment 4714, the public key 4718 of the device 4704 plus some other information is recorded as a database record 2275 in a secure database 4710; preferably, the other information includes the Security Profile 4720 of the device 4704, as described above with respect to the first aspect of the present invention. The device 4704 then is distributed to a customer 4732 and the customer 4732 establishes a respective account with each one of a plurality of desired Account Authorities 4742,4744,4746.

In accordance with the third aspect of the present invention, each PuK-linked account of the customer 4732 is established based upon, at least in part, a communication of the PuK-linked database record 4748 from the secure database 4710 to each of the desired Account Authorities 4742,4744,4746. As set forth above, the PuK-linked database record 4748 preferably includes the public key 4718 and Security Profile 4720 of the device 4704 linked thereto by the Secured Entity 4712. Furthermore, the database record 4748 is communicated in a secure manner 4714' so as to preserve the integrity of the database record 4748.

When received by a respective Account Authority 4742, 4744,4746, the public key 4718 linked to the Security Profile 4720 of the database record 4748 represents an initial PuK-linked account database record of the customer 4732 with the respective Account Authority and, if the customer 4732 is an existing customer of the respective Account Authority, then the initial PuK-linked account database record 4748 preferably is associated with the existing account database record of the customer 4732. However, the association of the PuK-linked account database record 4748 received from the Secure Entity 4712 with the existing account database record of the customer 4732 preferably is performed only after the receipt of the correct device 4704 by the customer 4732 has been verified through one or more of the aforementioned authentication techniques with regard to the second aspect of the present invention.

If the initial PuK-linked account database record represents the only account database record for the customer 4732 (i.e., if the customer is new to an Account Authority), then under a personalized framework the customer 4732 supplies customer-specific information to the Account Authority for recording with the initial PuK-linked account database record of the customer 4732. Under an anonymous framework, no customer-specific information need be provided.

Also under the personalized framework, the device 4704 is activated for use on each account when the customer 4732 sends a message digitally signed using the device 4704 in a respective EC 5122 to each Account Authority 4742,4744, 4746, and when the digitally signed message is authenticated by the respective Account Authority 4742,4744,4746 using the public key associated with the respective PuK-linked account database record 4748.

Under the anonymous framework, each respective account established with an Account Authority 4742,4744,4746 is activated when the customer 4732 sends a message digitally signed using the device 4704 in a respective EC 5122 to each Account Authority 4742,4744,4746, and when the digitally signed message is authenticated by the respective Account Authority 4742,4744,4746 using the public key associated with the respective PuK-linked account database record 4748.

A fifth aspect of the present invention includes gauging the risk of whether a message of an EC representing a transaction on an account and digitally signed with a device is fraudulent and, based thereon, determining whether to perform the transaction. Gauging of the risk is based on identified information that was securely linked with a public key of the device at the time of its manufacture, including the security aspects and manufacturing history of the device, and preferably incorporates the first aspect of the present invention. Gauging of the risk also is based on additional factors, including the transactional account history of digital signatures authenticated using the public key, the environment in which the digital signature for the EC was originated, and other account or business-specific factors, such as whether the transaction is even capable of being performed on the account.

An example of an account database maintained by an Account Authority for a plurality of user accounts in accordance with the fifth aspect of the present invention is illustrated in FIG. 44. This account database corresponds with that of FIG. 21 with "Transactional History" and "PuK-to-Account Authentication" information for each account being added to the account records in conjunction with the Security Profile to form "Risk Management Information." The security aspects and manufacturing history of the device, as well as the public key linked therewith, are associated with the account and may be obtained by an Account Authority as set forth above with respect to the first, second, or third aspects of the present invention, or through any other process considered trustworthy by the Account Authority.

The transactional account history is recorded on the account by the Account Authority, preferably as digitally signed ECs are received. In particular, the Account Authority records the transaction details of each EC in a record of the account. The transactional history may include such factors as the geographic locations of use, amounts of transaction, and frequency of transactions, all of which may be tracked and evaluated by the Account Authority in monitoring for possible fraud. Information such as the number of incorrect entries of data representing a Secret or biometric characteristic used to authenticate a user of the device also may be monitored by the Account Authority, which also may serve to indicate possible fraud.

The PuK-to-Account Authentication is the authentication technique employed when the public key and PuK-linked information were associated with the account maintained by the Account Authority. This information is important in evaluating the risk to be accorded the initial association of the public key and PuK-linked information with the account.

Also in accordance with the fifth aspect of the present invention, the Account Authority notes any factors known about the environment in which the digital signature for the message was originated. Indeed, the environment in which the device is used often is communicated within the EC itself. For example, in financial transactions involving credit charges, an Account Authority—such as an issuing bank—is able to determine whether a card was present at a point of sale for a transaction, or whether the charge occurred otherwise, such as over the Internet. The former scenario is believed to involve a risk of fraud that is substantially less than that of the later scenario. In another example, when an external apparatus such as an I/O support element is used in conjunction with a device to compose a message and originate a digital signature, information regarding the I/O support element is preferably included in the environmental information communicated in the EC. For instance, an I/O support element also may digitally sign an EC, and information regarding the I/O support element linked to the public key of the I/O support element preferably is identified in accordance with the first aspect of the present invention. Indeed, the device may include a card reader comprising hardware and software components designed in accordance with the technical specifications published by CEN/ISSS as a result of the well-known Financial Transactional IC Card Reader Project (known commonly as "FINREAD").

A preferred implementation in accordance with this aspect of the present invention is illustrated in FIG. 45, wherein an Account Authority receives (Step 4902) an EC including a message and a digital signature therefor. The digitally signed message includes an instruction therein representing a transaction on a particular account as identified in the EC by a unique account number. Upon receipt, the Account Authority retrieves (Step 4904) a public key associated with the particular account and then attempts to authenticate (Step 4906) the message of the EC using the public key. If the message does not authenticate in Step 4908, then the Account Authority rejects (Step 4910) the message. If the message authenticates in Step 4908, then the Account Authority further processes (Step 4512) the message.

Further processing (Step 4512) of the message includes consideration (Step 4514) of numerous factors that are used by the Account Authority to gauge the risk that the digital signature was fraudulently generated and, ultimately, to determine whether to perform the transaction on the account. The consideration (Step 4514) includes an evaluation (Step 4916) of the security aspects and manufacturing history of the device linked with the public key of the device within the environment of the manufacturing of the device and, as applicable: an evaluation (Step 4918) of entity authentication provided by the sender of the EC or user of the device; an evaluation (Step 4920) of environmental factors surrounding the origination of the EC; an evaluation (Step 4922) of the transactional history of the device on the account; and an evaluation (Step 4924) of other account or business-specific factors. At a more fundamental level, the PuK-to-Account Authentication also may be considered in gauging the risk of fraud.

Whether the Account Authority considers some or all of the above factors, how much weight the Account Authority applies to any particular factor, and what order the Account Authority makes these evaluations may vary, and the Account Authority uses its own business rules and judgment to determine (Step 4926), based on its own considerations in Step 4514, whether to perform the transaction on the account. If the determination in Step 4926 is negative, then the Account Authority rejects (Step 4910) the message. If the determination in Step 4926 is positive, then the Account Authority performs (Step 4928) the transaction on the account and updates (Step 4930) the account record accordingly. Alternatively, the Account Authority may choose to execute only a limited portion of the instruction (not shown) based on its considerations (Step 4514), or the Account Authority may require additional information from the sender of the EC prior to performing the transaction (not shown).

In a aspect of the present invention, a plurality of different devices are associated with the same user account maintained with the Account Authority. In this situation, the risk of a fraudulent transaction preferably is gauged not on an overall account basis, but rather, on a device-by-device basis for each account. Specifically, the transactional history of digital signatures on the account preferably is recorded and later considered on a device-by-device basis.

Of course, the actual rule base or business logic used by each Account Authority is subjective and necessarily will vary as between Account Authorities. Nevertheless, the reliable identification of the security aspects and manufacturing history of a device—when combined with evaluations of the transactional account history of digital signatures generated by the device, environmental factors in which the digital signature is originated, and other account or business-specific factors—provides added security against fraudulent transactions not otherwise realized.

F. Disseminating PuK-Linked Information of Device Generating Digital Signatures

In accordance with a sixth aspect of the present invention, an entity (herein "Central Key Authority") maintains certain PuK-linked account information of a user (herein "Registration Information") for disseminating to one or more Account Authorities. The Registration Information includes the public key (PuK) of a device of the user that generates digital signatures and one or more of the following types of information: the identity of Account Authorities with which the user has PuK-linked accounts for the device and respective account identifiers that identify each PuK-linked account of the user to the respective Account Authority; information linked with the public key of the device in accordance with the first aspect of the present invention; user-specific information, such as the user's mailing address, credit card information, age, etc.; and, as desired, the authentication techniques that were employed in verifying the user-specific information maintained by the Central Key Authority. Furthermore, the Central Key Authority preferably indexes the Registration Information of the user to a unique account identifier such that the Registration Information may be retrieved based on the account identifier. In this regard, but not shown, the public key may serve as the unique account identifier. An example of a PuK-linked account database 5040 of a Central Key Authority is illustrated in FIG. 46.

In accordance with this aspect of the present invention, the Central Key Authority disseminates some or all of the Registration Information, as appropriate, to Account Authorities. Registration Information is disseminated when the user has an account with an Account Authority—or desires to establish an account with an Account Authority—and desires to send ECs with messages each containing an instruction that represents a transaction on the account, each such message being digitally signed using the device. The dissemination of the Registration Information occurs, for example, when Registration Information maintained by an Account Authority has become outdated for a particular account. Furthermore, the dissemination of the Registration Information may be in accordance with the third aspect of the present invention wherein the PuK-linked account database record is obtained from the Central Key Authority if the Central Key Authority is considered to have sufficient security measures and protocols so as to qualify to be a Secure Entity.

The Registration Information maintained by the Central Key Authority is obtained in various ways. For example, the public key and information linked therewith preferably is obtained from a Secure Entity in accordance with the first, second, or third aspects of the present invention. The identity of the Account Authorities with which the user has PuK-linked accounts for the device, and the account identifier that identifies the PuK-linked account of the user to each such Account Authority, preferably is obtained from the user, and is obtained when the user registers with the Central Key Authority; when, at the instruction of the user, the Central Key Authority establishes an account on behalf of the user with an Account Authority; or when the third party, at the instruction of the user, acquires Registration Information from the Central Key Authority.

An example of efficiency and convenience that may be provided by the Central Key Authority in accordance with this sixth aspect of the present invention comprises the updating of PuK-linked accounts of a user with a new device of the user in place of the user's old (and possibly outdated) device as represented by the respective public keys of the devices. With reference to FIGS. 47-51, such an update preferably is accomplished by a user 5158 by the mere sending (Step 5206) of an EC 5122 to a Central Key Authority 5160 with which the user 5158 has previously registered with an old device as represented by the old public key (PuK1).

The EC 5122 includes a message (M) having an instruction to associate a new public key (PuK2) included in the message with accounts of the user 5158 maintained by certain Account Authorities 5162,5164, which preferably are on register with the Central Key Authority 5160. The message is digitally signed (Step 5202) using the private key (PrK1), and the digital signature (DS) therefor is included (Step 5204) with the message in the EC 5122. The EC 5122 also includes the account identifier (CKA#) for the account maintained by the Central Key Authority 5160.

Upon receipt (Step 5302) of the EC 5122, the Central Key Authority 5160 authenticates (Step 5304) the message (M) of the EC 5122 using the public key (PuK1) associated with the account of the user 5158 maintained by the Central Key Authority 5160 as identified by the unique account identifier (CKA#).

Upon successful authentication, the Central Key Authority 5160 updates (Step 5306) the Registration Information with the new public key (PuK2) and sends (Step 5308) a respective EC 5166,5168 to each of the Account Authorities 5162,5164 identified by the user 5158. Each EC 5162,5164 includes a respective request of the Account Authorities 5162,5164 to associate the new public key (PuK2) with the accounts of the user 5158. The Central Key Authority 5160 also preferably obtains the Security Profile linked with the new public key (PuK2) in accordance with the first aspect of the present invention, and includes the Security Profile with the new public key (PuK2) in the respective request sent to the Account Authorities 5162,5164.

The request preferably is digitally signed (Step 5308) using a private key of the Central Key Authority 5160 for authentication of the request and information therein by each Account Authority 5162,5164, and may include the original EC 5122 received by the Central Key Authority 5160 from the user 5158. Each respective request also preferably includes the appropriate account identifier for the account that is to be updated by each Account Authority 5162,5164, which information is part of the Registration Information maintained by the Central Key Authority 5160.

Upon receipt (Step 5502) of the EC 5166 by Account Authority 5162, the request (R1) is authenticated (Step 5504) using a public key of the Central Key Authority 5160, which preferably is obtained by the Account Authority 5162 beforehand. The Account Authority 5162 also may authenticate the original message (M) in EC 5122, as desired. Upon successful authentication, the Account Authority 5162 updates (Step 5506) the account identified by the account identifier (Acc#) in the EC 5166 by associating the new public key (PuK2) with the account.

Similarly, upon receipt (Step 5102) of the EC 5168 by Account Authority 5164, the request (R2) is authenticated (Step 5104) using the public key of the Central Key Authority 5160, which preferably is obtained by the Account Authority 5164 beforehand. The Account Authority 5164 also may authenticate the original message (M) in EC 5122, as desired. Upon successful authentication, the Account Authority 5164 updates (Step 5106) the account identified by the account identifier (Acc#) in the EC 5168 by associating the new public key (PuK2) with the account.

As will be appreciated by those having ordinary skill in the art, while two Account Authorities have been illustrated in the preferred implementation of FIGS. 47-51, any number of Account Authorities may be sent a respective EC by the Central Key Authority as appropriate and desired. Indeed, the more Account Authorities that are contacted, the more efficient and convenient the preferred implementation in accordance with the sixth aspect of the present invention.

C. Trusted Authentication

In view of the foregoing detailed description of the two aspects of the present invention, it will be appreciated by those having ordinary skill in the art that, by providing for both Factor B Entity Authentication and/or Factor C Entity Authentication of a Sender and a User in accordance with the first aspect, and in combination therewith, reliably identifying security aspects of a device generating a particular digital signature in accordance with the second aspect, a trusted authentication system is established using strong authentication based on digital signatures. The first aspect of the present invention—performing Factor B and/or Factor C Entity Authentication by a device—binds the device to a person through a Secret or a biometric characteristic of the person. The Second aspect of the present invention—manufacturing a device in a secure environment with a private key securely stored therein and recording the security aspects of the device for reliable identification later—binds the public-private key pair to the device. The identification of the person to which the device is bound as an account holder and the association of the public key bound to the device with the account then provides a foundation of trust as strong as the techniques used to identify the account holder.

From the recipient's perspective, the benefits of the present invention include the benefit of performing three factor Entity Authentication (Factors A, B, and C) in only performing Factor A Entity Authentication, which is a very simple process in itself but to date is believed to have only been widely utilized for the purposes of non-repudiation and not trusted authentication rising to the levels of Factor B and/or Factor C Entity Authentication. This reduces the costs and improves the efficiency of the entity authentication process performed by the recipient while increasing the trust and decreasing the risk in the system. The recipient, upon message authentication, merely evaluates the verification status identified by the device in deciding whether to accept the authentication performed by the device. Moreover, the recipient is able to determine an assurance of the device in reasonably relying upon the identified verification status by the device.

From the sender's perspective, the present invention increases the security and trust in the system without increasing risks to the sender's privacy. No biometric characteristics and no Secrets of the sender are disclosed to the recipient. Therefore, no risk of interception exists during transmission of this type of information and no risk of loss exists from safekeeping of this information by recipients.

1. Point of Sale Transaction Within a Trusted Authentication System

An exemplary business application 5600 implementing the trusted authentication system described above is illustrated in FIG. 56. In this example, an account holder comprising a purchaser 5602 possesses a device in the form of a PDA 5650.

The PDA 5650 securely protects therein a private key of a public-private key pair. Such private key is installed within the PDA 5650, for example, on a secure microchip or on secure card inserted into an expansion slot within the housing of the PDA 5650. The PDA 5650 further includes an interactive display screen 5652, user input keys 5654, and a thumbprint biometric reader 5656. Further, the PDA 5650 has been suitably equipped with a wireless internal antenna (and other conventional hardware and software) whereby the PDA 5650 is capable of communicating in a wireless environment, including a point of sale location. The PDA 5650 also has installed thereon suitable software to enable it to receive, generate, and transmit electronic messages in the wireless environment.

As shown, the purchaser 5602 is at a point of sale location, at which he is attempting to purchase a dog 5604. The seller (not shown) of the dog 5604 accepts payment at merchant cash register/terminal 5660, which has its own display 5662 and a suitable antenna (e.g., "bluetooth-type"—not shown), which also is able to communicate wirelessly, for example, with the PDA 5650. Further, the merchant cash register/terminal 5660 is in communication with a standard financial network 5608, which is in communication with and has the capability of correctly routing communications between the merchant (via the merchant cash register/terminal 5660) and the financial institution 5612.

The PDA 5650 is associated with multiple accounts maintained with multiple account authorities, including the financial institution 5612, the purchaser's employer 5622, and the manager of the purchaser's frequent flyer program 5632. Accounts maintained with the account authorities are associated with account records maintained in one or more account databases, collectively referred to and illustrated in this figure by account databases 5614,5624,5634, respectively. In this example, the financial institution 5612 is the relevant account authority, which maintains a banking or credit card account on behalf of the authorized user of the PDA 5650. It is also assumed, in this example, that the PDA 5650 is associated with the account of the authorized user of the PDA 5650 in account database 5614. As has been described previously, the purchaser's account in database 5614 includes, for example, a unique account identifier comprising an account number, which correspondingly is associated, in the database 5614, with account information, including customer-specific information and account-specific information. In accordance with the present invention, the account number also identifies public key information, which includes at least a public key of the purchaser's PDA 5650. Also in accordance with the present invention, the account number identifies Device Profile information for the PDA 5650. The Device Profile includes the Security Profile and transactional history of the PDA 5650. The Security Profile includes the security features and manufacturing history of the PDA 5650. The security features include those features of the PDA 5650 that protect the private key and other data within the PDA 5650 from discovery ("Security Characteristics") and features that perform entity authentication ("Authentication Capabilities").

With particular regard to FIG. 57, the purchaser 5702 initiates (Step 5702) a transaction with a merchant when the purchaser 5702 requests to purchase the dog 5604 and pay for her at the merchant cash register/terminal 5660. The merchant "rings up" (Step 5704) the dog 5604 on the merchant cash register/terminal 5660 and the total balance due is displayed (Step 5706) to the purchaser 5602 initially on the display 5662. In order to be paid, the merchant transmits (Step 5708) a message (M1) 5680, which itemizes the purchase and presents the amount due for the purchase. The message (M1) 5680 is received (Step 5710) by the PDA 5650, which then displays (Step 5712) the same message (M1) 5680 on display 5652 for viewing (shown by line 5682) by the purchaser 5602. The PDA 5650, in response to receipt of the message (M1) 5680, prompts (Step 5714) the purchaser 5602 to confirm the purchase by selecting (Step 5716) an account for payment (preferably from a list of all such possible accounts of the purchaser as maintained in memory in the PDA 5650. Once an account is selected, the purchaser 5602 is prompted (Step 5718) to input two types of verification data, in this case a PIN and a thumbprint. The purchaser 5650 inputs (Step 5720) a PIN 5684 and a thumbprint 5686.

The PDA 5650 then compares (Step 5722) the two types of verification data with prestored data and determines (Step 5724) a verification status of the PDA 5650. An indicator of the verification status (IVS) is then combined (Step 5726) with the message (M1) from the merchant and with the account identifier (acctID) corresponding with the payment account previously selected by the purchaser 5650. The PDA 5650 then originates (Step 5728) a digital signature for the message by first calculating a hash value for the data and then encrypting the hash value using the private key retained within the PDA 5650. The PDA 5650 then outputs (Step 5730) the digital signature, which is received by the merchant cash register/terminal 5660, which then transmits (Step 5732) the message and the digital signature therefor in an EC 5690 to the financial institution 5612 (via financial network 5608) and waits (Step 5734) for a response from the financial institution 5612.

With reference to FIG. 58, after the financial network 5608 routes the EC 5692, it is received (Step 5802) by the financial institution 5612 from the merchant cash register/terminal 5660. The financial institution 5612 then retrieves (Step 5804) from the account database 5614 the public key that is identified by the account number in the EC 5692. Using this public key, the financial institution 5612 attempts to authenticate (Step 5806) the message. If the message does not authenticate (in Step 5808), then the financial institution 5612 responds (Step 5810) to the merchant (via financial network 5608) with a rejection 5694 of the message. Such a response may indicate the reason for the rejection. If the message authenticates (in Step 5808), then the financial institution 5612 concludes that the message, in fact, came from the person possessing the correct PDA 5650 associated with the identified account number—(i.e., Factor A Entity Authentication is obtained). The financial institution 5612 then further processes (Step 5812) the message.

Further processing (Step 5812) includes evaluation and consideration (Step 5814) of numerous factors that are used by the financial institution 5612, ultimately, to determine whether or not to act on the message (e.g., approve the transaction against the account specified). The evaluation and consideration (Step 5814) includes an evaluation (Step 5816) of the authentication capabilities of the PDA 5650 and an analysis of the verification status (IVS) provided by the PDA 5650, an evaluation (Step 5818) of the security characteristics associated with the PDA 5650, an evaluation (Step 5820) of the environmental factors surrounding the EC 5690,5692, consideration (Step 5822) of the transactional history of the PDA 5650 and/or the account (acctID) associated with the EC 5690,5692, and consideration (Step 5824) of other account or business-specific factors. Whether the financial institution 5612 considers some or all of the above factors, how much weight or importance the financial institution 5612 applies to any particular factor, and the order, if any, in which the financial institution 5612 evaluates or considers the above factors varies from one account authority to the next according to each account authority's own particular business concerns, needs, objectives, purposes, and risks. Thus, each account authority (e.g., financial institution) uses its own business rules and judgment to determine (Step 5826), based on any or all of the factors considered (in Step 5814), whether the instruction from the message should be performed. If the determination (in Step 5826) is negative, then the financial institution 5612 replies (Step 5810) with a rejection 5694 of the message. If the determination (in Step 5826) is positive, then the account authority performs (Step 5828) the instruction from the message (and notifies the merchant with EC 5694,5696 accordingly) and updates (Step 5830) the account record accordingly.

Referring back to FIG. 57, once the merchant receives the response from the financial institution 5612, the determination in Step 5734 is positive. The merchant next determines (Step 5736) whether the response is an approval or rejection of the transaction. If the financial institution 5612 does not approve the transaction, then the merchant notifies (Step 5738) the purchaser 5602 that the transaction was not approved. On the other hand, if the determination in Step 5736 is positive, then the merchant completes the sale (Step 5740) by giving the purchaser 5602 the dog 5604.

D. Additional Security and Privacy Measures

1. Protecting Against Fraudulent Displays

A risk of using a device, such as the IC card 95, in conjunction with the example given in FIG. 33 is the fact that the user of the IC card 95 must rely upon the display 3314 of the card reader 3308, which is under the control of the point of sale merchant, to present an actual representation of the message displayed for generating a digital signature with the IC card 95. It is possible for an unscrupulous merchant, for example, to display a purchase price of one amount but have the message data that is transmitted by the card reader 3308 to the IC card 95 to have a higher purchase price. To minimize the risk of such fraud, it is preferable for the computer chip 50, described in FIG. 28, to be installed in a more sophisticated device, such as a PDA or cell phone, which has its own display (presumably under the control of the owner of the device). Since a PDA or cell phone could be programmed to display the full text of message data accurately prior to the generation of a digital signature thereof with the device, it would be more difficult for a merchant to "present" one purchase price to the customer but actually have a different purchase price included within the message to be digitally signed.

2. Protecting Account Information

Unlike an IC card 95, a PDA or cell phone also provides the user with much greater flexibility and privacy. For example, continuing with the illustration from FIG. 33, rather than having the point of sale reader 3308 prompt the user to select from only a limited number of primary payment accounts, a PDA or cell phone enables the user to store and select from all payment accounts stored on the device. In addition, rather than having the point of sale reader 3308 actually retrieve all available payment accounts from the IC card 95, which potentially raises some privacy concerns, a PDA or cell phone allows the user to select an account from a list presented by the device and not by the point of sale merchant. Thus, the point of sale merchant never becomes privy to the list of account numbers maintained by the device.

3. Protecting Against Replay Attacks

In all of the examples illustrated in FIGS. 29-33, the party receiving the digital signature generated by the IC card 95 is potentially subject to a replay attack. A replay attack occurs when an original digital signature from a device is copied and then reused in an unauthorized manner. Since both the original and copy of a digital signature will decrypt with the appropriate public key, the party receiving the digital signature needs to have some way of distinguishing between the original and a later copy.

To prevent the acceptance of recorded digital signatures, it is merely necessary for the party guarding against the replay attack to include a random number or unique message (e.g., time of day, date, and counter combination) as part of each message input command sent to a device for originating a digital signature and require that the random number or unique message be included in what is digitally signed. The party receiving back the digital signature thereby is able to confirm, upon Message Authentication, that the digital signature received from the device was actually generated by the device in direct response to the corresponding message input command. Such techniques are set forth, for example, in *Federal Information Processing Standards Publication* 196, *Entity Authentication Using Public Key Cryptograph*, U.S. DOC/NBS, Feb. 18, 1997 (hereinafter "FIPS PUB 196"), which is incorporated herein by reference and which is available for download at http://csrc.nist.gov/publications/fips.

For applications in which the party receiving the digital signature (e.g., a card reader or associated controller) is involved in only one authentication session at any given time and when a response is expected substantially contemporaneously (e.g. while the device is in or near a reader), it is only necessary to maintain the random number or unique message in computer memory long enough to ensure that the digital signature received back within the expected time interval contains the appropriate random number or unique message. This random number or unique message is good for only one digital signature and it is assumed that the first digital signature received by the party is the original and that subsequent identical digital signatures, if any, are fraudulent copies and handled as such.

For applications in which the party receiving the digital signature is involved in more than one authentication session at any given time, such as, for example, a website that is entertaining simultaneous requests from multiple users for entry to the site and/or for transactions through the site, it is necessary for the party to maintain a log of all random numbers or unique messages that have been sent out to all devices for the generation of digital signatures. It is also necessary for the party to link or otherwise associate each such random number or unique message with the particular session in which it is used. Thus, when a digital signature is received back within a particular session, the party can confirm that the correct random number was received and digitally signed for such session The generation of random numbers may be performed, for example, using any of the random number generators specified in appendix 3 of FIPS PUB 186-2.

For one-way financial transactions and other transactions not involving the establishment of a session, a recipient is unable to provide a unique message for signing in order to guard against a replay attack. In this situation, the recipient preferably maintains a log of previous digital signatures if they are originated in accordance with the Digital Signature Standard. Furthermore, the recipient may only accept ECs having time and date stamps and, additionally, only accept such ECs within a predetermined window of time.

Accordingly, it readily will be understood by those persons skilled in the art that, in view of the above detailed description of the preferred implementations, devices, and methods of the present invention, the present invention is susceptible of broad utility and application. Many methods, implementations, and adaptations of the present invention other than those herein described, as well as many variations, modifications, and equivalent arrangements, will be apparent from or reasonably suggested by the present invention and the following detailed description thereof, without departing from the substance or scope of the present invention. Furthermore, those of ordinary skill in the art will understand and appreciate that although steps of various processes may be shown and described in some instances as being carried out in a preferred sequence or temporal order, the steps of such processes are not necessarily to be limited to being carried out in such particular sequence or order. Rather, in many instances the steps of processes described herein may be carried out in various different sequences and orders, while still falling within the scope of the present invention. Accordingly, while the present invention is described herein in detail in relation to preferred implementations and devices, it is to be understood that this detailed description only is illustrative and exemplary of the present invention and is made merely for purposes of providing a full and enabling disclosure of the invention. The detailed description set forth herein is not intended nor is to be construed to limit the present invention or otherwise to exclude any such other implementations, adaptations, variations, modifications and equivalent arrangements of the present invention, the present invention being limited solely by the claims appended hereto and the equivalents thereof.

What is claimed is:

1. A method of establishing trusted entity authentication associated with an electronic communication (EC), comprising:
    (a) manufacturing a device within a secure environment, wherein manufacturing the device comprises:
        (i) creating a public-private key pair before release of the device from the secure manufacturing environment,
        (ii) storing the private key securely within the device before release of the device from the secure manufacturing environment, and
        (iii) linking within the secure manufacturing environment in a secure manner the public key with other information associated with the device;
    (b) after its manufacture, using the device to generate a digital signature as part of the EC, wherein generating the digital signature comprises:
        (i) receiving into the device input comprising verification data of an entity,
        (ii) identifying within the device a current verification status out of a plurality of predefined verification statuses as a function of the input verification data and data prestored within the device, each verification status regarding an entity authentication performed by the device,
        (iii) independent of the verification status identified, generating the digital signature for a message as a function of said identified verification status, including modifying within the device the message as a function of said identified verification status, said generated digital signature comprising an indication of the identified verification status, and
        (iv) outputting from the device the digital signature for transmission as part of the EC to a recipient; and
    (c) upon receipt of the EC by the recipient,
        (i) extracting the indication of the identified verification status from the EC and identifying the other information linked with the public key of the device by successfully authenticating the message using the public key of the device, and
        (ii) acting on the message in the EC based on the indication of the identified verification status included in the EC, based on the contents of the message itself, and based on said identified information linked with the public key.

2. The method of claim 1, wherein the other information comprises a Security Profile of the manufactured device and wherein the secure manner of linking comprises recording together the public key with the Security Profile of the manufactured device and generating a digital signature therefor to collectively define a Security Certificate, the public key and Security Profile thereby being securely linked together; and before the device is released from the secure environment, incorporating its Security Certificate into the device such that the Security Certificate is sent in the EC with the digital signature generated by the device.

3. The method of claim 1, wherein the other information comprises a Security Profile of the manufactured device and wherein the secure manner of linking comprises recording the linked public key and the Security Profile of the manufactured device in a database and maintaining the database in an environment having a security rating at least comparable to a security level of the device.

4. The method of claim 1, wherein the other information comprises a Security Profile of the manufactured device and wherein the secure manner of linking comprises generating a digital signature for a reference including the linked public key and the Security Profile of the manufactured device, publishing the reference and digital signature therefor, and maintaining the private key used in generating the digital signature for the reference in an environment having a security rating that is at least comparable to a security level of the device to which the reference pertains.

5. The method of claim 1, wherein the other information comprises a Security Profile, and wherein the secure manner of linking comprises recording the public key and the Security Profile in a database of public keys linked with Security Profiles of devices, and maintaining the database in an environment having a security rating at least comparable to a security level of each device for which the public key thereof is linked.

6. The method of claim 1, wherein authenticating the message using the public key of the device comprises (a) modifying data representing the message as a function of a suspected verification status of the device, (b) calculating a message digest as a function of said modified data, (c) decrypting said generated digital signature received in the EC with the public key, and (d) concluding the verification status of the device as being the suspected verification status of the device when said calculated message digest matches said decrypted digital signature.

7. The method of claim 1, further comprising generating a digital signature within the device using a digital signature algorithm, and then using said generated digital signature as a random number in an application requiring a random number.

8. The method of claim 7, further comprising using the digital signature as a random number to safeguard against a replay attack.

9. The method of claim 7, further comprising using the digital signature to generate a session key for encrypted communications.

10. A method in which a recipient of an electronic communication (EC) authenticates an entity solely by conducting message authentication with respect to the received EC, which includes unique identifier associated with an account maintained by the recipient, a message regarding the account, and a digital signature of the message, the method comprising:

(a) before receipt of the EC:
   (i) associating a public key of a public-private key pair with the unique identifier in a database maintained by the recipient, and
   (ii) retrieving information linked with the public key, the information identifying security aspects of a device used to generate digital signatures using the private key stored securely therein, the public-private key pair having been created within an environment of manufacture of the device and the private key having been stored within the device prior to release of the device from the environment following its manufacture; and
(b) thereafter,
   (i) using only the digital signature from the EC and the public key associated with the account identifier to authenticate the message, and
   (ii) upon successful authentication of the message, acting upon the message based on;
      (A) said information linked with the public key, and
      (B) an indication included in the EC of a verification status of the device out of a plurality of predefined verification statuses, the verification status regarding an entity authentication performed by the device as a function of verification data of the entity input into the device and data prestored within the device.

11. A method in which a recipient of an electronic communication (EC) authenticates an entity solely by conducting message authentication with respect to the received EC, which includes a unique identifier associated with an account maintained by the recipient, a message regarding the account, and a digital signature of the message, the method comprising:
(a) before receipt of the EC:
   (i) associating a public key of a public-private key pair with the unique identifier in a database maintained by the recipient, and
   (ii) retrieving information linked with the public key, the information identifying security aspects of a device used to generate digital signatures using the private key stored securely therein; and
(b) thereafter,
   (i) using only the digital signature from the EC and the public key associated with the account identifier to authenticate the message, and
   (ii) upon successful authentication of the message, acting upon the message based on;
      (A) said information linked with the public key, and
      (B) an indication included in the EC of a verification status of the device out of a plurality of predefined verification statuses, the verification status regarding an entity authentication performed by the device as a function of verification data of the entity input into the device and data prestored within the device.

12. A method in which a recipient of an electronic communication (EC) authenticates an entity solely by conducting message authentication with respect to the received EC, which includes a unique identifier associated with an account maintained by the recipient, a message regarding the account, and a digital signature of the message, the method comprising:
(a) before receipt of the EC, associating a public key of a public-private key pair with the unique identifier in a database maintained by the recipient; and thereafter
(b) using only the digital signature from the EC and the public key associated with the account identifier to authenticate the message, and upon successful authentication of the message, acting upon the message based on an indication included in the EC of a verification status of the device out of a plurality of predefined verification statuses, the verification status regarding an entity authentication performed by the device as a function of verification data of the entity input into the device and data prestored within the device.

13. A method in which a recipient of an electronic communication (EC) authenticates an entity solely by conducting message authentication with respect to the received EC, which includes a unique identifier associated with an account maintained by the recipient, a message regarding the account, and a digital signature of the message, the method comprising:
(a) before receipt of the EC:
   (i) associating a public key of a public-private key pair with the unique identifier in a database maintained by the recipient, and
   (ii) retrieving information linked with the public key, the information identifying security aspects of a device used to generate digital signatures using the private key stored securely therein, the public-private key pair having been created within an environment of manufacture of the device and the private key having been stored within the device prior to release of the device from the environment following its manufacture; and
(b) thereafter,
   (i) using only the digital signature from the EC and the public key associated with the account identifier to authenticate the message, and
   (ii) upon successful authentication of the message, acting upon the message based on said information linked with the public key.

* * * * *